US012719586B2

(12) United States Patent
Rijsman et al.

(10) Patent No.: US 12,719,586 B2
(45) Date of Patent: Aug. 25, 2026

(54) OPERATING A LAYERED QUANTUM NETWORKING ENVIRONMENT WITH ENTANGLEMENT SWAP OPERATIONS

(71) Applicant: Aliro Technologies, Inc., Brighton, MA (US)

(72) Inventors: Bruno Rijsman, Seattle, WA (US); Michael Cubeddu, New York, NY (US); Matthew Skrzypczyk, Downers Grove, IL (US)

(73) Assignee: Aliro Technologies, Inc., Brighton, MA (US)

( * ) Notice: Subject to any disclaimer, the term of this patent is extended or adjusted under 35 U.S.C. 154(b) by 286 days.

(21) Appl. No.: 18/545,181

(22) Filed: Dec. 19, 2023

(65) Prior Publication Data

US 2024/0204887 A1 Jun. 20, 2024

Related U.S. Application Data

(60) Provisional application No. 63/433,775, filed on Dec. 20, 2022.

(51) Int. Cl.
*H04B 10/00* (2013.01)
*G06N 10/20* (2022.01)
(Continued)

(52) U.S. Cl.
CPC ............. *H04B 10/70* (2013.01); *G06N 10/20* (2022.01); *G06N 10/40* (2022.01); *G06N 10/70* (2022.01);
(Continued)

(58) Field of Classification Search
CPC .... H04B 10/70; H04J 14/0267; H04L 9/0852; H04L 9/0855
See application file for complete search history.

(56) References Cited

U.S. PATENT DOCUMENTS

| | | | |
|---|---|---|---|
| 11,367,014 | B2 | 6/2022 | Vacon et al. |
| 12,132,486 | B2 | 10/2024 | Sivan et al. |

(Continued)

OTHER PUBLICATIONS

W. Kozlowski et al., "Designing a quantum network protocol", ACM, Proceedings of the 16th International Conference on Emerging Networking Experiments and Technologies, pp. 1-24, Dec. 1, 2020, DOI: 10.1145/3386367.3431293.

(Continued)

*Primary Examiner* — Daniel G Dobson
(74) *Attorney, Agent, or Firm* — Young Basile Hanlon & MacFarlane. P.C

(57) ABSTRACT

At a first node in a network, a first (second) message is received indicating that a first (second) quantum element at the first node is entangled with a quantum element at a second (third) node in the network. The first (second) message comprises a first (second) identifier that uniquely identifies one of a plurality of entanglement generation operations between the first and second (third) nodes over a first time period. At the first node, a third identifier is generated that identifies an entanglement resulting from an entanglement swap operation based on the entangled quantum elements at the first and second nodes and the entangled quantum elements at the first and third nodes. At least a portion of the first identifier is included in the third identifier, and at least a portion of the second identifier is included in the third identifier.

30 Claims, 61 Drawing Sheets

(51) Int. Cl.

| | |
|---|---|
| ***G06N 10/40*** | (2022.01) |
| ***G06N 10/70*** | (2022.01) |
| ***H04B 10/70*** | (2013.01) |
| ***H04L 9/08*** | (2006.01) |
| ***H04L 9/32*** | (2006.01) |
| *H04J 14/00* | (2006.01) |

(52) U.S. Cl.
CPC .......... *H04L 9/0855* (2013.01); *H04L 9/0858* (2013.01); *H04L 9/3297* (2013.01)

(56) References Cited

U.S. PATENT DOCUMENTS

| | | | | |
|---|---|---|---|---|
| 2008/0089696 | A1 | 4/2008 | Furuta | |
| 2015/0055961 | A1 | 2/2015 | Meyers et al. | |
| 2016/0315715 | A1 | 10/2016 | Smith et al. | |
| 2017/0134100 | A1* | 5/2017 | Smith .................... | H04B 10/70 |
| 2020/0125985 | A1 | 4/2020 | Narang et al. | |
| 2020/0394276 | A1 | 12/2020 | Woerner et al. | |
| 2021/0105135 | A1 | 4/2021 | Figueroa et al. | |
| 2021/0175976 | A1 | 6/2021 | Rahman | |
| 2021/0182726 | A1 | 6/2021 | Harry Putra et al. | |
| 2022/0006534 | A1 | 1/2022 | Reilly | |
| 2022/0036230 | A1 | 2/2022 | Wang et al. | |
| 2022/0094442 | A1 | 3/2022 | Isaacson | |
| 2022/0114471 | A1 | 4/2022 | Vacon et al. | |
| 2022/0215279 | A1 | 7/2022 | Rahman | |
| 2022/0269976 | A1 | 8/2022 | Wang et al. | |
| 2022/0358390 | A1 | 11/2022 | Ruedinger | |
| 2023/0421367 | A1* | 12/2023 | Figueroa ............ | G01B 9/02017 |
| 2024/0202565 | A1 | 6/2024 | Rijsman et al. | |
| 2025/0007701 | A1 | 1/2025 | Rijsman et al. | |

OTHER PUBLICATIONS

S. DiAdamo et al., "Packet Switching in Quantum Networks: A Path to Quantum Internet", American Physical Society, Phys. Rev. Res., pp. 1-14, May 16, 2022, DOI: 10.1103/PhysRevResearch.4.043064.

M. Pompili et al., "Experimental demonstration of entanglement delivery using a quantum network stack", npj Quantum Information, pp. 1-20, Nov. 25, 2021, DOI: 10.1038/s41534-022-00631-2.

H. Leone et al., "QuNet: Cost vector analysis & multi-path entanglement routing in quantum networks", arXiv preprint, pp. 1-28, Dec. 20, 2021, DOI: 10.48550/arXiv.2105.00418.

S. Das et al., "Robust quantum network architectures and topologies for entanglement distribution", American Physical Society (APS), Physical Review A, pp. 1-14, Feb. 1, 2018, DOI: 10.1103/physreva.97.012335.

K. Goodenough et al., "Optimizing repeater schemes for the quantum internet", American Physical Society (APS), Physical Review A, pp. 1-39, Jun. 22, 2020, DOI: 10.1103/physreva.103.032610.

M. Skrzypczyk et al., "An Architecture for Meeting Quality-of-Service Requirements in Multi-User Quantum Networks".

W. Kozlowski et al., "A P4 Data Plane for the Quantum Internet", ACM, Proceedings of the 3rd P4 Workshop in Europe, pp. 1-3, Oct. 21, 2020, DOI: 10.1145/3426744.3431321.

S. Wehner et al., "Quantum internet: A vision for the road ahead", Science, vol. 362, 12 pages, Oct. 19, 2018, DOI: 10.1126/science.aam9288.

K. Chakraborty et al., "Distributed Routing in a Quantum Internet", arXiv, quant-ph, pp. 1-37, Jul. 26, 2019, DOI: 10.48550/arXiv.1907.11630.

K. Chakraborty et al., "Entanglement Distribution in a Quantum Network: A Multicommodity Flow-Based Approach", Institute of Electrical and Electronics Engineers (IEEE), IEEE Transactions on Quantum Engineering, pp. 1-18, May 28, 2020, DOI: 10.1109/tqe.2020.3028172.

A. Pirker et al., "A quantum network stack and protocols for reliable entanglement-based networks", IOP Publishing, New Journal of Physics, pp. 1-24, Mar. 25, 2019, DOI: 10.1088/1367-2630/ab05f7.

R. Van Meter et al., "Recursive quantum repeater networks", National Institute of Informatics (NII), Progress in Informatics, pp. 1-14, May 6, 2011, DOI: 10.2201/niipi.2011.8.8.

M. Pant et al., "Routing entanglement in the quantum internet", arXiv, quant-ph, pp. 1-13, Sep. 22, 2017, DOI: 10.48550/arXiv.1708.07142.

Y. Lee et al., "A quantum router architecture for high-fidelity entanglement flows in quantum networks", Springer Science and Business Media LLC, npj Quantum Information, pp. 1-16, Oct. 22, 2022, DOI: 10.1038/s41534-022-00582-8.

W. Dür et al., "Entanglement purification and quantum error correction", IOP Publishing, Reports on Progress in Physics, 48 pages, Aug. 7, 2007, DOI: 10.1088/0034-4885/70/8/r03.

M. Alshowkan et al., "Reconfigurable Quantum Local Area Network Over Deployed Fiber", American Physical Society (APS), PRX Quantum, pp. 1-12, Feb. 26, 2021, DOI: 10.1103/prxquantum.2.040304.

R. Van Meter et al., "Optimizing Timing of High-Success-Probability Quantum Repeaters", arXiv, quant-ph, pp. 1-12, Jan. 17, 2017, DOI: 10.48550/arXiv.1701.04586.

R. Van Meter et al., "A Quantum Internet Architecture", 2022 IEEE International Conference on Quantum Computing and Engineering (QCE), pp. 1-17, Dec. 14, 2021, DOI: 10.1109/qce53715.2022.00055.

A. S. Cacciapuoti et al., "When Entanglement Meets Classical Communications: Quantum Teleportation for the Quantum Internet", IEEE Transactions on Communications, 23 pages, Jul. 17, 2019, DOI: 10.1109/TCOMM.2020.2978071.

G. Vardoyan et al., "On the quantum performance evaluation of two distributed quantum architectures" Elsevier BV, Performance Evaluation, 35 pages, Dec. 23, 2021, DOI: 10.1016/j.peva.2021.102242.

T. Coopmans et al., "NetSquid, a NETwork Simulator for Quantum Information using Discrete events", Commun Phys 4, 15 pages, 2021, DOI: 10.1038/s42005-021-00647-8.

W. Kozlowski et al., "Architectural Principles for a Quantum Internet", Internet Engineering Task Force, 43 Pages, Aug. 28, 2022, Retrieved from URL: <https://datatracker.ietf.org/doc/draft-irtf-qirg-principles/11/>.

Dahlberg et al., "A link layer protocol for quantum networks", SIGCOMM '19: Proceedings of the ACM Special Interest Group on Data Communication, 2019, pp. 159-173.

Wang et al., "Fidelity-Guaranteed Entanglement Routing in Quantum Networks", arXiv, 22, Jun. 2022, Retrieved from the internet URL: https://arxiv.org.abs/2111.07764.

Lu et al., "Quantum state tomography and fidelity estimation via Phaselift", In: Annals of Physics 360 (2015) 161-179, May 2, 2015, retrieved on Apr. 22, 2024, URL: https://www.sciencedirect.com/science/article/pii/S0003491615001815.

Hoeven, "Entanglement tracking and EPL entanglement generation in quantum networks using the discrete event simulator QNetSquid", In: Thesis for the degree of Master of Science in Applied Physics, Delft, the Netherlands, Aug. 2018, retrieved on Apr. 22, 2024, URL: https://repository.tudelft.nl/islandora/object/uuid%3Ad94bff29-3c16-45eb-a9f1-40aaf73fpc22.

Baccoittni et al., "A Configurable Protocol for Quantum Entanglement Distribution to End Nodes", In: arXiv, Nov. 25, 2022, retrieved on Apr. 22, 2024, URL: https://arxiv.org/abs/2211.14045v1.

Winnel at al., Achieving the ultimate end-to-end rates of lossy quantum communication networks:, In: npj Quantum Information vol. 8, Article No. 129 (2022), Nov. 8, 2022, retrieved on Apr. 22, 2024, URL: https://www.nature.com/articles/s41534-022-00641-0.

Wang et al., "An Asynchronous Entanglement Distribution Protocol for Quantum Networks", IEEE Network, vol. 36, Iss. 5, 8 pages, 2022, DOI: 10.1109/MNET.001.2200177.

DiAdamo et al., "Distributed Quantum Computing and Network Control for Accelerated VQE," in IEEE Transactions on Quantum Engineering, vol. 2, pp. 1-21 (Year: 2021).

* cited by examiner

3400

3900

4000

OPERATING A LAYERED QUANTUM NETWORKING ENVIRONMENT WITH ENTANGLEMENT SWAP OPERATIONS

CROSS-REFERENCE TO RELATED APPLICATION(S)

This application claims priority to and the benefit of U.S. Provisional Application Ser. No. 63/433,775, entitled "OPERATING A LAYERED QUANTUM NETWORKING ENVIRONMENT," filed Dec. 20, 2022, the entire disclosure of which is hereby incorporated by reference.

TECHNICAL FIELD

This disclosure relates to operating a layered quantum networking environment with entanglement swap operations.

BACKGROUND

A variety of proposals have been presented for delivering entanglement using a quantum network stack. Some techniques use a physical layer to manage attempts at entanglement generation, and a link layer above the physical layer that abstracts the physical-layer entanglement attempts into a more robust entanglement delivery service. A network controller may provide a time-division multiple access (TDMA) network schedule where each time bin is reserved for a certain class of entanglement generation requests. Fidelity of generated quantum states may be managed to meet a particular minimum fidelity requirement.

SUMMARY

In one aspect, in general, a method for managing entangled quantum states in a network of nodes comprises: sending, from a controller in the network, at least a portion of scheduling information to each of a plurality of nodes in the network, where the scheduling information specifies a procedure to be executed for scheduling entanglement swap operations associated with portions of a plurality of paths through nodes in the network; for each of two or more pairs of nodes on a first path over a set of N nodes in the network, establishing entanglement between pairs of quantum elements in the respective nodes of that pair of nodes based at least in part on one or more quantum signals transmitted over one or more quantum communication channels, where N>3; performing a plurality of entanglement swap operations among different respective subsets of nodes in the set of N nodes using the pairs of entangled quantum elements, and managing the plurality of entanglement swap operations during establishment of end-to-end entanglement between respective quantum elements in the nodes at the ends of the first path over the set of N nodes based at least in part on: the scheduling information, identifiers that identify entanglement resulting from respective entanglement swap operations, and a plurality of estimates of fidelity of entanglement between a first quantum element at the first node in the network and a second quantum element at a second node in the network, where the plurality of estimates are generated at different respective times and/or at different respective nodes in the network.

Aspects can include one or more of the following features.

The controller sends fidelity tracking information to a plurality of nodes in the network, where the fidelity tracking information comprises one or more of the plurality of estimates.

At least one of the nodes in the set of N nodes sends fidelity tracking information to the controller, where the fidelity tracking information comprises one or more of the plurality of estimates.

At least a portion of the scheduling information sent to a particular node specifies a procedure to be executed at the particular node based on a finite state machine that includes (1) two or more states that include at least one state associated with performing an entanglement swap operation at the particular node, and (2) at least one transition between states based on a message received by the particular node and at least one transition between states based on an entanglement swap operation having been attempted at the particular node.

The states of the finite state machine include at least one state associated with sending a message from the particular node to another node in the set of N nodes.

The states of the finite state machine include at least one state associated with sending a message from the particular node to the controller.

At least a portion of the scheduling information that specifies the procedure to be executed at the particular node based on the finite state machine is provided from the controller in a message sent to the particular node that further comprises a virtual circuit identifier identifying a first virtual circuit, and information indicating that the particular node is associated with the first virtual circuit.

Managing the plurality of entanglement swap operations during establishment of end-to-end entanglement between respective quantum elements in the nodes at the ends of the first path comprises, in response to an entanglement lost message indicating a loss of entanglement associated with a first pair of nodes on the first path, attempting to re-establish entanglement between pairs of quantum elements in the respective nodes of the first pair of nodes based at least in part on one or more quantum signals transmitted over at least one of the one or more quantum communication channels.

The entanglement lost message includes at least a portion of delay information, where the delay information indicates a time delay before attempting to re-establish entanglement after the entanglement lost message is received.

The delay information is determined by the controller.

The delay information is determined based at least in part on a machine learning algorithm.

The entanglement lost message includes a virtual circuit identifier identifying a first virtual circuit associated with the first path.

The entanglement lost message is sent after a predetermined time delay.

The method further comprises sending, from the controller, a plurality of thresholds to the second node, and comparing, at the second node, the plurality of estimates of fidelity of entanglement to at least one of a first threshold of the plurality of thresholds or a second threshold of the plurality of thresholds.

The first threshold is associated with a first action performed in response to a result of comparing one of the estimates to the first threshold, and the first action comprises attempting to re-establish entanglement between a pair of quantum elements in respective nodes on the first path.

The second threshold is associated with a second action performed in response to a result of comparing one of the estimates to the second threshold, and the second action comprises performing an entanglement purification operation on a plurality of pairs of quantum elements in respective nodes on the first path.

The second threshold is higher than the first threshold.

Performing a first entanglement swap operation of the plurality of entanglement swap operations comprises performing a joint measurement on a non-entangled pair of quantum elements in the first node, where the first node is a member of two different pairs of nodes of the two or more pairs of nodes on the first path including a first pair of nodes comprising the first node and the second node and a second pair of nodes comprising the first node and a third node in the network, after establishing entanglement between pairs of quantum elements in the respective nodes of the first pair of nodes and establishing entanglement between pairs of quantum elements in the respective nodes of the second pair of nodes.

The joint measurement comprises a Bell state measurement.

For all of the two or more pairs of nodes on the first path for which entanglement is established, no path between a particular pair of nodes on the first path overlaps with any path between any other pair of nodes on the first path.

In another aspect, in general, one or more non-transitory computer readable media store a program for managing entangled quantum states in a network of nodes. The program comprises instructions operable to cause one or more processors to perform steps comprising: sending, from a controller in the network, at least a portion of scheduling information to each of a plurality of nodes in the network, where the scheduling information specifies a procedure to be executed for scheduling entanglement swap operations associated with portions of a plurality of paths through nodes in the network; for each of two or more pairs of nodes on a first path over a set of N nodes in the network, establishing entanglement between pairs of quantum elements in the respective nodes of that pair of nodes based at least in part on one or more quantum signals transmitted over one or more quantum communication channels, where N>3; performing a plurality of entanglement swap operations among different respective subsets of nodes in the set of N nodes using the pairs of entangled quantum elements; and managing the plurality of entanglement swap operations during establishment of end-to-end entanglement between respective quantum elements in the nodes at the ends of the first path over the set of N nodes based at least in part on: the scheduling information, identifiers that identify entanglement resulting from respective entanglement swap operations, and a plurality of estimates of fidelity of entanglement between a first quantum element at the first node in the network and a second quantum element at a second node in the network, where the plurality of estimates are generated at different respective times and/or at different respective nodes in the network.

In another aspect, in general, a system comprises: a network of nodes in which each of a plurality of nodes in the network of nodes includes at least one quantum element and is connected to at least one other node in the network of nodes by a quantum communication channel coupled to the quantum element; and a controller in the network in communication with at least one node in the network of nodes; where the controller and the network of nodes are configured to: send, from the controller, at least a portion of scheduling information to each of a plurality of nodes in the network, where the scheduling information specifies a procedure to be executed for scheduling entanglement swap operations associated with portions of a plurality of paths through nodes in the network; for each of two or more pairs of nodes on a first path over a set of N nodes in the network, establish entanglement between pairs of quantum elements in the respective nodes of that pair of nodes based at least in part on one or more quantum signals transmitted over one or more quantum communication channels, where N>3; perform a plurality of entanglement swap operations among different respective subsets of nodes in the set of N nodes using the pairs of entangled quantum elements; and manage the plurality of entanglement swap operations during establishment of end-to-end entanglement between respective quantum elements in the nodes at the ends of the first path over the set of N nodes based at least in part on: the scheduling information, identifiers that identify entanglement resulting from respective entanglement swap operations, and a plurality of estimates of fidelity of entanglement between a first quantum element at the first node in the network and a second quantum element at a second node in the network, where the plurality of estimates are generated at different respective times and/or at different respective nodes in the network.

In another aspect, in general, a method for managing entangled quantum states in a network of nodes, for a plurality of time periods comprises: receiving, at a first node in the network, a first message indicating that a first quantum element at the first node is entangled with a quantum element at a second node in the network, where the first message comprises a first identifier that uniquely identifies one of a plurality of entanglement generation operations between the first and second nodes over a first time period of the plurality of time periods; receiving, at the first node, a second message indicating that a second quantum element at the first node is entangled with a quantum element at a third node in the network, where the second message comprises a second identifier that uniquely identifies one of a plurality of entanglement generation operations between the first and third nodes over the first time period; and generating, at the first node, a third identifier that identifies an entanglement resulting from an entanglement swap operation based on the entangled quantum elements at the first and second nodes and the entangled quantum elements at the first and third nodes, where the generating comprises: including at least a portion of the first identifier in the third identifier, and including at least a portion of the second identifier in the third identifier.

Aspects can include one or more of the following features.

The generating further comprises: including in the third identifier one or more values that uniquely identify a link between the first and second nodes from all other links on a path through a series of nodes that includes the first, second, and third nodes, and including in the third identifier one or more values that uniquely identify a link between the first and third nodes from all other links on the path.

The one or more values that uniquely identify the link between the first and second nodes comprise a value that identifies the first node and a value that identifies the second node.

The first node receives the first message from the second node.

The first node receives the first message at a first layer executing on the first node from a second layer executing on the first node.

The first time period is longer than a time duration over which the first quantum element at the first node is configured to maintain at least a predetermined minimum fidelity of a stored quantum state.

Including at least a portion of the first identifier in the third identifier comprises including a portion of the first identifier corresponding to the second node and discarding a portion of the first identifier corresponding to the first node, and including at least a portion of the second identifier in the third identifier comprises including a portion of the second identifier corresponding to the third node and discarding a portion of the second identifier corresponding to the first node.

In another aspect, in general, one or more non-transitory computer readable media store a program for managing entangled quantum states in a network of nodes. The program comprises instructions operable to cause one or more processors to perform steps comprising: receiving, at a first node in the network, a first message indicating that a first quantum element at the first node is entangled with a quantum element at a second node in the network, where the first message comprises a first identifier that uniquely identifies one of a plurality of entanglement generation operations between the first and second nodes over a first time period of a plurality of time periods; receiving, at the first node, a second message indicating that a second quantum element at the first node is entangled with a quantum element at a third node in the network, where the second message comprises a second identifier that uniquely identifies one of a plurality of entanglement generation operations between the first and third nodes over the first time period; and generating, at the first node, a third identifier that identifies an entanglement resulting from an entanglement swap operation based on the entangled quantum elements at the first and second nodes and the entangled quantum elements at the first and third nodes, where the generating comprises: including at least a portion of the first identifier in the third identifier, and including at least a portion of the second identifier in the third identifier.

In another aspect, in general, a system comprises: a network of nodes in which each of a plurality of nodes in the network of nodes includes at least one quantum element and is connected to at least one other node in the network of nodes by a quantum communication channel coupled to the quantum element; where network of nodes is configured to: receive, at a first node in the network, a first message indicating that a first quantum element at the first node is entangled with a quantum element at a second node in the network, where the first message comprises a first identifier that uniquely identifies one of a plurality of entanglement generation operations between the first and second nodes over a first time period of a plurality of time periods; receive, at the first node, a second message indicating that a second quantum element at the first node is entangled with a quantum element at a third node in the network, where the second message comprises a second identifier that uniquely identifies one of a plurality of entanglement generation operations between the first and third nodes over the first time period; and generate, at the first node, a third identifier that identifies an entanglement resulting from an entanglement swap operation based on the entangled quantum elements at the first and second nodes and the entangled quantum elements at the first and third nodes, where the generating comprises: including at least a portion of the first identifier in the third identifier, and including at least a portion of the second identifier in the third identifier.

In another aspect, in general, a method for managing entangled quantum states in a network of nodes comprises: for each of two or more pairs of nodes on a path over a set of N nodes in the network, establishing entanglement between pairs of quantum elements in the respective nodes of that pair of nodes based at least in part on one or more quantum signals transmitted over one or more quantum communication channels, where N>3; performing a plurality of entanglement swap operations among different respective subsets of nodes in the set of N nodes using the pairs of entangled quantum elements, where each entanglement swap operation comprises: performing a joint measurement on a non-entangled pair of quantum elements in a node that is a member of two different pairs of nodes of the two or more pairs of nodes, resulting in a measurement result; and managing the plurality of entanglement swap operations during establishment of end-to-end entanglement between respective quantum elements in the nodes at the ends of the path over the set of N nodes using a set of classical messages transmitted over one or more classical communication channels, where each of at least two classical messages in the set of classical messages comprises one or both of: information indicating success or failure of a particular entanglement swap operation, and information indicating the measurement result of the joint measurement performed for the particular entanglement swap operation; where one or more of the classical messages in the set of classical messages are sent in a first direction between nodes on the path, and one or more of the classical messages in the set of classical messages are sent a second direction opposite to the first direction between nodes on the path; and where none of the classical messages in the set of classical messages or messages acknowledging success or failure of one or more of the plurality of entanglement swap operations are transmitted from one of the nodes at the ends of the path with a destination of the other of the nodes at the ends of the path.

Aspects can include one or more of the following features.

The joint measurement comprises a Bell state measurement.

The classical messages further comprise an estimate of a fidelity of an entanglement established using the particular entanglement swap operation.

The classical messages further comprise a timestamp indicating a time at which the particular entanglement swap operation was performed.

The non-entangled pair of quantum elements comprise members of two different pairs entangled quantum elements.

The one or more quantum communication channels comprise at least a first transmission medium on links between nodes of the set of N nodes, and the one or more classical communication channels comprise at least a second transmission medium on the links different from the first transmission medium.

The one or more quantum communication channels comprise a first wavelength band on at least one optical transmission medium on links between nodes of the set of N nodes, and the one or more classical communication channels comprise a second wavelength band on the optical transmission medium on the links.

Establishing entanglement between pairs of quantum elements and performing a plurality of entanglement swap operations comprise providing to nodes in the set of N nodes instructions formatted according to a hardware abstraction layer (HAL).

The HAL is configured to map an operation associated with establishing entanglement or an entanglement swap operation to an instruction formatted according to at least one of a plurality of available driver interfaces associated with different devices used for interacting with a quantum element in one of the nodes in the set of N nodes.

Managing the plurality of entanglement swap operations comprises, at each of a plurality of nodes in the set of N nodes, executing a procedure that comprises sending at least one of the classical messages in the set of classical messages based on at least one condition.

The condition is based at least in part on receiving at least one of the classical messages in the set of classical messages.

The procedure further comprises performing a first entanglement swap operation.

The classical message sent based on the condition includes information indicating that the first entanglement swap operation was performed without indicating success of the first entanglement swap operation and without indicating which nodes have quantum elements between which entanglement has been established as a result of success of the first entanglement swap operation.

The classical message sent based on the condition includes information indicating that the first entanglement swap operation was performed, information indicating success of the first entanglement swap operation, and information indicating which nodes have quantum elements between which entanglement has been established as a result of success of the first entanglement swap operation.

The first entanglement swap operation is performed at a first node in the set of N nodes after the first node receives at least one of the classical messages in the set of classical messages including information indicating success of at least one entanglement swap operation performed before the first entanglement swap operation.

The procedure comprises, from a first node in the set of N nodes: sending a first classical message in the set of classical messages to a first subset of nodes in the set of N nodes including information indicating failure of a first entanglement swap operation comprising a joint measurement performed at the first node, and sending a second classical message in the set of classical messages to a second subset of nodes in the set of N nodes including information indicating success of a second entanglement swap operation comprising a joint measurement performed at the first node, where the second subset of nodes is different from the first subset of nodes.

A first classical message in the set of classical messages indicates that a first established entanglement between a first pair of quantum elements was lost based on an associated fidelity falling below a predetermined minimum fidelity.

The first classical message comprises at least one of: an identifier that uniquely identifies an entanglement generation operation that established the first established entanglement between a pair of nodes over a first time period of a plurality of time periods, or an identifier associated with the path.

A first classical message in the set of classical messages includes information indicating failure of at least one entanglement swap operation comprising a joint measurement performed at a first node in the set of N nodes, and the first classical message is sent to one or more nodes along a portion of the path over the set of N nodes.

The one or more classical messages sent in the first direction are sent from a first node at a first end of the path, and the one or more classical messages sent in the second direction are sent from a second node at a second end of the path.

The plurality of entanglement swap operations are performed before the one or more classical messages sent in the first direction cross the one or more classical messages sent in the second direction on the path.

The classical messages include a first message that comprises information corresponding to a result of a Bell state measurement performed in an entanglement swap operation of the plurality of entanglement swap operations.

In response to receiving the first message, one of the nodes on the first path performs a Bell state correction operation that transforms one of four possible Bell states associated with a quantum element into a target Bell state if the quantum element is not already associated with the target Bell state.

The node that performs the Bell state correction operation is one of the nodes at the ends of the first path.

All of the plurality of entanglement swap operations performed during establishment of end-to-end entanglement between respective quantum elements in the nodes at the ends of the path are performed after transmission of all classical messages in the set of classical messages associated with results of the entanglement established between pairs of quantum elements in the respective nodes of the two or more pairs of nodes on the path.

One or more of the plurality of entanglement swap operations performed during establishment of end-to-end entanglement between respective quantum elements in the nodes at the ends of the path are performed before transmission of any classical messages in the set of classical messages associated with results of the entanglement established between pairs of quantum elements in the respective nodes of the two or more pairs of nodes on the path.

In another aspect, in general, one or more non-transitory computer readable media store a program for managing entangled quantum states in a network of nodes. The program comprises instructions operable to cause one or more processors to perform steps comprising: for each of two or more pairs of nodes on a path over a set of N nodes in the network, establishing entanglement between pairs of quantum elements in the respective nodes of that pair of nodes based at least in part on one or more quantum signals transmitted over one or more quantum communication channels, where N>3; performing a plurality of entanglement swap operations among different respective subsets of nodes in the set of N nodes using the pairs of entangled quantum elements, where each entanglement swap operation comprises: performing a joint measurement on a non-entangled pair of quantum elements in a node that is a member of two different pairs of nodes of the two or more pairs of nodes, resulting in a measurement result; and managing the plurality of entanglement swap operations during establishment of end-to-end entanglement between respective quantum elements in the nodes at the ends of the path over the set of N nodes using a set of classical messages transmitted over one or more classical communication channels, where each of at least two classical messages in the set of classical messages comprises one or both of: information indicating success or failure of a particular entanglement swap operation, and information indicating the measurement result of the joint measurement performed for the particular entanglement swap operation; where one or more of the classical messages in the set of classical messages are sent in a first direction between nodes on the path, and one or more of the classical messages in the set of classical messages are sent a second direction opposite to the first direction between nodes on the path; and where none of the classical messages in the set of classical messages or messages acknowledging success or failure of one or more of the plurality of entanglement swap operations are transmitted from one of the nodes at the ends of the path with a destination of the other of the nodes at the ends of the path.

In another aspect, in general, a system comprises: a network of nodes in which each of a plurality of nodes in the network of nodes includes at least one quantum element and is connected to at least one other node in the network of nodes by a quantum communication channel coupled to the quantum element; where network of nodes is configured to: for each of two or more pairs of nodes on a path over a set of N nodes in the network, establish entanglement between pairs of quantum elements in the respective nodes of that pair of nodes based at least in part on one or more quantum signals transmitted over one or more quantum communication channels, where N>3; perform a plurality of entanglement swap operations among different respective subsets of nodes in the set of N nodes using the pairs of entangled quantum elements, where each entanglement swap operation comprises: performing a joint measurement on a non-entangled pair of quantum elements in a node that is a member of two different pairs of nodes of the two or more pairs of nodes, resulting in a measurement result; and manage the plurality of entanglement swap operations during establishment of end-to-end entanglement between respective quantum elements in the nodes at the ends of the path over the set of N nodes using a set of classical messages transmitted over one or more classical communication channels, where each of at least two classical messages in the set of classical messages comprises one or both of: information indicating success or failure of a particular entanglement swap operation, and information indicating the measurement result of the joint measurement performed for the particular entanglement swap operation; where one or more of the classical messages in the set of classical messages are sent in a first direction between nodes on the path, and one or more of the classical messages in the set of classical messages are sent a second direction opposite to the first direction between nodes on the path; and where none of the classical messages in the set of classical messages or messages acknowledging success or failure of one or more of the plurality of entanglement swap operations are transmitted from one of the nodes at the ends of the path with a destination of the other of the nodes at the ends of the path.

In another aspect, in general, a method for managing entangled quantum states in a network of nodes comprises: sending, from a controller in the network, a first message to a first node in the network, where the first message comprises at least a portion of scheduling information that specifies a procedure to be executed for scheduling entanglement swap operations associated with portions of a plurality of paths through nodes in the network; sending, from the controller, a second message to a second node in the network, where the second message comprises at least a portion of the scheduling information; executing at least a portion of the procedure at the first node based at least in part on the first message and based at least in part on information associated with one or more previous attempts to establish entanglement between nodes on a first path of the plurality of paths that includes the first node; and executing at least a portion of the procedure at the second node based at least in part on the second message and based at least in part on information associated with one or more previous attempts to establish entanglement between nodes on a second path of the plurality of paths that includes the second node.

Aspects can include one or more of the following features.

The information associated with one or more previous attempts to establish entanglement between nodes on the first path comprises information indicating success or failure of an entanglement swap operation of the scheduled entanglement swap operations.

The information associated with one or more previous attempts to establish entanglement between nodes on the first path comprises information indicating receipt of classical messages.

The information associated with one or more previous attempts to establish entanglement between nodes on the first path comprises an estimate of fidelity of entanglement established between a pair of nodes on the first path.

The information associated with one or more previous attempts to establish entanglement between nodes on the first path comprises information indicating that an estimate of fidelity of entanglement established between a pair of nodes on the first path is below a predetermined threshold.

The information associated with one or more previous attempts to establish entanglement between nodes on the first path comprises information corresponding to a result of a Bell state measurement performed in an entanglement swap operation of the scheduled entanglement swap operations.

The method further comprises sending, from the controller to the first node, a first virtual circuit identifier identifying a first virtual circuit, and information specifying that the first node is associated with the first virtual circuit.

The virtual circuit identifier and the information specifying that the first node is associated with the first virtual circuit are included in the first message.

The method further comprises sending, from the controller to the first node, a second virtual circuit identifier identifying a second virtual circuit, and information specifying that the first node is associated with the second virtual circuit.

The method further comprises sending, from the controller to the first node, information for managing sharing between the first virtual circuit and the second virtual circuit of a non-entangled pair of quantum elements on which joint measurements are performed at the first node as part of the scheduled entanglement swap operations.

The method further comprises sending, from the controller, to each node on the first path, respective messages that include at least a portion of the scheduling information.

The information associated with one or more previous attempts to establish entanglement between nodes on the first path comprises a result of a set of one or more rules for determining whether entanglement between a quantum element at the first node and a quantum element at another node on the first path should be re-established.

The set of one or more rules is sent to the first node from the controller.

The method further comprises managing the scheduled entanglement swap operations during establishment of end-to-end entanglement between respective quantum elements in the nodes at the ends of the first path based at least in part on protocol information sent from the controller to one or more nodes on the first path.

The protocol information comprises information indicating that a new attempt to establish end-to-end entanglement is to be started in response to an indication of a previous successful attempt to establish end-to-end entanglement.

The protocol information comprises information indicating that a new attempt to establish end-to-end entanglement is to be started in response to messages received at a node on the first path from each of the nodes at the ends of the first path.

The protocol information comprises one or more of: at least one threshold for a fidelity of the end-to-end entanglement, at least one threshold for a fidelity of entanglement between respective quantum elements in nodes on the first path other than the nodes at the ends of the first path, a rate at which successful attempts to establish end-to-end entanglement are to be generated, a number of successful attempts to establish end-to-end entanglement that are to be generated, or resources to be reserved at one or more nodes on the first path for use during establishment of end-to-end entanglement.

At least a portion of the scheduling information sent to a particular node specifies a procedure to be executed at the particular node based on a finite state machine that includes (1) two or more states that include at least one state associated with performing an entanglement swap operation at the particular node, and (2) at least one transition between states based on a message received by the particular node and at least one transition between states based on an entanglement swap operation having been attempted at the particular node.

The states of the finite state machine include at least one state associated with sending a message from the particular node to another node in the network.

At least a portion of the scheduling information that specifies the procedure to be executed at the particular node based on the finite state machine is provided from the controller in a message sent to the particular node that further comprises a virtual circuit identifier identifying a first virtual circuit, and information indicating that the particular node is associated with the first virtual circuit.

In another aspect, in general, one or more non-transitory computer readable media store a program for managing entangled quantum states in a network of nodes. The program comprises instructions operable to cause one or more processors to perform steps comprising: sending, from a controller in the network, a first message to a first node in the network, where the first message comprises at least a portion of scheduling information that specifies a procedure to be executed for scheduling entanglement swap operations associated with portions of a plurality of paths through nodes in the network; sending, from the controller, a second message to a second node in the network, where the second message comprises at least a portion of the scheduling information; executing at least a portion of the procedure at the first node based at least in part on the first message and based at least in part on information associated with one or more previous attempts to establish entanglement between nodes on a first path of the plurality of paths that includes the first node; and executing at least a portion of the procedure at the second node based at least in part on the second message and based at least in part on information associated with one or more previous attempts to establish entanglement between nodes on a second path of the plurality of paths that includes the second node.

In another aspect, in general, a system comprises: a network of nodes in which each of a plurality of nodes in the network of nodes includes at least one quantum element and is connected to at least one other node in the network of nodes by a quantum communication channel coupled to the quantum element; and a controller in the network in communication with at least one node in the network of nodes; where the controller and the network of nodes are configured to: send, from the controller, a first message to a first node in the network, where the first message comprises at least a portion of scheduling information that specifies a procedure to be executed for scheduling entanglement swap operations associated with portions of a plurality of paths through nodes in the network; send, from the controller, a second message to a second node in the network, where the second message comprises at least a portion of the scheduling information; execute at least a portion of the procedure at the first node based at least in part on the first message and based at least in part on information associated with one or more previous attempts to establish entanglement between nodes on a first path of the plurality of paths that includes the first node; and execute at least a portion of the procedure at the second node based at least in part on the second message and based at least in part on information associated with one or more previous attempts to establish entanglement between nodes on a second path of the plurality of paths that includes the second node.

In another aspect, in general, a method for managing entangled quantum states in a network of nodes comprises: sending, from a first node in the network, a first message indicating that a first quantum element at the first node is entangled with a second quantum element at a second node in the network, where the first message comprises a first estimate of a fidelity of entanglement between the first and second quantum elements, and a timestamp indicating a time associated with the first estimate; generating, based at least in part on the first message, a second estimate of a fidelity of the entanglement between the first and second quantum elements, at a second time after the time indicated by the timestamp; comparing the second estimate to each of a plurality of thresholds; and performing at least a first action in response to a result of comparing the second estimate to a first threshold of the plurality of thresholds, and performing at least a second action different from the first action in response to a result of comparing the second estimate to a second threshold of the plurality of thresholds.

Aspects can include one or more of the following features.

At least one of the plurality of thresholds is adjusted between the first time and the second time based at least in part on information characterizing an event occurring at at least one of the first or second nodes.

The event comprises an operation that increases noise associated with the first or second quantum element.

The event comprises an operation that reduces noise associated with the first or second quantum element or an operation that performs quantum error correction or quantum error mitigation associated with the first or second quantum element.

The event comprises an action that is performed based at least in part on a result of comparing a third estimate of a fidelity of the entanglement between the first and second quantum elements, generated at a third time between the first and second times, to one of the plurality of thresholds.

The second estimate is based at least in part on a value resulting from a function applied to the first estimate.

The method further comprises comparing a plurality of estimates of fidelity of entanglement to at least one of the first threshold or the second threshold.

The first action comprises attempting to re-establish entanglement between a pair of quantum elements in respective nodes in the network.

The second action comprises performing an entanglement purification operation on a plurality of pairs of quantum elements in respective nodes in the network.

The second threshold is higher than the first threshold.

The first action is selected from a first set of two or more candidate actions, the first set comprising: attempting to re-establish entanglement between a pair of quantum elements in respective nodes in the network, and discarding entanglement between a pair of quantum elements in respective nodes in the network.

The second action is selected from a second set of two or more candidate actions, the second set comprising: performing an entanglement purification operation, and performing a quantum error correction or quantum error mitigation operation.

The first action is selected from a first set of two or more candidate actions, the first set comprising: performing an entanglement purification operation, and performing a quantum error correction or quantum error mitigation operation.

In another aspect, in general, one or more non-transitory computer readable media store a program for managing entangled quantum states in a network of nodes. The program comprises instructions operable to cause one or more processors to perform steps comprising: sending, from a first node in the network, a first message indicating that a first quantum element at the first node is entangled with a second quantum element at a second node in the network, where the first message comprises a first estimate of a fidelity of entanglement between the first and second quantum elements, and a timestamp indicating a time associated with the first estimate; generating, based at least in part on the first message, a second estimate of a fidelity of the entanglement between the first and second quantum elements, at a second time after the time indicated by the timestamp; comparing the second estimate to each of a plurality of thresholds; and performing at least a first action in response to a result of comparing the second estimate to a first threshold of the plurality of thresholds, and performing at least a second action different from the first action in response to a result of comparing the second estimate to a second threshold of the plurality of thresholds.

In another aspect, in general, a system comprises: a network of nodes in which each of a plurality of nodes in the network of nodes includes at least one quantum element and is connected to at least one other node in the network of nodes by a quantum communication channel coupled to the quantum element; where network of nodes is configured to: send, from a first node in the network, a first message indicating that a first quantum element at the first node is entangled with a second quantum element at a second node in the network, where the first message comprises a first estimate of a fidelity of entanglement between the first and second quantum elements, and a timestamp indicating a time associated with the first estimate; generate, based at least in part on the first message, a second estimate of a fidelity of the entanglement between the first and second quantum elements, at a second time after the time indicated by the timestamp; compare the second estimate to each of a plurality of thresholds, and perform at least a first action in response to a result of comparing the second estimate to a first threshold of the plurality of thresholds, and perform at least a second action different from the first action in response to a result of comparing the second estimate to a second threshold of the plurality of thresholds.

In another aspect, in general, a method for managing entangled quantum states in a network of nodes comprises: receiving, at a first node in the network, a first message indicating that a first quantum element at the first node is entangled with a second quantum element at a second node in the network, where the first message comprises a first estimate of a fidelity of entanglement between the first and second quantum elements; receiving, at the first node, storage information characterizing a reduction in fidelity due to storage of quantum states on at least one of the first or second quantum element, and swap information characterizing a reduction in fidelity due to one or more quantum operations associated with an entanglement swap operation based on the entangled quantum elements at the first and second nodes and entangled quantum elements at another pair of nodes; and generating, at the first node, a second estimate of a fidelity of a result of the entanglement swap operation based at least in part on: the storage information, and the swap information.

Aspects can include one or more of the following features.

The second estimate of the fidelity of the result of the entanglement swap operation is further generated based at least in part on information characterizing an increase in fidelity due to at least one of an entanglement purification operation, a quantum error correction operation, or a quantum error mitigation operation.

The storage information comprises a time duration resulting from an inverse function applied to the first estimate.

The storage information characterizes the reduction in fidelity based at least in part on a plurality of measurements of previously stored quantum states on at least one of the first or second quantum elements for different durations of time.

The storage information characterizes the reduction in fidelity based at least in part on a computed model characterizing time dependence of quantum states stored on at least one of the first or second quantum elements.

The computed model characterizing time dependence of quantum states stored on at least one of the first or second quantum elements is based at least in part on at least one of: a value characterizing a time taken for a higher energy quantum state to evolve over time to a lower energy quantum state during storage, or a value characterizing a time taken for an initial phase of a quantum state to evolve to away from the initial phase during storage.

The computed model characterizing time dependence of quantum states stored on at least one of the first or second quantum elements is based at least in part on a noise associated with propagation of a quantum state over a communication medium before storage in a quantum element.

The computed model characterizing time dependence of quantum states stored on at least one of the first or second quantum elements is based at least in part on a set of quantum state tomography measurements performed at at least one of the first or second nodes.

The swap information characterizes the reduction in fidelity based at least in part on at least one previously performed entanglement swap operation associated with at least one of the first or second quantum element.

The swap information characterizes the reduction in fidelity based at least in part on a computed model of the entanglement swap operation.

The computed model of the entanglement swap operation is based at least in part on noise associated with at least one quantum gate operation.

The computed model of the entanglement swap operation is based at least in part on a set of quantum state tomography measurements performed at the first node.

The swap information characterizes the reduction in fidelity based at least in part on a plurality of sets of quantum state tomography measurements performed at the first node.

Each set of quantum state tomography measurements is used to provide an exponential function that provides an estimate of the reduction in fidelity over a time duration t of the form $Ae^{Bt}+C$, where A, B, and C are parameters derived from a corresponding set of quantum state tomography measurements.

In another aspect, in general, one or more non-transitory computer readable media store a program for managing entangled quantum states in a network of nodes. The program comprises instructions operable to cause one or more processors to perform steps comprising: receiving, at a first node in the network, a first message indicating that a first quantum element at the first node is entangled with a second quantum element at a second node in the network, where the first message comprises a first estimate of a fidelity of entanglement between the first and second quantum elements; receiving, at the first node, storage information characterizing a reduction in fidelity due to storage of quantum states on at least one of the first or second quantum element, and swap information characterizing a reduction in fidelity due to one or more quantum operations associated with an entanglement swap operation based on the entangled quantum elements at the first and second nodes and entangled quantum elements at another pair of nodes; and generating, at the first node, a second estimate of a fidelity of a result of the entanglement swap operation based at least in part on: the storage information, and the swap information.

In another aspect, in general, a system comprises: a network of nodes in which each of a plurality of nodes in the network of nodes includes at least one quantum element and is connected to at least one other node in the network of nodes by a quantum communication channel coupled to the quantum element; where network of nodes is configured to: receive, at a first node in the network, a first message indicating that a first quantum element at the first node is entangled with a second quantum element at a second node in the network, where the first message comprises a first estimate of a fidelity of entanglement between the first and second quantum elements; receive, at the first node, storage information characterizing a reduction in fidelity due to storage of quantum states on at least one of the first or second quantum element, and swap information characterizing a reduction in fidelity due to one or more quantum operations associated with an entanglement swap operation based on the entangled quantum elements at the first and second nodes and entangled quantum elements at another pair of nodes; and generate, at the first node, a second estimate of a fidelity of a result of the entanglement swap operation based at least in part on: the storage information, and the swap information.

In another aspect, in general, a method for managing entangled quantum states in a network of nodes comprises: sending, from a controller in the network, at least a portion of scheduling information to each of a plurality of nodes in the network, where the scheduling information specifies a procedure to be executed for scheduling entanglement swap operations associated with portions of a plurality of paths through nodes in the network; for each of two or more pairs of nodes on a first path over a set of N nodes in the network, establishing entanglement between pairs of quantum elements in the respective nodes of that pair of nodes based at least in part on one or more quantum signals transmitted over one or more quantum communication channels, where $N \geq 3$; performing a plurality of entanglement swap operations among different respective subsets of nodes in the set of N nodes using the pairs of entangled quantum elements; and managing the plurality of entanglement swap operations during establishment of end-to-end entanglement between respective quantum elements in the nodes at the ends of the first path over the set of N nodes based at least in part on: at each of a first node, a second node, and a third node on the first path, using at least a portion of the scheduling information to perform at least a portion of the procedure, and at the first node, generating a first identifier that identifies entanglement resulting from an entanglement swap operation based on (1) entangled quantum elements at the first and second nodes identified by a second identifier, and (2) entangled quantum elements at the first and third nodes identified by a third identifier, where the generating comprises: including at least a portion of the second identifier in the first identifier, and including at least a portion of the third identifier in the first identifier.

Aspects can include one or more of the following features.

The method further comprises sending, from the controller to the first node, a virtual circuit identifier identifying a first virtual circuit, and information specifying that the first node is associated with the first virtual circuit.

The method further comprises sending, from the controller to the first node, one or more parameters for configuring the procedure specified by the scheduling information for execution at the first node.

The method further comprises sending, from the controller to the first node, information associated with an entanglement purification operation for increasing a fidelity of entanglement between quantum elements at the first send second nodes.

The method further comprises sending, from the controller to the first node, a second virtual circuit identifier identifying a second virtual circuit, and information specifying that the first node is associated with the second virtual circuit.

The method further comprises sending, from the controller to the first node, information for managing sharing between a plurality of virtual circuits, including the first virtual circuit and the second virtual circuit, of a non-entangled pair of quantum elements on which joint measurements are performed at the first node as part of the scheduled entanglement swap operations.

Managing the sharing comprises determining non-overlapping fractions of time allocated for the first virtual circuit and for the second virtual circuit for accessing the non-entangled pair of quantum elements based at least in part on one or more of: quality of service requests associated with the first virtual circuit and/or the second virtual circuit, or a property of a link between the first node and another node in the network.

The non-overlapping fractions of time are determined based at least in part on one or more of: a network state, information associated with one or more virtual circuits or one or more requests to establish one or more virtual circuits, information characterizing capabilities of nodes in the set of N nodes, information characterizing resources accessible to nodes in the set of N nodes, information characterizing one or more properties of nodes in the set of N nodes, or information characterizing one or more properties of links between nodes in the set of N nodes.

The method further comprises sending, from the controller to the first node, recovery instructions for initiating a recovery procedure to re-establish one or both of: the entanglement between the entangled quantum elements at the first and second nodes, or the entanglement between the entangled quantum elements at the first and third nodes.

The initiating includes sending a request from the first node to the second node or the third node.

The recovery instructions include a message from the controller to the first node prompting the first node to send the request in response to the message.

The recovery instructions includes an indication of whether the first virtual circuit uses: (1) a full recovery procedure, in response to the recovery instructions, in which both of the entanglement between the entangled quantum elements at the first and second nodes and the entanglement between the entangled quantum elements at the first and third nodes are re-established, or (2) a partial recovery procedure, in response to the recovery instructions, in which only one of the entanglement between the entangled quantum elements at the first and second nodes or the entanglement between the entangled quantum elements at the first and third nodes is re-established.

The method further comprises sending, from the controller to the first node, resource usage information for determining at least one of (1) which of a plurality of quantum elements within the first node is used for establishing entanglement with the second node, or (2) times during which a quantum element within the first node is able to be used for establishing entanglement with the second node.

At least a portion of the scheduling information sent to a particular node specifies a procedure to be executed at the particular node based on a finite state machine that includes (1) two or more states that include at least one state associated with performing an entanglement swap operation at the particular node, and (2) at least one transition between states based on a message received by the particular node and at least one transition between states based on an entanglement swap operation having been attempted at the particular node.

The states of the finite state machine include at least one state associated with sending a message from the particular node to another node in the set of N nodes.

At least a portion of the scheduling information that specifies the procedure to be executed at the particular node based on the finite state machine is provided from the controller in a message sent to the particular node that further comprises a virtual circuit identifier identifying a first virtual circuit, and information indicating that the particular node is associated with the first virtual circuit.

Managing the plurality of entanglement swap operations during establishment of end-to-end entanglement between respective quantum elements in the nodes at the ends of the first path comprises, in response to an entanglement lost message indicating a loss of entanglement associated with a first pair of nodes on the first path, attempting to re-establish entanglement between pairs of quantum elements in the respective nodes of the first pair of nodes based at least in part on one or more quantum signals transmitted over at least one of the one or more quantum communication channels.

The entanglement lost message includes at least a portion of delay information, where the delay information indicates a time delay before attempting to re-establish entanglement after the entanglement lost message is received.

The delay information is determined by the controller.

The delay information is determined based at least in part on a machine learning algorithm.

The first pair of nodes is the first and second nodes, and the entanglement lost message includes the second identifier.

The entanglement lost message includes a virtual circuit identifier identifying a first virtual circuit associated with the first path.

The entanglement lost message is sent after a predetermined time delay.

The scheduling information includes information that determines an order in which the plurality of entanglement swap operations are performed during establishment of end-to-end entanglement between respective quantum elements in the nodes at the ends of the first path.

An order in which the plurality of entanglement swap operations are performed during establishment of end-to-end entanglement between respective quantum elements in the nodes at the ends of the first path is based at least in part on an order in which the nodes on the first path are connected along the first path.

An order in which the plurality of entanglement swap operations are performed during establishment of end-to-end entanglement between respective quantum elements in the nodes at the ends of the first path is based at least in part on a machine learning algorithm.

An order in which the plurality of entanglement swap operations are performed during establishment of end-to-end entanglement between respective quantum elements in the nodes at the ends of the first path is based at least in part on one or more of: one or more quality of service requests, information indicating a topology of connectivity among the nodes in the network, or resources accessible to nodes in the set of N nodes.

An order in which the plurality of entanglement swap operations are performed during establishment of end-to-end entanglement between respective quantum elements in the nodes at the ends of the first path is determined by the controller.

A plurality of messages sent during establishment of end-to-end entanglement between respective quantum elements in the nodes at the ends of the first path include a message that comprises information corresponding to a result of a Bell state measurement performed in an entanglement swap operation of the plurality of entanglement swap operations.

In response to receiving the message, one of the nodes on the first path performs a Bell state correction operation that transforms one of four possible Bell states associated with a quantum element into a target Bell state if the quantum element is not already associated with the target Bell state.

The node that performs the Bell state correction operation is one of the nodes at the ends of the first path.

At least one of the plurality of messages comprises information that indicates which of the nodes at the ends of the first path is designated to perform the Bell state correction operation based on a selection by the controller.

The selection by the controller is based at least in part on at least one of: quantum processing capabilities of the nodes at the ends of the first path, resources available to the nodes at the ends of the first path, quality-of-service information accessible to the controller, or a state of the establishment of end-to-end entanglement between respective quantum elements in the nodes at the ends of the first path.

In another aspect, in general, one or more non-transitory computer readable media store a program for managing entangled quantum states in a network of nodes. The program comprises instructions operable to cause one or more processors to perform steps comprising: sending, from a controller in the network, at least a portion of scheduling information to each of a plurality of nodes in the network, where the scheduling information specifies a procedure to be executed for scheduling entanglement swap operations associated with portions of a plurality of paths through nodes in the network; for each of two or more pairs of nodes on a first path over a set of N nodes in the network, establishing entanglement between pairs of quantum elements in the respective nodes of that pair of nodes based at least in part on one or more quantum signals transmitted over one or more quantum communication channels, where $N \geq 3$; performing a plurality of entanglement swap operations among different respective subsets of nodes in the set of N nodes using the pairs of entangled quantum elements; and managing the plurality of entanglement swap operations during establishment of end-to-end entanglement between respective quantum elements in the nodes at the ends of the first path over the set of N nodes based at least in part on: at each of a first node, a second node, and a third node on the first path, using at least a portion of the scheduling information to perform at least a portion of the procedure, and at the first node, generating a first identifier that identifies entanglement resulting from an entanglement swap operation based on (1) entangled quantum elements at the first and second nodes identified by a second identifier, and (2) entangled quantum elements at the first and third nodes identified by a third identifier, where the generating comprises: including at least a portion of the second identifier in the first identifier, and including at least a portion of the third identifier in the first identifier.

In another aspect, in general, a system comprises: a network of nodes in which each of a plurality of nodes in the network of nodes includes at least one quantum element and is connected to at least one other node in the network of nodes by a quantum communication channel coupled to the quantum element; and a controller in the network in communication with at least one node in the network of nodes; where the controller and the network of nodes are configured to: send, from the controller, at least a portion of scheduling information to each of a plurality of nodes in the network, where the scheduling information specifies a procedure to be executed for scheduling entanglement swap operations associated with portions of a plurality of paths through nodes in the network; for each of two or more pairs of nodes on a first path over a set of N nodes in the network, establish entanglement between pairs of quantum elements in the respective nodes of that pair of nodes based at least in part on one or more quantum signals transmitted over one or more quantum communication channels, where $N \geq 3$; perform a plurality of entanglement swap operations among different respective subsets of nodes in the set of N nodes using the pairs of entangled quantum elements; and manage the plurality of entanglement swap operations during establishment of end-to-end entanglement between respective quantum elements in the nodes at the ends of the first path over the set of N nodes based at least in part on: at each of a first node, a second node, and a third node on the first path, using at least a portion of the scheduling information to perform at least a portion of the procedure, and at the first node, generating a first identifier that identifies entanglement resulting from an entanglement swap operation based on (1) entangled quantum elements at the first and second nodes identified by a second identifier, and (2) entangled quantum elements at the first and third nodes identified by a third identifier, where the generating comprises: including at least a portion of the second identifier in the first identifier, and including at least a portion of the third identifier in the first identifier.

In another aspect, in general, a method for managing entangled quantum states in a network of nodes comprises: for each of two or more pairs of nodes on a first path over a set of N nodes in the network, establishing entanglement between pairs of quantum elements in the respective nodes of that pair of nodes based at least in part on one or more quantum signals transmitted over one or more quantum communication channels, where $N>3$, performing a plurality of entanglement swap operations among different respective subsets of nodes in the set of N nodes using the pairs of entangled quantum elements; and managing the plurality of entanglement swap operations during establishment of end-to-end entanglement between respective quantum elements in the nodes at the ends of the first path over the set of N nodes based at least in part on: a plurality of messages sent between nodes in the network, including a first message indicating that a first quantum element at a first node on the first path is entangled with a second quantum element at a second node on the first path, where the first message comprises a first estimate of a fidelity of entanglement between the first and second quantum elements, and a plurality of estimates of fidelity of entanglement, including a second estimate of a fidelity of the entanglement between the first and second quantum elements, where the second estimate is generated at the second node based at least in part on at least one of (1) the first message, or (2) fidelity reduction information comprising at least one of (a) storage information characterizing a reduction in fidelity due to storage of quantum states on at least one of the first or second quantum element, or (b) swap information characterizing a reduction in fidelity due to one or more quantum operations associated with an entanglement swap operation based on the entangled quantum elements at the first and second nodes and entangled quantum elements at another pair of nodes.

Aspects can include one or more of the following features.

The plurality of messages include at least one message that includes a third estimate of a fidelity of the end-to-end entanglement.

The third estimate is based at least in part on noise introduced while establishing entanglement between a first pair of the pairs of quantum elements.

The third estimate is based at least in part on an estimate of decoherence of quantum elements of the first pair that occurs over a time period between establishing entanglement between the first pair and performing an entanglement swap operation using the first pair.

The third estimate is based at least in part on at least one quantum operation associated with the entanglement swap operation using the first pair.

The estimate of decoherence is based at least in part on at least one of: a value characterizing a time taken for a higher energy quantum state to evolve over time to a lower energy quantum state during storage, or a value characterizing a time taken for an initial phase of a quantum state to evolve to away from the initial phase during storage.

The third estimate is based at least in part on an estimate of decoherence of quantum elements of a first pair of the pairs of quantum elements that occurs over a time period between establishing entanglement between the first pair and performing an entanglement swap operation using the first pair.

The plurality of messages include a second message that is sent in response to a timer associated with an estimate of decoherence of at least one of the first or second quantum element that occurs over a time period that starts in response to establishing entanglement between the first and second quantum elements.

The second message includes an instruction to re-establish entanglement between the first and second quantum elements.

The second message is sent before any of the plurality of entanglement swap operations are performed.

An initial entanglement swap operation of the plurality of entanglement swap operations is performed after entanglement between the first and second quantum elements has been re-established and after entanglement has been established between a third quantum element at the first node or the second node and a fourth quantum element at a node other than the first node or the second node.

The plurality of messages include a second message that comprises information corresponding to a result of a Bell state measurement performed in an entanglement swap operation of the plurality of entanglement swap operations.

In response to receiving the second message, one of the nodes on the first path performs a Bell state correction operation that transforms one of four possible Bell states associated with a quantum element into a target Bell state if the quantum element is not already associated with the target Bell state.

The node that performs the Bell state correction operation is one of the nodes at the ends of the first path.

At least one of the plurality of messages comprises information that indicates which of the nodes at the ends of the first path is designated to perform the Bell state correction operation based on a non-centralized agreement protocol.

In another aspect, in general, one or more non-transitory computer readable media store a program for managing entangled quantum states in a network of nodes. The program comprises instructions operable to cause one or more processors to perform steps comprising: for each of two or more pairs of nodes on a first path over a set of N nodes in the network, establishing entanglement between pairs of quantum elements in the respective nodes of that pair of nodes based at least in part on one or more quantum signals transmitted over one or more quantum communication channels, where N>3; performing a plurality of entanglement swap operations among different respective subsets of nodes in the set of N nodes using the pairs of entangled quantum elements; and managing the plurality of entanglement swap operations during establishment of end-to-end entanglement between respective quantum elements in the nodes at the ends of the first path over the set of N nodes based at least in part on: a plurality of messages sent between nodes in the network, including a first message indicating that a first quantum element at a first node on the first path is entangled with a second quantum element at a second node on the first path, where the first message comprises a first estimate of a fidelity of entanglement between the first and second quantum elements, and a plurality of estimates of fidelity of entanglement, including a second estimate of a fidelity of the entanglement between the first and second quantum elements, where the second estimate is generated at the second node based at least in part on at least one of (1) the first message, or (2) fidelity reduction information comprising at least one of (a) storage information characterizing a reduction in fidelity due to storage of quantum states on at least one of the first or second quantum element, or (b) swap information characterizing a reduction in fidelity due to one or more quantum operations associated with an entanglement swap operation based on the entangled quantum elements at the first and second nodes and entangled quantum elements at another pair of nodes.

In another aspect, in general, a system comprises: a network of nodes in which each of a plurality of nodes in the network of nodes includes at least one quantum element and is connected to at least one other node in the network of nodes by a quantum communication channel coupled to the quantum element; where network of nodes is configured to: for each of two or more pairs of nodes on a first path over a set of N nodes in the network, establish entanglement between pairs of quantum elements in the respective nodes of that pair of nodes based at least in part on one or more quantum signals transmitted over one or more quantum communication channels, where N>3; perform a plurality of entanglement swap operations among different respective subsets of nodes in the set of N nodes using the pairs of entangled quantum elements; and manage the plurality of entanglement swap operations during establishment of end-to-end entanglement between respective quantum elements in the nodes at the ends of the first path over the set of N nodes based at least in part on: a plurality of messages sent between nodes in the network, including a first message indicating that a first quantum element at a first node on the first path is entangled with a second quantum element at a second node on the first path, where the first message comprises a first estimate of a fidelity of entanglement between the first and second quantum elements, and a plurality of estimates of fidelity of entanglement, including a second estimate of a fidelity of the entanglement between the first and second quantum elements, where the second estimate is generated at the second node based at least in part on at least one of (1) the first message, or (2) fidelity reduction information comprising at least one of (a) storage information characterizing a reduction in fidelity due to storage of quantum states on at least one of the first or second quantum element, or (b) swap information characterizing a reduction in fidelity due to one or more quantum operations associated with an entanglement swap operation based on the entangled quantum elements at the first and second nodes and entangled quantum elements at another pair of nodes.

In another aspect, in general, a method for managing entangled quantum states in a network of nodes comprises: sending, from a controller in the network, at least a portion of scheduling information to each of a plurality of nodes in the network, where the scheduling information specifies a procedure to be executed for scheduling entanglement swap operations associated with portions of a plurality of paths through nodes in the network; and managing the scheduled entanglement swap operations based at least in part on: at each of a first node, a second node, and a third node on a first path of the plurality of paths, using at least a portion of the scheduling information to perform at least a portion of the procedure, a plurality of messages sent between nodes in the network, including a first message indicating that a first quantum element at one of the nodes on the first path is entangled with a second quantum element at another of the nodes on the first path, where the first message comprises a first estimate of a fidelity of entanglement between the first and second quantum elements, and a plurality of estimates of fidelity of entanglement, including a second estimate of a fidelity of the entanglement between the first and second quantum elements, where the second estimate is generated at the second node based at least in part on at least one of (1) the first message, or (2) fidelity reduction information comprising at least one of (a) storage information characterizing a reduction in fidelity due to storage of quantum states on at least one of the first or second quantum element, or (b) swap information characterizing a reduction in fidelity due to one or more quantum operations associated with an entanglement swap operation based on the entangled quantum elements at the first and second nodes and entangled quantum elements at another pair of nodes.

Aspects can include one or more of the following features.

The method further comprises providing, from the controller, a fidelity threshold associated with a fidelity of an end-to-end entanglement established between respective quantum elements in the nodes at the ends of the first path using one or more of the scheduled entanglement swap operations.

The fidelity threshold is provided from the controller in a message sent to the first node comprising a virtual circuit identifier identifying a first virtual circuit, and information specifying that the first node is associated with the first virtual circuit.

The method further comprises comparing an estimate of fidelity of the end-to-end entanglement to the fidelity threshold, and performing an action in response to a result of the comparing.

The method further comprises providing, from the controller, a fidelity threshold associated with a fidelity of the entanglement between the first and second quantum elements.

The method further comprises comparing the second estimate to the fidelity threshold, and performing an action in response to a result of the comparing.

The plurality of messages include a second message that comprises information corresponding to a result of a Bell state measurement performed in an entanglement swap operation of the scheduled entanglement swap operations.

In response to receiving the second message, one of the nodes on the first path performs a Bell state correction operation that transforms one of four possible Bell states associated with a quantum element into a target Bell state if the quantum element is not already associated with the target Bell state.

The node that performs the Bell state correction operation is one of the nodes at the ends of the first path.

At least one of the plurality of messages comprises information that indicates which of the nodes at the ends of the first path is designated to perform the Bell state correction operation based on a selection by the controller.

The selection by the controller is based at least in part on at least one of: quantum processing capabilities of the nodes at the ends of the first path, resources available to the nodes at the ends of the first path, quality-of-service information accessible to the controller, or at least one of the plurality of estimates of fidelity of entanglement.

At least a portion of the scheduling information sent to a particular node specifies a procedure to be executed at the particular node based on a finite state machine that includes (1) two or more states that include at least one state associated with performing an entanglement swap operation at the particular node, and (2) at least one transition between states based on a message received by the particular node and at least one transition between states based on an entanglement swap operation having been attempted at the particular node.

The states of the finite state machine include at least one state associated with sending a message from the particular node to another node in the network.

At least a portion of the scheduling information that specifies the procedure to be executed at the particular node based on the finite state machine is provided from the controller in a message sent to the particular node that further comprises a virtual circuit identifier identifying a first virtual circuit, and information indicating that the particular node is associated with the first virtual circuit.

The method further comprises sending, from the controller, a plurality of thresholds to the second node, and comparing, at the second node, the plurality of estimates of fidelity of entanglement to at least one of a first threshold of the plurality of thresholds or a second threshold of the plurality of thresholds.

The first threshold is associated with a first action performed in response to a result of comparing one of the estimates to the first threshold, and the first action comprises attempting to re-establish entanglement between a pair of quantum elements in respective nodes on the first path.

The second threshold is associated with a second action performed in response to a result of comparing one of the estimates to the second threshold, and the second action comprises performing an entanglement purification operation on a plurality of pairs of quantum elements in respective nodes on the first path.

The second threshold is higher than the first threshold.

The second threshold is associated with a second action performed in response to a result of comparing one of the estimates to the second threshold, and the second action comprises performing a quantum error correction operation or quantum error mitigation operation on a quantum element in a node on the first path.

The second threshold is higher than the first threshold.

The first threshold is associated with a first action performed in response to a result of comparing one of the estimates to the first threshold.

The first action is selected from a set of two or more candidate actions.

The set of two or more candidate actions comprise two or more different candidate quantum error correction or error mitigation operations.

The first action is selected from the set of two or more candidate actions by the controller.

The first action is selected from the set of two or more candidate actions by the second node based at least in part on information sent from the controller.

The information sent from the controller comprises one or more rules that depend on one or more inputs comprising at least one of: information associated with one or more virtual circuits or one or more requests to establish one or more virtual circuits, information characterizing capabilities of nodes in the network, information characterizing resources accessible to one or more nodes in the network, a network state, information characterizing one or more properties of nodes in the network, or information characterizing one or more properties of links between nodes in the network.

At least one of the one or more inputs is provided at the second node.

The first threshold is associated with two or more actions performed in response to the result of comparing one of the estimates to the first threshold.

In another aspect, in general, one or more non-transitory computer readable media store a program for managing entangled quantum states in a network of nodes. The program comprises instructions operable to cause one or more processors to perform steps comprising: sending, from a controller in the network, at least a portion of scheduling information to each of a plurality of nodes in the network, where the scheduling information specifies a procedure to be executed for scheduling entanglement swap operations associated with portions of a plurality of paths through nodes in the network; and managing the scheduled entanglement swap operations based at least in part on: at each of a first node, a second node, and a third node on a first path of the plurality of paths, using at least a portion of the scheduling information to perform at least a portion of the procedure, a plurality of messages sent between nodes in the network, including a first message indicating that a first quantum element at one of the nodes on the first path is entangled with a second quantum element at another of the nodes on the first path, where the first message comprises a first estimate of a fidelity of entanglement between the first and second quantum elements, and a plurality of estimates of fidelity of entanglement, including a second estimate of a fidelity of the entanglement between the first and second quantum elements, where the second estimate is generated at the second node based at least in part on at least one of (1) the first message, or (2) fidelity reduction information comprising at least one of (a) storage information characterizing a reduction in fidelity due to storage of quantum states on at least one of the first or second quantum element, or (b) swap information characterizing a reduction in fidelity due to one or more quantum operations associated with an entanglement swap operation based on the entangled quantum elements at the first and second nodes and entangled quantum elements at another pair of nodes.

In another aspect, in general, a system comprises: a network of nodes in which each of a plurality of nodes in the network of nodes includes at least one quantum element and is connected to at least one other node in the network of nodes by a quantum communication channel coupled to the quantum element; and a controller in the network in communication with at least one node in the network of nodes; where the controller and the network of nodes are configured to: send, from the controller, at least a portion of scheduling information to each of a plurality of nodes in the network, where the scheduling information specifies a procedure to be executed for scheduling entanglement swap operations associated with portions of a plurality of paths through nodes in the network; and manage the scheduled entanglement swap operations based at least in part on: at each of a first node, a second node, and a third node on a first path of the plurality of paths, using at least a portion of the scheduling information to perform at least a portion of the procedure, a plurality of messages sent between nodes in the network, including a first message indicating that a first quantum element at one of the nodes on the first path is entangled with a second quantum element at another of the nodes on the first path, where the first message comprises a first estimate of a fidelity of entanglement between the first and second quantum elements, and a plurality of estimates of fidelity of entanglement, including a second estimate of a fidelity of the entanglement between the first and second quantum elements, where the second estimate is generated at the second node based at least in part on at least one of (1) the first message, or (2) fidelity reduction information comprising at least one of (a) storage information characterizing a reduction in fidelity due to storage of quantum states on at least one of the first or second quantum element, or (b) swap information characterizing a reduction in fidelity due to one or more quantum operations associated with an entanglement swap operation based on the entangled quantum elements at the first and second nodes and entangled quantum elements at another pair of nodes.

Aspects can include one or more of the following features.

The network of nodes comprises a network of quantum computers comprising respective quantum processors with at least a first quantum processor in a first quantum computer coupled to at least a second quantum processor in a second quantum computer over a quantum communication channel between at least the first processor and the second quantum processor.

The network of nodes comprises a network of quantum processors comprising respective sets of quantum elements with at least a first quantum element in a first quantum processor coupled to at least a second quantum element in a second quantum processor over a quantum communication channel between at least the first quantum element and the second quantum element.

Aspects can have one or more of the following advantages.

Techniques for managing entanglement swap operations may enable identifiers to be determined in an efficient manner that reduces the amount of overall communication that is needed.

Techniques for fidelity estimation can enable fidelity estimates to be efficiently updated and compared to multiple different thresholds to take into account a variety of factors that may impact fidelity.

Techniques for providing network control can allow for both centralized network management as well as dynamic local state transitions that enable responsiveness to local conditions associated with entanglement generation.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

1. Overview

Figure 1:
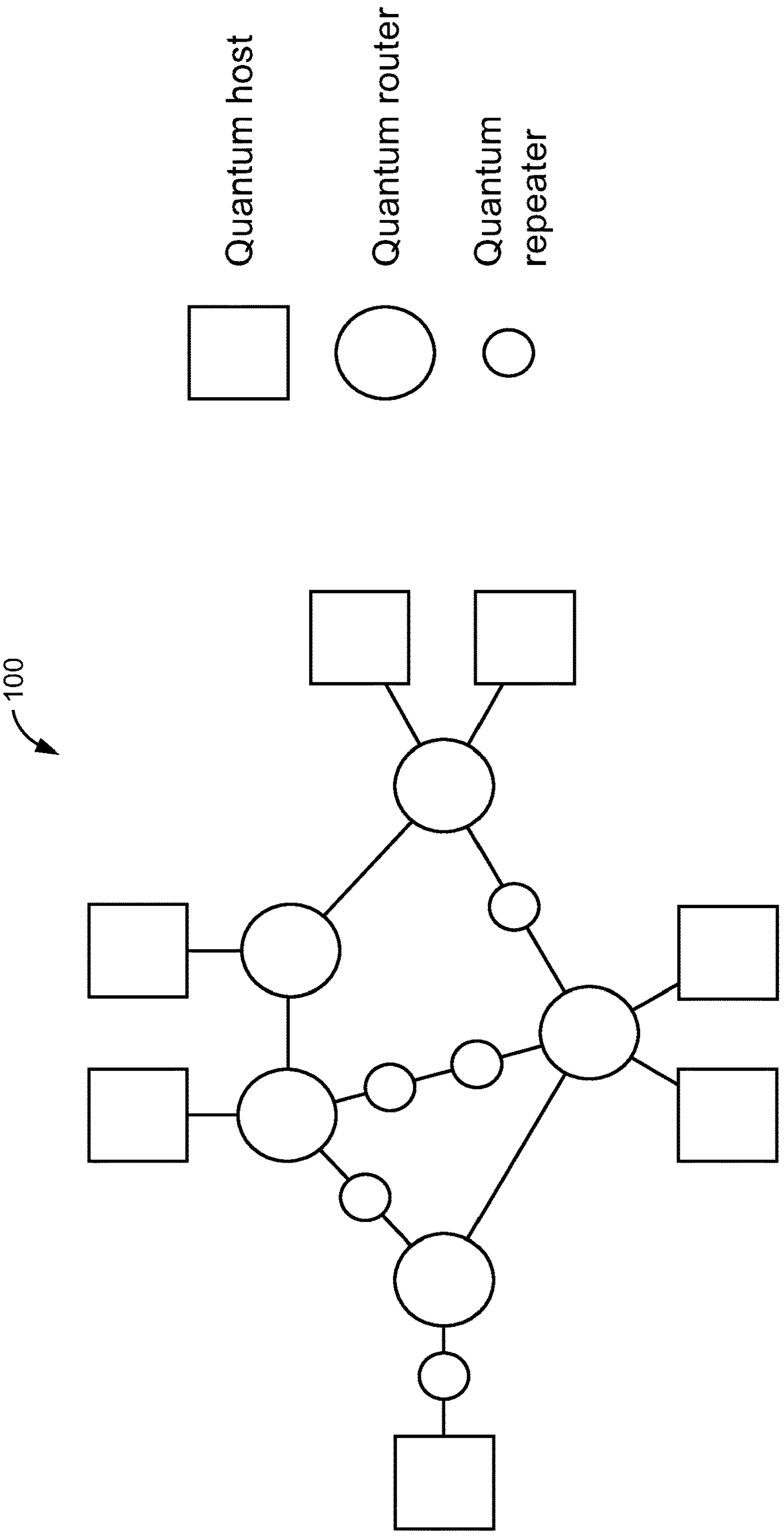
FIG. 1 is a schematic diagram of an example quantum networking environment.

FIG. 1 shows an example quantum networking environment 100 that includes nodes that have been enabled to facilitate the establishment of entangled quantum states associated with quantum elements in different quantum nodes that have been entangled with each other. Some of the nodes in this environment include quantum host nodes comprising quantum elements configured to store quantum states for some periods of time, over which the fidelity of those quantum states may be changing. For example, a quantum element can be implemented using any of the following: a color center defect (e.g., NV centers) in a crystal material (e.g., diamond), an atom or ion trapped in an electromagnetic field, an ensemble of atoms in a vapor cell, an electric current in a superconducting circuit, a structure in a semiconductor material having multiple energy levels (sometimes referred to as a quantum dot or artificial atom), or a topological qubit arrangement. There are also quantum router nodes and quantum repeater nodes, also comprising quantum elements, at which entanglement swap operations can be performed as part of a schedule for establishing end-to-end entanglements. A layered set of protocols can be used to manage the entanglement produced within various portions of the quantum networking environment 100. The quantum networking environment 100 may also include nodes that do not contain any quantum elements but do participate in determining and/or transmitting real-time classical messages or other messages sent on a classical communication channel.

For ease of reference, this Detailed Description includes various sections that together describe a variety of example implementations of aspects of a layered quantum networking environment. The division of the description into sections does not necessarily limit the applicability of the features described to those respective sections. The multiple layers of different example implementations of the quantum networking environment 100 that are described throughout various sections enable various functions on and between the nodes of a quantum network, and on other devices that are part of the nodes or otherwise support the quantum networking environment 100. For example, the multiple layers may include a swapping layer of a quantum network control plane. The swapping layer runs a swapping protocol, which performs a series of entanglement swap operations to stitch elementary entanglements together to produce end-to-end entanglements. Other layers in some implementations of the quantum networking environment 100 may include an elementary entanglement generation layer, a distillation/purification layer, and a teleportation layer, for example.

2. Quantum Hosts, Routers, Repeaters, and Nodes

One example of a swapping protocol disclosed herein produces a series of end-to-end entangled qubit pairs between a pair of quantum hosts, which we refer to as quantum host A and quantum host B.

In some examples, whenever an end-to-end entangled pair of qubits is produced, one qubit of the pair is delivered to quantum host A and the other qubit of the pair is delivered to quantum host B.

A quantum host is a device that hosts the quantum application which can utilize or store the produced end-to-end entanglement. Examples of quantum hosts include: quantum computers that perform a clustered or distributed quantum computation, devices that use quantum secure communications based on entanglement (e.g., the E91 protocol), and sensors in a distributed quantum sensing application. Quantum hosts are sometimes also referred to as quantum endpoints or quantum end-nodes.

For explanation purposes only, an embodiment of the system with bi-partite entanglement is considered herein, and hence there are two quantum hosts. In general, multi-partite entanglement (e.g., Greenberger-Horne-Zeilinger (GHZ) states) amongst three or more hosts may be generated by an appropriately configured quantum networking environment, assuming the quantum operational capabilities on the quantum repeater nodes and quantum router nodes are sufficient. In some examples of bi-partite entanglement, the two quantum hosts are not directly connected to each other. For example, they may be connected to each other indirectly with some number of quantum repeaters or quantum routers in between. The quantum repeaters and quantum routers are responsible for producing point-to-point elementary entanglements and for performing entanglement swapping to concatenate those point-to-point elementary entanglements together to form end-to-end entanglements. Examples of concatenating the point-to-point elementary entanglements together in this manner are described in more detail within various examples included herein, which may refer to a process of "stitching" together, or otherwise combining, the results of different entanglement operations at, various intermediate stages until end-to-end entanglement is achieved between particular "end" nodes. One difference between a quantum repeater and a quantum router is that a quantum repeater has exactly two interfaces to quantum channels whereas a quantum router can have more than two interfaces.

In general, many of the swapping protocol procedures are exactly the same for quantum repeaters and quantum routers. In some implementations, the main difference is that a quantum repeater swaps entanglements associated with a fixed pair of interfaces, whereas a quantum router has to make a choice of which two interfaces' entanglements to perform a swap operation on. Unless specifically mentioned otherwise, the terms quantum repeater and quantum router are used interchangeably herein. In other implementations, in addition to selecting two interfaces for using or distributing bipartite entanglement, a quantum router is able to make use of any number of interfaces associated with using or distributing multi-partite entanglement (e.g., in a protocol among three or more nodes, as described in more detail below).

In some implementations, quantum repeaters and quantum routers are implicitly also quantum hosts. Herein, quantum nodes refer to quantum hosts, quantum repeaters, and quantum routers collectively. For explanation purposes only, the "quantum" adjective may be omitted herein (e.g., hosts, routers, repeaters, and nodes). As used herein, a quantum communication channel configured to carry quantum states encoded on quantum signals may be free of certain devices that may be part of a classical channel configured to carry classical messages. For example, devices such as optical amplifiers, or optical-to-electronic and electronic-to-optical conversion devices, which may be part of a classical communication channel, may be absent in a quantum communication channel. Some implementations of quantum communication channels consist essentially of one or more optical propagation media that are configured for all-optical propagation over a significant portion of the channel (e.g., optical waveguides on a chip, optical fibers, free space communication links through the atmosphere, or satellite links) and devices such as transmitters, receivers, transceivers, that are configured for optical signal generation and detection. A quantum signal encoded on an optical wave may have an electromagnetic wavelength spectrum with a peak wavelength that falls in a particular range (e.g., between about 100 nm to about 1 mm, or some subrange thereof). As used herein, a quantum device, element, or channel may have the ability to store or transmit a quantum state, or constituent of an entangled quantum state, and a classical device, element, or channel may lack the ability to store or transmit a quantum state, or constituent of an entangled quantum state.

The network of nodes within the quantum network can correspond to any of a variety of types of networks. For example, network of nodes can correspond to a network of quantum computers. Each quantum computer can include a quantum processor that has a set of quantum elements (also referred to as the qubits of the quantum processor, or as a quantum register), and other circuitry such as control circuitry that is used to perform quantum gate operations on the quantum elements. In such a quantum network, at least a first quantum processor in a first quantum computer is coupled to at least a second quantum processor in a second quantum computer over a quantum communication channel between at least the first processor and the second quantum processor. The quantum communication channels may extend over a long distance (e.g., 10s of kilometers over a regional network) or over short distances (e.g., over 10s of meters within a data center). Alternatively, the network of nodes can correspond to a network of quantum processors within a quantum computer (e.g., to scale the quantum computer to a larger number of quantum elements) in which a network of quantum processors comprises respective sets of quantum elements within the quantum processors, with at least a first quantum element in a first quantum processor coupled to at least a second quantum element in a second quantum processor over a quantum communication channel between at least the first quantum element and the second quantum element. Alternatively, the network of nodes can correspond to a network of quantum sensors (e.g., telescopes in an array of telescopes that are configured to implement long-baseline optical intensity interferometry that yields a larger effective aperture). Or, the network of nodes can correspond to a network of nodes that can include quantum modules that support certain quantum protocols, such as quantum key distribution (QKD) or other quantum cryptographic protocols such as quantum secure direct communication (QSDC).

3. Quantum Network Stack Software

Each quantum network node (i.e., each quantum host, each quantum router, and each quantum repeater) may runs software to implement functionality of the various layers within the quantum networking environment 100, also referred to as a "quantum network stack." In some examples, there is also software that runs on a centralized controller, which is described in detail below. The qualifier "on-device" may be used to refer specifically to software that runs on the distributed quantum network nodes as opposed to the centralized controller. In classical networks, the term control plane software is sometimes used to refer to the on-device network stack software. As used herein, the terms control plane and data plane may be used to refer to certain features of the classical communication that occurs in the quantum network, in addition to features that are specific to quantum networks, which may have a variety of characteristics that are not present in strictly classical systems that do not include any quantum networking devices.

4. Network Stack Software Responsibilities

Figure 2A:
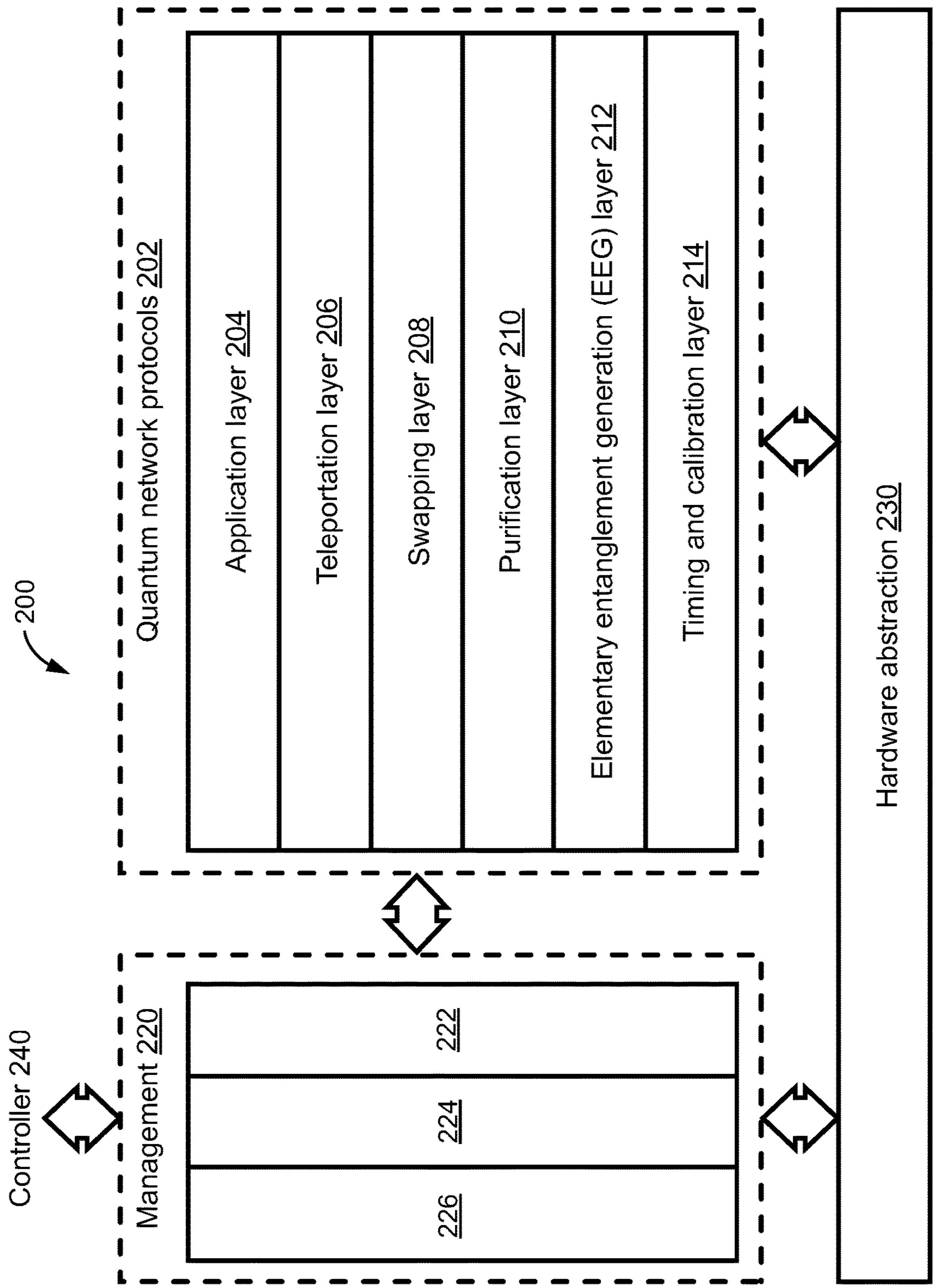
FIG. 2A is a schematic diagram of example set of quantum network stack subsystems.

FIG. 2A shows an example set of quantum network stack subsystems 200. The on-device quantum network stack software may include multiple subsystems, such as a quantum network protocols subsystem 202 (e.g., associated with a protocol stack), a management subsystem 220, and a hardware abstraction subsystem 230. The quantum network protocols subsystem 202 can run the actual quantum network protocols between the quantum node and its peers. The protocols may be divided into layers, each with a specific responsibility (similar to the OSI reference model in classical networking). Examples of such layers can include an application layer 204, a teleportation layer 206, a swapping layer 208, a purification layer 210, an elementary entanglement generation layer 212, and a timing and calibration layer 214. The management subsystem 220 can provide management functions. It may be responsible for configuration and monitoring of various aspects of the quantum network stack (e.g., protocol management 222, quantum memory management 224, and fidelity management 226 (e.g., fidelity tracking performed using a fidelity estimation unit, described in more detail below)). The management subsystem 220 can be in communication with the quantum network protocols subsystem 202, the hardware abstraction subsystem 230, and/or a controller subsystem 240. The hardware abstraction subsystem 230 may be responsible for abstracting the details of the hardware and may be in communication with the quantum network protocols subsystem 202. It may allow the rest of the quantum network stack software to be platform independent (i.e., portable across multiple hardware platforms).

The controller subsystem 240 can determine and install a set of rules and configurations for the quantum network protocols subsystem 202 and the management subsystem 220 to govern the behavior of network operations. An example rule set for the management subsystem 220 programmatically describes a set of conditions and actions that govern how entanglement fidelity is estimated and tracked, and setting minimum fidelity thresholds to guarantee the requisite quality of service for the network application. Another example rule set for the management subsystem 220 programmatically describes a set of conditions and actions that govern quantum resource provisioning between different virtual circuit requests and different protocols therein. In a resource-constrained network environment, quantum resources, such as quantum memories, are in great demand by several network protocols (e.g., elementary entanglement generation, purification protocol, swapping protocol) and potentially a multitude of virtual circuit requests. Rule sets, determined and installed by the controller subsystem 240, may be useful for serving the demand placed on quantum resources. Another example rule set for the quantum network protocols subsystem 202 programmatically describes a set of conditions and actions that determine which protocol variants to run, and govern when and how certain protocol instances are scheduled relative to each other, depending on network state (e.g., purify on elementary entanglements before swapping, set the scheduled sequence of swapping operations across repeaters in the determined path, regenerate entanglement once estimated fidelity falls below a certain threshold, wait for a confirmation message before attempting the next entanglement). The determination of such rule sets by the controller subsystem 240 may optimize for some metric aggregating user fairness, network utility, and network performance, while taking into account factors such as network operational state, network demand, topology, resource availability, real-time telemetry, hardware characteristics, and quality of service parameters (i.e., requested end-to-end entanglement generation rate and fidelity).

5. Quantum Network Protocols Subsystem

In some examples, the swapping protocol disclosed herein consumes (i.e., utilizes and perhaps collapses parts of the quantum state) elementary entanglements that are generated by the elementary entanglement generation (EEG) protocol between neighboring nodes. The EEG protocol can be implemented using any of a variety of techniques (e.g., meet-in-the-middle, node-source, midpoint-source), depending on the capabilities of the hardware comprising each node participating in the point-to-point elementary entanglement.

Figure 2B:
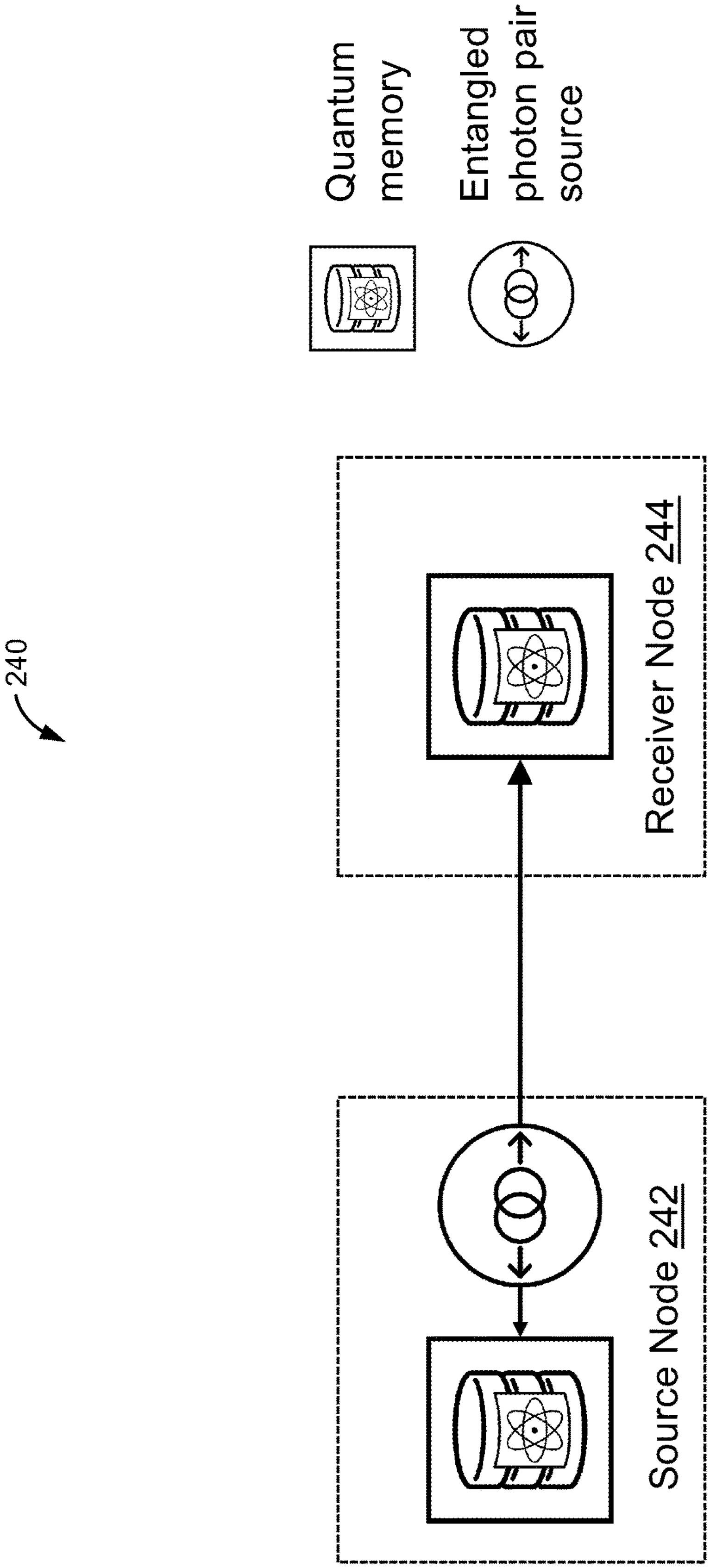
FIGS. 2B-2D are schematic diagrams of example entanglement generation techniques.

FIG. 2B shows an example node-source technique 240 for generating point-to-point elementary entanglement between two quantum memories on neighboring nodes wherein each node (dashed rectangles) has a specific responsibility for implementing the EEG protocol. A first source node 242 includes at least a quantum memory (cylinder with atomic symbol) and an entangled photon pair source (overlapping circles with two arrows). A second receiver node 244 includes at least a quantum memory. To generate an elementary entanglement between the two quantum memories, one photon of the generated entangled pair is received by the local quantum memory in source node 242, and the other photon is transmitted to receiver node 244 and received by the remote quantum memory on receiver node 244. It is not a requirement that elementary entanglement be established and stored in a pair of quantum memories. In a more general quantum network, elementary entanglement can be established between a variety of node types (e.g., the photons can be routed to anything that stores and/or consumes the elementary entanglement).

Figure 2C:
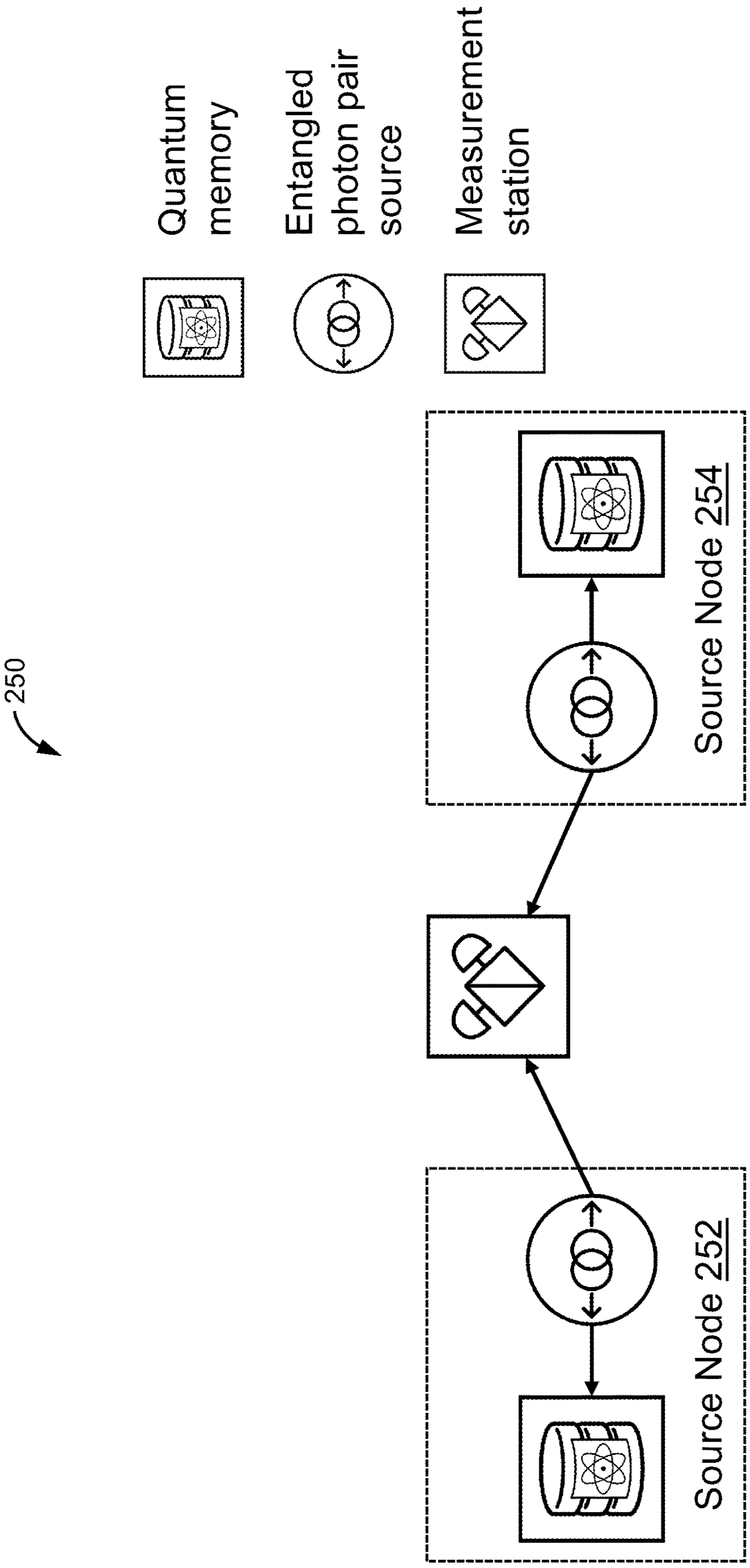

FIG. 2C shows an example meet-in-the-middle technique 250 for generating point-to-point elementary entanglement between two quantum memories on neighboring nodes wherein each node (dashed rectangles) has a respective responsibility for implementing the EEG protocol. Both source nodes 252 and 254 consist of at least a quantum memory and an entangled photon pair source. Somewhere along the quantum channel between source node 252 and 254 is a measurement station (square with two semicircles), consisting of at least a set of optical components and photon detectors (semicircles), responsible for conducting measurements on received photon pairs and communicating classical measurement results back to the source nodes 252 and 254. In order to generate elementary entanglement between the quantum memories at source nodes 252 and 254, each entangled photon pair source at source nodes 252 and 254 emits one of its photons to the local quantum memory, and transmits the other half of the photon pair to the measurement station. For successful establishment of high-fidelity elementary entanglement, the independent photons arriving at the measurement station should be as indistinguishable as possible across all relevant degrees of freedom. An example constraint on the system is to ensure that the inter-photon arrival time at the measurement station is reduced below an appropriate threshold (e.g., a threshold on the order of nanoseconds).

Figure 2D:
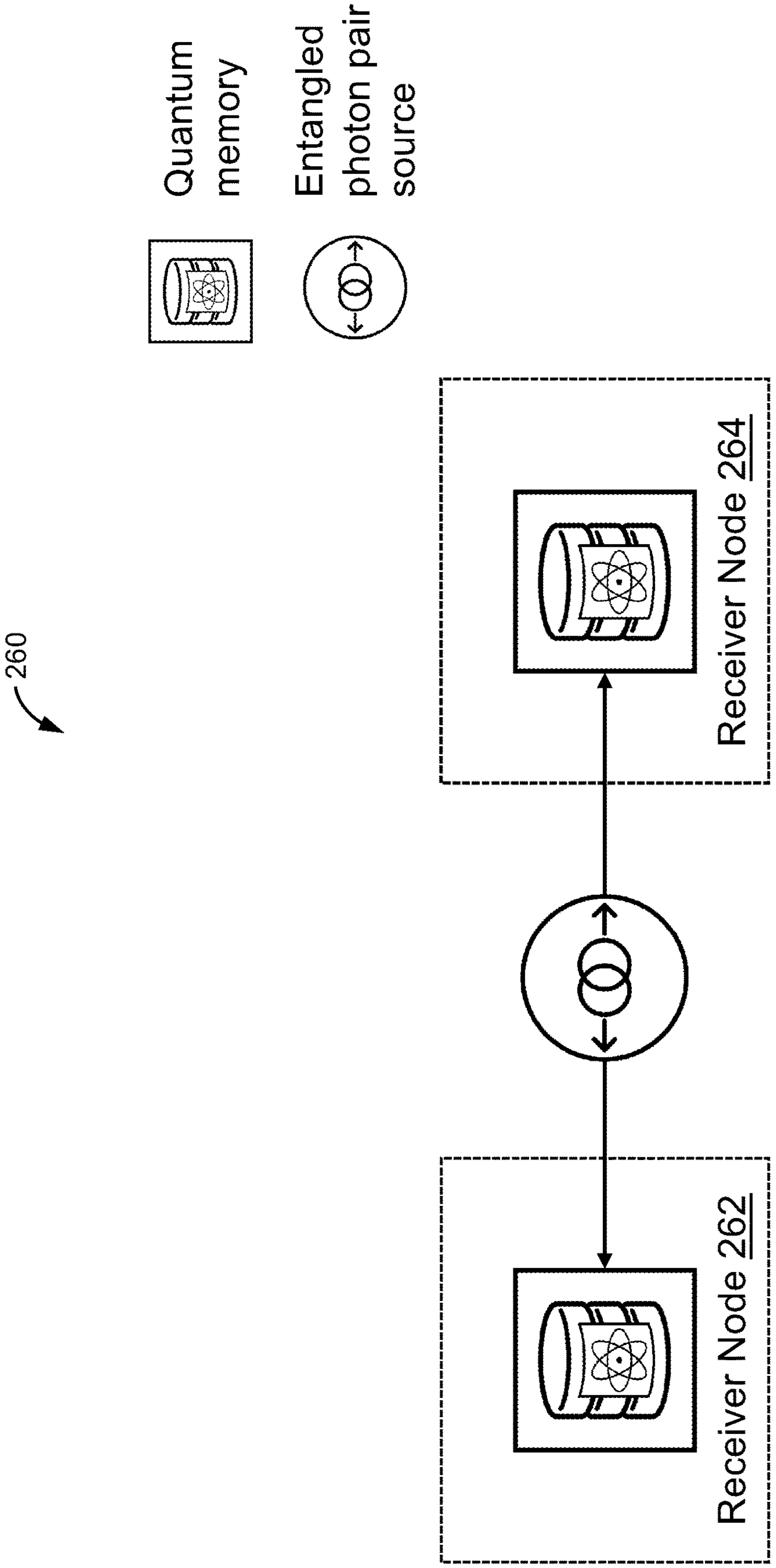

FIG. 2D shows an example midpoint-source technique 260 for generating point-to-point elementary entanglement between two quantum memories on neighboring nodes wherein each node (dashed rectangles) has a respective responsibility for implementing the EEG protocol. Both receiver nodes 262 and 264 consist of at least a quantum memory. Somewhere along the quantum channel between receiver node 262 and 264 is an entangled photon pair source (overlapping circles with two arrows) responsible for generating and transmitting entangled photons to both receiver nodes 262 and 264. To successfully establish entanglement between receiver nodes 262 and 264, one photon from the entangled photon pair source is transmitted and received by the quantum memory on receiver node 262, and the other photon from the generated pair is transmitted and received by the quantum memory on receiver node 264.

The swapping protocol may also interact with a purification protocol which attempts to combine multiple pairs of entanglements into a smaller number of entanglements of higher fidelity. The purification protocol may run before or after the swapping protocol, or both. The purification protocol can be implemented using any of a variety of techniques.

Once the swapping protocol has finished producing an end-to-end entanglement (i.e., a pair of entangled quantum elements, one on each host), this end-to-end entanglement may be delivered to the next-higher layer. The next-higher layer is often teleportation. Or, if (additional) rounds of purification are desired before teleportation, then the next-higher layer may be purification and the layer on top of that may be teleportation. Or, if the application consumes entanglement directly without teleportation (e.g., a quantum key distribution [QKD] application), then the next-higher layer may be the application layer.

Figure 3:
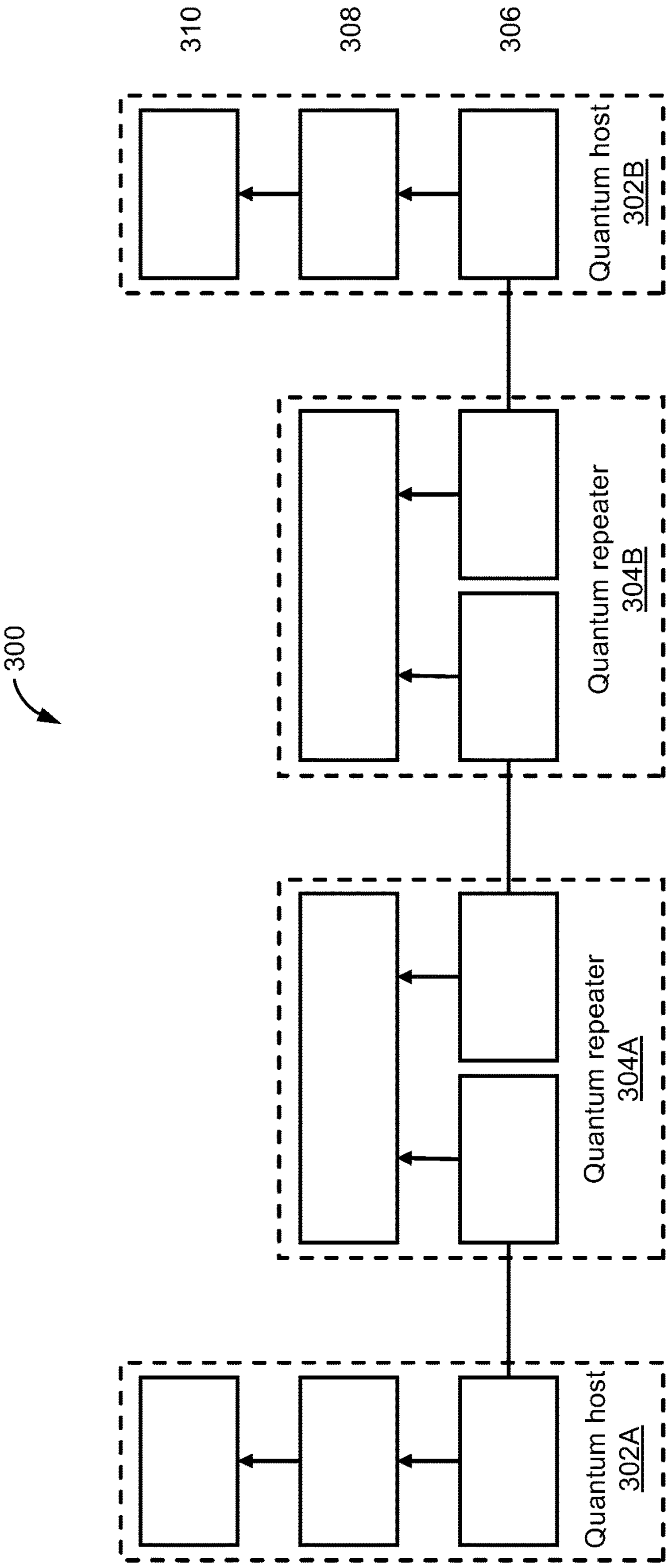
FIGS. 3-5 are schematic diagrams of examples of layered protocols.

FIG. 3 shows an example of layered protocols 300 wherein the protocols (empty rectangles) are divided into layers, each with a specific responsibility. A first quantum host 302A, a second quantum host 302B, a first quantum repeater 304A, and a second quantum repeater 304B, each comprise two or more layers of protocols. In this example, the first layer of protocols is an elementary entanglement generation layer 306. A second layer of protocols is a swapping layer 308. A third layer of protocols 310 is only applied to the first quantum host 302A and the second quantum host 302B and may comprise purification, teleportation, and/or application.

Figure 4:
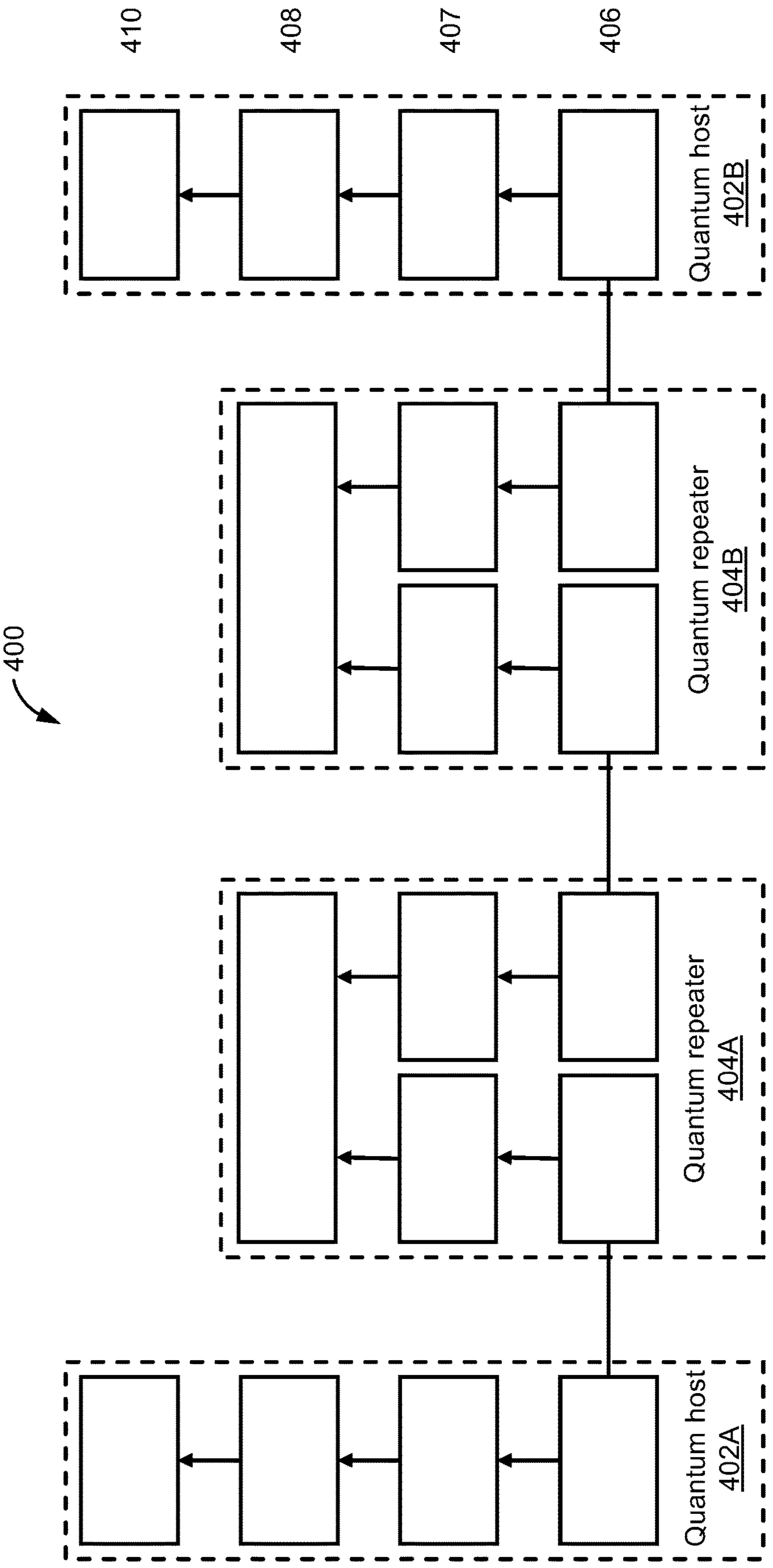

FIG. 4 shows an example of layered protocols 400. A first quantum host 402A, a second quantum host 402B, a first quantum repeater 404A, and a second quantum repeater 404B, each comprise three or more layers of protocols. In this example, the first layer of protocols is an elementary entanglement generation layer 406. A second layer of protocols is a (possibly optional) purification layer 407. A third layer of protocols is a swapping layer 408. A fourth layer of protocols 410 is only applied to the first quantum host 402A and the second quantum host 402B and may comprise purification, teleportation, and/or application. In other examples, the purification layer 407 may be on some but not all of the nodes.

In general, the layering can differ from node to node. For example, the network may only perform the initial round of purification for some links (e.g., long links) and not for other links (e.g., short links).

Figure 5:
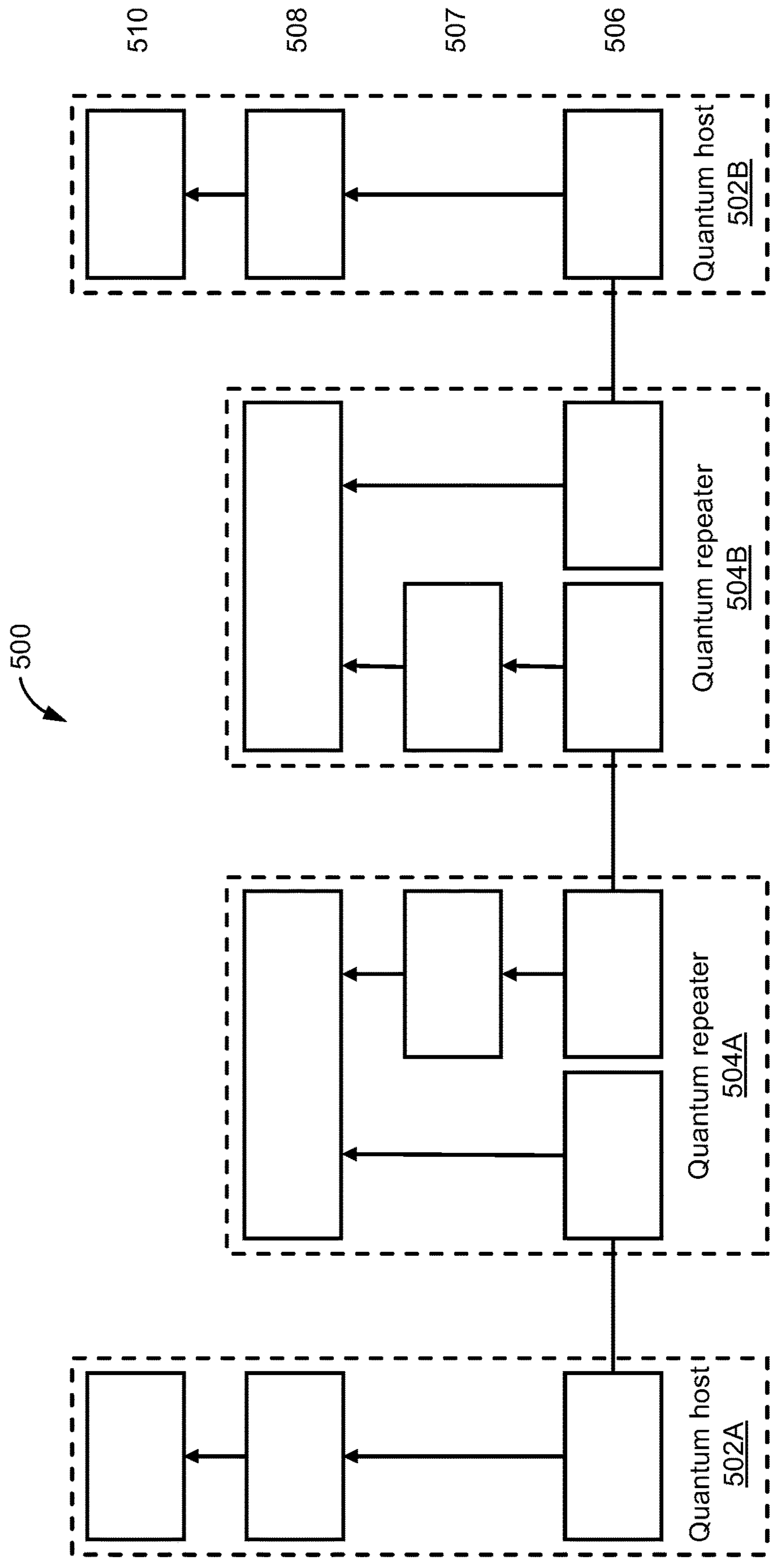

FIG. 5 shows an example of layered protocols 500 with an initial purification layer 507 before a swapping layer 508 on the repeater-to-repeater link but not on the host-to-repeater links. A first quantum host 502A, a second quantum host 502B, a first quantum repeater 504A, and a second quantum repeater 504B, each comprise three layers of protocols. In this example, the first layer of protocols is an elementary entanglement generation layer 506. A second layer of protocols is a purification layer 507 on the repeater-to-repeater link but not on the host-to-repeater links. A third layer of protocols is a swapping layer 508. A fourth layer of protocols 510 is only applied to the first quantum host 502A and the second quantum host 502B and may comprise purification, teleportation, and/or application.

Furthermore, there can be multiple rounds of purification as deemed necessary to correct for the effects of noise and decoherence.

In addition to interfacing with upper and lower layers, the entanglement swapping protocol may interact with a memory management module for managing the local qubit resources (e.g., quantum memories, or other quantum elements capable of storing qubits associated with various entangled quantum states or other quantum states, over some duration of time with potentially changing fidelity) that store entanglements used by the entanglement swapping protocol. For example, the controller can provide resource usage information to the nodes (e.g., in the form of a schedule, a ruleset, and/or conditional parameters) to indicate to the entanglement swapping protocol running on the nodes which quantum elements can and cannot be used, and/or when particular quantum elements can be used. The rules can be provided in association with virtual circuits connecting different entities (e.g., different user pairs). Proper servicing of all users may involve the controller, the entanglement swapping protocol, and the local memory management module to ensure correct and fair resource usage. The entanglement swapping protocol may also interact with a fidelity estimation unit for tracking the quality of entanglements consumed and produced by the protocol.

The details of the underlying quantum hardware that is accessed by the entanglement swapping protocol may be kept abstract through the use of a hardware abstraction layer.

6. The Hardware Abstraction Subsystem

Figure 6:
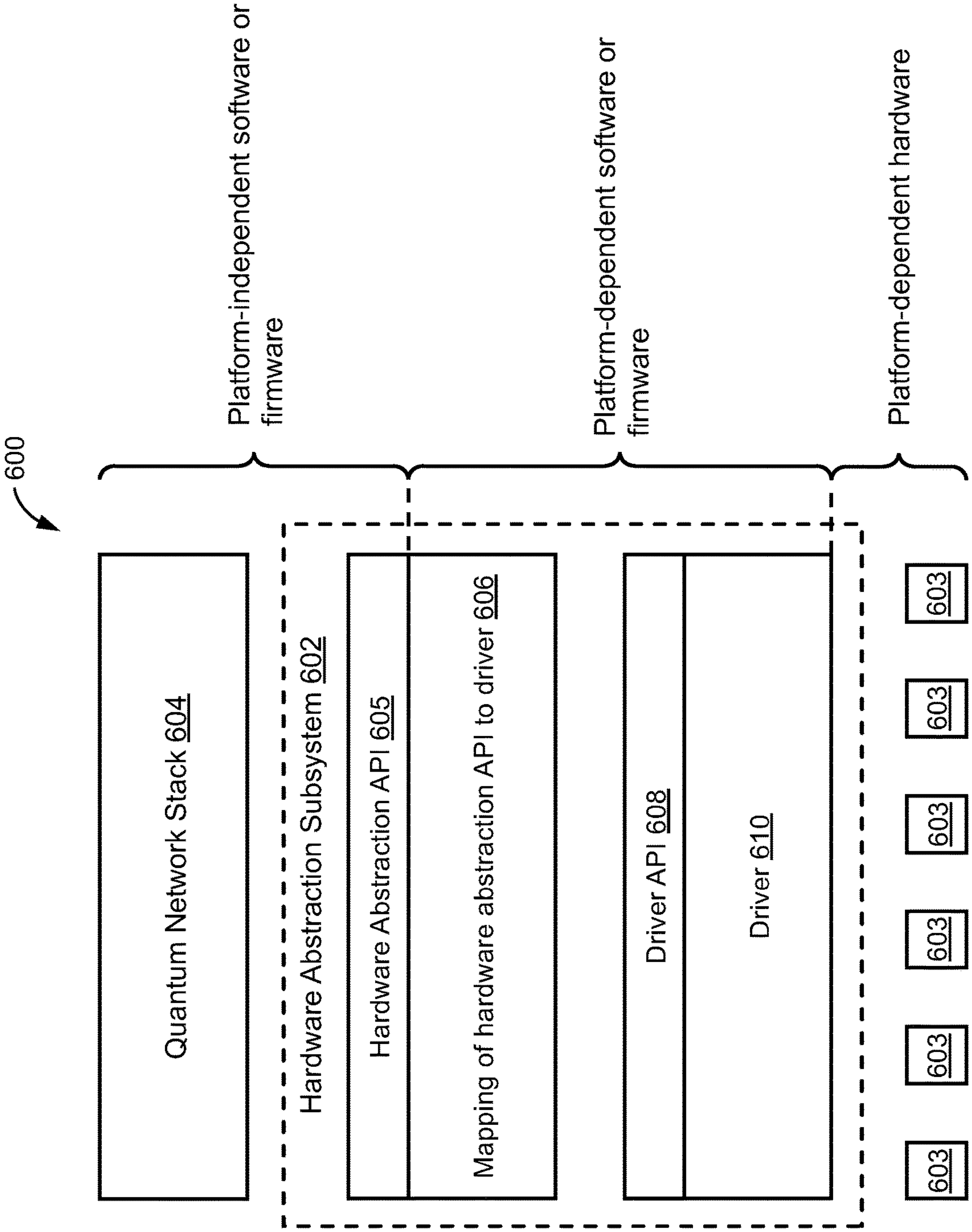
FIG. 6 is a schematic diagram of an example technology stack.

FIG. 6 shows an example technology stack 600 including a hardware abstraction subsystem 602 (also referred to as the hardware abstraction layer, or HAL) that is responsible for abstracting the details of underlying hardware 603. In some examples the hardware abstraction subsystem 602 allows a quantum network stack 604 software to be implemented in a platform-independent and portable manner. The hardware abstraction subsystem 602 defines a set of abstract hardware devices, such as entangled photon pair sources, single photon sources, single photon detectors, quantum memories, Bell state measurement stations, etc. The abstract hardware devices may map one-to-one to a physical hardware device. Alternatively, the abstract hardware device may be a more complex higher-level abstraction that maps to a group of physical hardware devices. For example, a memory-based quantum repeater abstract hardware device provides an abstraction of performing an entanglement swap between two quantum memories. In physical reality, represented at a lower level of abstraction, this may be implemented using passive optics, quantum memories, and photon detectors, or by using quantum gates, depending on the underlying physical platform. Another example of an abstract hardware device is a quantum key distribution end node, where the provided abstraction is associated with performing quantum measurements and running protocols to generate secret key material. In physical reality, represented at a lower level of abstraction, this may be implemented using passive optics, quantum measurement systems, and classical processors, depending on the protocol variant and underlying physical platform. Another example of an abstract hardware device is a quantum router, which provides abstraction of distributing entanglement over three or more interfaces. In physical reality, represented at a lower level of abstraction, the quantum router may be implemented using passive optics, optical switches, detectors, quantum memories, entangled photon sources, and frequency converters, depending on the underlying physical platform and network architecture.

Referring to FIG. 6, the hardware abstraction subsystem 602 can provide a north-bound application programming interface (API) for the quantum network stack software above it, which is referred to as a hardware abstraction API 605. The hardware abstraction API 605 operates together with a mapping of hardware abstraction API to driver 606. The hardware abstraction API 605 may be platform-independent (i.e., the same for all hardware platforms). For each supported abstract hardware device, the hardware abstraction API 605 defines: (1) a set of operational attributes whose value can be read to retrieve some operational aspect of the abstract hardware device (e.g., the number of photons that a counting single photon detector has detected), (2) a set of configuration attributes whose value can be written to set some configuration aspect of the abstract hardware device (e.g., the target rate at which an entangled photon pair source should generate entangled photon pairs), (3) a set of notifications that the abstraction hardware device can generate to report that some event has occurred (e.g., to report a fault), and (4) a set of actions that can be invoked on the abstract hardware device to request it to perform some action (e.g., to trigger a quantum memory to emit a photon that is entangled with the qubit that is stored in the quantum memory). A formal data modeling language (e.g., YANG (RFC 6020 from Internet Engineering Task Force (IETF)), incorporated herein by reference) can be used to provide a formal description of the attributes, notifications, and actions listed above, and to automatically generate the hardware abstraction API 605 from the formal description in one or more programming languages. A quantum memory at a given node can be implemented using any of a variety of types of quantum elements configured to store a quantum state or a constituent of a quantum state (e.g., potentially entangled with other constituents of a collective quantum state). A quantum element configured to store a quantum state or constituent of a quantum state corresponding to a single qubit may also be referred to herein as a "single qubit memory" or simply a "qubit memory."

Referring to FIG. 6, the functions provided by the hardware abstraction API 605 may be divided into several classes, depending on the real-time nature of the function, including: hard real-time functions, soft real-time functions, and non-real-time functions. Hard real-time functions may be used by field programmable gate arrays (FPGAs) and application-specific integrated circuits (ASICs). Here, the exact timing of the function, possibly to nanosecond precision, is part of the function definition. Soft real-time functions may be used by software running on a controller with a real-time operating system. Here it is important that the functions are executed very fast and can be invoked at a very high rate (e.g., hundreds of thousands of invocations per second or more). Non-real-time functions may be used by software running on a general-purpose processor and a general-purpose operating system. These functions are invoked at a relatively low frequency, typically for management purposes.

Below the hardware abstraction API 605 and the mapping of hardware abstraction API to driver 606 is a driver API 608 together with a driver 610. The driver API 608 is responsible for mapping the hardware abstraction API 605 to concrete operation on the hardware 603. Each hardware platform may have its own separate driver. While it is a goal for the quantum network stack 604 software to be portable and platform-independent, it is not necessarily completely oblivious of the details of the underlying physical hardware 603. For this reason, some implementations of the hardware abstraction API 605 may include resource and capability discovery functions which allow the platform-independent quantum network stack 604 software to dynamically discover various aspects of the underlying hardware 603 and adjust its behavior accordingly. For example, some possible questions that may be relevant include:

(1) Which types of abstract hardware devices (i.e., resources) are present in the platform? For example, are there quantum memories present?

(2) How many abstract hardware devices of each type are present in the platform? For example, how many quantum memories are present?

(3) What are the capabilities of each abstract hardware device? For example, is it possible to trigger a quantum memory to emit a photon that is entangled with the qubit stored in the quantum memory?

(4) What are the parameters of each abstract hardware device? For example, what is the T1 relaxation time (e.g., a value characterizing the time taken for a higher energy state that encodes a first basis state associated with a quantum element, such as a first excited state, to evolve over time to a lower energy state that encodes a second basis state associated with that quantum element, such as a ground state during storage) and the T2 dephasing time (e.g., a value characterizing the time taken for an initial phase of a state associated with a quantum element to evolve over time to a state whose phase is no longer close enough to the initial phase according to a phase metric during storage) for each quantum memory?

(5) What is the logical topology of the abstract hardware devices (i.e., what are the relationships between them)? For example, on which pairs of quantum memories is it possible to perform a specific two-qubit operation (e.g., a quantum gate operation)?

7. Virtual Circuits

In some examples, a connection-oriented model may be used, wherein before two hosts can start to produce entanglement, they first establish a virtual circuit (VC).

Figure 7:
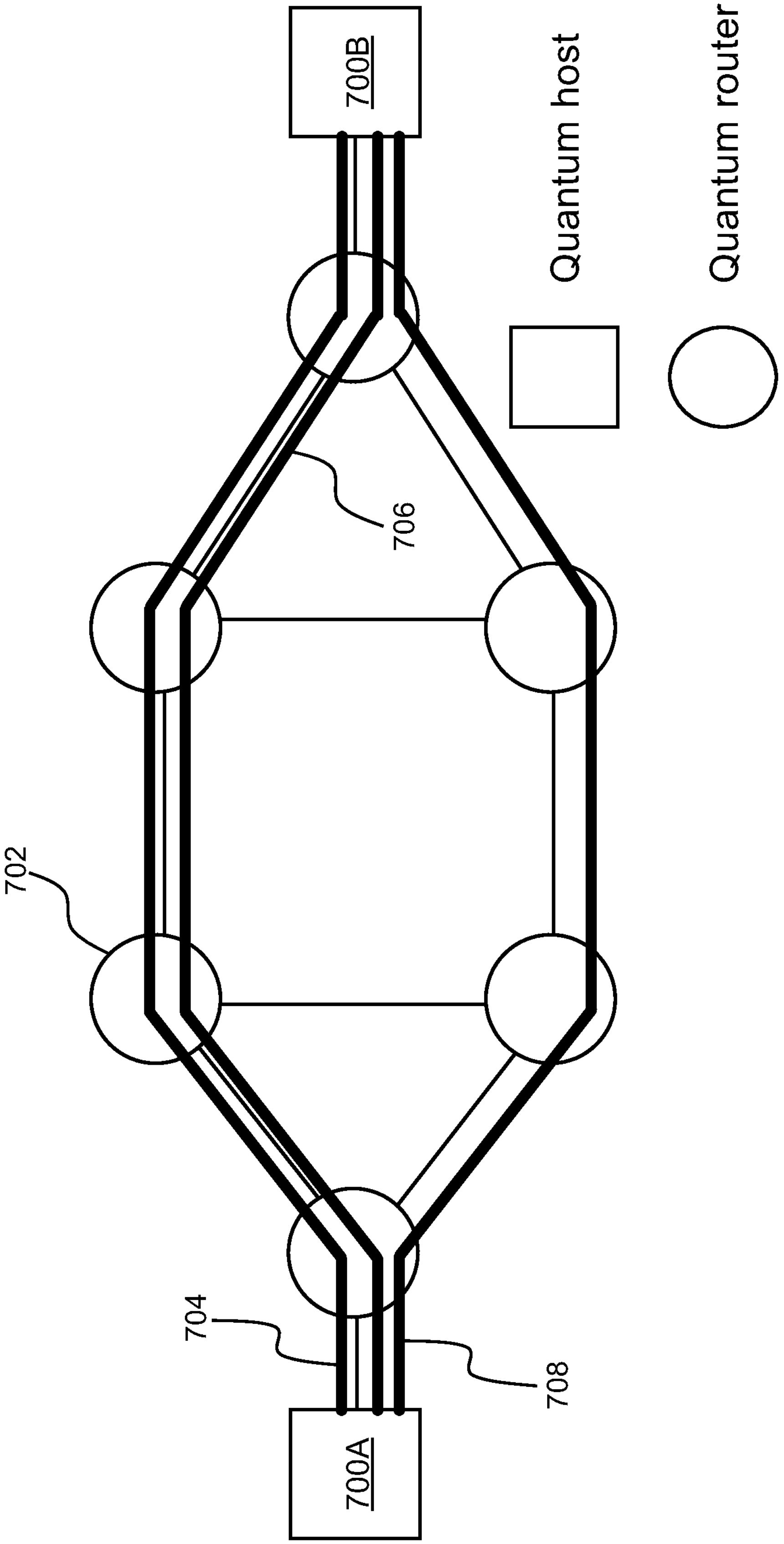
FIG. 7 is a schematic diagram of example virtual circuits.

FIG. 7 shows an example of a collection of virtual circuits over paths between quantum host nodes 700A and 700B (also referred to as simply "hosts"). The quantum host nodes 700A and 700B are connected via a set of six quantum router nodes 702 (also referred to as simply "routers") that have point-to-point connections between neighboring pairs quantum router nodes. Additionally, two of the quantum router nodes have respective connections to respective quantum host nodes. This set of nodes could be a subset of a larger quantum network. In this example, there are three virtual circuits 704, 706, and 708. In a connection-oriented model, each node has one instance of the swapping finite-state machine (FSM) instance per quantum virtual circuit that transits the node. Each virtual circuit is associated with a corresponding path through one or more quantum router nodes. Two different virtual circuits may share the same path, as do virtual circuit 706 and virtual circuit 706 in this example. Additionally, two quantum host nodes may have more than one virtual circuits between them, as in virtual circuits 704, 706, and 708 in this example. Some classical information may be shared among nodes associated with the same virtual circuit. That classical information may not necessarily be required to traverse the same path as the virtual circuit, but for some protocols (e.g., some secure protocols) there may restrictions on nodes other those on the path associated with the virtual circuit forwarding (or otherwise receiving) the classical information. On the routers, the swapping FSM manages two qubit memories and is responsible for swapping the two qubits at the correct time. The swapping FSM is also responsible for exchanging classical messages with swapping FSM instances on other nodes to coordinate the swaps to produce end-to-end entanglements and to detect and recover from failure scenarios. Some examples may include "swapping" FSM instances on the hosts which only manage a single qubit memory. We put the word "swapping" in quotes because these FSM instances (having only a single qubit memory) do not physically perform any swaps. However, they do take part in the protocol (i.e., the classical message exchange) to coordinate the creation of end-to-end entanglements and to detect and recover from failure scenarios. The FSM instances on the hosts deliver the end-to-end entanglements that are produced to the next-higher layer. The mechanism to decide the path for the virtual circuit can be implemented using any of a variety of techniques. Choosing the path may be the responsibility of the path computation element (PCE) which uses information (e.g., the topology) provided by the routing protocol.

The mechanism for creating the virtual circuit can be implemented using any of a variety of techniques. For example, one approach is to use a distributed signaling protocol to install the virtual circuits and the FSM instances (e.g., using an cast-west protocol as described below). Another approach is to use a logically centralized controller that installs the virtual circuits and the FSM instances on each visited node (e.g., using a north-south protocol as described below). The FSM instances are installed with appropriate parameters for configuring the protocols run by the FSM instances.

In some of the examples disclosed herein, it is assumed that the path for the virtual circuit has already been chosen and that the virtual circuit has already been created. Under such an assumption, the example protocols and the example state machines that each node on the already-created virtual circuit executes to produce end-to-end entanglement may be described.

8. The Controller

The quantum network may also include a centralized controller (also referred to as simply "controller") that is responsible for implementing high-level centralized functions.

Figure 8A:
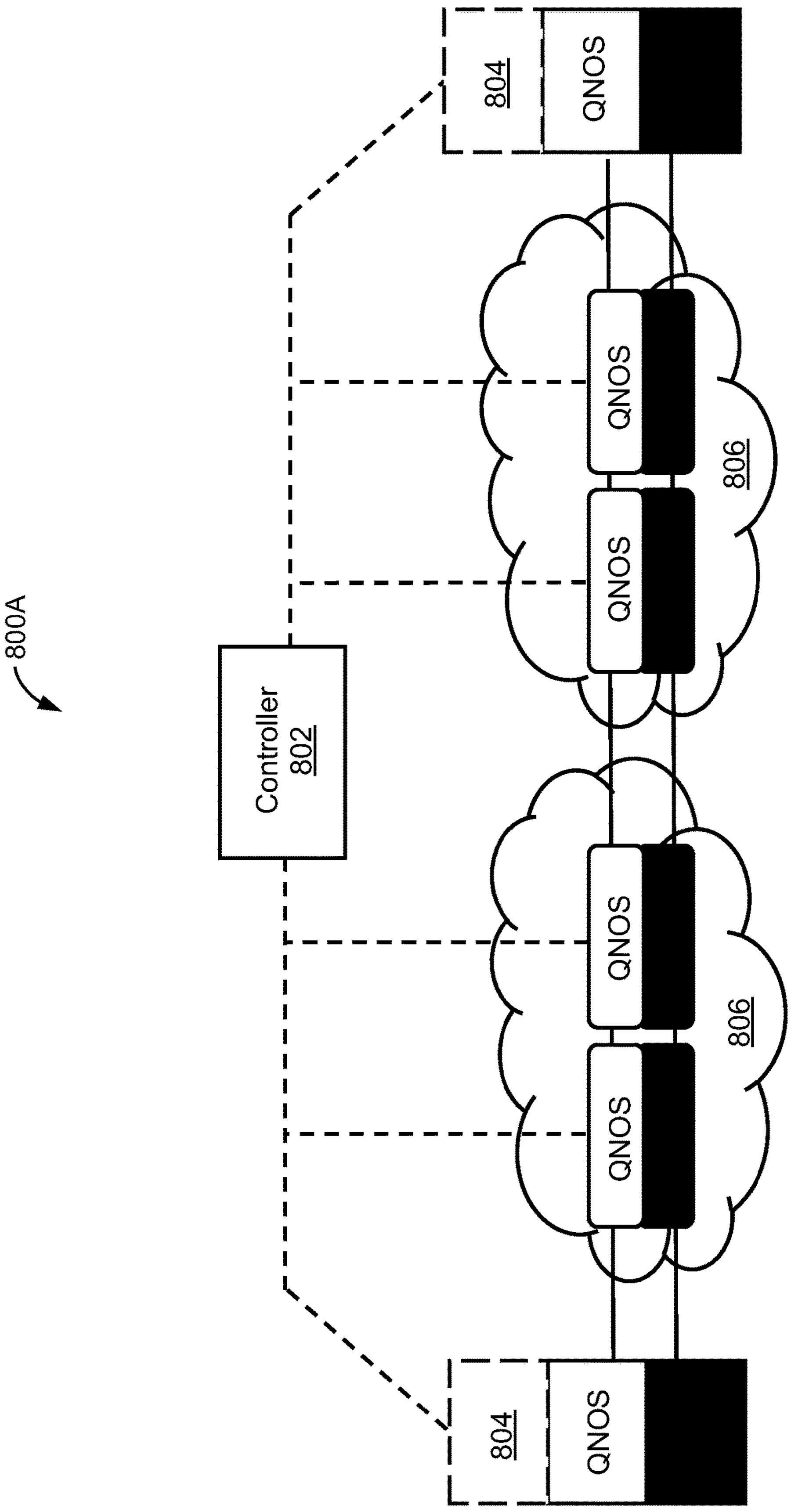
FIG. 8A is a schematic diagram of an example quantum network.

FIG. 8A shows an example quantum network 800 comprising a centralized controller 802. The centralized controller 802 may be logically centralized but physically distributed. For example, the centralized controller 802 may be implemented on a cluster of redundant local servers to avoid a single point of failure and to allow the controller to scale-out as the quantum network grows. The centralized controller 802 may also be referred to as the Software Defined Networking (SDN) controller, following common terminology in classical networking. The responsibilities of the centralized controller 802 may include: (1) centralized device and network management, (2) auto-discovery of the network topology, (3) auto-discovery of available resources in the quantum network (e.g., the number of quantum memories and their coherence times), (4) optimized routing of the virtual circuits (also known as traffic engineering) based on the provided traffic demand matrix and/or the auto-discovered available resources in the network. (5)

gathering and storing network telemetry data, and (6) dynamic re-optimization after failures of traffic pattern changes. The network 800 may have local servers 804 and remote servers 806 (i.e., cloud servers) that are in communication with other local servers 804, remote servers 806, and/or the centralized controller 802. The local servers 804 and the remote servers 806 may have a quantum network operating system (QNOS) stored in memory. FIGS. 8B-8E illustrate a variety of different examples in which a quantum network can be used, with each example highlighting different aspects of the techniques that are disclosed herein.

Figure 8B:
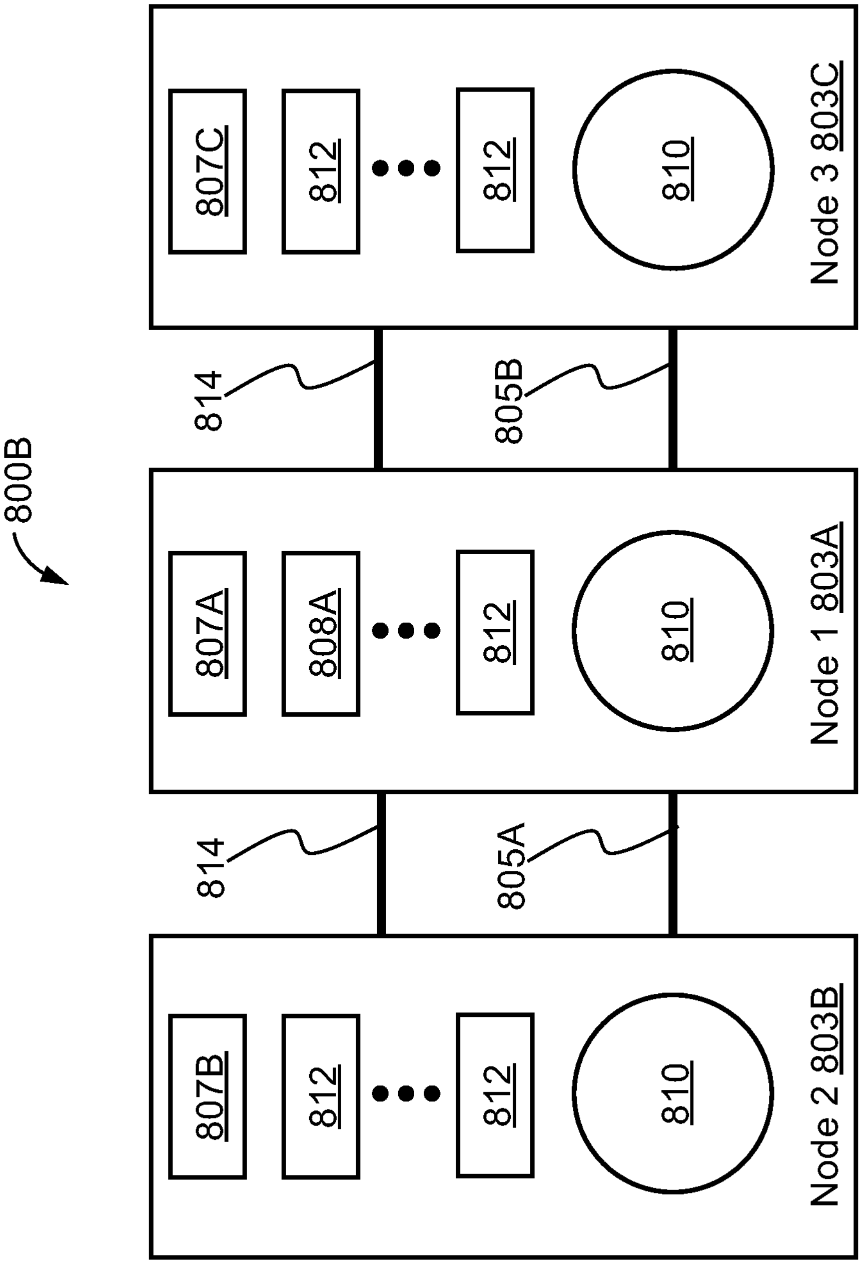
FIGS. 8B-8E are schematic diagrams of example quantum network portions.

FIG. 8B shows a schematic diagram of a portion of a quantum network 800B. The quantum network 800B manages entangled quantum states, for a plurality of time periods, in a network of nodes comprising a first node 803A, a second node 803B, and a third node 803C.

Referring to FIG. 8B, in one example, managing entangled quantum states in the quantum network 800B comprises receiving, at the first node 803A, a first message indicating that a first quantum element 807A at the first node 803A is entangled with a second quantum element 807B at the second node 803B. The first message may be transmitted across a first classical communication channel 805A between the first node 803A and the second node 803B, or across a classical communication channel comprising other nodes, for example, a controller node (not shown). The first message comprises a first identifier that uniquely identifies one of a plurality of entanglement generation operations between the first node 803A and the second node 803B over a first time period of the plurality of time periods. Additionally, the quantum network 800B receives, at the first node 803A, a second message transmitted indicating that a third quantum element 808A at the first node 803A is entangled with a fourth quantum element 807C at the third node 803C. The second message may be transmitted across a second classical communication channel 805B between the first node 803A and the third node 803C, or across a classical communication channel comprising other nodes. The second message comprises a second identifier that uniquely identifies one of a plurality of entanglement generation operations between the first node 803A and the third node 803C over the first time period. The quantum network 800B generates, at the first node 803A, a third identifier that identifies an entanglement resulting from an entanglement swap operation performed at the fire node 803A, wherein the third identifier is based on the entangled quantum elements at the first node 803A and the second node 803B (e.g., the first quantum element 807A and the second quantum element 807B) and the entangled quantum elements at the first node 803A and the third node 803C (e.g., the third quantum element 808A and the fourth quantum element 807C). The third identifier comprises at least a portion of the first identifier and at least a portion of the second identifier. The first node 803A, the second node 803B, and the third node 803C each comprise control circuitry 810. In some examples, the control circuitry 810 may be connected directly or indirectly to quantum elements 812, the first quantum element 807A, the second quantum element 807B, the third quantum element 808A, and the fourth quantum element 807C. The control circuitry 810 may comprise one or more processing units (e.g., field programmable gate arrays (FPGAs), application-specific integrated circuits (ASICs), central processing units, and/or graphical processing units that may have software running with a real-time operating system stored in memory). Each node in the quantum network 800B may be connected to one or more other nodes in the quantum network 800B by quantum communication channels 814 and/or classical communication channels (e.g., fiber optic cable).

Figure 8C:
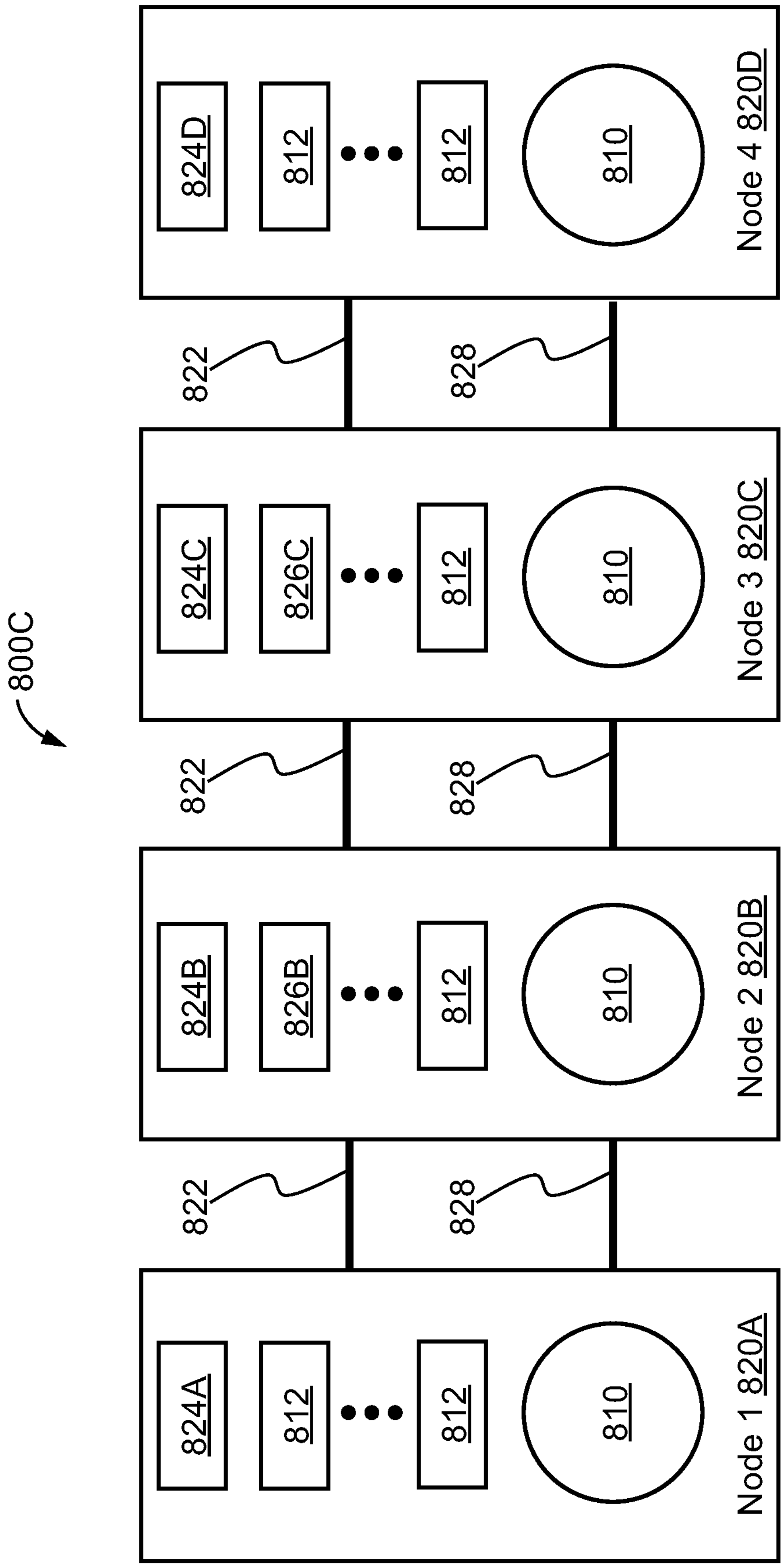

FIG. 8C shows a schematic diagram of a portion of a quantum network 800C. The quantum network 800C manages entangled quantum states in a network of nodes comprising a first node 820A, a second node 820B, a third node 820C, and a fourth node 820D.

Referring to FIG. 8C, in one example, managing entangled quantum states in the quantum network 800C comprises, for each of two or more pairs of nodes on a path over a set of N nodes in the quantum network 800C, establishing entanglement between pairs of quantum elements in the respective nodes of that pair of nodes based at least in part on one or more quantum signals transmitted over one or more quantum communication channels 822, where N>3. In one example, N=4 and entanglement is established between three pairs of nodes, for example, between a first quantum element 824A at the first node 820A and a second quantum element 824B at the second node 820B, between a third quantum element 826B at the second node 820B and a fourth quantum element 824C at the third node 820C, and between a fifth quantum element 826C at the third node 820C and a sixth quantum element 824D at the fourth node 820D. Additionally, the quantum network 800C performs a plurality of entanglement swap operations among different respective subsets of nodes in the set of N nodes using the pairs of entangled quantum elements. For example, entanglement swap operations may be performed at the second node 820B and the third node 820C. Each entanglement swap operation comprises performing a joint measurement on a non-entangled pair of quantum elements in a node that is a member of two different pairs of nodes of the two or more pairs of nodes, resulting in a measurement result. For example, a joint measurement may be performed on the second quantum element 824B and the third quantum element 826B, and a joint measurement may be performed on the fourth quantum element 824C and the fifth quantum element 826C. The quantum network 800C manages the plurality of entanglement swap operations during establishment of end-to-end entanglement between respective quantum elements in the nodes at the ends of the path over the set of N nodes using a set of classical messages transmitted over one or more classical communication channels 828. In one example, the first node 820A and the fourth node 820D are the nodes at the ends of the path over which end-to-end entanglement is established. Each classical message in the set of classical messages comprises one or both of (1) information indicating success or failure of a particular entanglement swap operation and (2) information indicating the measurement result of the joint measurement performed for the particular entanglement swap operation. One or more of the classical messages in the set of classical messages are sent in a first direction between nodes on the path (e.g., from the second node 820B to the third node 820C), and one or more of the classical messages in the set of classical messages are sent a second direction opposite to the first direction between nodes on the path (e.g., from the third node 820C to the first node 820A). Furthermore, none of the classical messages in the set of classical messages or messages acknowledging success or failure of one or more of the plurality of entanglement swap operations are transmitted from one of the nodes at the ends of the path with a destination of the other of the nodes at the ends of the path (e.g., none of the classical messages are transmitted from the first node 820A to the fourth node 820D). The first node 820A, the second node 820B, the third node 820C, and the fourth node 820D each comprise control circuitry 810. In some examples, respective control circuitry 810 may be connected directly or indirectly to quantum elements 812 and the first quantum element 824A, the second quantum element 824B, the third quantum element 826B, the fourth quantum element 824C, the fifth quantum element 826C, and the sixth quantum element 824D. The control circuitry 810 may comprise one or more processing units (e.g., field programmable gate arrays (FPGAs), application-specific integrated circuits (ASICs), central processing units, and/or graphical processing units that may have software running with a real-time operating system stored in memory).

Figure 8D:
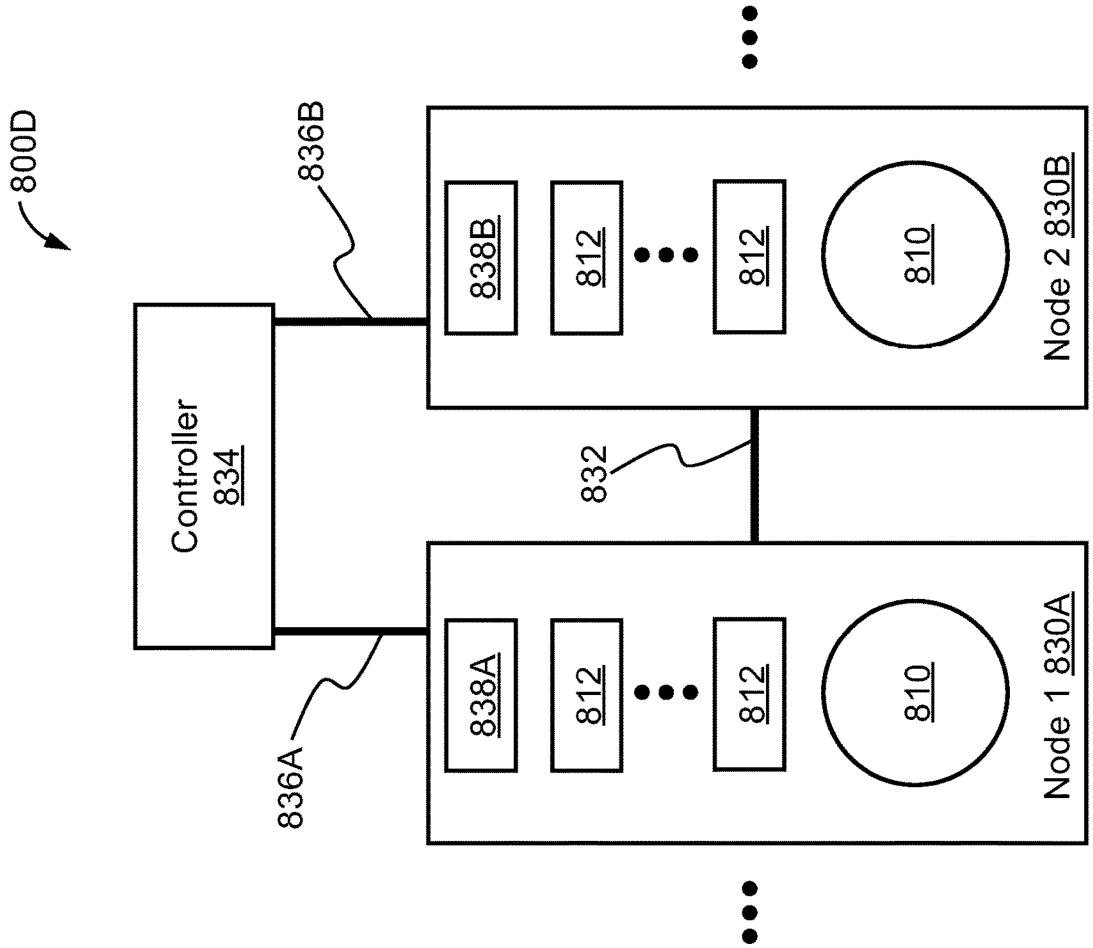

FIG. 8D shows a schematic diagram of a portion of a quantum network 800D. The quantum network 800D manages entangled quantum states in a network of nodes comprising a first node 830A and a second node 830B connected by a first quantum communication channel 832.

Referring to FIG. 8D, in one example, managing entangled quantum states in the quantum network 800F comprises sending, from a controller 834 in the quantum network 800D, a first message to the first node 830A along a first classical communication channel 836A, where the first message comprises scheduling information that specifies a procedure to be executed for scheduling entanglement swap operations associated with portions of a plurality of paths through nodes in the quantum network 800D. The quantum network 800D sends, from the controller 834, a second message to the second node 830B along a second classical communication channel 836B, where the second message comprises the scheduling information. The quantum network 800D executes at least a portion of the procedure at the first node 830A based at least in part on the first message and based at least in part on information associated with one or more previous attempts to establish entanglement between nodes on a first path of the plurality of paths that includes the first node 830A. The quantum network 800D executes at least a portion of the procedure at the second node 830B based at least in part on the second message and based at least in part on information associated with one or more previous attempts to establish entanglement between nodes on a second path of the plurality of paths that includes the second node 830B. The first node 830A and the second node 830B each comprise control circuitry 810. In some examples, the control circuitry 810 may be connected directly or indirectly to quantum elements 812.

Referring again to FIG. 8D, in another example, managing entangled quantum states in the quantum network 800D comprises sending, from the first node 830A, a first message indicating that a first quantum element 838A at the first node 830A is entangled with a second quantum element 838B at the second node 830B. The first message comprises a first estimate of a fidelity of entanglement between the first quantum element 838A and the second quantum element 838B, and a timestamp indicating a time associated with the first estimate. The first message may be generated, at least in part, from control circuitry 810 at the first node 830A, and may be transmitted along the first classical communication channel 836A between the first node 830A and the controller 834. In some examples, the controller 834 may also transmit the first message along a second classical communication channel 836B to the second node 830B (e.g., to control circuitry 810 at the second node 830B). In some examples, the first node 830A and the second node 830B may be connected directly by a third classical communication channel (not shown), and the first message may be transmitted along the third classical communication channel. The quantum network 800D generates, based at least in part on the first message, a second estimate of a fidelity of the entanglement between the first quantum element 830A and the second quantum element 830B, at a second time after the time indicated by the timestamp. The second estimate of the fidelity may be generated by control circuitry 810 at the first node 830A, control circuitry 810 the second node 830B, and/or at other nodes in the quantum network 800D (e.g., the controller 834). The quantum network 800D compares the second estimate to each of a plurality of thresholds and performs a first action in response to a result of comparing the second estimate to a first threshold of the plurality of thresholds, and performs a second action different from the first action in response to a result of comparing the second estimate to a second threshold of the plurality of thresholds. The comparing may be performed at the first node 830A, the second node 830B, and/or at other nodes in the quantum network 800D (e.g., using control circuitry 810 or the controller 834).

Referring again to FIG. 8D, in another example, managing entangled quantum states in the quantum network 800D comprises receiving, at the first node 830A, a first message indicating that the first quantum element 838A at the first node 830A is entangled with the second quantum element 838B at the second node 830B, where the first message comprises a first estimate of a fidelity of entanglement between the first quantum element 838A and the second quantum element 838B. The quantum network 800D receives, at the first node 830A, (1) storage information characterizing a reduction in fidelity due to storage of quantum states on at least one of the first quantum element 838A or the second quantum element 838B, and (2) swap information characterizing a reduction in fidelity due to one or more quantum operations associated with an entanglement swap operation based on the entangled quantum elements at the first node 830A and the second node 830B and entangled quantum elements at another pair of nodes (not shown). The quantum network 800D generates, at the first node 830A, a second estimate of a fidelity of a result of the entanglement swap operation based at least in part on the storage information and the swap information.

Referring again to FIG. 8D, in some examples the control circuitry 810 may be connected directly or indirectly to quantum elements 812, the first quantum element 838A, and the second quantum element 838B. The control circuitry 810 and the controller 834 may comprise one or more processing units (e.g., field programmable gate arrays (FPGAs), application-specific integrated circuits (ASICs), central processing units, and/or graphical processing units that may have software running with a real-time operating system stored in memory). In some examples, the quantum network 800D comprises a second quantum communication channel between the controller 834 and the first node 830A, and a third quantum communication channel between the controller 834 and the second node 830B.

Figure 8E:
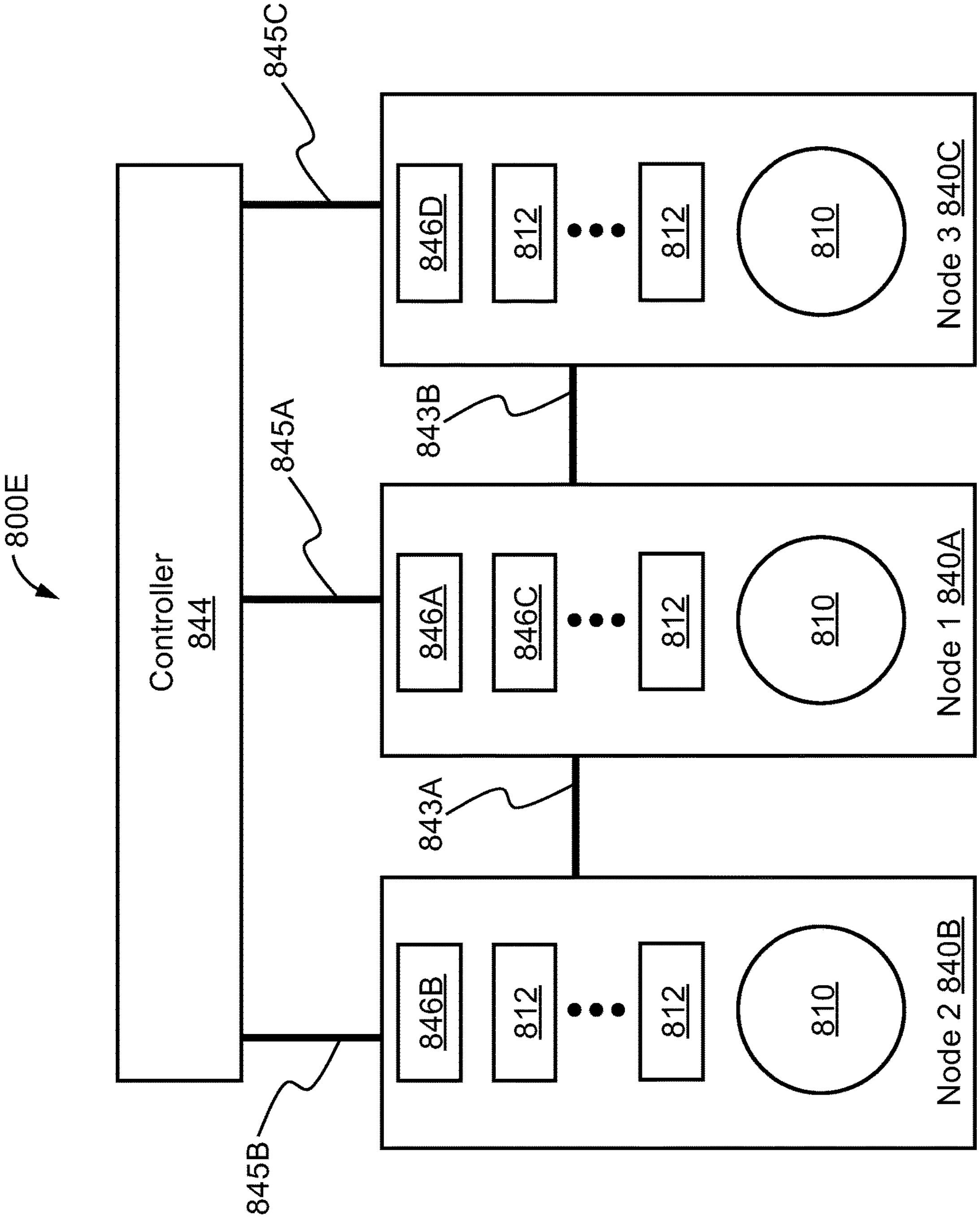

FIG. 8E shows a schematic diagram of a portion of a quantum network 800E. The quantum network 800E manages entangled quantum states in a network of nodes comprising a first node 840A, a second node 840B, a third node 840C, and a controller 844. The first node 840A and the second node 840B are connected by a first quantum communication channel 843A, and the second node 840B and the third node 840C are connected by a second quantum communication channel 843B. The first node 840A, the second node 840B, and the third node 840C are connected to the controller 844 by a first classical communication channel 845A, a second classical communication channel 845B, and a third classical communication channel 845C, respectively. In some examples, the first node 840A, the second node 840B, and the third node 840C may be connected to the controller 844 by a third quantum communication channel (not shown), a fourth quantum communication channel, and a fifth quantum communication channel, respectively. In some examples, the first node 840A and the second node 840B may be connected by a fourth classical communication channel (not shown), the first node 840A and the third node 840C may be connected by a fifth classical communication channel (not shown), and the second node 840B and the third node 840C may be connected by a sixth classical communication channel (not shown). The first node 840A, the second node 840B, and the third node 840C each comprise control circuitry 810.

Referring to FIG. 8E, in one example, managing entangled quantum states in the quantum network 800E may comprise sending, from the controller 844, scheduling information to each of a plurality of nodes in the network, where the scheduling information specifies a procedure to be executed for scheduling entanglement swap operations associated with portions of a plurality of paths through nodes in the network. The quantum network 800E, for each of two or more pairs of nodes (e.g., a first pair comprising the first node 840A and the second node 840B, and a second pair comprising the first node 840A and the third node 840C) on a first path over a set of N nodes in the network, establishes entanglement between pairs of quantum elements (e.g., between a first quantum element 846A and a second quantum element 846B, and between a third quantum element 846C and a fourth quantum element 846D) in the respective nodes of that pair of nodes based at least in part on one or more quantum signals transmitted over one or more quantum communication channels, where N≥3. In one example, N=3 and the quantum communication channels are at least one of the first quantum communication channel 843A, the second quantum communication channel 843B, the third quantum communication channel, the fourth quantum communication channel, or the fifth quantum communication channel. The quantum network 800E performs a plurality of entanglement swap operations among different respective subsets of nodes in the set of N nodes using the pairs of entangled quantum elements. For example, the first node 840A may perform an entanglement swap operation on the first quantum element 846A and the third quantum element 846C. The quantum network 800E manages the plurality of entanglement swap operations during establishment of end-to-end entanglement between respective quantum elements (e.g., the second quantum element 846B and the fourth quantum element 846D) in the nodes (e.g., the second node 840B and the third node 840C) at the ends of the path over the set of N nodes. The managing is based at least in part on, at each of a first node 840A, a second node 840B, and a third node 840C on the first path, using the scheduling information to perform at least a portion of the procedure. The managing is also based at least in part on, at the first node 840A, generating a first identifier that identifies entanglement resulting from an entanglement swap operation based on (1) entangled quantum elements at the first node 840A and the second node 840B identified by a second identifier (e.g., the first quantum element 846A and the second quantum element 846B), and (2) entangled quantum elements at the first node 840A and the third node 840C identified by a third identifier (e.g., the third quantum element 846C and the fourth quantum element 846D). The generating comprises including at least a portion of the second identifier in the first identifier, and including at least a portion of the third identifier in the first identifier.

Referring again to FIG. 8E, in another example, the quantum network 800E manages the plurality of entanglement swap operations during establishment of end-to-end entanglement between respective quantum elements (e.g., the second quantum element 846B and the fourth quantum element 846D) in the nodes (e.g., the second node 840B and the third node 840C) at the ends of the first path over the set of N nodes based at least in part on a plurality of messages sent between nodes in the quantum network 800D, including a first message indicating that the first quantum element 846A at the first node 840A is entangled with the second quantum element 846B at the second node 840B, where the first message comprises a first estimate of a fidelity of entanglement between the first quantum element 846A and the second quantum element 846B. The quantum network 800E also manages the plurality of entanglement swap operations during establishment of end-to-end entanglement based at least in part on a plurality of estimates of fidelity of entanglement, including a second estimate of a fidelity of the entanglement between the first quantum element 846A and the second quantum element 846B, where the second estimate is generated at the second node 840B based at least in part on at least one of (1) the first message, or (2) fidelity reduction information comprising at least one of (a) storage information characterizing a reduction in fidelity due to storage of quantum states on at least one of the first quantum element 846A or the second quantum element 846B, or (b) swap information characterizing a reduction in fidelity due to one or more quantum operations associated with an entanglement swap operation based on the entangled quantum elements at the first node 840A and at the second node 840B and entangled quantum elements at another pair of nodes.

Referring to FIG. 8E, in another example, managing entangled quantum states in the quantum network 800E may comprise sending, from the controller 844, scheduling information to each of a plurality of nodes in the network, where the scheduling information specifies a procedure to be executed for scheduling entanglement swap operations associated with portions of a plurality of paths through nodes in the network. The quantum network 800E manages the scheduled entanglement swap operations based at least in part on, at each of the first node 840A, the second node 840B, and the third node 840C on the first path, using the scheduling information to perform at least a portion of the procedure. The quantum network 800E manages the scheduled entanglement swap operations also based at least in part on a plurality of messages sent between nodes in the quantum network 800E, including a first message indicating that the first quantum element 846A at the first node 840A is entangled with the second quantum element 846B at the second node 840B, where the first message comprises a first estimate of a fidelity of entanglement between the first quantum element 846A and the second quantum element 846B. The quantum network 800E manages the scheduled entanglement swap operations also based at least in part on a plurality of estimates of fidelity of entanglement, including a second estimate of a fidelity of the entanglement between the first quantum element 846A and the second quantum element 846B, where the second estimate is generated at the second node 840B (e.g., at control circuitry 810) based at least in part on at least one of (1) the first message, or (2) fidelity reduction information comprising at least one of (a) storage information characterizing a reduction in fidelity due to storage of quantum states on at least one of the first quantum element 846A or the second quantum element 846B, or (b) swap information characterizing a reduction in fidelity due to one or more quantum operations associated with an entanglement swap operation based on the entangled quantum elements at the first node 840A and the second node 840B and entangled quantum elements at another pair of nodes.

Referring again to FIG. 8E, in some examples the control circuitry 810 may be connected directly or indirectly to quantum elements 812, the first quantum element 846A, and the second quantum element 846B, the third quantum element 846C, and the fourth quantum element 846D. The control circuitry 810 and the controller 844 may comprise one or more processing units (e.g., field programmable gate arrays (FPGAs), application-specific integrated circuits (ASICs), central processing units, and/or graphical processing units that may have software running with a real-time operating system stored in memory).

9. East-West Protocols Used in Combination with North-South Protocols

In some examples, the quantum nodes (i.e., the quantum hosts, the quantum routers, and the quantum repeaters) may run cast-west protocols with each other. These protocols can implement the various layers of the on-device quantum network stack (e.g., timing and calibration, elementary entanglement generation, purification, swapping, and teleportation).

In some examples, the controller may run north-south protocols with each of the quantum nodes in the network. The north-south protocols may include communication of information that is relevant for the east-west protocols. For example, the controller may provide to the quantum nodes (e.g., in a virtual circuit installation procedure) information identifying a virtual circuit, information specifying a path for the identified virtual circuit, and an FSM instance for an east-west protocol. The controller may provide this information to each quantum router node that is on the path associated with the virtual circuit, which enables the nodes to run the associated protocol (e.g., swapping or purification). The controller may also be responsible for configuring the high-level parameters of the FSM instances based on network-defined and/or user-defined metrics (e.g., requested fidelity or quality of service, network traffic demand). The configurations may determine what specific procedure the FSM will perform. For example, a particular version of a swapping protocol (e.g., ALAP/ASAP/BIDIR) can be determined. The configurations may also determine whether purification will be performed, and if so, how and/or when purification protocol will be performed.

In classical networking and/or quantum networking, there are a variety of centralized and distributed architectures that can be used. In some examples of classical networking, most of the intelligence is in the centralized controller. Correspondingly, most of the complexity in such examples may be in the north-south protocols. For example, in some SONET/SDH time-division multiplexed networks, the controller is responsible for computing the route for each virtual circuit, installing the necessary configuration state for each virtual circuit on each network node. The east-west protocols between network nodes in such examples may be relatively simple and focused on fast recovery from failures.

Alternatively, the TCP/IP-based Internet uses a decentralized design where most of the complexity is in the east-west protocols. For example, traffic routing may be done using fully decentralized protocols such as BGP and OSPF.

In some networks, some level of centralized intelligence may be useful for certain use cases, including traffic engineering and data center networks. This can be facilitated by Software Defined Networking (SDN). Examples of north-south protocols that can be used between the SDN controller and the network nodes, include OpenFlow, P4, and PCEP.

10. Node Hop Numbers

Consider a virtual circuit with N nodes in the path. The number N includes the hosts on either side of the virtual circuit. Thus, there are two hosts and N−2 routers. For N=2 there are two directly connected hosts with no routers in between. In the case of a host setting up a virtual circuit to itself (N=1), creation of the "end-to-end" entangled pair boils down to using local gates to produce a pair of local qubits entangled with each other.

Figure 9:
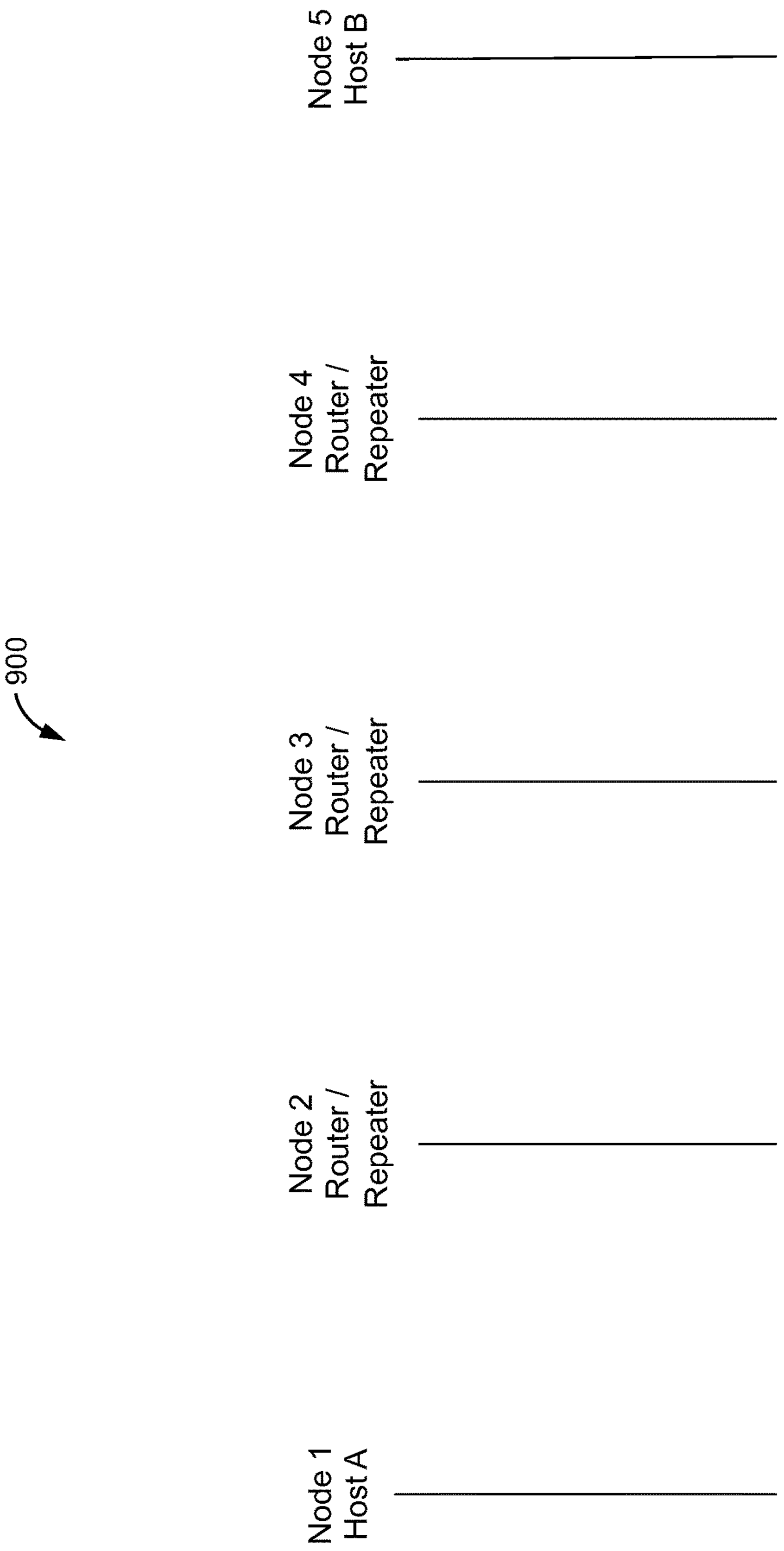
FIGS. 9-28 are schematic diagrams of example steps occurring in quantum network portions.

FIG. 9 shows a portion of an example quantum network 900 comprising two hosts (Host A at Node 1 and Host B at Node 5) and three routers/repeaters at Node 2, Node 3, and Node 4, with a total number of nodes equal to five (N=5). The vertical black lines illustrated below each node indicate a passage of time from top to bottom which will herein be used to depict network events in a ladder diagram.

Each node in the virtual circuit may be assigned a node hop number (also referred to as a hop number, for short). The first node in the virtual circuit gets node hop number 1. The next one gets node hop number 2. The last node gets node hop number N. Hop numbers are only unique within the scope of a virtual circuit. For example, if two different virtual circuits go through the same node, that node may be node hop number 2 in one virtual circuit and node hop number 4 in the other virtual circuit. Nodes may also be assigned node identifiers, which are unique within the scope of the network. Node identifiers are different from node hop numbers. Node identifiers may not play an important role in the swapping protocol (but they can play an important role in other protocols, e.g., in some routing protocols). Herein, unless otherwise specified, node numbers or nodes labeled with numbers in diagrams are assumed to be node hop numbers.

11. A and B Sides

Quantum virtual circuits are inherently directionless (i.e., there is no source or destination). In some examples, end-to-end entangled pairs of qubits are produced symmetrically, where one qubit of the pair is delivered to one host and the other qubit of the pair is delivered to the other host. Despite the directionless nature of quantum virtual circuits, one host can be arbitrarily designated as "host A" and the other host as "host B". By convention, the node hop numbering starts at host A.

In some examples, a (preferably automated) mechanism may be used to decide which host is designated as host A and which host is designated as host B. and to assign node hop numbers. Such a mechanism could select the host with the highest system identifier as host A. In other examples, the controller could perform such selection, or the end-user could manually configure it.

On the routers the term A-side will refer to the direction towards host A and the term B-side will refer to the direction towards host B.

12. Elementary Entanglement Generation

In some examples, before any swapping can take place the elementary entanglement generation (EEG) protocol produces elementary entanglements between each node and its directly connected neighbor(s) in a path over a set of nodes.

Each node runs one instance of the EEG FSM per interface (i.e., per directly connected neighbor). The hosts (e.g., Nodes 1 and 5 in FIG. 9) run a single EEG FSM instance. The routers (e.g., Nodes 2, 3, and 4 in FIG. 9) run two instances of the EEG protocol: one instance generates elementary entanglements with the neighbor on the A-side and the other instance generates elementary entanglements with the neighbor on the B-side.

In some examples in which the swapping protocol is performed in a layer directly above a layer performing the EEG protocol, whenever the EEG protocol successfully generates an elementary entanglement, it may dispatch an Entanglement-Created event to the swapping protocol. Each instance of the EEG protocol may be associated with at least one qubit memory. For example, when attempting to create elementary entanglements between directly connected nodes X and Y, then there will be one EEG protocol instance and one associated qubit memory on node X, and there will be one EEG protocol instance and one associated qubit memory on node Y. If the EEG protocol for a given link is capable of supporting multiplexing, the EEG protocol instance may be associated with multiple qubit memories.

The EEG protocol instances on nodes X and Y cooperate to produce elementary entanglement by using, for example, a midpoint source or a midpoint Bell state analyzer. As far as the swapping protocol is concerned, the method used to produce elementary entanglement is not relevant, since the details are hidden inside the EEG protocol. Thus, different EEG protocols may be run on different hardware platforms. Regardless of which EEG protocol is running, the swapping protocol can be configured to receive Entanglement-Created events from the EEG protocol. Once the swapping protocol receives the Entanglement-Created event, the qubit on node X and the qubit on node Y are entangled with each other. Alternatively, in other examples, another layer may be between the EEG protocol layer and the swapping protocol layer, such as a purification layer, in which case the purification layer can be configured to receive the Entanglement-Created event.

Many EEG protocols involve a Bell state measurement and a subsequent Bell state correction (which uses classical messaging) to consistently produce a particular Bell state, for example $|\Phi^+\rangle$, by transforming a Bell state associated with a quantum element at the node to a different Bell state (using one of three operations that correspond to a change in Bell state) or confirm that the quantum element is associated with the particular Bell state (without performing any transformation operation, or by performing a transformation operation that corresponds to an identity operation). The Bell state correction can be performed as part of the EEG protocol. Optionally, the EEG protocols may have a feature that allows the swapping layer to request that the Bell state correction is deferred until after end-to-end entanglement is established. In that case, the Entanglement-Created event may also include information about what type of entanglement was actually created (i.e., which Bell pair: $|\Phi^+\rangle$, $|\Phi^-\rangle$, $|\psi^+\rangle$, or $|\Psi^-\rangle$), where:

$$|\Phi^+\rangle = \frac{1}{\sqrt{2}}(|00\rangle + |11\rangle)$$

$$|\Phi^-\rangle = \frac{1}{\sqrt{2}}(|00\rangle - |11\rangle)$$

-continued $$|\Psi^+\rangle = \frac{1}{\sqrt{2}}(|01\rangle + |10\rangle)$$

$$|\Psi^-\rangle = \frac{1}{\sqrt{2}}(|01\rangle - |10\rangle)$$

Information about the type of entanglement created may allow the swapping protocol to determine the final end-to-end state and perform the Bell state correction only once on either host A or B. Furthermore, such information may avoid the need for Bell state corrections on the routers, which reduces the number of applied operations, and hence improves latency and fidelity. For example, the Bell state measurement results may be tracked at each step along the way, and the Swap messages may contain information for performing Bell state correction operations that may be needed along with fidelity estimates and other metadata (e.g., identifiers, and timestamps). Bell state correction operations (i.e., operations that can convert between different states of the four Bell states) can be realized with quantum gates. The physical implementation of these correction operations depend on the method by which qubits are physically encoded, and the hardware platform that supports controlled quantum state manipulation. For example, one can implement Bell state corrections with nonlinear optics, superconducting circuits, trapped ions, atomic ensembles, vacancy centers in diamond, or a quantum memory unit coupled to a quantum processing unit.

In the case of deferred Bell state correction/conformation, in which Bell state measurement results from intermediate operations in the end-to-end entanglement distribution process are tracked and communicated, either host A or B can conduct any needed final Bell state correction to convert the generated entangled state to any of the desired Bell states. Such Bell state correction can be performed with one or more operations on only one of the two qubits in the distributed Bell state. However, to ensure correctness of the Bell state correction, hosts A and B receive sufficient information such that they agree as to which Bell state is to ultimately be produced, and agree as to which host is responsible for conducting any needed correction operation (s). In the case that the generated Bell state is already the "correct" Bell state that is intended, the host storing the qubit on which the correction operation would have been performed can simply forego any operations or apply a "no-op" operation that is essentially an identity operation that preserves the existing Bell state. To facilitate this agreement process, hosts A and B may use an east-west classical communication protocol prior to starting the entanglement generation and distribution processes. Alternatively, a centralized controller may use a north-south protocol to delegate non-conflicting Bell state correction roles to hosts A and B. In this case, the controller may use information pertaining to the host nodes' capabilities (e.g., if only host B has a quantum processor capable of performing the necessary operations), overall network state, virtual circuit request metadata, and/or quality-of-service parameters when determining Bell state correction roles for the relevant hosts. The controller may communicate and install these roles on the hosts in a static manner (i.e. fixed roles for the duration of a requested session) or in a dynamic manner, in which the hosts follow a set of rules for Bell state correction based at least in part on the type of received Bell state and other relevant metadata (e.g., timestamp information, estimated fidelity).

In some cases, instead of correcting the Bell state after entanglement is established, the Bell state measurement results can be used to notify the end nodes which Bell pair has been produced (e.g., 2 bits of information indicating one of four possible results of a Bell state measurement corresponding to one of four possible Bell pairs being established).

The Entanglement-Created event may also include information about the estimated fidelity of the entanglement. This estimate may be based on the known parameters of the hardware (e.g., the $T_1$ (relaxation time) and $T_2$ (dephasing time) decoherence times of the memory combined with observed storage times, the noise models for the optical fibers combined with observed fiber lengths, etc.) or it may be empirically determined (e.g., by performing quantum state tomography on a subset of the generated elementary entanglements).

Some hardware platforms distinguish between communication qubits and storage qubits. In some examples, a communication qubit can be directly coupled to a photonic interface, whereas a storage qubit cannot be directly coupled to a photonic interface, but only indirectly via a communication qubit (e.g., using a swap gate). In some implementations, only communication qubits can participate in the EEG protocol. Some platforms may have a very limited number of communication qubits. For example, the diamonds used in recent nitrogen-vacancy (NV) center repeater experiments have a single communication qubit and a small number of storage qubits. In such a scenario, a router may first generate elementary entanglement on the A-side, then move the communication qubit to the storage qubit, then generate elementary entanglement on the B-side, and finally perform a Bell state measurement on the storage plus communication qubit pair. Any logic that is used to move communication qubits to storage qubits may be the responsibility of the swapping protocol and not the responsibility of the EEG protocol, which can deliver elementary entanglements in communication qubits.

In the diagrams herein, a dashed black double-headed arrow is used to indicate the production of an elementary entanglement by the EEG protocol.

Figure 10:
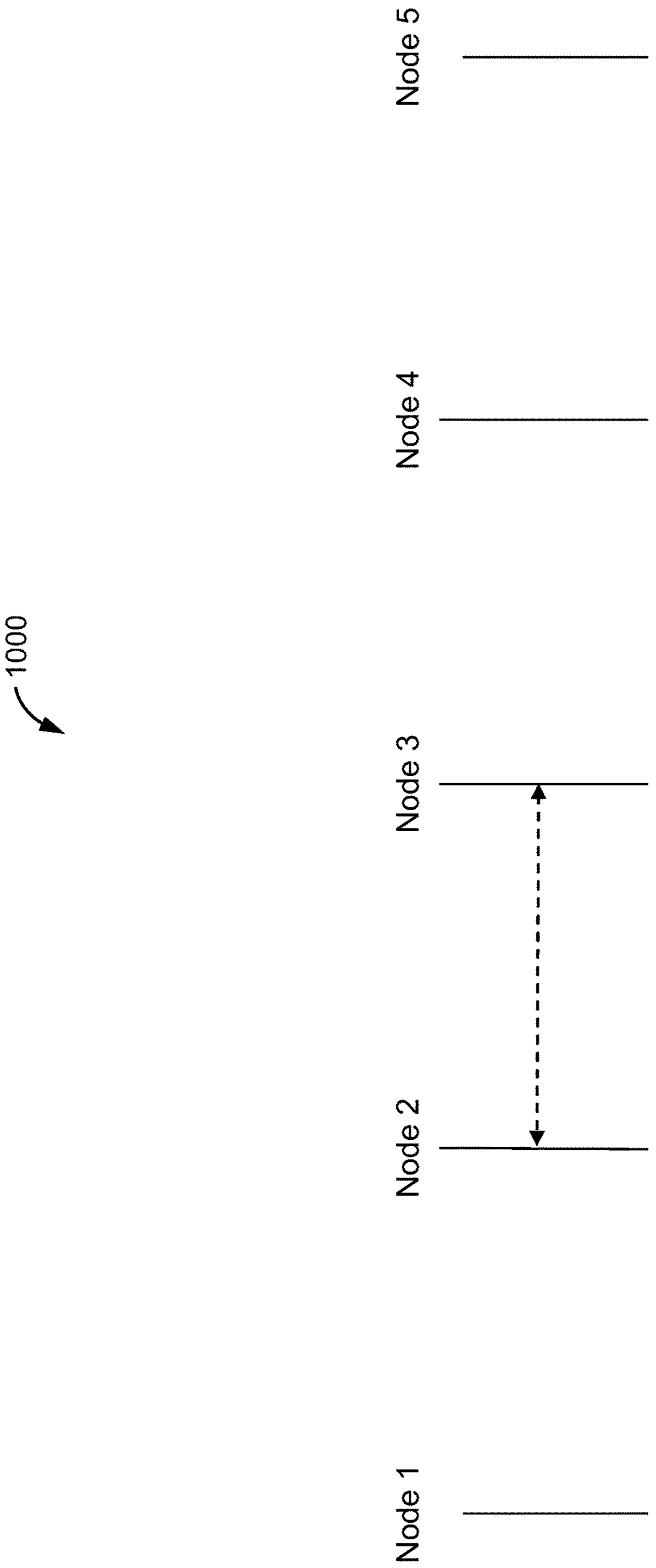

FIG. 10 shows a portion of an example quantum network 1000 wherein elementary entanglement (dashed line) is produced between Nodes 2 and 3. A swapping FSM instance running on node 2 will receive an Entanglement-Created event from an EEG FSM instance associated with a B-side communication qubit. A swapping FSM instance running on node 3 will receive an Entanglement-Created event from a EEG FSM instance associated with an A-side communication qubit. Each of the two arrow heads represents an Entanglement-Created event, and the dashed red line represents the fact that the two qubits are entangled with each other. Node 2 and node 3 do not necessarily dispatch their respective Entanglement-Created events at the exact same time. While the two events are typically generated very close together in time, there is often some finite time difference between the two events. To emphasize the possible time difference, the dashed black line may be drawn slanted, as shown in FIG. 11.

Figure 11:
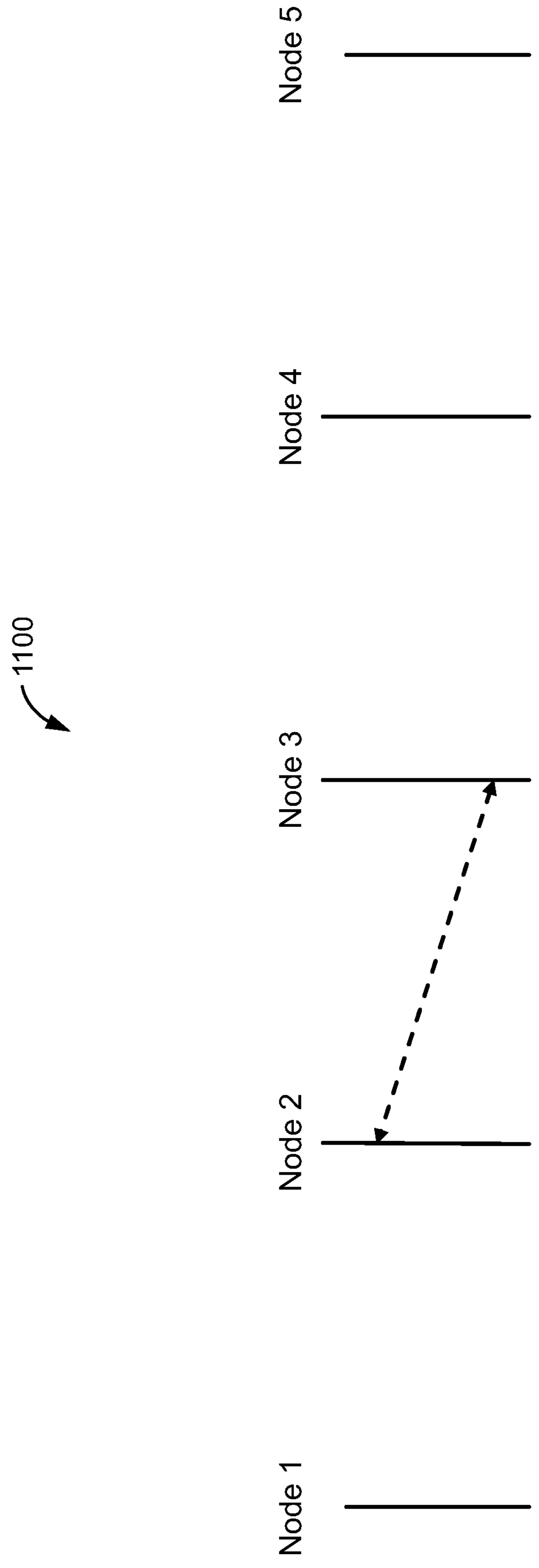

FIG. 11 shows a portion of an example quantum network 1100 wherein elementary entanglement (dashed line) is produced between Nodes 2 and 3 with a time lag represented by the slant of the dashed line. In all the figures disclosed herein, the time increases from the top to the bottom of the figures such that operations performed higher than other operations occur before the lower operations.

For the figures disclosed herein, although there may exist a finite time difference, for explanation purposes, the dashed black lines are drawn horizontally, unless the implications of non-simultaneous events are being actively considered.

The swapping protocol may also handle degenerate scenarios (i.e., where the time difference between the two events is unusually large) and failure scenarios (i.e., where the event is missing on one or both nodes).

Figure 12:
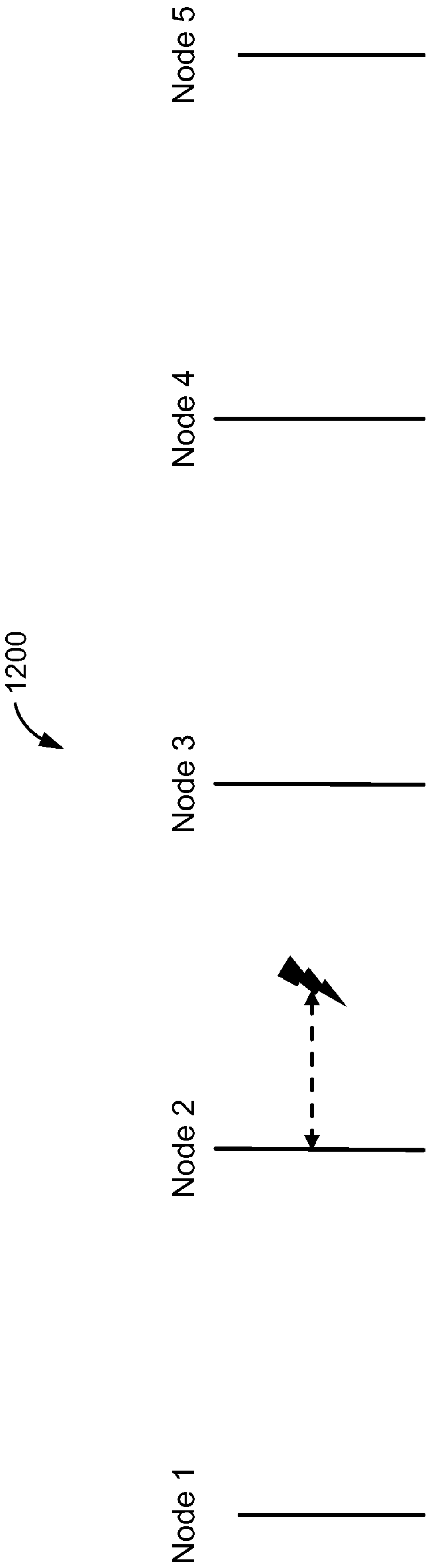

FIG. 12 shows a portion of an example quantum network 1200 wherein one node (Node 2) receives an Entanglement-Created event (dashed line), but the event is lost (lightning bolt) on the other node (Node 3).

There are several layers in the stack that can create an entanglement, such as the elementary entanglement layer. However, the elementary entanglement layer is not the only possible source of entanglements. The swapping layer can also produce an end-to-end entanglement by using entanglement swapping operations to stitch multiple elementary entanglements together. Additionally, the purification layer may produce purified entanglement by combining multiple simultaneously existing entanglements together. By design, the layering in a quantum stack may be flexible. For example, purification may be performed before swapping or after swapping or there may not be any purification at all. The quantum stack may reuse the same Entanglement-Created event in each layer that can produce an entanglement, so that the next higher layer that consumes the entanglement does not need to information related to how the entanglement was produced.

13. Swapping

A black ⊗ symbol is used to represent a swap operation, and a short-dashed black line is used to represent a non-elementary (multi-hop) entanglement that is produced by the swap operation.

Figure 13:
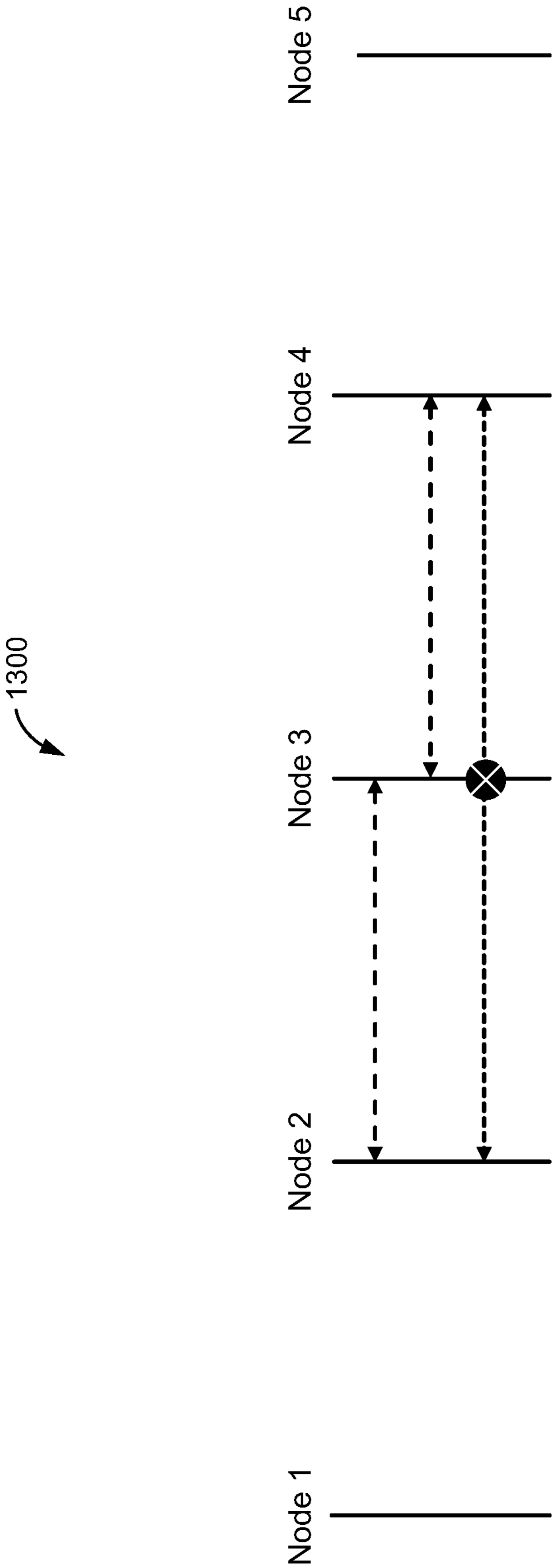

FIG. 13 shows a portion of an example quantum network 1300 wherein elementary entanglement (dashed line). Node 3 swaps the 2-3 entanglement with the 3-4 entanglement by performing a swap operation (black ⊗), in order to produce a non-elementary (multi-hop) 2-4 entanglement (short-dashed black line).

On some platforms, the swap operation is a heralded, non-deterministic operation. On such platforms, there is a high probability (e.g., 50%) that the swap operation fails but the platform is able to determine and distribute information about whether it succeeded or failed (this is an example of a "heralded" swap operation).

Figure 14:
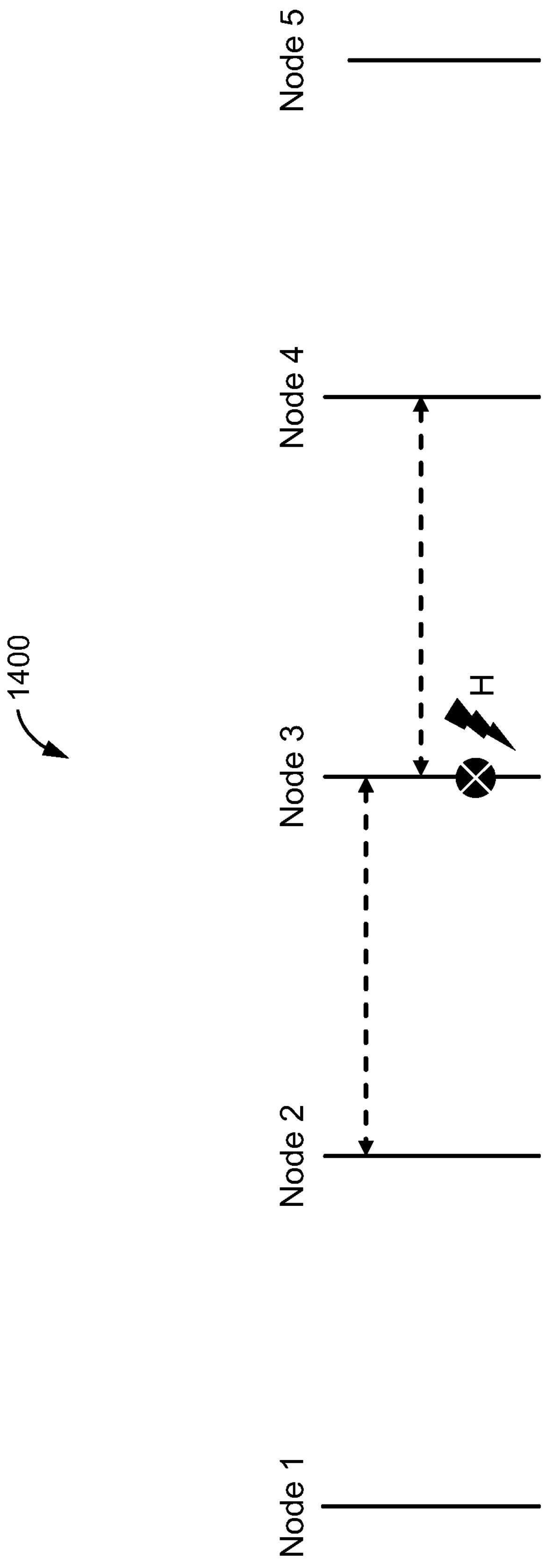

FIG. 14 shows a portion of an example quantum network 1400 wherein a heralded swap failure (lightning bolt) has occurred during a swap operation (black ⊗) at Node 3. The letter "H" indicates that the failure was heralded. Also, there is no short-dashed black line because the 2-4 entanglement was not created. The protocol determines that the entanglement was not created because the failure was heralded. Note that the 2-3 and 3-4 entanglements are lost because of the failed swap attempt.

Even on deterministic platforms, it is possible for low-probability non-heralded swap failures to occur.

Figure 15:
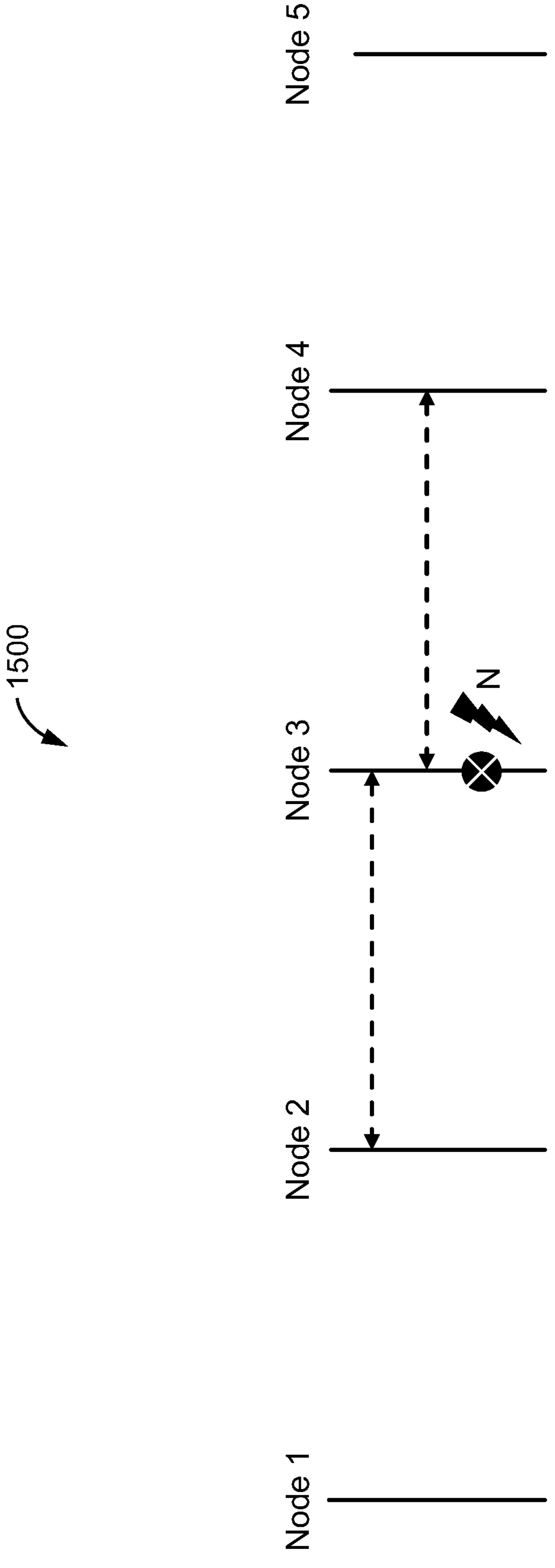

FIG. 15 shows a portion of an example quantum network 1500 wherein a non-herald swap failure (lightning bolt) has occurred during a swap operation (black ⊗) at Node 3. The letter "N" indicates that the failure was non-heralded. Once again, no 2-4 entanglement was produced, but in this case the protocol does not determine this because the swap failure was non-heralded.

14. Qubit Memory Hop Numbers

Elementary entanglement generation may use two qubit memories: one qubit memory on one side of the point-to-point link, and one qubit memory on the other side of the point-to-point link. In some example swapping protocols, each qubit memory is assigned to a particular virtual circuit (i.e., a single qubit memory is not or cannot be shared between multiple virtual circuits at the same time).

Figure 16:
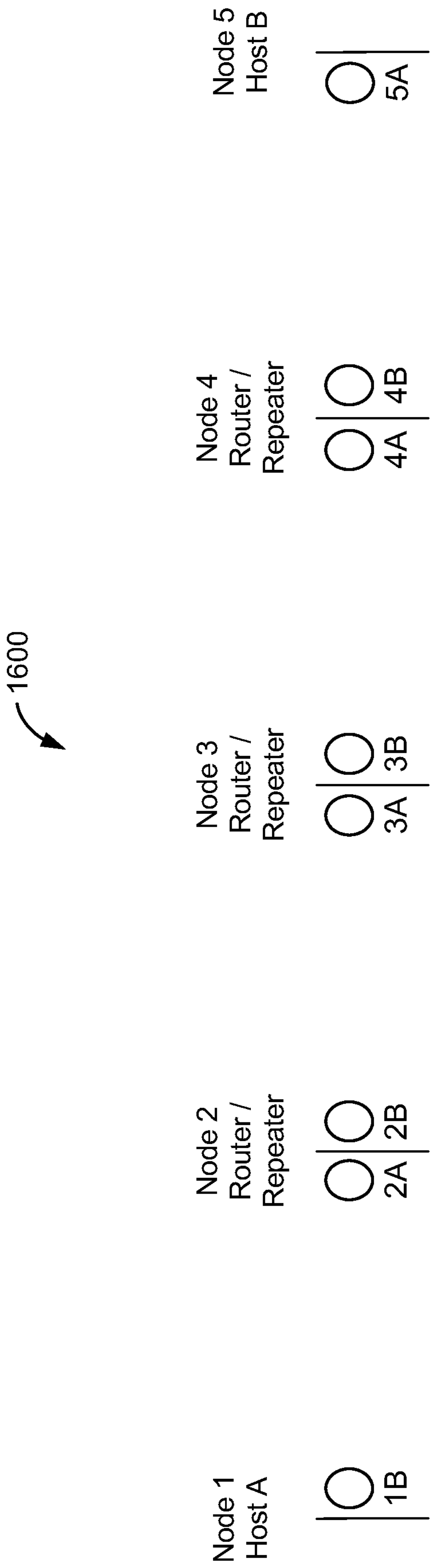

FIG. 16 shows a portion of an example quantum network 1600 comprising two qubit memories (e.g., 2A and 2B) on each router/repeater node (e.g., Node 2, Node 3, and Node 4) and one qubit memory (e.g., 1B) on each host (e.g., Host A at Node 1 and Host B at Node 5). The quantum network 1600 is shown in a virtual circuit representation. In one implementation of a prepare-and-measure system, the qubit memory on host A may be replaced by a single photon source that emits photons in a chosen state and the qubit memory on host B may be replaced by a single photon detector that measures rather than stores the received photon. A qubit memory hop "number" (i.e., label), also referred to as a qubit number, can be assigned to each qubit memory on the virtual circuit. The qubit memory hop number may be composed of the node hop number (1, 2, 3, . . . ) followed by A or B to indicate "on which side" the qubit memory is. As in the case for node hop numbers, qubit memory hop numbers are only unique in the scope of a given virtual circuit. Herein, the term "qubit" may be used instead of "qubit memory".

15. Entanglement and Qubit Ownership Tracking

In some examples, qubit ownership may be tracked through a node's Memory Management module. "Ownership" here refers to the allocation of a local qubit memory to an executing process (e.g., for management of actions associated with the qubit memory), such as the EEG protocol or the swapping protocol. By looking at one particular point-to-point link associated with a pair of qubits (one on each side), the following sequence associated with elementary entanglements being generated may be observed.

(1) The elementary entanglement generation protocol generates a point-to-point elementary entanglement. This typically takes many non-deterministic attempts, so it may not happen at a predictable regular interval. At this stage, the EEG protocol owns the qubit memory that will hold the generated entanglement and may have exclusive usage of the qubit. The entanglement swapping protocol may not be responsible for initializing the qubit for the EEG protocol.

(2) Once an elementary entanglement is generated, the ownership of the qubit storing the elementary entanglement is handed off to the higher layers (e.g., purification, swapping, teleportation, or application).

(3) The higher layers may hold on to the elementary entanglement for some amount of time. During that time, the elementary entanglement generation layer cannot use the associated qubits and cannot yet attempt to generate the next elementary entanglement. The local memory management unit will track that the qubit is not available and in use by the entanglement swapping protocol.

(4) Eventually, the higher layer will consume the entanglement. For example, purification may sacrifice an entanglement in an attempt to improve the fidelity of another entanglement. As another example, the swapping layer may swap two qubits, after which the swapped qubits are no longer needed by the swapping layer. In these scenarios, the higher layer releases the ownership of the qubit. The ownership may be returned back to the elementary entanglement layer, which can resume elementary entanglement generation attempts as soon as it owns both qubits again. This may be done by having the swapping layer free the qubit via the memory manager so that it may be allocated to the underlying EEG protocol for generating new entanglement. The entanglement swapping protocol may not be responsible for reinitializing the qubit on behalf of any other process.

(5) In some examples, it may be beneficial to track how the estimated fidelity of each entanglement evolves over time. The estimated fidelity may be updated to reflect: (A) spontaneous decoherence in qubit memories as a result of the passage of time (e.g., T1 and T2 decoherence times), (B) noise experienced as communication qubits are transmitted over a communication medium (e.g., noise associated with propagation over optical fibers) before being stored as a storage qubit, and (C) noise experienced as quantum gate operations and other local operations are applied to qubits.

When the estimated fidelity falls below a threshold, the end-to-end entanglement generation attempt may be given up, and the ownership of all involved qubit memories may be returned to the elementary entanglement generation layer (e.g., via the memory manager). Alternatively, the estimated fidelity falling below a threshold may trigger another set of protocol actions (e.g., trigger another round of purification).

16. Elementary Entanglement Sequence Numbers

As described previously, there can be a sequence of elementary entanglements on a given link between a given pair of qubits.

In some examples, it may be beneficial to distinguish one entanglement on the link from some other entanglement at a different point in time on the same link. The nodes in the network may use a method to uniquely identify one particular entanglement amongst the series of entanglements that are produced over time. One such method assigns an entanglement sequence number to each elementary entanglement that is produced on a given link, as shown in FIG. 17.

Figure 17:
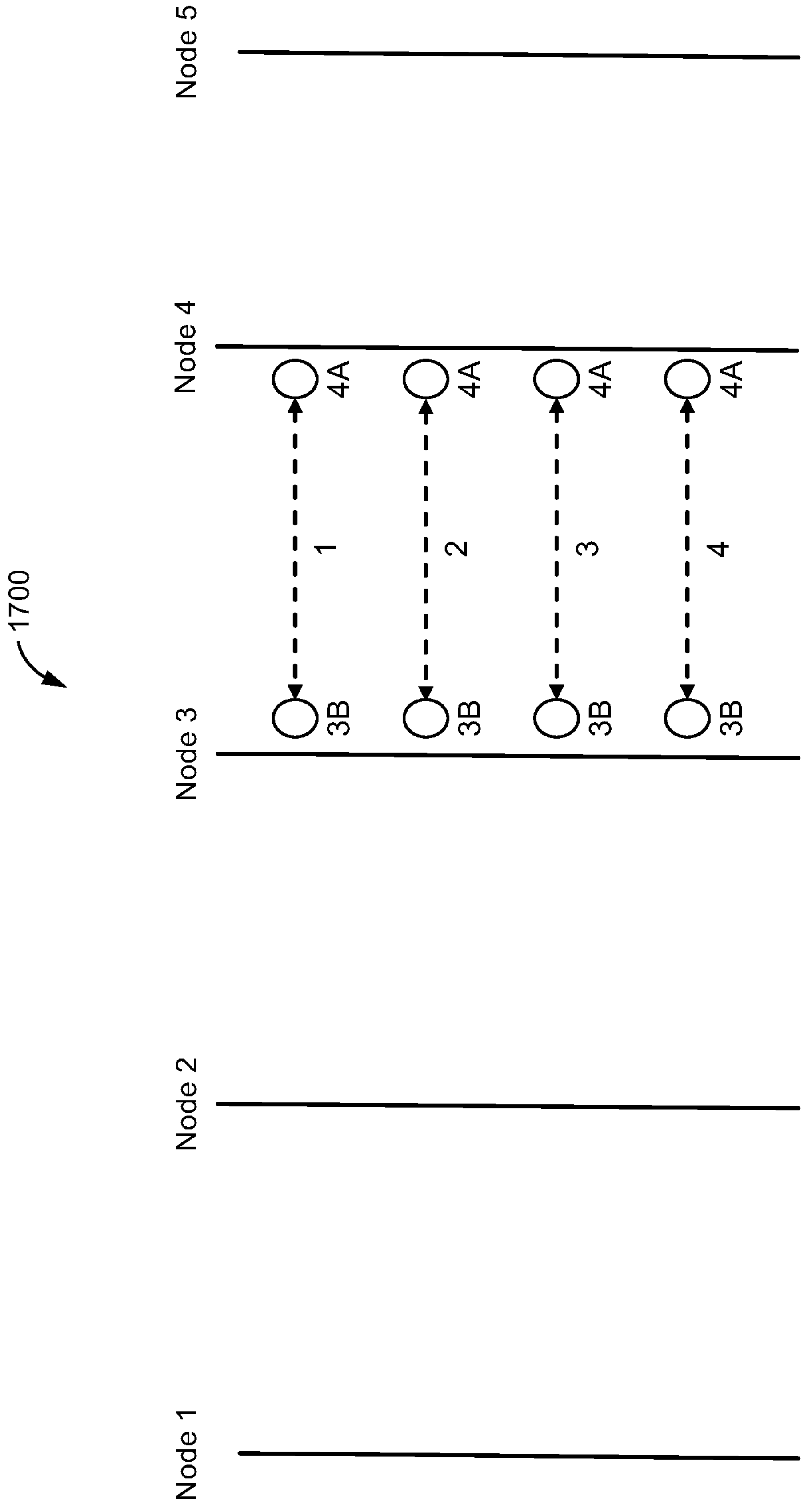

FIG. 17 shows a portion of an example quantum network 1700. Each entanglement (dashed line) on a point-to-point link is assigned a monotonically increasing sequence number. In this example, the first entanglement is number 1, the second entanglement is number 2, the third entanglement is number 3, etc. Numbers may be skipped, as long as they increase monotonically. In this example, the two nodes on either side of a point-to-point link must agree on the entanglement sequence number. It may be the role of the elementary entanglement generation protocol to assign the entanglement sequence numbers and to make sure that both sides agree. The empty circles denote quantum memories that are not currently storing an entanglement constituent.

As a practical matter, sequence numbers are stored in variables and message fields with a finite number of bits, such that the sequence number may roll-over to the initial value. One example of a technique to ensure that such a roll-over is acceptable is to ensure that the roll-over interval is longer than the longest potential lifetime of an entanglement (e.g., longer by a factor of 2, 10, 100, or 1000), and to ensure that the number comparison routines for ordering purposes take this roll-over into account. The longest potential lifetime may be determined, for example, as the longest time that the entanglement could be characterized by a high enough fidelity metric to be useful, which may depend on the characteristics of a particular quantum element being used as a quantum memory at a node (e.g., the longest time that a quantum element is configured to maintain at least a predetermined minimum fidelity of a stored quantum state.

17. Qubit State Identifiers

Figure 18:
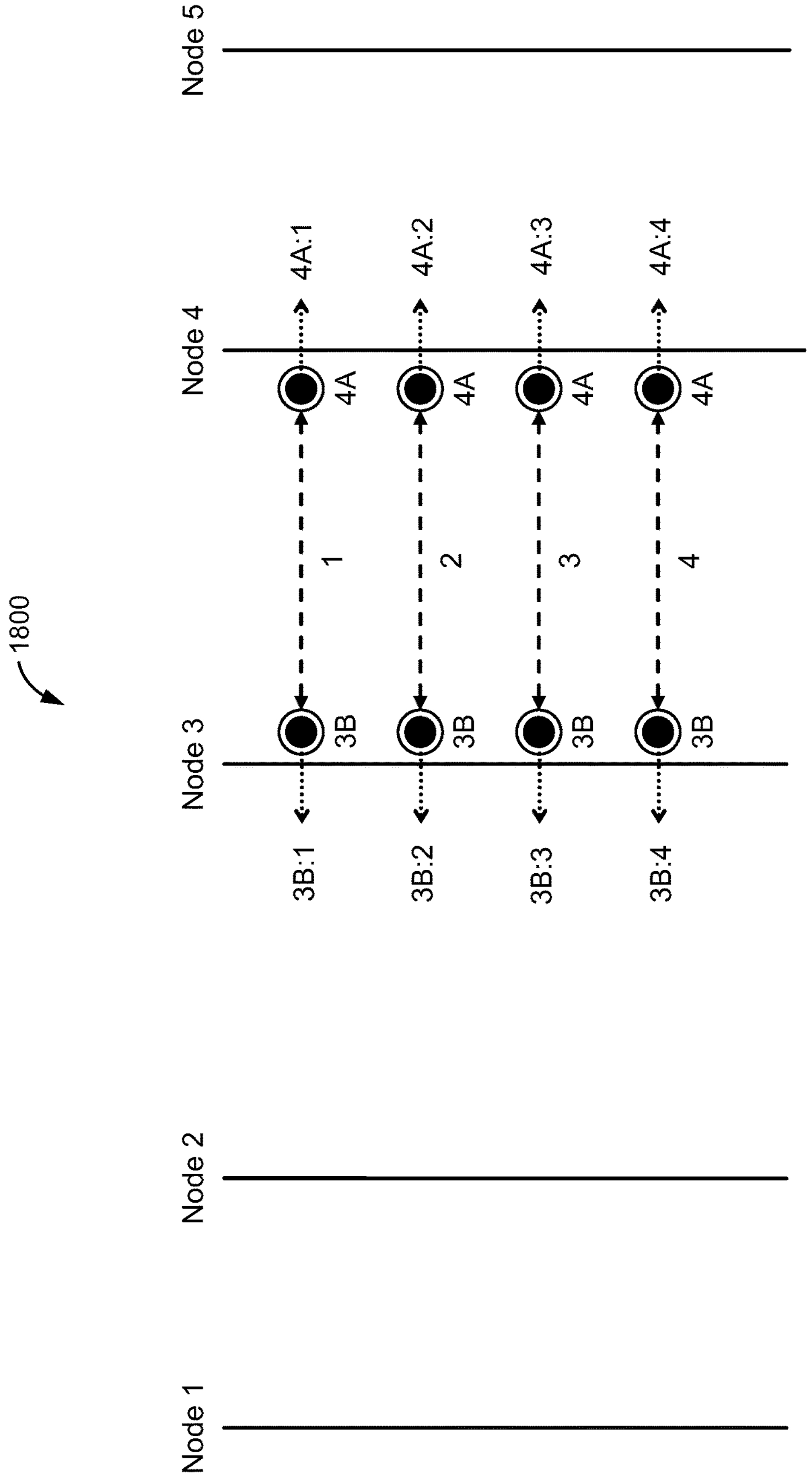

FIG. 18 shows a portion of an example quantum network 1800 comprising qubit state identifiers. Herein, the notation Q:E is used to refer to a particular qubit state, where Q is the qubit memory hop number (e.g., "3B" or "4A") and where E is the entanglement sequence number (e.g., 1, 2, 3, 4, etc.). For example, 3B:2 refers to the state stored in qubit memory 3B after entanglement number 2 has been generated. Note that qubit state 3B:2 cannot be considered in isolation because it is entangled with qubit state 4A:2. We will explain how this issue can be resolved in the next section. The solid black circles denote quantum memories that are currently storing an entanglement constituent.

There exist clear distinctions between qubit memories and qubit states. Herein, a qubit memory is the physical device that is used to store qubit states. In FIG. 18, for example, the black circle labeled 3B is a qubit memory; its qubit memory hop number stays the same as time passes. In contrast, the black disk labeled 3B:2 is a qubit state; its qubit state identifier changes over time as different states are stored in the qubit memory.

18. Entanglement Identifiers

Bipartite entanglements involving two qubit memories herein are denoted using the notation $Q_A$:$E_A$~$Q_B$:$E_B$ where $Q_A$:$E_A$ is the qubit state on the A-side of the entanglement and $Q_B$: $E_B$ is the qubit state on the B-side of the entanglement. For multipartite entanglement a different notation may be used.

Figure 19:
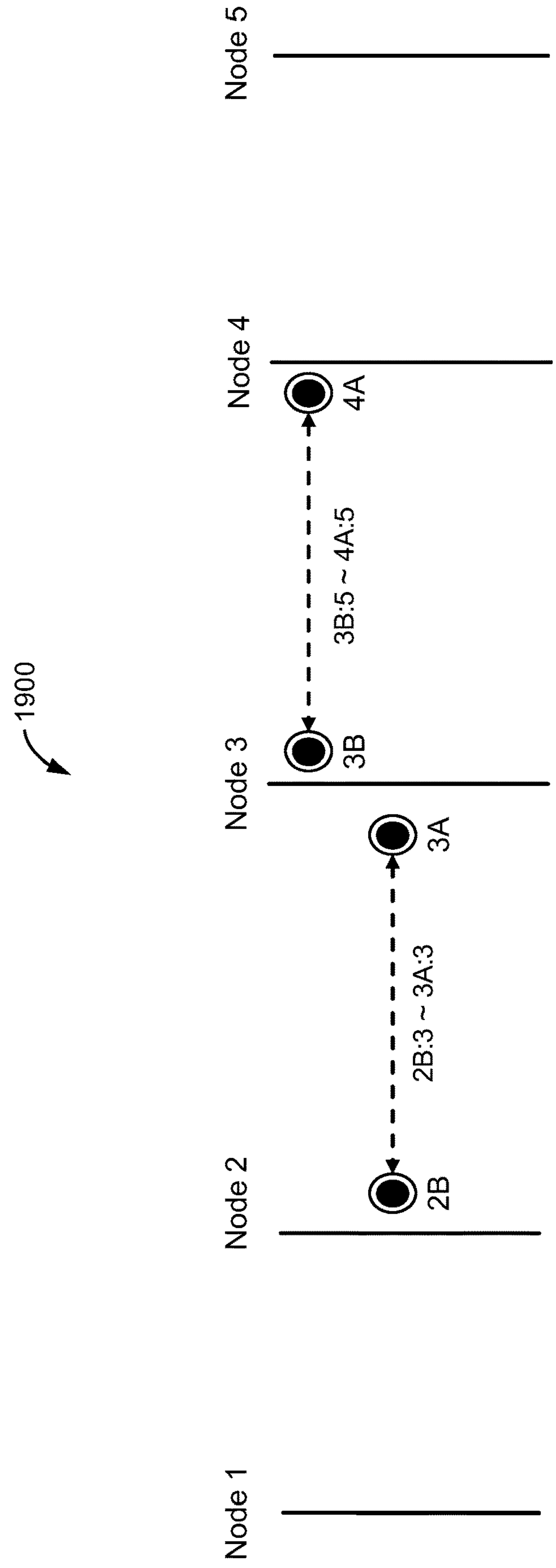

FIG. 19 shows a portion of an example quantum network 1900 comprising two elementary entanglements with corresponding elementary entanglement identifiers. Note that in this example the elementary entanglement sequence numbers 3 and 5 are used (not starting at 1), indicating that there were some other elementary entanglements generated earlier that are not explicitly shown in this example.

Figure 20:
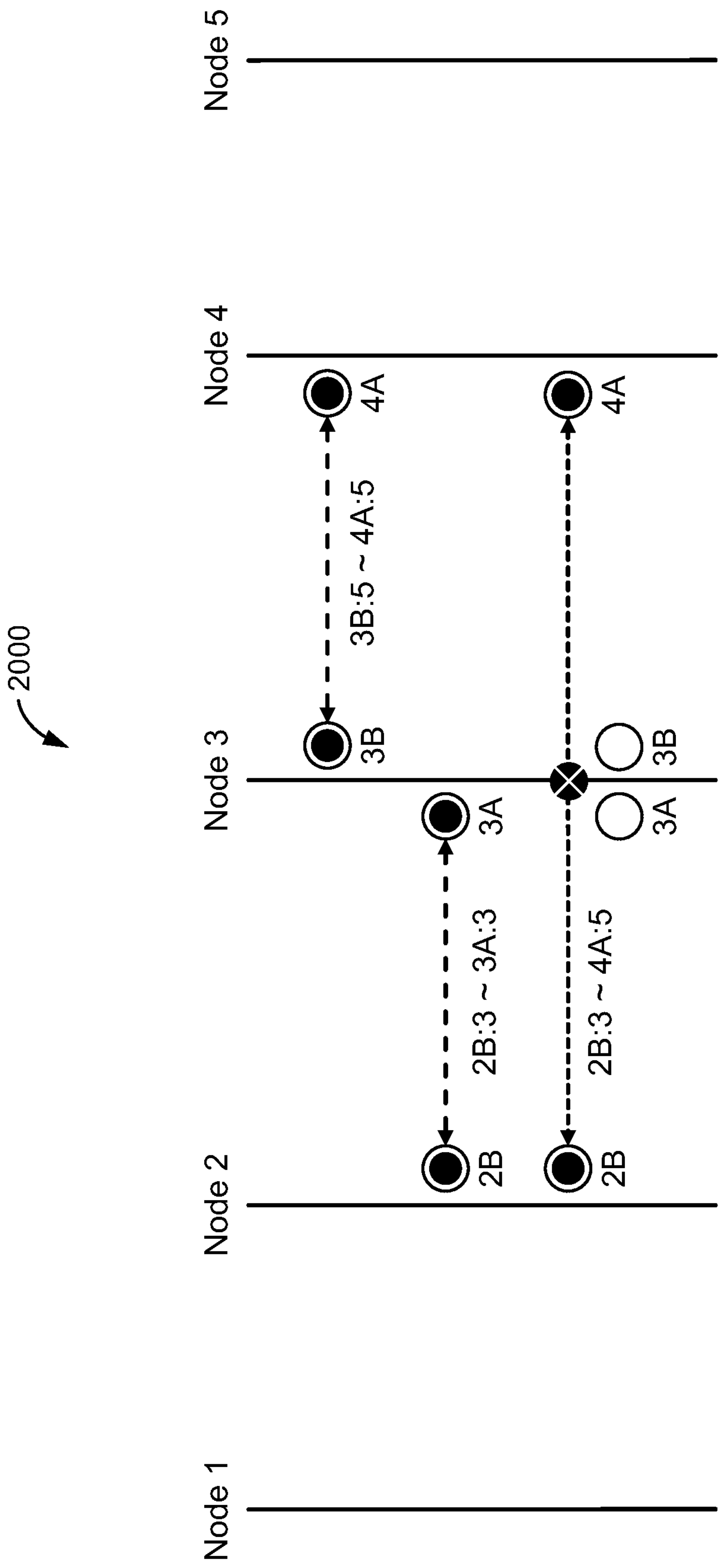

FIG. 20 shows a portion of an example quantum network 2000 comprising a non-elementary entanglement identifier (2B:3~4A:5), wherein Node 3 performs a swap operation (black ⊗) between two elementary entanglements, resulting in a multi-hop non-elementary entanglement between qubit memories 2B and 4A. Also, the qubit states 3A:3 and 3B:5 are lost in the swapping process, which makes qubit memories 3A and 3B available again (empty circles for 3A and 3B) for future elementary entanglement generation.

Figure 21:
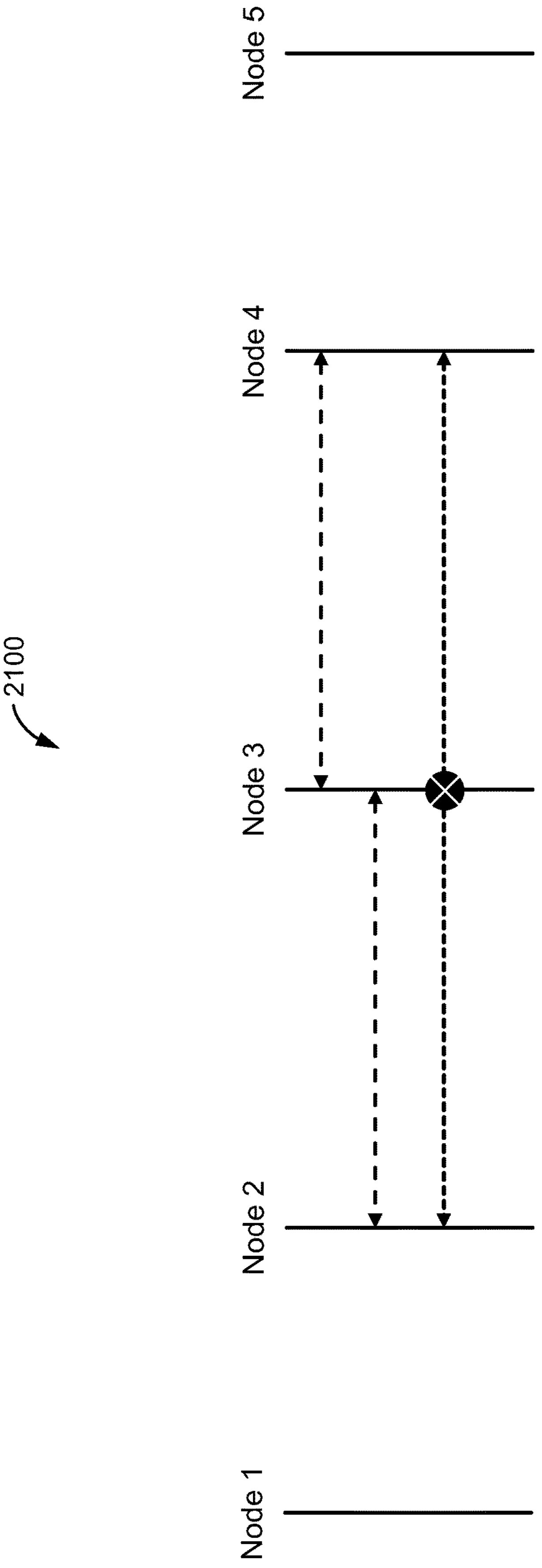

FIG. 21 shows a portion of an example quantum network 2100 representing a simplified swapping operation diagram corresponding to FIG. 20.

Herein, swap operations may be denoted in a shorthand notation. For example, "23+34=24" means that node 3 performed a swap which consumed the entanglement between nodes 2 and 3, and the entanglement between nodes 3 and 4, to produce a new entanglement between nodes 2 and 4.

19. Real-Time Classical Messages

In the figures disclosed herein, a solid black single-headed arrow is used to indicate sending a real-time classical message from one node to another node. As used herein, a "real-time classical message" can refer to any message that is sent using a technique for communicating classical information in real-time (e.g., the transmission and/or arrival times of the classical messages may be relevant to the operations). For example, some techniques encode classical information on macroscopic signals that are not capable of encoding quantum states, which in some cases involves transmission over a separate classical communication channel or network. Other encoding schemes could be used, including schemes that encode classical information within quantum signals. For example, a multiplexing scheme can be used that multiplexes quantum signals sending encoded qubits with quantum signals sending encoded classical information. For example, a protocol such as a quantum secure direct communication (QSDC) protocol can be used to send classical information, where the quantum nature of the communication scheme may provide a benefit, such as enhanced security.

Figure 22:
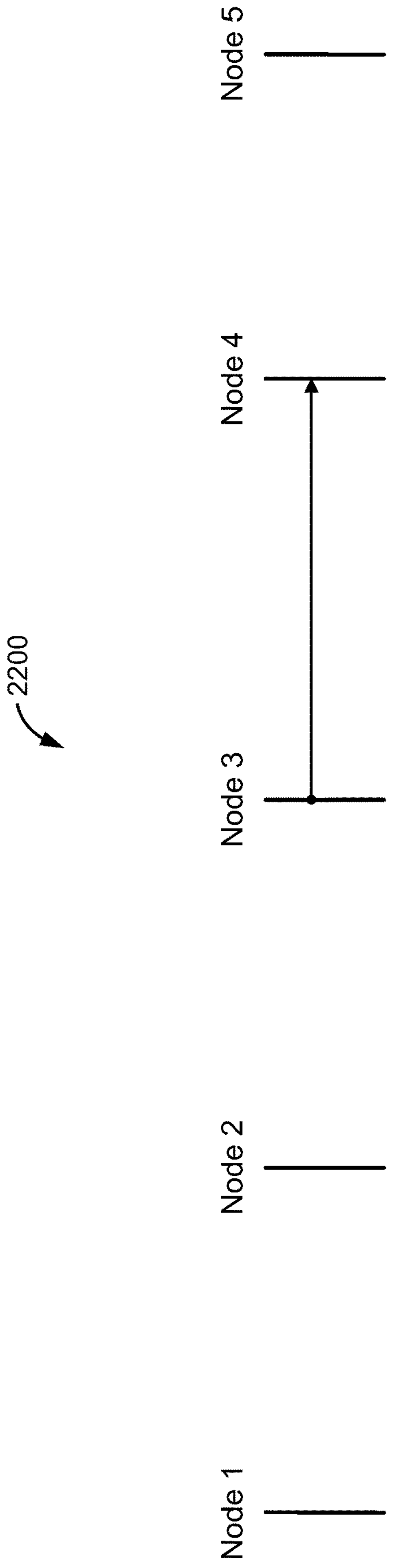

FIG. 22 shows a portion of an example quantum network 2200 wherein Node 3 sends a real-time classical message (solid black single-headed arrow) to Node 4. Node 3 sending the classical message is an action, typically executed as part of an FSM transition. Node 4 receiving a real-time classical message is an event, typically dispatched to an FSM. In some examples, real-time classical messages do not go through the TCP/IP stack on the host. Instead, the real-time firmware may directly encode and decode the bits of such a real-time classical message as light pulses on the fiber, possibly reducing processing latency and jitter. In such examples, real-time classical messages may be exchanged between directly connected neighbor nodes, assuming that there is a classical channel in parallel to the quantum channel.

For real-time classical messages, some finite amount of time passes between sending a message and receiving a message. For example, it takes a finite amount of time to encode the bits onto the fiber (e.g., at 10 Gbps it takes 3 ns to encode a 3-byte message, assuming 8b/10b encoding). It also takes a finite amount of time for the message to propagate along the fiber at the speed of light (e.g., it takes 50 us to traverse a 50 km fiber link). Thus, slanted black arrows may be used to indicate the passage of time, as shown in FIG. 23.

Figure 23:
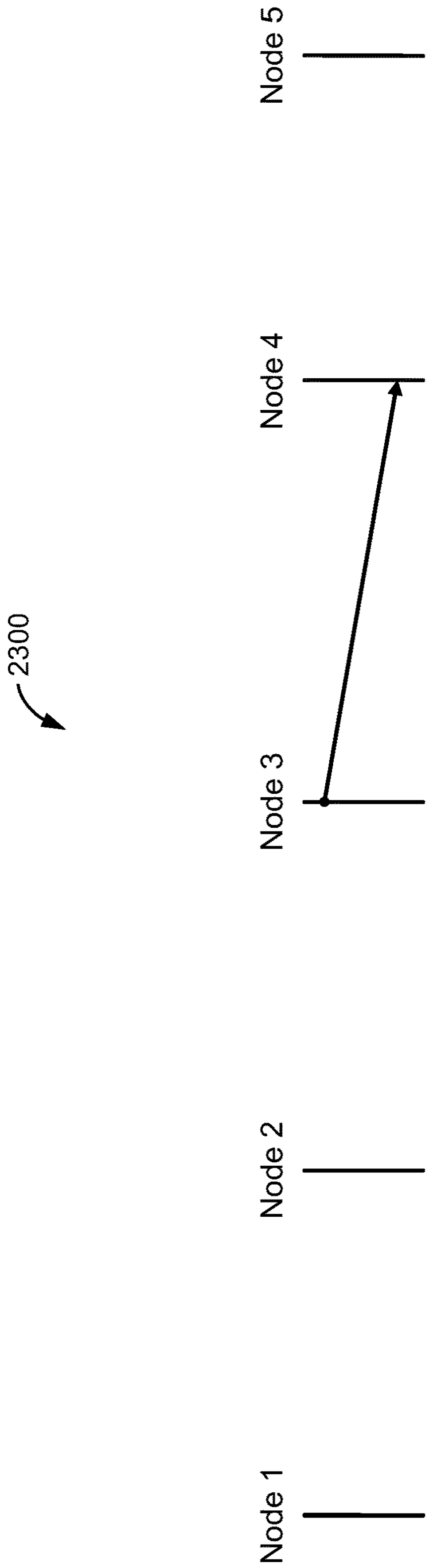

FIG. 23 shows a portion of an example quantum network 2300 wherein Node 3 sends a real-time classical message (solid black single-headed arrow) to Node 4, with a time lag represented by the slant of the solid black single-headed arrow.

Figure 24:
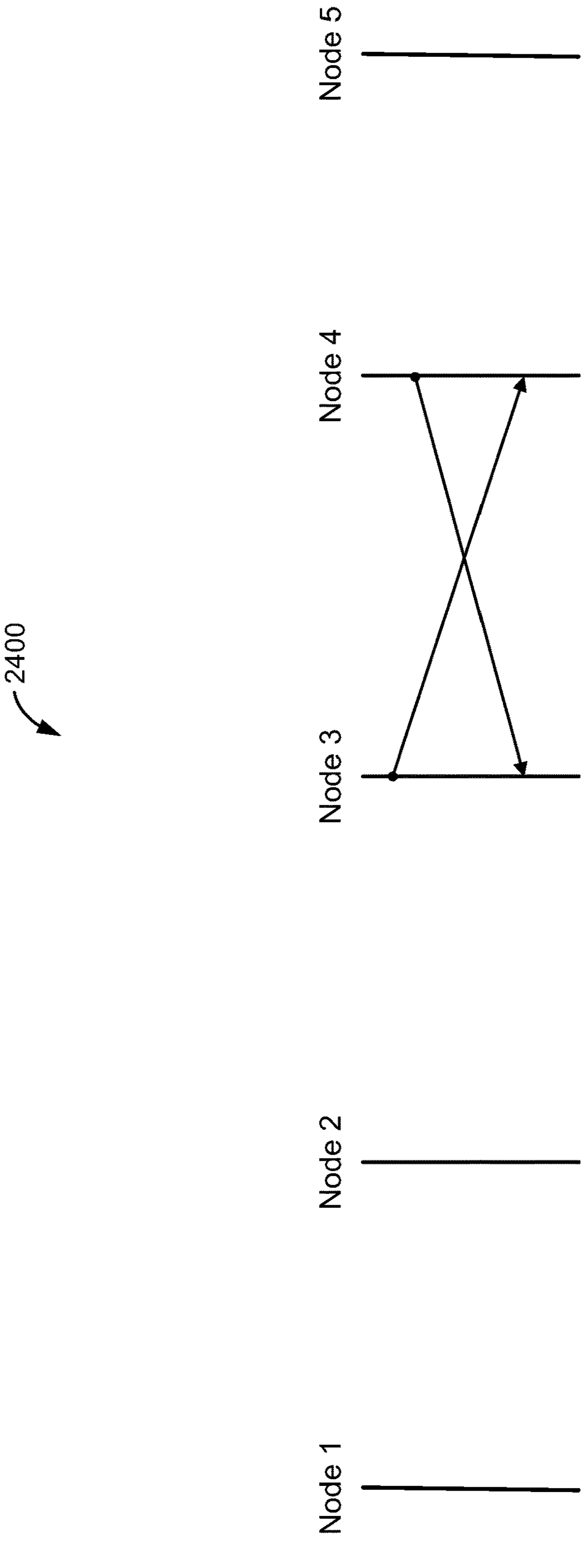

Such delays may be important when the protocol handles situations where messages "cross each other" on the fiber, as shown in FIG. 24.

FIG. 24 shows a portion of an example quantum network 2400 wherein Node 3 sends a real-time classical message (solid black single-headed arrow) to Node 4 and Node 4 sends a real-time classical message to Node 3, with a time lag represented by the slant of each of the solid black single-headed arrows.

For simplicity, horizontal black arrows will be used herein unless a figure is specifically considering scenarios where the propagation delay or the possibility of crossing messages matters.

Figure 25:
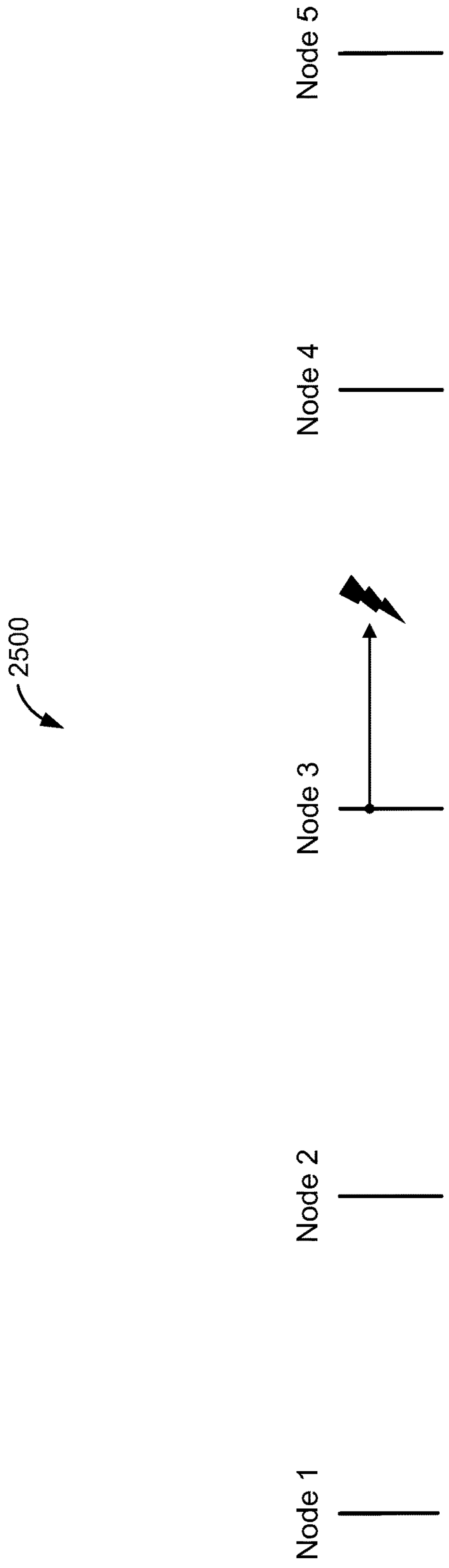

FIG. 25 shows a portion of an example quantum network 2500 wherein a classical message (solid black single-headed arrow) is lost (lightning bolt). Node 3 sends a classical message, but Node 4 never receives the classical message. Note that in some examples, real-time messages do not use a reliable transport protocol such as TCP. Therefore, Node 3 may be unaware that Node 4 did not receive the message, and Node 4 may be unaware that it is missing a message, unless there is some explicit acknowledgement mechanism in the swapping protocol itself.

20. Parallel Elementary Entanglement Generation

Elementary entanglement generation on a given link may start as soon as the qubit memories on either side of the link are available. Once elementary entanglement generation starts, it is a non-deterministic process (i.e., it is unknown how many attempts it will take to generate the elementary entanglement), and hence it is unknown how long it will take to generate elementary entanglement. As a result, it is unknown in which order the elementary entanglements will be created.

Figure 26:
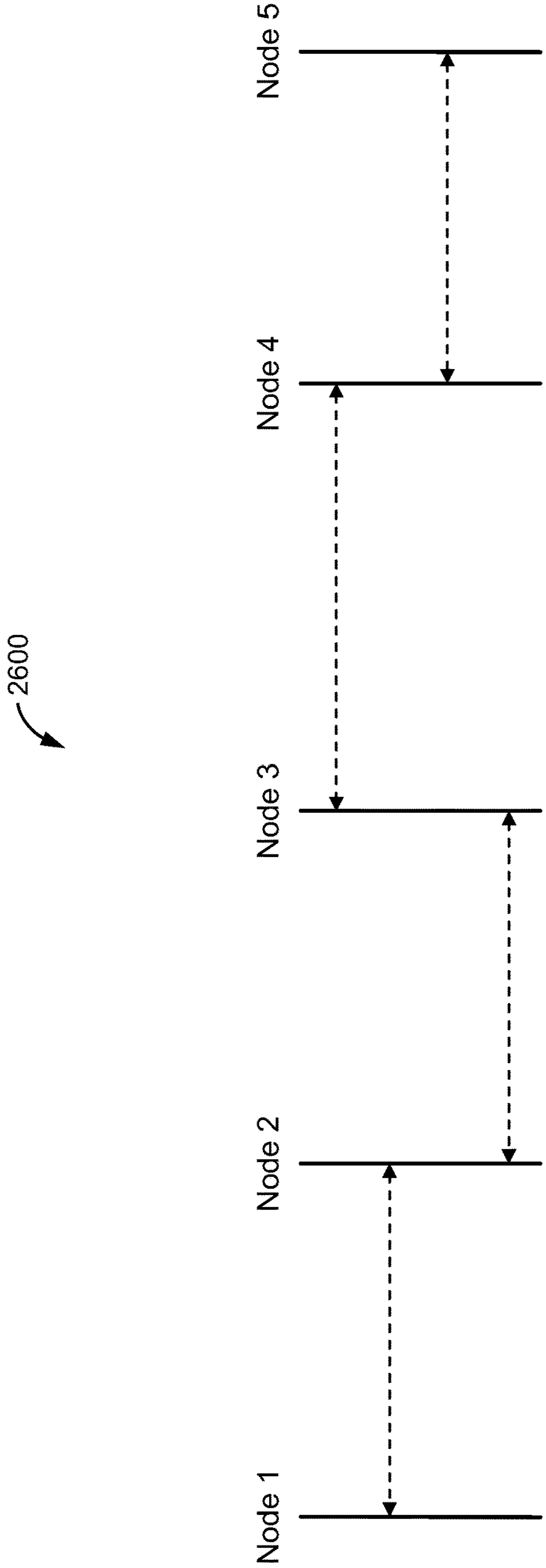
Figure 27:
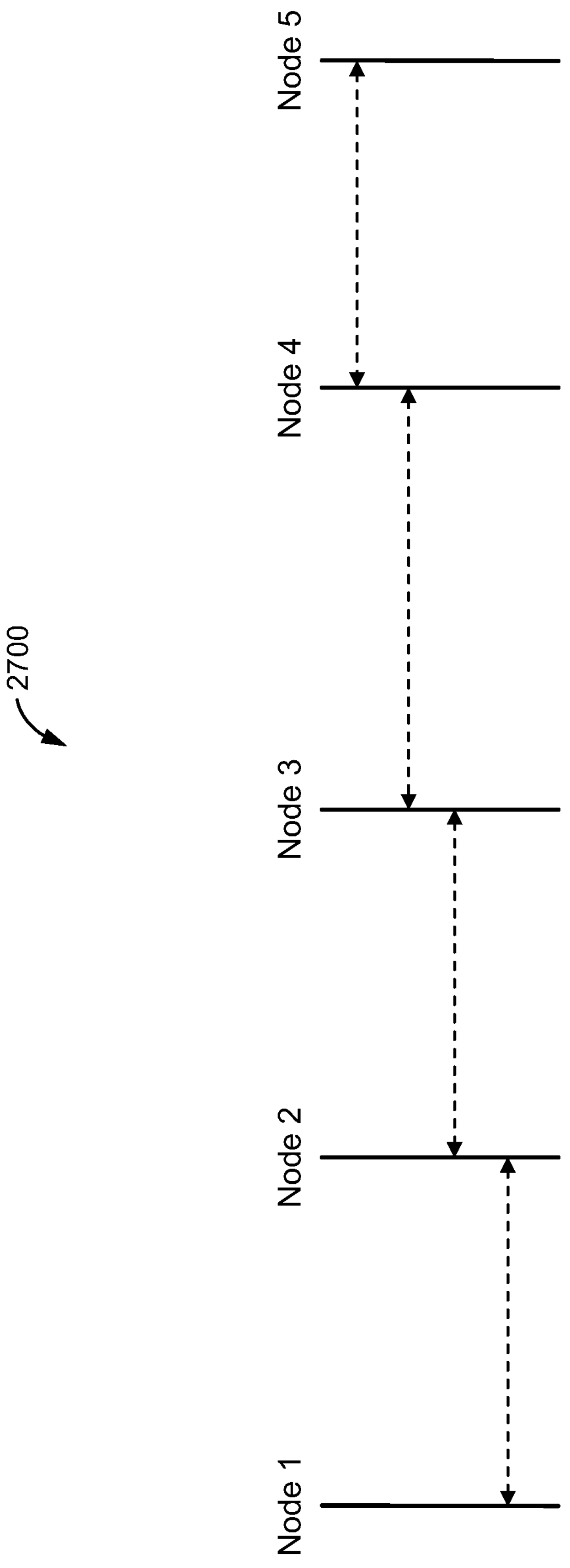

FIG. 26 and FIG. 27 show portions of example quantum networks 2600 and 2700, respectively, comprising two different orders in which entanglements could potentially be created. For example, referring to the quantum network 2600 in FIG. 26, the first entanglement generation occurs between Nodes 3 and 4, while the last entanglement generation occurs between nodes 2 and 3. In contrast, referring to the quantum network 2700, the first entanglement generation occurs between Nodes 4 and 5, while the last entanglement generation occurs between nodes 1 and 2.

21. Swapping and Swapped Messages

Nodes may perform entanglement swaps and exchange Swapped messages to create an end-to-end entanglement that is delivered to the next-higher layer. In this example, there may be two requirements for such a process. (1) With a high probability, either both hosts or neither host deliver an end-to-end to the next higher layer. It is not acceptable for one host to report an end-to-end entanglement but the other host not. Concretely, this means that an end-to-end entanglement is only delivered once all swaps across the entire path have been successfully completed. (2) When a host delivers an end-to-end entanglement to the higher layer, it reports both the local qubit state identifier and the remote qubit state identifier, in addition to other metadata associated with those identifiers. It is not sufficient to report what the local and remote qubit memories are. Those qubit memories will contain multiple different states over time, and those states are identified by qubit state identifiers which include a sequence number.

In the first case "with a high probability" is used because there may be low-probability failures that are not detected and that may be accounted for in the noise model.

Figure 28:
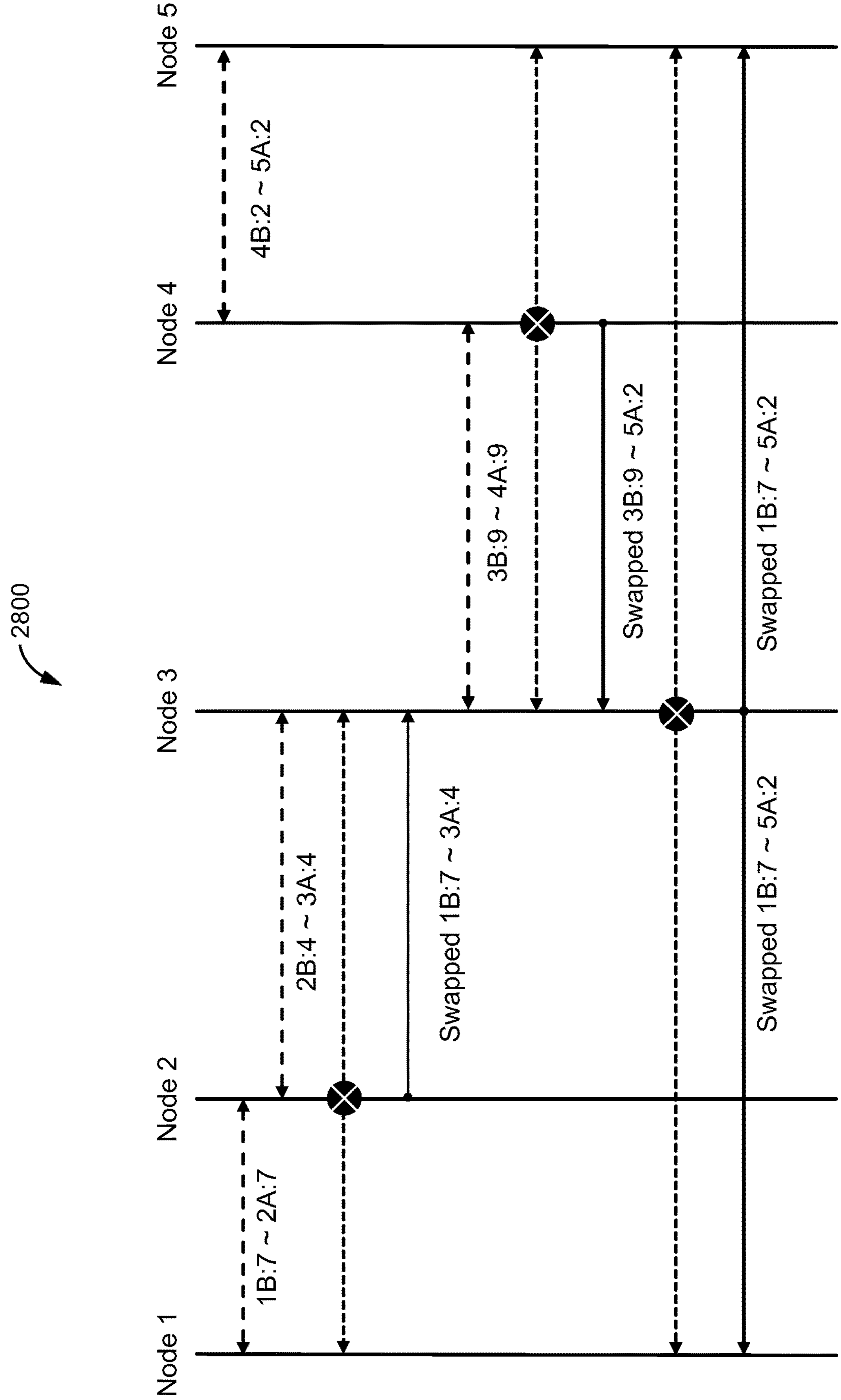

FIG. 28 shows a portion of an example quantum network 2800 wherein, after a node has performed a successful swap operation on two qubit memories, it sends one or two Swapped messages (e.g., Swapped 1B:7~3A:4) to other nodes (e.g., Node 3). A swapping node sends two Swapped messages (one to each host for the virtual circuit) if the swap was successful and was the last swap, in accordance with the schedule installed by the controller, to complete end-to-end entanglement. Otherwise, the swapping node sends a single Swapped message, namely to the next node that must perform a swap in the swap schedule. Either way, the Swapped message(s) may be sent to another node that is more than one hop away. Thus, Swapped messages may need to be forwarded across multiple hops (e.g., Node 3 to Node 5). In some implementations of the swapping protocol, the Swapped messages may need to be forwarded along a portion of the same path associated with the virtual circuit. In other implementations, the forwarding path may be different from the path associated with the virtual circuit as long as the Swapped messages get to the intended destination.

Referring again to FIG. 28, there are four Swapped messages. (1) Node 2 performs swap elementary entanglement 1B:7~2A:7 with elementary entanglement 2B:4~3A:4 to produce non-elementary entanglement 1B:7~3A:4. Then node 2 sends a single Swapped 1B:7~3A:4 message to node 3. (2) Node 4 performs swap elementary entanglement 3B:9~4A:9 with elementary entanglement 4B:2~5A:2 to produce non-elementary entanglement 3B:9~5A:2 and sends a single Swapped 3B:9~5A:2 message to node 3. (3) Node 3 waits until it has received both Swapped messages from nodes 2 and 4. Then it swaps entanglement 1B:7~3A:4 with entanglement 3B:9~5A:2 to produce entanglement 1B:7~5A:2. At this point the end-to-end entanglement is complete, so node 3 sends a Swapped 1B:7~5A:2 message to both hosts (i.e., Nodes 1 and 5). (4) When a host receives the Swapped 1B:7~5A:2 message, it delivers the produced end-to-end entanglement to the next higher layer.

Table 1 below shows some of the fields in an example Swapped message.

TABLE 1

Example Swapped message fields.

| Field | Description |
| --- | --- |
| Virtual circuit | The identifier of the virtual circuit for which the entanglement was produced. |
| Destination node | The identifier of the node to which the Swapped message is sent. |
| Entanglement identifier | The identifier of the entanglement that the swap produced. For example 3B:2~5A:7 means an entanglement between the qubit state with sequence number 2 stored in the qubit memory on the B-side of node 3 and the qubit state with sequence number 7 stored in the qubit memory on the A-side of node 5. |
| Bell state | Which of the four possible Bell states the entanglement is: $\|\phi^{+}>$, $\|\phi^{-}>$, $\|\Psi^{+}>$, or $\|\Psi^{-}>$. See section 29 for details. |
| Timestamp | The global timestamp when the entanglement was successfully created (for the purpose of fidelity tracking) |
| Post-swap fidelity | Estimated fidelity of the entanglement right after the swap occurred. |
| Post-swap density matrix | Estimated density matrix of the entanglement right after the swap occurred. |

Simplified entanglement state identifiers (e.g., 35) may be used herein, instead of full entanglement state identifiers (e.g., 3B:9~5A:2). The simplified swap notation "13+35=15" may also be used herein. Although the entanglement sequence numbers in the entanglement state identifiers may be omitted in the simplified notation, they often cannot be neglected in practice (e.g., when a host must report both the local qubit state identifier and the remote qubit state identifier, where the entanglement sequence numbers correspond to the respective qubit state identifiers).

21.1 Swap-Success and Swap-Failed Messages

Entanglement swap operations are non-deterministic in nature, and can either result in a successful swapping of the entanglement, or a failed operation which destroys the input entanglements in the process. As entanglement swap operations can be used in the process of generating end-to-end entanglement on a virtual circuit, the east-west protocols described herein communicate the information of the operational outcomes of entanglement swap operations to coordinate subsequent actions towards generating end-to-end entanglement(s). Thus, we can define Swap-Success and Swap-Failed messages.

The Swap-Success message refers to the Swapped message described above, with the fields of the message describing the successful swap operation detailed in Table 1: Swapped message fields. Herein, a "Swapped message" may also be referred to as a "Swap-Success message".

The Swap-Failed message is a message to convey information to nodes in the network that an attempted entanglement swap operation was unsuccessful. In this case, the input entanglements are destroyed in the process and there is no resulting Bell state information, nor post-swap fidelity or post-swap density matrix included in the message. The Swap-Failed message may still include a virtual circuit identifier, a destination node identifier, the identifier of the entanglement that was attempted to be produced by the operation, and/or a timestamp of the attempted swap operation.

22. The Swapping Schedule

The swapping schedule determines in which order the swaps occur, and hence in which order the Swapped messages are sent.

Figure 29:
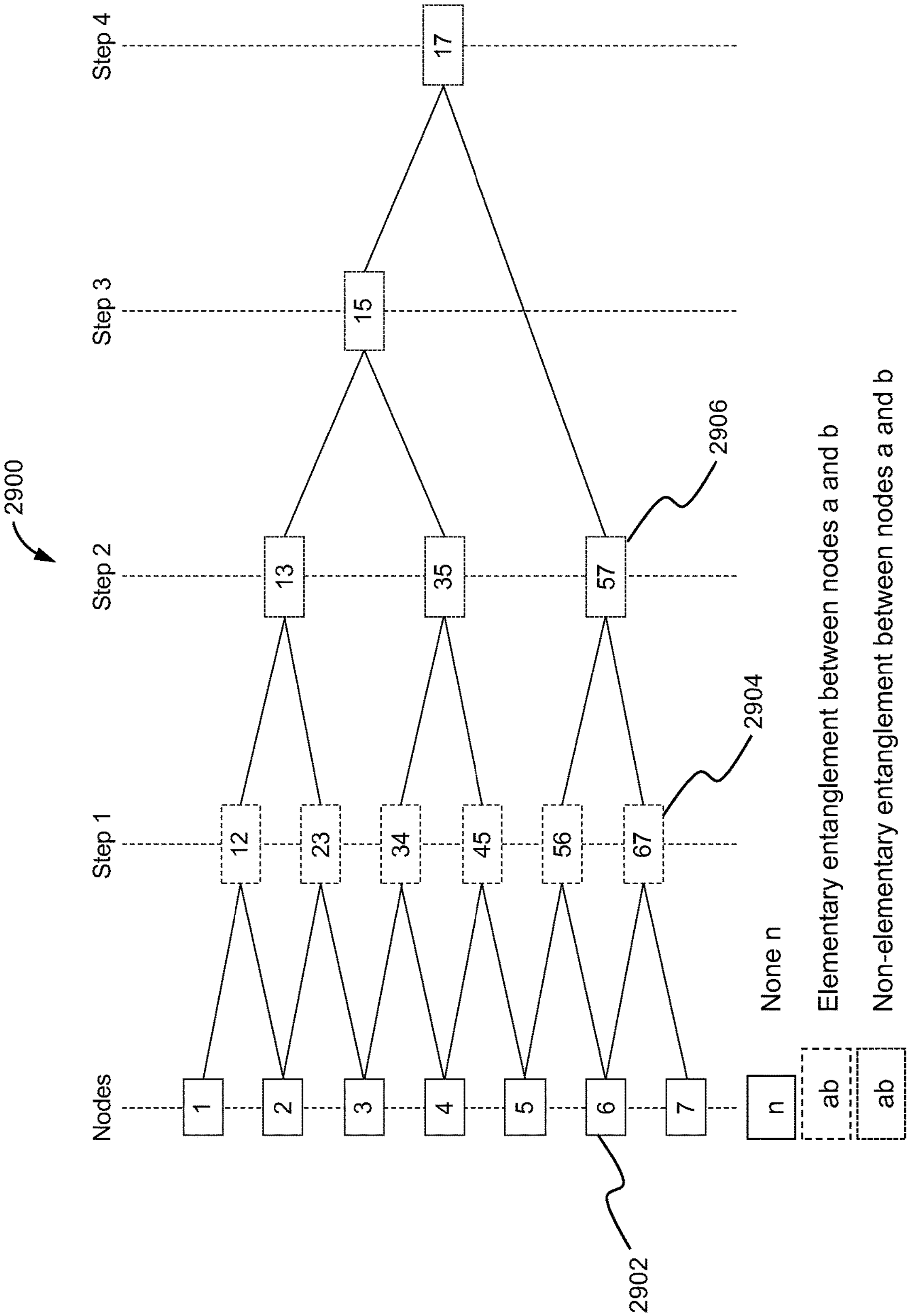
FIGS. 29-31 are schematic diagrams of example schedules.

FIG. 29 shows a first example swapping schedule 2900 for seven nodes. No entanglement at a node is represented by a solid black-bordered rectangle 2902, elementary entanglement between two nodes is represented by a dashed black-bordered rectangle 2904, and non-elementary entanglement between two nodes is represented by a short-dashed black-bordered rectangle 2906. The swapping schedule 2900 comprises the following steps. (1) Begin with 7 nodes, indicated by the solid black-bordered rectangles 2902 on the left (i.e., at the Nodes vertical line). (2) Each pair of neighboring nodes first produces an elementary entanglement at Step 1, indicated by the dashed black-bordered rectangles 2904. The number in the rectangle identifies the elementary entanglement, for example, 56 means an elementary entanglement between nodes 5 and 6. The fact that all elementary entanglements are on the same vertical line (i.e., in the same time step) means that all the elementary entanglement generations are allowed to happen asynchronously, i.e., in parallel without any interdependencies. This approach is referred to as asynchronous scheduling, hence the elementary entanglements are not necessarily produced synchronously at exactly the same moment. (3) Next, at Step 2 the following three things are allowed to happen asynchronously in parallel (note, the vertical line is not intended to mean that these three swaps happen at the same moment, only that they are performed asynchronously in parallel). (a) Node 2 waits until both elementary entanglements 12 and 23 exist. Then it performs swap 12+23=13 and sends a Swapped message to node 3. (b) Node 4 waits until both elementary entanglements 34 and 45 exist. Then it performs swap 34+45=35 and sends a Swapped message to node 3. (c) Node 6 waits until both elementary entanglements 56 and 67 exist. Then it performs swap 56+67=57 and sends a Swapped message to node 5. (4) At Step 3, Node 3 waits until it has received both the Swapped 13 message from node 2 and the Swapped 35 message from node 4. Then it performs swap 13+35=15 and sends a Swapped message to node 5. (5) At Step 4, Node 5 waits until it has received both the Swapped 15 message from node 3 and the Swapped 57 message from node 6. Then it performs swap 15+57=17. This completes the end-to-end entanglement, so node 5 sends two Swapped 17 messages, one to node 1 (host A) and one to node 7 (host B).

23. The Optimal Swapping Schedule

There are many possible swapping schedules for a given number of nodes.

Figure 30:
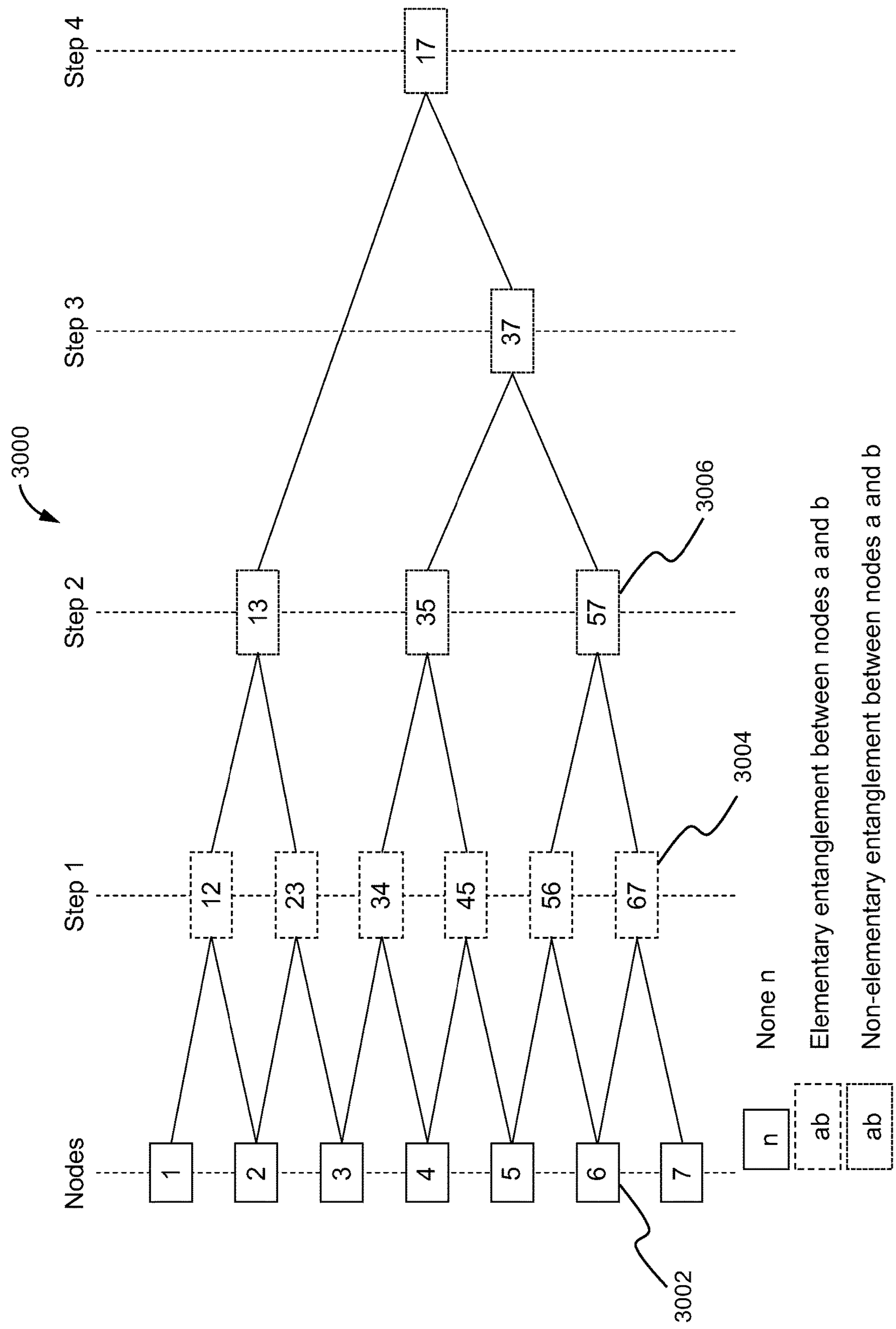

FIG. 30 shows a second example possible swapping schedule 3000 for 7 nodes. No entanglement at a node is represented by a solid black-bordered rectangle 3002, elementary entanglement between two nodes is represented by a dashed black-bordered rectangle 3004, and non-elementary entanglement between two nodes is represented by a short-dashed black-bordered rectangle 3006.

Figure 31:
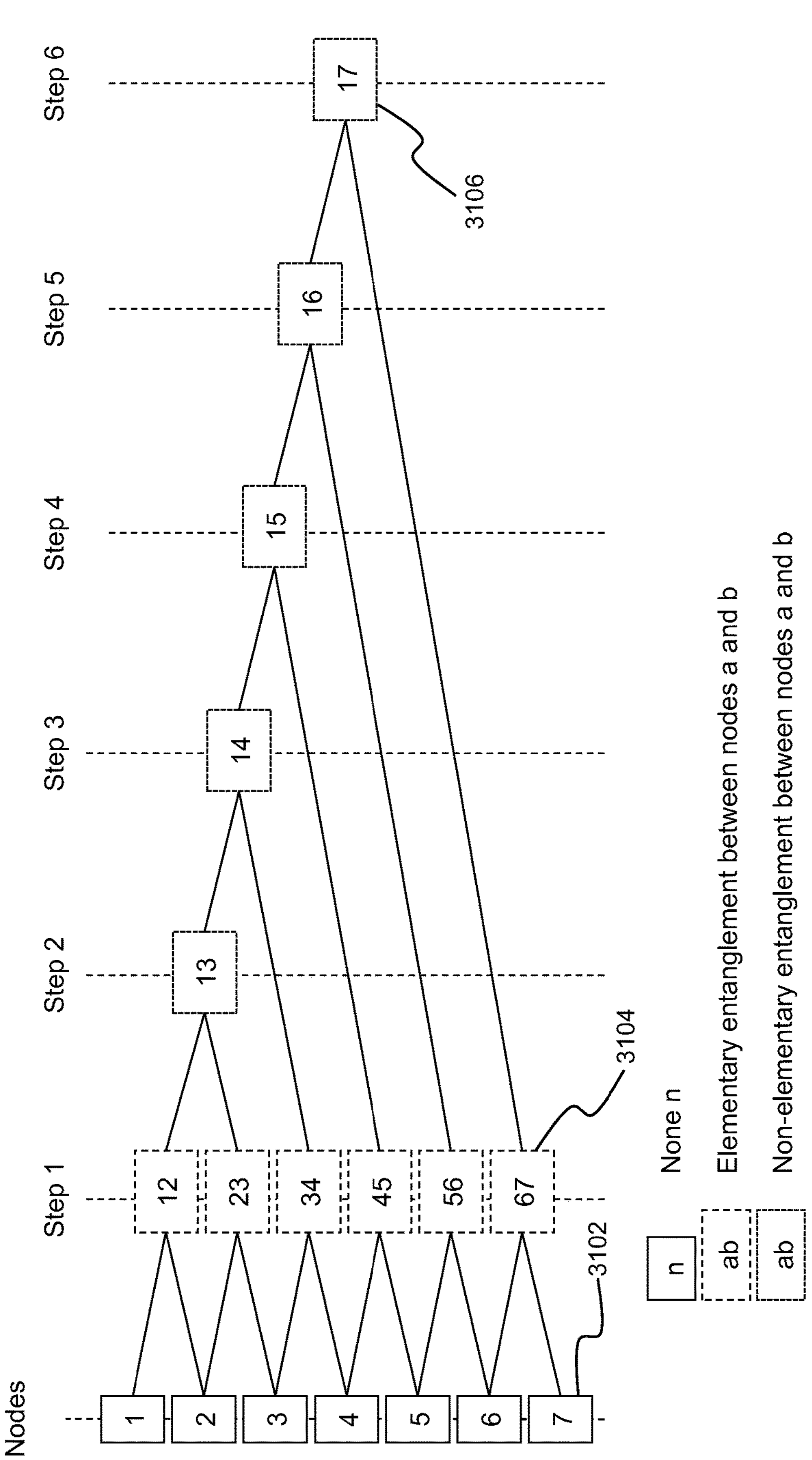

FIG. 31 shows a third example swapping schedule 3100 for 7 nodes. No entanglement at a node is represented by a solid black-bordered rectangle 3102, elementary entanglement between two nodes is represented by a dashed black-bordered rectangle 3104, and non-elementary entanglement between two nodes is represented by a short-dashed black-bordered rectangle 3106.

In general, some swapping schedules are better than other swapping schedules. In FIG. 29 and FIG. 30, only 4 steps are used to complete the end-to-end entanglement, whereas in FIG. 31, 6 steps are used. In certain circumstances (e.g., depending on the underlying architecture of the network), however, more steps may be beneficial or necessary.

In some examples, it may be the job of the quantum network controller to choose a swapping schedule for each node on a given virtual circuit. The chosen swapping schedule may be optimized with regards to one or more parameters and constraints. In some examples, the chosen swapping schedule may be optimal under the parameters of the quantum network. The quantum network takes many factors into consideration when computing a (possibly optimal) swapping schedule, including the characteristics of the qubit memories (e.g., $T_1$ and $T_2$ decoherence times), the characteristics of the fiber links (distance, loss), etc., as may be discovered through the hardware abstraction API.

24. The Swapping Schedule is Asynchronous

In some figures (e.g., FIGS. 29 and 30), the actions that are on the same vertical line (i.e., in the same time step) are allowed to happen concurrently in an asynchronous fashion. As a result, the exact sequence of events may not be fully determined by the schedule.

Figure 32:
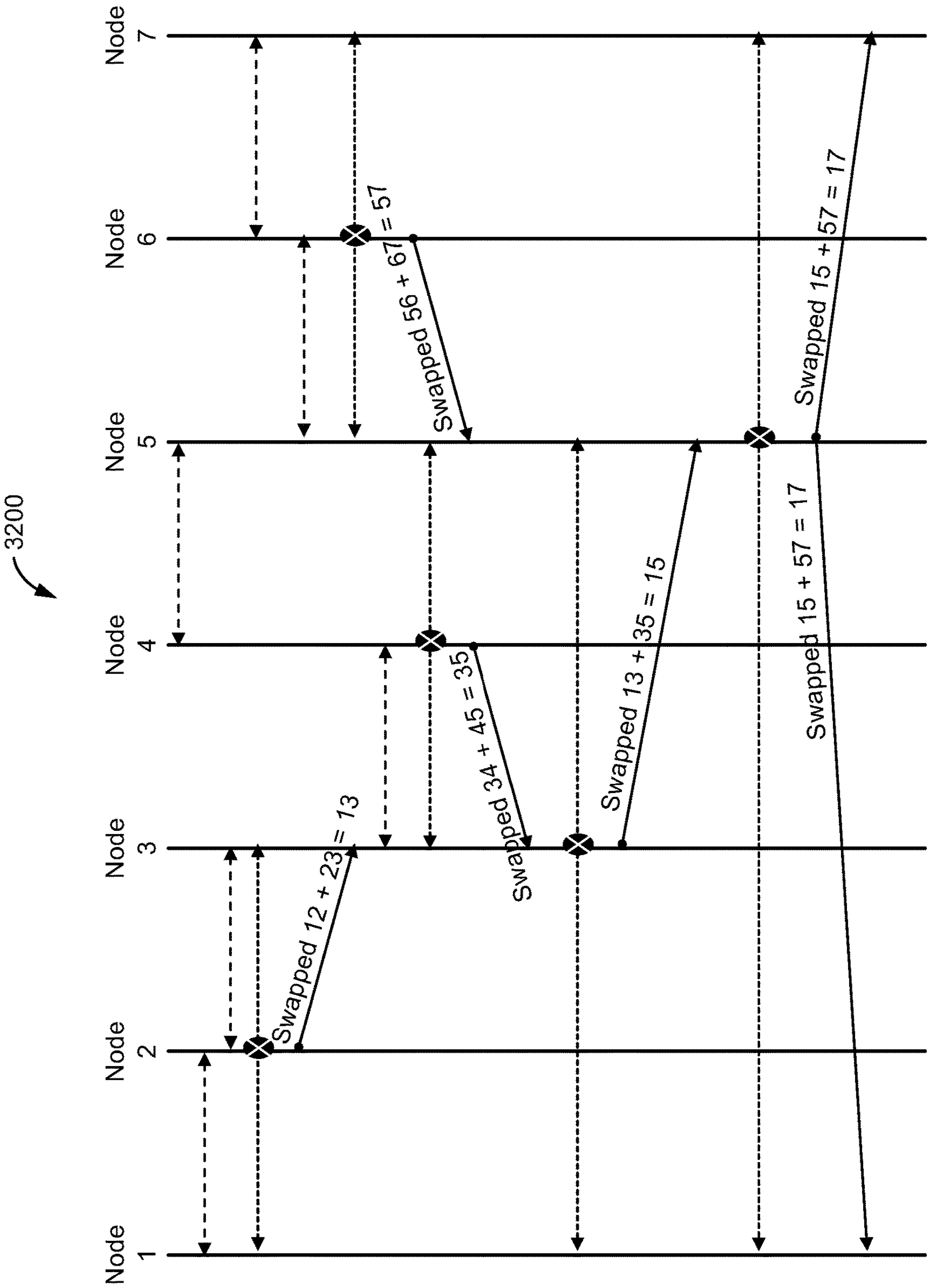
FIGS. 32-33 are schematic diagrams of example steps occurring in quantum network portions.

FIG. 32 shows a portion of an example quantum network 3200 comprising a first example sequence of events corresponding to the example swapping schedule 3100 shown in FIG. 31. In this example, the first non-elementary entanglement generated is 13 by swap 12+23=13. Furthermore, non-elementary entanglement 57 is generated before non-elementary entanglement 15.

Figure 33:
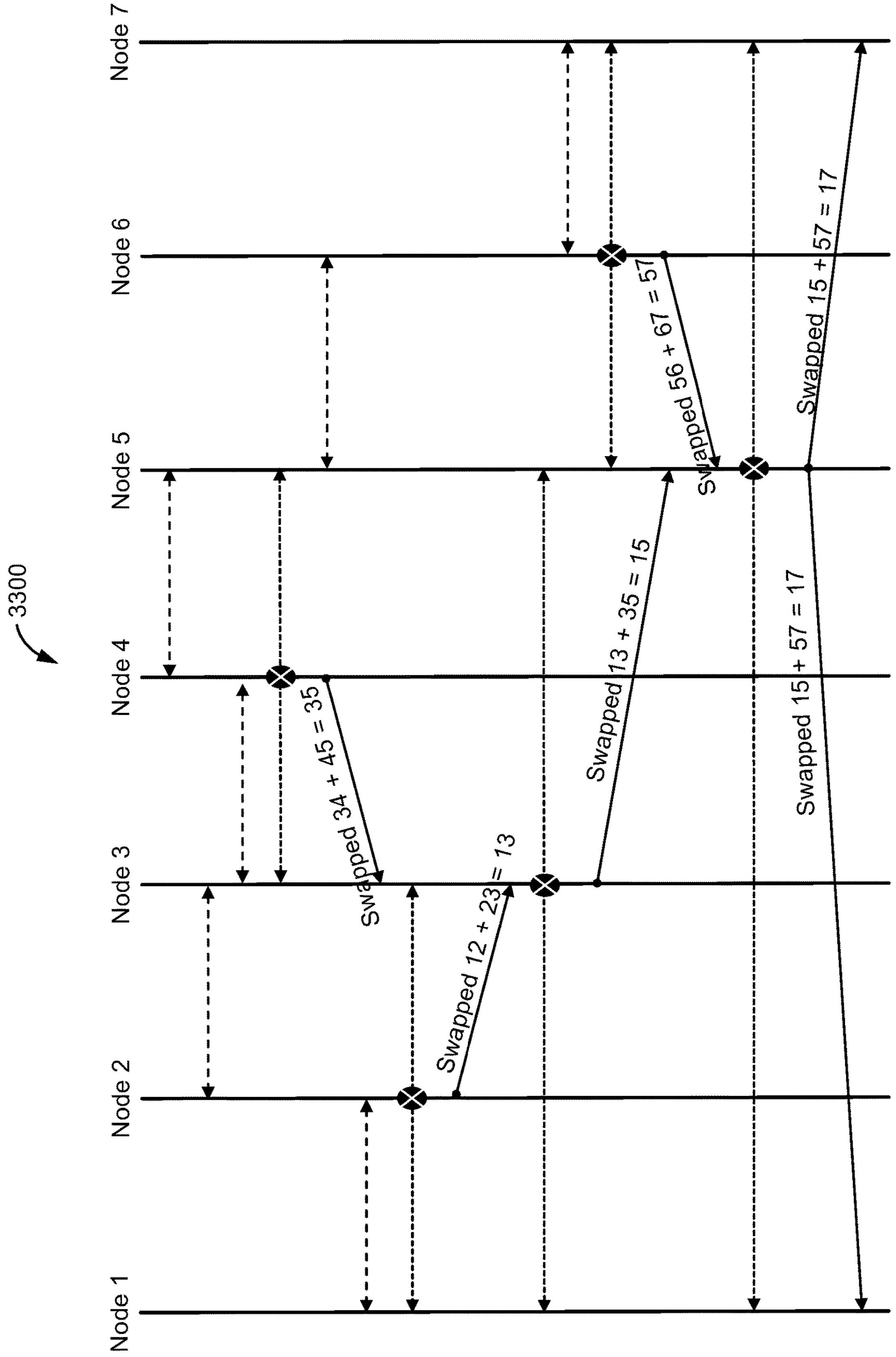

FIG. 33 shows a portion of an example quantum network 3300 comprising a second example sequence of events corresponding to the example swapping schedule 2900 shown in FIG. 29. In this example, the first non-elementary entanglement generated is 35 by swap 34+45=35. Furthermore, non-elementary entanglement 57 is generated after non-elementary entanglement 15.

Note that, while there is some asynchronicity (i.e., some freedom in the exact relative timing of the various events) there is also some ordering imposed by the swapping schedule: the Swapped messages guarantee that certain swap actions in time step n are completed before any swap actions in time step n+1.

25. Translating Schedules to Finite-State Machines

In some examples, regardless of the order in which the elementary entanglements are generated, or in which order the swaps occur, the sequence of swaps can follow the same "tree structure" imposed by the swapping schedule. As a result, it can be known in advance from which node to which node the Swapping messages will be sent. It can also be known in advance which event(s) a node must wait for before it can perform a swap.

Such information allows for the translation of the schedule into a finite-state machine (FSM) for each node in the virtual circuit. The finite-state machine may describe what events a node must wait for, when to perform a swap, and when to send a message and to which node a message is sent. Depending on the specific variation of swapping protocol and the schedule, the set of nodes to be sent a Swap-Success message may differ from the set of nodes to be sent a Swap-Failed message.

Figure 34:
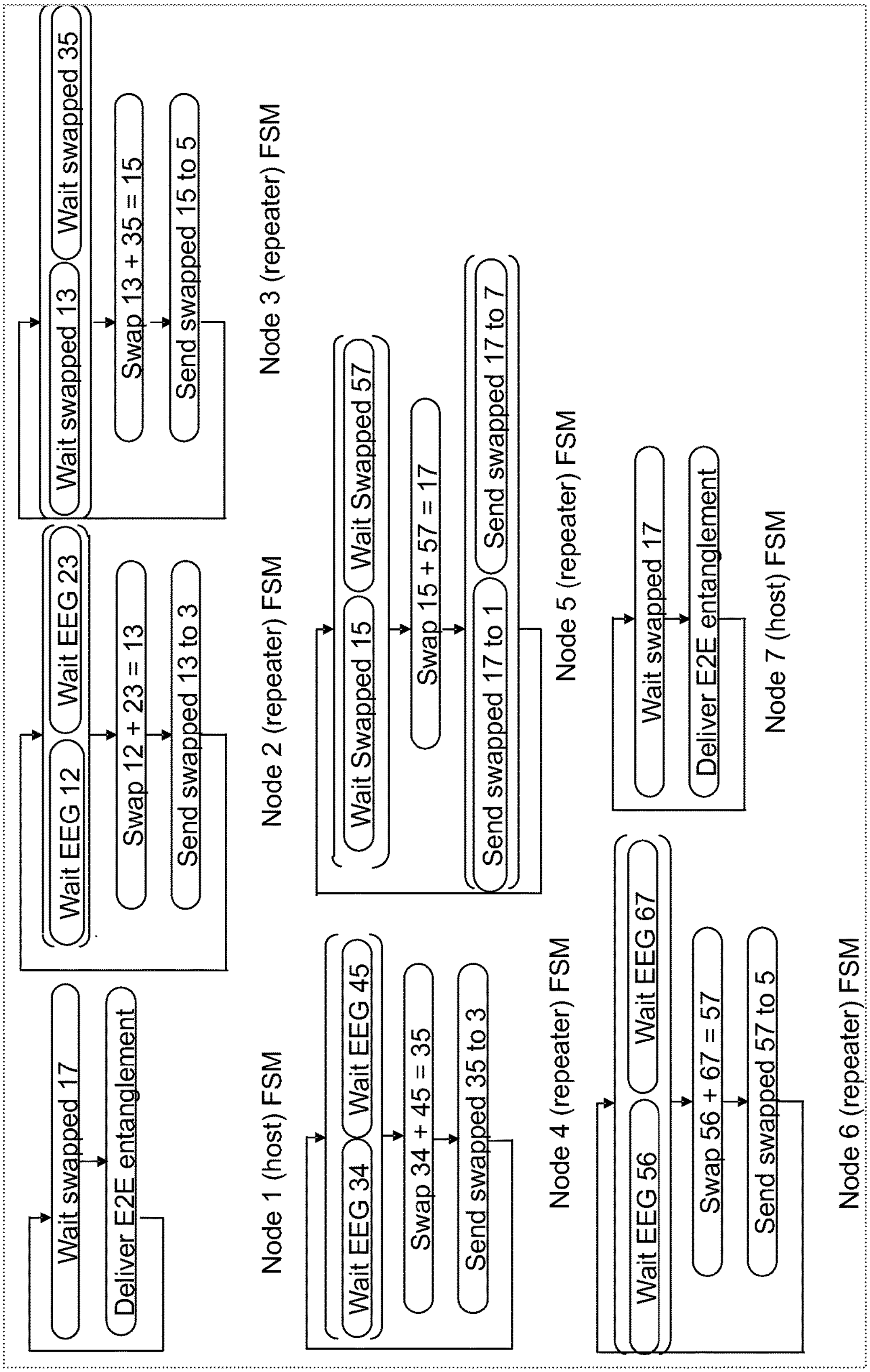
FIGS. 34-35 are finite state machine (FSM) transition diagrams for example FSMs.

FIG. 34 shows an example set of finite-state machines 3400 (FSMs), with one FSM for each node, corresponding to the first swapping schedule 2900 in FIG. 29. Although "Swap ab+bc=ac" may appear to be an action, it is in fact a state of a node. In general, executing an entanglement swap operation may involve sending a swap request to the hardware abstraction layer and waiting for a response event (e.g., success or failure) from the hardware abstraction, which occurs some finite amount of time later. Later paragraphs describe how the swapping protocol handles swap failures, depending on the variation of the protocol.

Referring again to FIG. 34, a Node 1 (host) FSM comprises two states that transition between each other after their completion: a state "Wait swapped 17" and a state "Deliver E2E (end-to-end) entanglement". A Node 7 (host) FSM behaves in a similar manner to the Node 1 (host) FSM. A Node 2 (repeater) FSM comprises a state including both "Wait EEG 12" and "Wait EEG 23". After both EEGs occur, the Node 2 (repeater) FSM transitions to a state "Swap 12+23=13" where a non-elementary entanglement generation by swapping yields entanglement 13, after which the state transitions to a state "Send swapped 13 to 3" wherein Node 2 sends a Swapped message to Node 3. A Node 4 (repeater) FSM and Node 6 (repeater) FSM behaves in a similar manner to the Node 2 (repeater) FSM. A Node 3 (repeater) FSM comprises a state including both "Wait Swapped 13" and "Wait Swapped 35", and, upon receiving the respective Swapped messages from Node 2 (i.e., "Send swapped 13 to 3") and Node 4 (i.e., "Send swapped 35 to 3"), transitions to a state "Swap 13+35=15". After the swap, the Node 3 (repeater) FSM transitions to a state "Send swapped 15 to 5". A Node 5 (repeater) FSM comprises a state including both "Wait Swapped 15" and "Wait Swapped 57", and, upon receiving the respective Swapped messages from Node 3 (i.e., "Send swapped 15 to 5") and Node 6 (i.e., "Send swapped 57 to 5"), transitions to a state "Swap 15+57=17". After the swap, the Node 5 (repeater) FSM transitions to a state including both "Send swapped 17 to 1" and "Send swapped 17 to 7". After Node 1 and Node 7 receive the respective Swapped messages, they each transition to the state "Deliver E2E entanglement".

Figure 35:
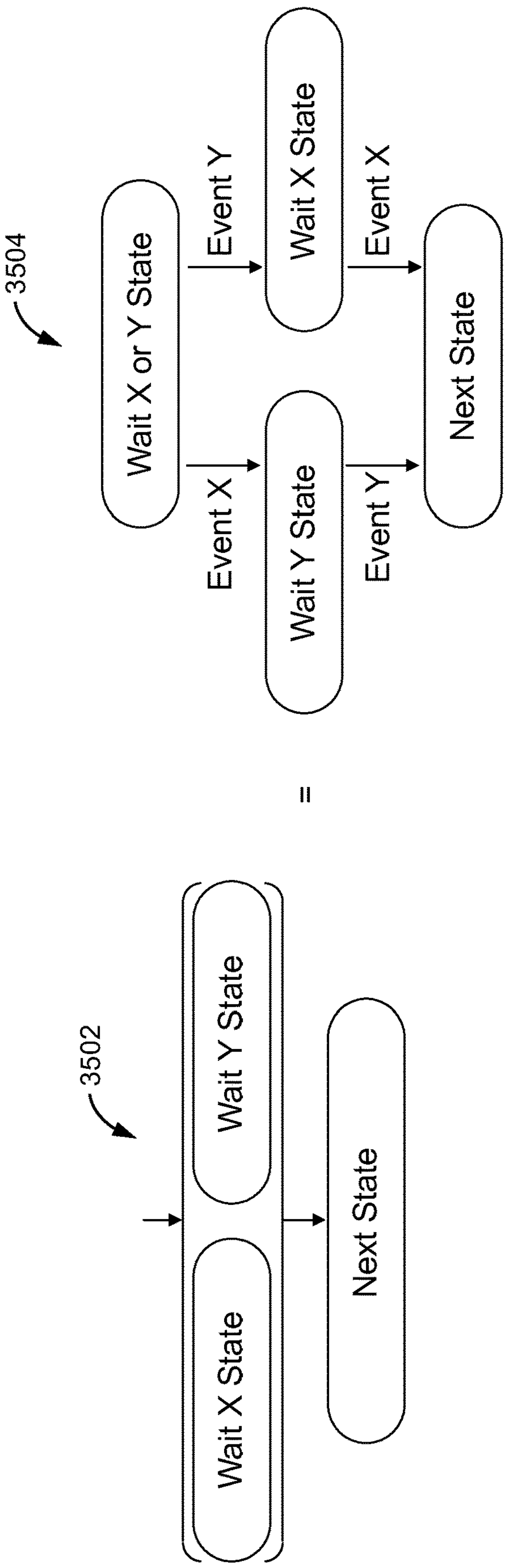

A "Send real-time classical" message, on the other hand, is technically not a state but rather an action. As such, it is not included in a box in FIG. 34. Sending a real-time classical message may be unreliable, since the message may be lost on the wire without any indication. FIG. 34 makes use of a simplified notation to indicate that the finite-state machine is waiting for two events X and Y to both occur, but as has been previously discussed, it does not matter in which order the event occurs. FIG. 35 makes more explicit the logic that is applied in the case of waiting for two events to both occur.

FIG. 35 shows an example simplification of a finite-state machine notation. A first representation 3502 of the FSM is equivalent to a second representation 3504 of the FSM. The second representation 3504 includes a state "Wait X or Y State" that transitions to a state "Wait Y State" if Event X occurs or to a state "Wait X state" if Event Y occurs. The "Wait Y State" then transitions to a state "Next State" after Event Y occurs and the "Wait X State" then transitions to a state "Next State" after Event X occurs. The first representation 3502 is simplified in comparison to the second representation 3504 and simply includes two states: a state including both "Wait X State" and "Wait Y State" that transitions to a state "Next State" after Event X and Event Y occur.

The translation from a schedule to a finite-state machine for each node may occur once the virtual circuit is established. The finite-state machines can be installed in the data plane of each node at virtual circuit establishment time. From then on, each node can efficiently perform its part of creating end-to-end entanglements by simply following the simple rules of its local finite-state machine.

26. Heralded Swap Failures

On some platforms, notably platforms using linear optics, there may be a 50% upper bound probability that a swap operation fails in a heralded manner. Heralded means that the swapping node has enough information to notify one or more nodes whether an entanglement swap attempt succeeded or failed.

Figure 36:
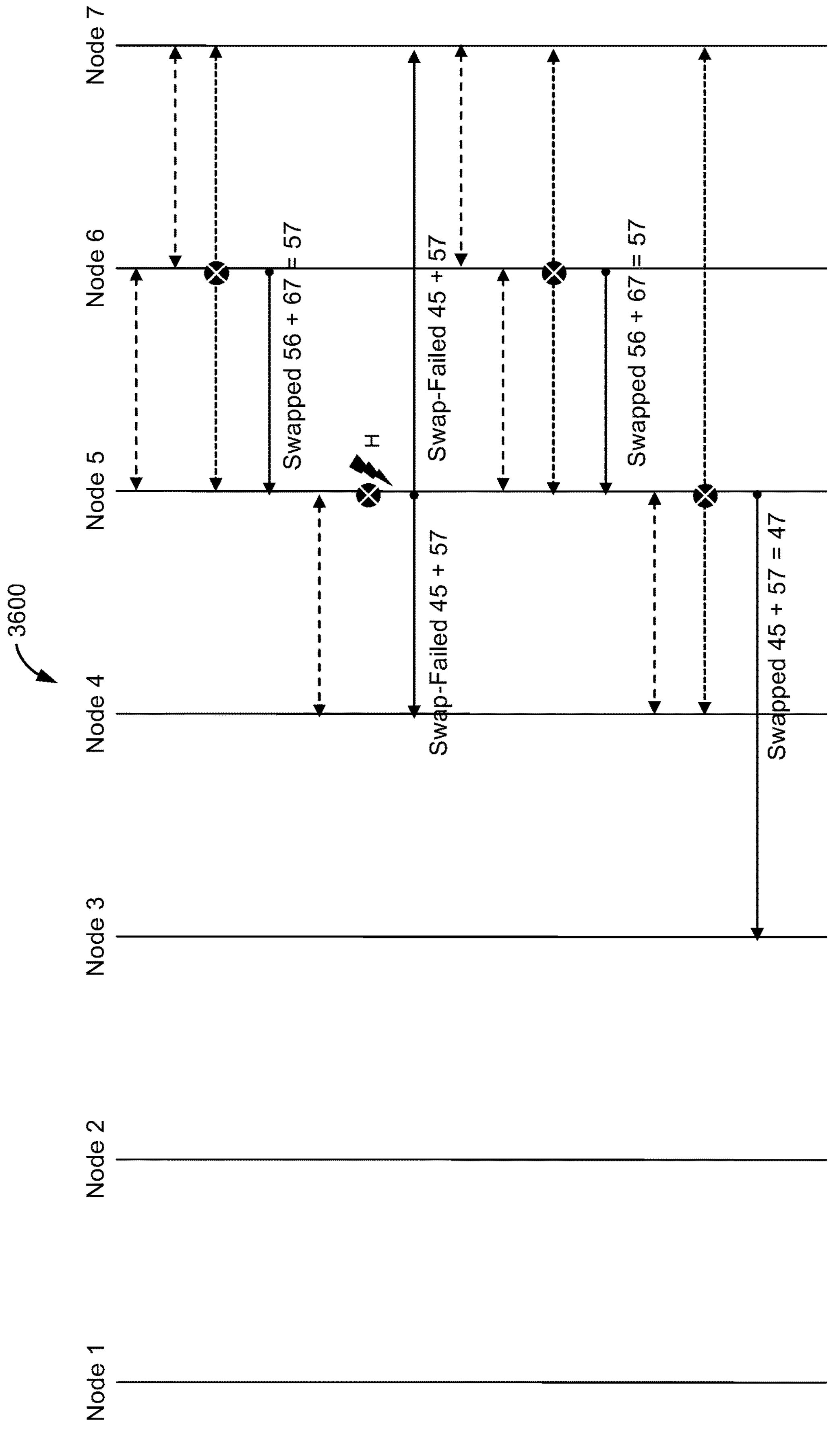
FIG. 36 is a schematic diagram of example steps occurring in a quantum network portion.

FIG. 36 shows a portion of an example quantum network 3600 that includes an example method for handling a heralded swap failure (represented as a lightning bolt and the letter "H") by using a real-time classical message: the Swap-Failed message. The quantum network 3600 is based on a portion of the underlying schedule shown in FIG. 37, a non-optimal schedule, in order to demonstrate that the Swapped (success) and Swap-Failure messages can potentially be sent to different nodes. In this example, the heralded swap failure (represented as a lightning bolt and the letter "H") is succeeded by sending "Swap-Failed 45+57" messages to Nodes 4 and 7 from Node 5, after which entanglement between Nodes 4 and 7 is reattempted and eventually succeeds, resulting in a "Swapped 45+57=47" message being sent to Node 3 from Node 5.

Figure 37:
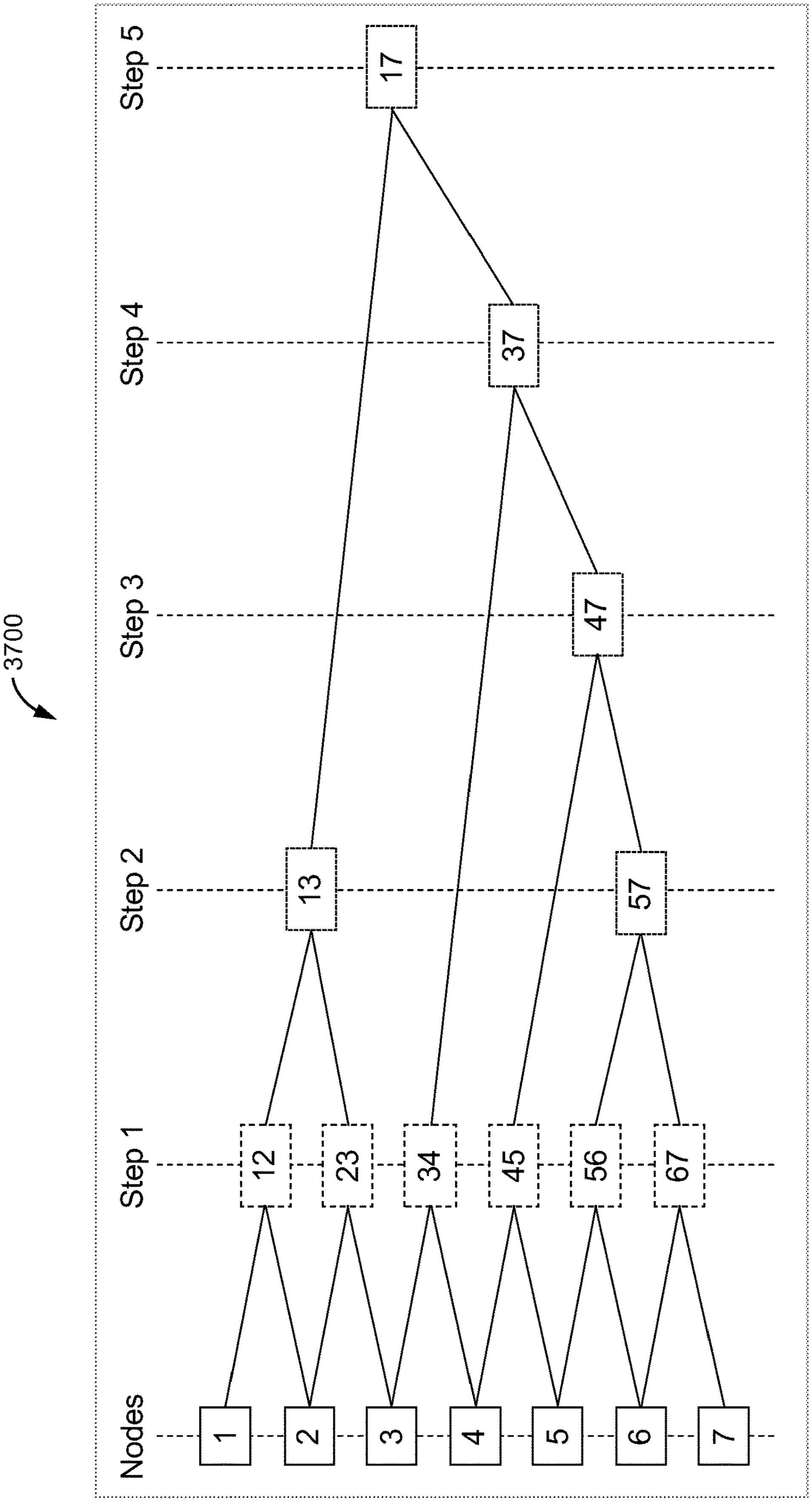
FIG. 37 is a schematic diagram of an example schedule.

FIG. 37 shows an example schedule 3700 of swapping that is used in the example quantum network 3600 in FIG. 36. The portion of the schedule 3700 used in the quantum network 3600 in FIG. 36 is the elementary entanglement generation between Nodes 4 and 5 (i.e., 45), Nodes 5 and 6 (i.e., 56), and Nodes 6 and 7 (i.e., 67), followed by swapping operations 56+67=57 and 45+57=47, the latter of which experiences a heralded swap failure at first in the quantum network 3600 before succeeding on the second attempt.

Referring again to FIG. 36, the steps to recover from a heralded swap failure are as follows:

1. For the purpose of this example, node 6 performs a swap first, which is successful. Node 6 sends a Swapped 56+67=57 message to node 5.

2. Node 5 attempts to perform the swap 45+57=47 but the swap fails in a heralded manner. Since the swap is heralded, node 5 receives information that the swap attempt failed and initiates a recovery procedure:
   a. Ownership of the two local qubit memories on node 5 are released and returned to the elementary entanglement layer (note that this would have also happened if the swap was successful).
   b. Node 5 sends a Swap-Failed message to the remote side of its A-side entanglement. In this case, the A-side entanglement is 45, so node 5 sends a Swap-Failed message to node 4. When node 4 receives the Swap-Failed message, it releases its B-side qubit memory and returns it to the elementary entanglement layer (this qubit memory was waiting to be swapped).
   c. Similarly, node 5 also sends a Swap-Failed message to the remote side of its B-side entanglement. In this case, the B-side entanglement is 57, so node 5 sends a Swap-Failed message to node 7. When node 7 receives the Swap-Failed message, it releases its A-side qubit memory and returns it to the elementary entanglement layer (this qubit memory was waiting to be swapped).
   d. There is no need to send a Swap-Failed message to node 6. The local qubit memories on node 6 were already released and returned back to the elementary entanglement layer when node 6 performed a successful swap. (Note that node 6 may forward the Swap-Failed message from node 5 to node 7, but there is no Swap-Failed message that is destined to node 6.)
   e. There is already no need to send any Swap-Failed messages to nodes 1, 2, or 3. These nodes are not affected by the failed swap on node 5. Any entanglements that exist between nodes 1, 2, and 3 are still valid and can continue to be used.
3. As a result of the above recovery procedure:
   a. Qubit memories 4B and 5A have both been returned to the elementary entanglement layer, which will start producing a new 45 elementary entanglement.
   b. Similarly, qubit memories 5B and 6A have both been returned to the elementary entanglement layer, which will start producing a new 56 elementary entanglement.
   c. Similarly, qubit memories 6B and 7A have both been returned to the elementary entanglement layer, which will start producing a new 67 elementary entanglement.
   d. The normal swapping protocol procedures are followed as before. First node 6 swaps 56+67=57. Then node 5 swaps 45+57=47. In this example, the second swap attempt at node 5 succeeds, so node 5 sends a Swapped 45+57=47 message to some other node (node 3 in this example).

Figure 38:
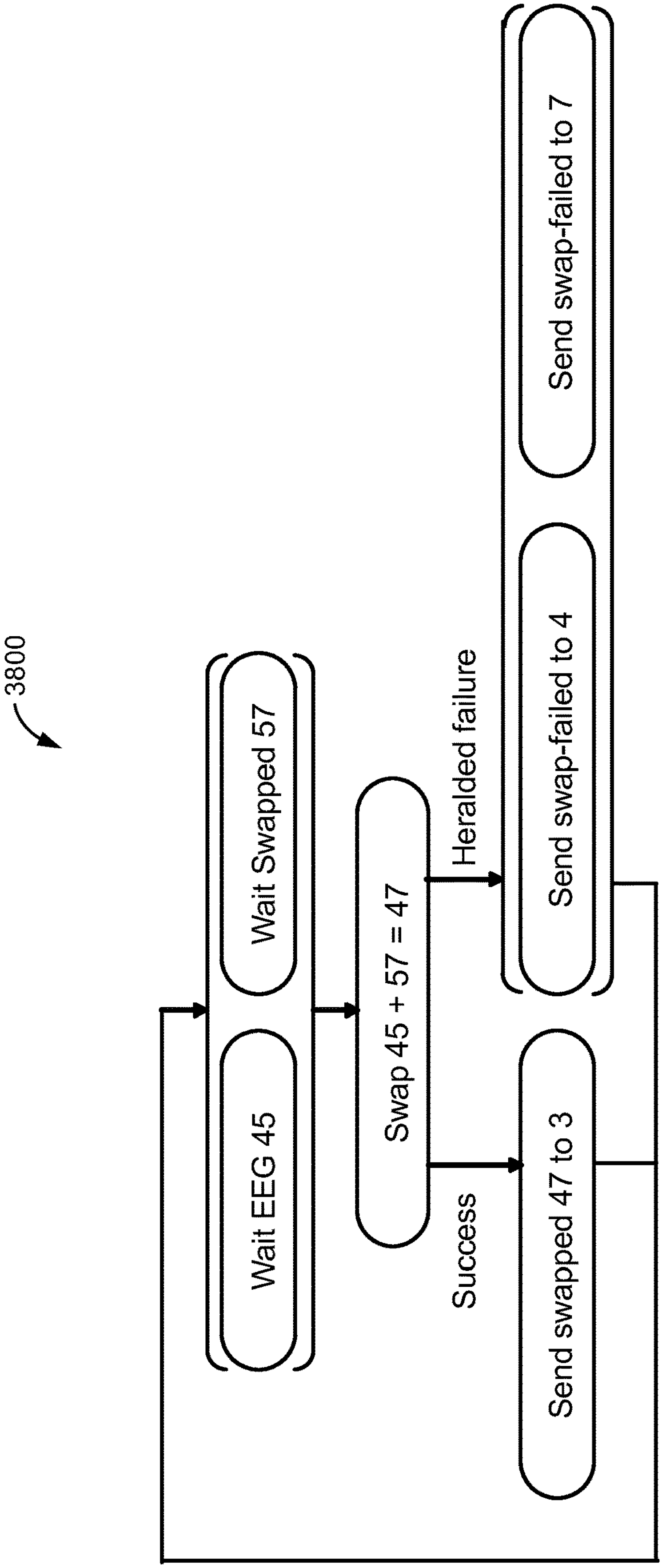
FIG. 38 is an FSM transition diagram for an example FSM.

The heralded swap failure recovery procedure is reflected in the finite-state machine (FSM), as shown in FIG. 38. Each state is labeled with an associated action that may be performed by the FSM, or one or more conditions for which the FSM is waiting. It is implicit that the swap operation releases the local two qubit memories, regardless of whether the swap operation was successful or not.

FIG. 38 shows an example FSM 3800 at a node, wherein the finite-state machine 3800 includes heralded swap failure recovery. The FSM 3800 comprises a waiting state that includes both "Wait EEG 45" and "Wait Swapped 57". After EEG (elementary entanglement generation) of the entangled pair 45 and after non-elementary entanglement generation by swapping creates the entangled pair 57, the FSM 3800 transitions to a state "Swap 45+57=47". After non-elementary entanglement generation by swapping creates the entangled pair 47, the FSM 3800 transitions to one of two states depending on the whether the "Swap 45+57=47" results in a "Success" or a "Heralded failure". If "Swap 45+57=47" results in "Success", the FSM 3800 transitions to a state "Send swapped 47 to 3" wherein a classical message indicating the swap of 45 and 57 was successful is sent to Node 3 from Node 5. If "Swap 45+57=47" results in "Heralded failure", the FSM 3800 transitions to a state "Send swap-failed to 4" and "Send swap-failed to 7", wherein a classical message indicating the swap of 45 and 57 resulted in a heralded failure is sent to Nodes 4 and 7 from Node 5. The FSM 3800 then transitions back to the waiting state.

27. Unheralded Swap Failures

In addition to the heralded swap failures discussed in the previous section, there may also be a low probability that the swap fails in an unheralded manner.

By definition, unheralded means that the swapping node does not receive information that the swap failed. In some examples, the node does not recover from the swapped failure, since the node does not know that the swap failed in the first place. One way to deal with such swap failures is to account for it as a source of noise, and to include it in a model for estimating the fidelity of produced entanglements, and for the SDN controller when making routing/scheduling decisions based on these unheralded swap failure probabilities.

28. Concurrent End-to-End Entanglement Creation

In some scenarios, it is possible that some nodes in the virtual circuit are already working on the next end-to-end entanglement while other nodes in the same virtual circuit are still working on the previous end-to-end entanglement.

We refer to this as concurrent end-to-end entanglement generation, and it is similar in concept to pipelining.

Figure 39:
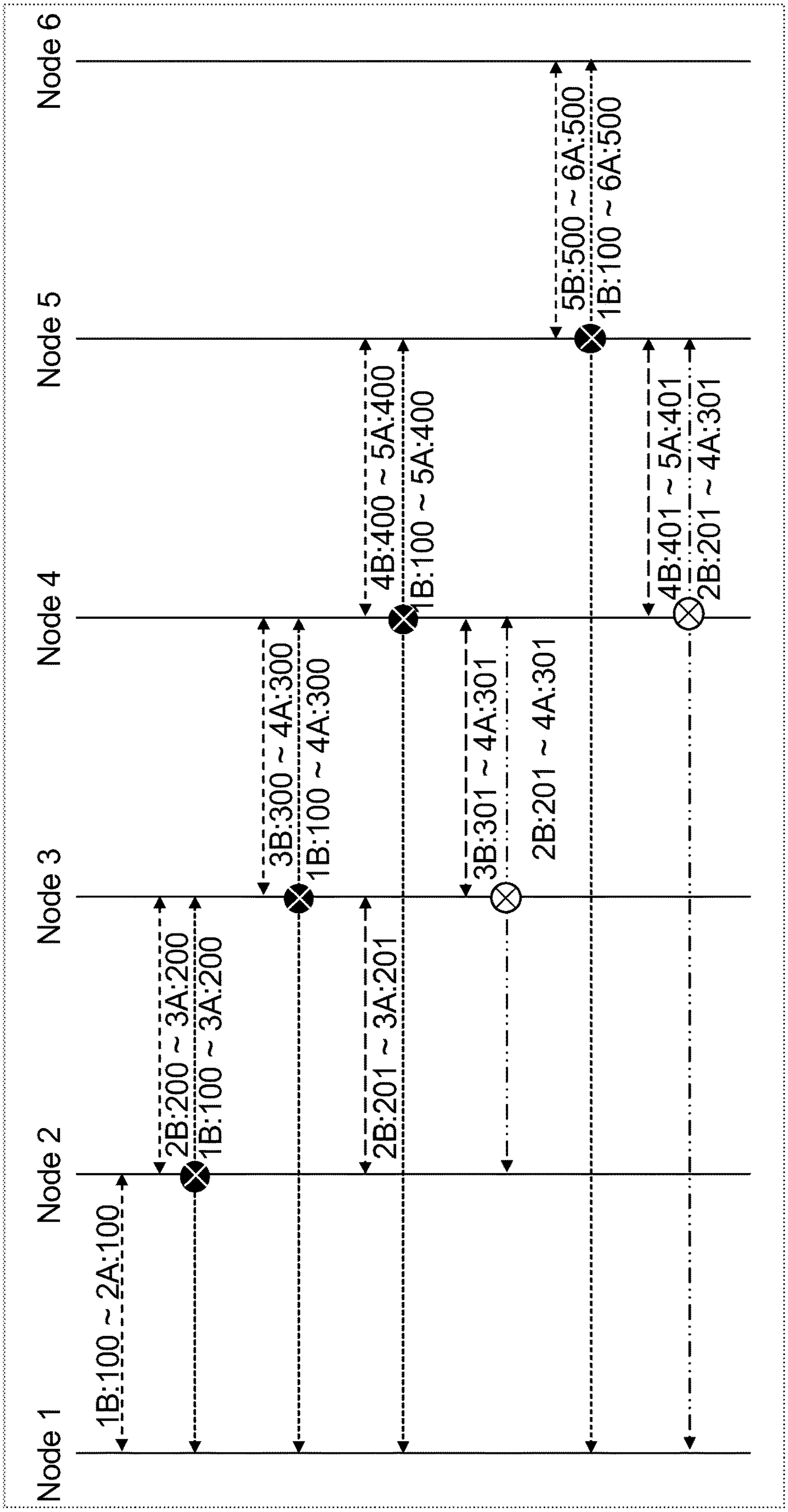
FIG. 39 is a schematic diagram of example steps occurring in a quantum network portion.

FIG. 39 shows a portion of an example quantum network 3900 comprising concurrent end-to-end entanglement generation. In this example we have two end-to-end entanglements being generated concurrently. The first entanglement generation is shown with black dashed arrows (elementary entanglement generation), black ⊗ (swap operation), and black short-dashed arrows (long-range entanglement). The second concurrent entanglement generation is shown with black long-dashed arrows (elementary entanglement generation), white ⊗ (swap operation), and long dash-dot-dot arrows (long-range entanglement).

Referring again to FIG. 39, the scenario unfolds as follows:

1. When node 2 has elementary entanglements on its A-side and B-side, it performs a swap resulting in 1B:100~3A:200. This frees up the two qubit memories at node 2.
2. When node 3 has elementary entanglements on its A-side and B-side, it performs a swap resulting in 1B:100~4A:300. This frees up the two qubit memories at node 3.
3. At this point the protocol can start generating a new elementary entanglement on the link between nodes 2 and 3 (e.g., 2B:201~3A:201) for the next end-to-end entanglement despite the fact that the previous end-to-end entanglement is not complete yet.

4. Similarly, after node 4 performs a swap resulting in 1B:100~5A:400, the protocol can already start generating the next elementary entanglement on the link between nodes 3 and 4 (e.g., 3B; 301~4A:301).
5. When the next elementary entanglements on the 2-3 and 3-4 links are generated, the protocol can already perform a swap for the next end-to-end entanglement (e.g., 2B:201~4A:301), once again despite the fact that the previous end-to-end entanglement generation is not complete yet.

29. Tracking Bell State Information

Each swapping FSM may keep track of one or two entanglements. For example, swapping FSMs for hosts may keep track of one entanglement and swapping FSMs for repeaters may keep track of two entanglements. The tracked state for each entanglement may include which of the four Bell states it is, as well as the local and remote qubit state identifiers and the estimated fidelity.

When the elementary entanglement generation layer dispatches an Entanglement-Created event to the swapping layer it may include which of the four possible Bell states was generated: $|\Phi^{+}\rangle$, $|\Phi^{-}\rangle$, $|\Psi^{+}\rangle$, or $|\Psi^{-}\rangle$. The swapping FSM can store this information in the corresponding tracked entanglement. While the swapping FSM is waiting for the Entanglement-Created event, the qubit Bell state is marked as pending. In some examples, when a node performs an entanglement swap, the node measures a pair of qubits it holds locally (each qubit belonging to a different entanglement, and therefore are a non-entangled pair) using a joint measurement referred to as a Bell state measurement, and determines the resulting Bell state of the extended entanglement based on results of that Bell state measurement. For example, one example of such a joint measurement using linear optics is the combination of photons encoded with the respective qubit states in two input ports of a beamsplitter and determining the presence or absence of detected photons at the two output ports of the beamsplitter. The heralding of success or failure of the measurement, and the associated entanglement swap operation, may be related to the properties of the detectors used to detect the photons. Another example of such a joint measurement uses a gate-based Bell state measurement circuit, as described in more detail below. The heralding of success or failure of the measurement, and the associated entanglement swap operation, may be related to properties of the gate-based Bell state measurement circuit.

To determine the post-swap Bell state, let each Bell state, $|\Phi^{+}\rangle$, $|\Phi^{-}\rangle$, $|\Psi^{+}\rangle$, and $|\Psi^{-}\rangle$, be mapped to a tuple (s1, s2) as follows:

TABLE 2

Mapping bell states to binary pairs.

| $|\phi^{+}\rangle$ | $|\Psi^{+}\rangle$ | $|\phi^{-}\rangle$ | $|\Psi^{-}\rangle$ |
|---|---|---|---|
| (0, 0) | (0, 1) | (1, 0) | (1, 1) |

Mapping the A-side Bell state $|\Phi_A\rangle$ to a tuple ($s1_A$, $s2_A$) and the B-side Bell state $|\Phi_B\rangle$ to a tuple ($s1_B$, $s2_B$) allows the determination of a new tuple ($s1_{new}$, $s2_{new}$)=($s1_A \oplus s1_B \oplus m1$, $s2_A \oplus s2_B \oplus m2$) where '$\oplus$' denotes the bitwise XOR operation. The resulting tuple maps back to the post-swap Bell state according to the table above. In the case of gate-based Bell state measurements (e.g., teleportation), the post-swap Bell state may also be determined via computation.

Figure 40:
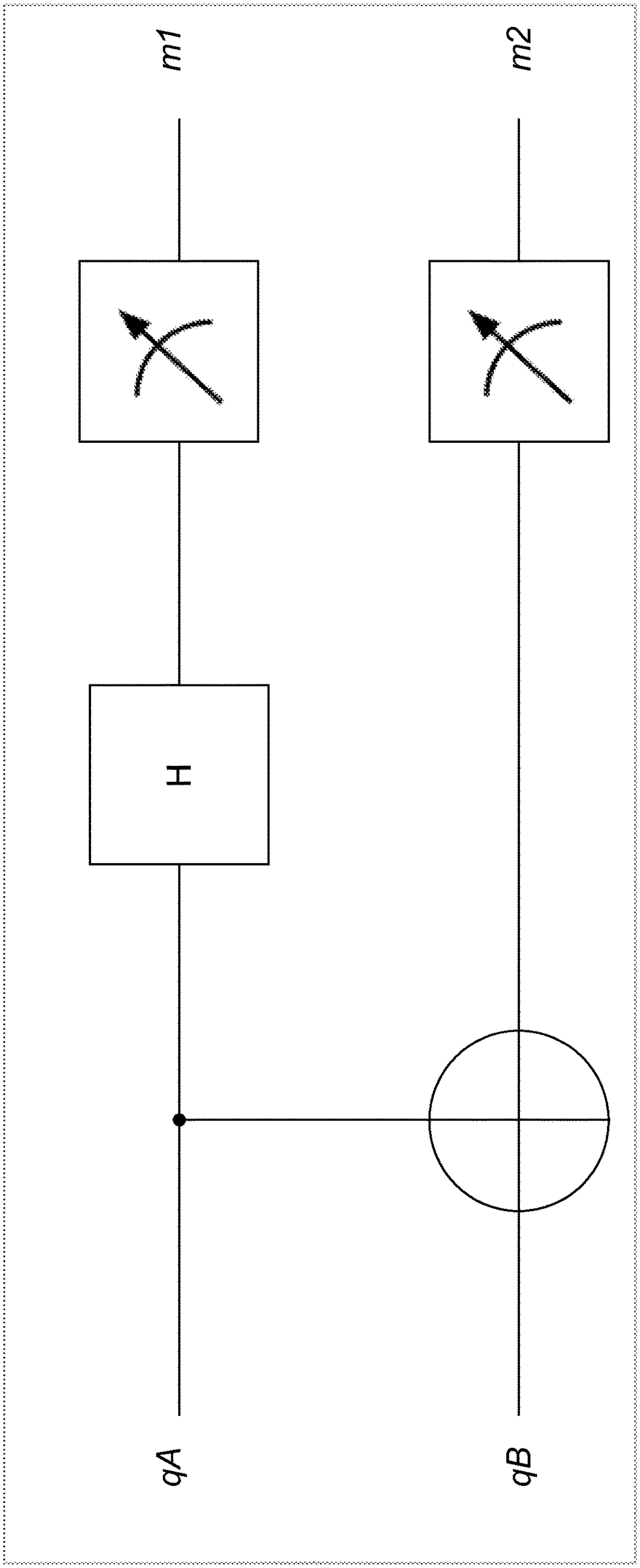
FIG. 40 is a quantum circuit diagram of an example measurement circuit.

FIG. 40 shows an example gate-based Bell state measurement circuit, where $q_A$ and $q_B$ are the node's local qubits part of the A-side entanglement and B-side entanglement respectively. The circuit reads from left to right in order of operations and may be summarized as: First, apply a CNOT gate from qubit $q_A$ to qubit q using $q_A$ as the control and q as the target, followed by a Hadamard gate (H) on qubit $q_A$ and a measurement of both qubits in the standard (Z) basis (m1 and m2). If the role of $q_A$ and $q_B$ change within the circuit above (e.g., $q_B$ is used as the control of the CNOT and has the Hadamard applied to it) then m1 and m2 change accordingly.

After the swap is complete and the Bell state of the new extended entanglement has been determined, the swapping node may perform the following:

1. The swapping node includes the Bell state of the extended entanglement in the Swapped message that it sends to the next node in the swapping schedule. When the next node receives the Swapped message, it updates the Bell state of the affected entanglement.
2. Since the swap operation collapses the state of the local two qubits, the tracked Bell states for those qubits are set back to pending.

Once host A and host B have completed end-to-end entanglement generation, the swapping FSMs of host A and host B contain the Bell state of the end-to-end entanglement. At this point, the entanglement may be delivered to higher layers along with its Bell state information or a correction may be applied so that a desired Bell state is delivered to higher layers.

A pending Bell state may also be used in other circumstances and protocols. In some examples, it may be unnecessary to store the Bell state for an entanglement if the FSM still expects to receive a Swapped message pertaining to that entanglement. This is because the Bell state can potentially change several times due to remote swaps. The local node will not know about those intermediate Bell state changes. It will only know the final state when the Swapped message is received. Thus, if the schedule indicates that a Swap message is still expected, the Bell state is marked as pending.

An example based on FIG. 33 clarifies this:

1. When node 2 receives Entanglement-Created events for the 12 and 23 entanglements, it uses the Bell state information reported in those events, stores it in the track entanglement state, and uses it for the swap operation. This is because node 2 is not expecting any Swapped messages. The same is true for nodes 4 and 6.
2. When node 1 receives an Entanglement-Created event for the 12 entanglement, it does not store the reported Bell state; instead it marks the Bell state as pending. This is because the actual Bell state will change several times (namely due to the swaps at node 2, 3, and 5) but node 1 is not and cannot be aware of that. Node 1 only knows what the actual Bell state is when it receives the Swapped message from node 5. The same is true for node 7.
3. Similarly, when node 5 receives Entanglement-Created events for the 45 and 56 it sets the Bell state to Pending instead of the Bell state reported in the event. This is because both Bell states on the A-side and the B-side are subject to unknown state changes, until the Swapped message is received, at which point the actual state is known. The same is true for node 3.

30. Greedy Swapping

Greedy swapping is also referred to as "as soon as possible" (ASAP) swapping. In contrast, some examples above performed swaps as late as possible, for example, just before sending the Swapped message(s). In many cases, it is possible to do the swap earlier, namely as soon as there is an elementary entanglement on both the left side and the right side. In some examples of greedy swapping, the protocol does not wait until it has received the Swapped message from any predecessor node.

Figure 41:
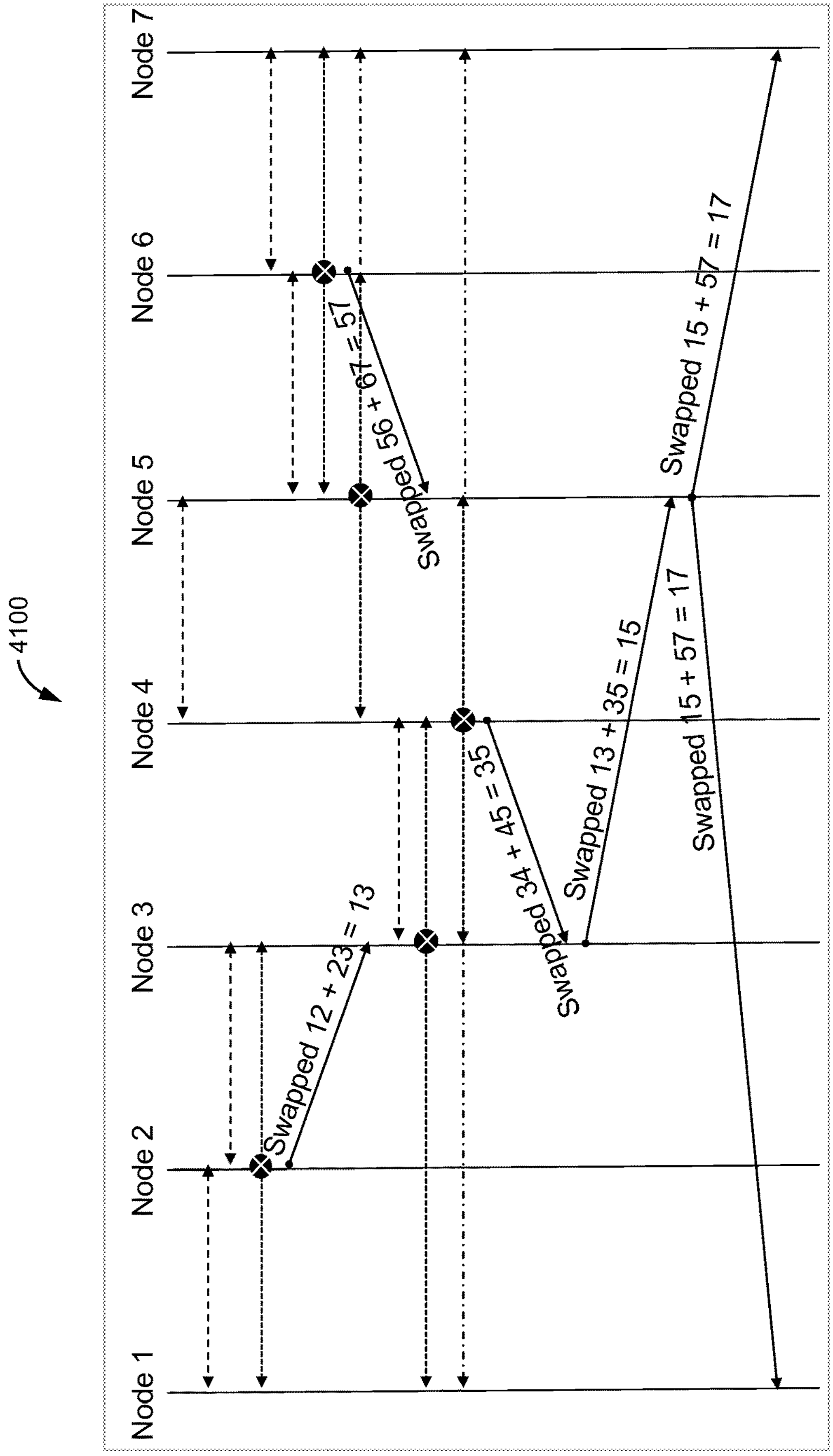
FIG. 41 is a schematic diagram of example steps occurring in a quantum network portion.

FIG. 41 shows a portion of an example quantum network 4100 performing greedy swapping (in contrast to FIG. 33, which performs swaps as late as possible). Some of the swap operations have both short-dashed black and dash-dotted black arrows. The short-dashed black arrows indicate the entanglement that the swapping node is aware of. The dash-dotted black arrows indicate the actual entanglement, which the swapping node is not aware of because it depends on events on other nodes that have not yet been communicated to the swapping node.

Referring again to FIG. 41, when node 4 performs the swap, the swap messages will indicate "34+45=45" but in reality, the swap was "14+47=17". When performing greedy swapping, the swap messages should be interpreted slightly different. "34+45=45" should be interpreted as follows:

- Before the swap, on its A-side, node 4 has an entanglement with node 3 or some node further down the A-side of node 3.
- Before the swap, on its B-side, node 4 has an entanglement with node 5 or some node further down the B-side of node 5.
- After the swap there is an entanglement between node 3 or some node further down the A-side of node 3, and node 5 or some node further down the B-side of node 5.
- In some examples, a more explicit notation may be used, such as "<34+45>=<35>" where <means "or further down the A-side" and > means "or further down the B-side".

One of the main advantages of greedy swapping is that the swaps occur earlier. This has two implications:

1. The pre-swap entanglements have less time to decohere, which means that the post-swap entanglement will have better fidelity. That said, it may still take the same amount of time to complete all the classical messaging and to deliver the final end-to-end entanglement to the next-higher layer. So, the post-swap entanglement may have more time to decohere.
2. The qubit memories on the routers are freed up earlier. This increases the amount of concurrency (i.e., the ability to work on the next end-to-end entanglement sooner).

One possible disadvantage of greedy swapping is that the protocol may become more non-deterministic and more difficult to understand (but not necessarily incorrect). Examples of these complications may include:

1. There is a race condition whenever an elementary entanglement is created between two routers. For example, in FIG. 41, when entanglement 56 is created, there is a race condition between node 5 swapping first or node 6 swapping first. Node 6 swaps first, but it could also be that node 5 swaps first. This doesn't affect the correctness of the protocol, since a 47 entanglement is still generated. However, it may make the protocol less predictable and more difficult to understand.
2. The Swapped messages are not necessarily sent when the swap actually occurred, but possibly later. Once again, this does not affect correctness, but it may make the protocol more difficult to follow.
3. It no longer makes sense for Swapped messages to report which entanglements were consumed, and which entanglements were produced (e.g., 12+23=13). This information is no longer known by the nodes because there may or may not have been swaps at the remote side of the entanglements. Thus, a Swapped message may only need to report the node that performed the swap.

Another possible disadvantage of greedy swapping is that the mechanism for recovering from heralded swap failures previously described no longer works. The previously described recovery mechanism can selectively restart a portion of the end-to-end entanglement after a heralded swap failure. With greedy entanglement swapping, the protocol may have to restart the entire end-to-end entanglement generation and abandon some or all elementary entanglements.

One more possible advantage of postponing the actual swap to as-late-as-possible (i.e., another advantage of late swapping) is that it may maximize the freedom of which qubit is swapped with which other qubit. In some examples such freedom is not needed, since the protocol may have pre-allocated each qubit memory to a particular virtual circuit, and who gets swapped with whom is predetermined. However, when considering sharing a qubit memory amongst multiple virtual circuits, the flexibility may be beneficial.

Unless otherwise stated, late swapping (i.e., not greedy swapping) is assumed in the examples disclosed herein. In general, translating late swapping examples into greedy swapping examples is possible. In the case of greedy swapping, the finite-state machines for the nodes can be adapted as shown in FIG. 42 (compare this with the FSM for node 5 as shown in FIG. 34).

Figure 42:
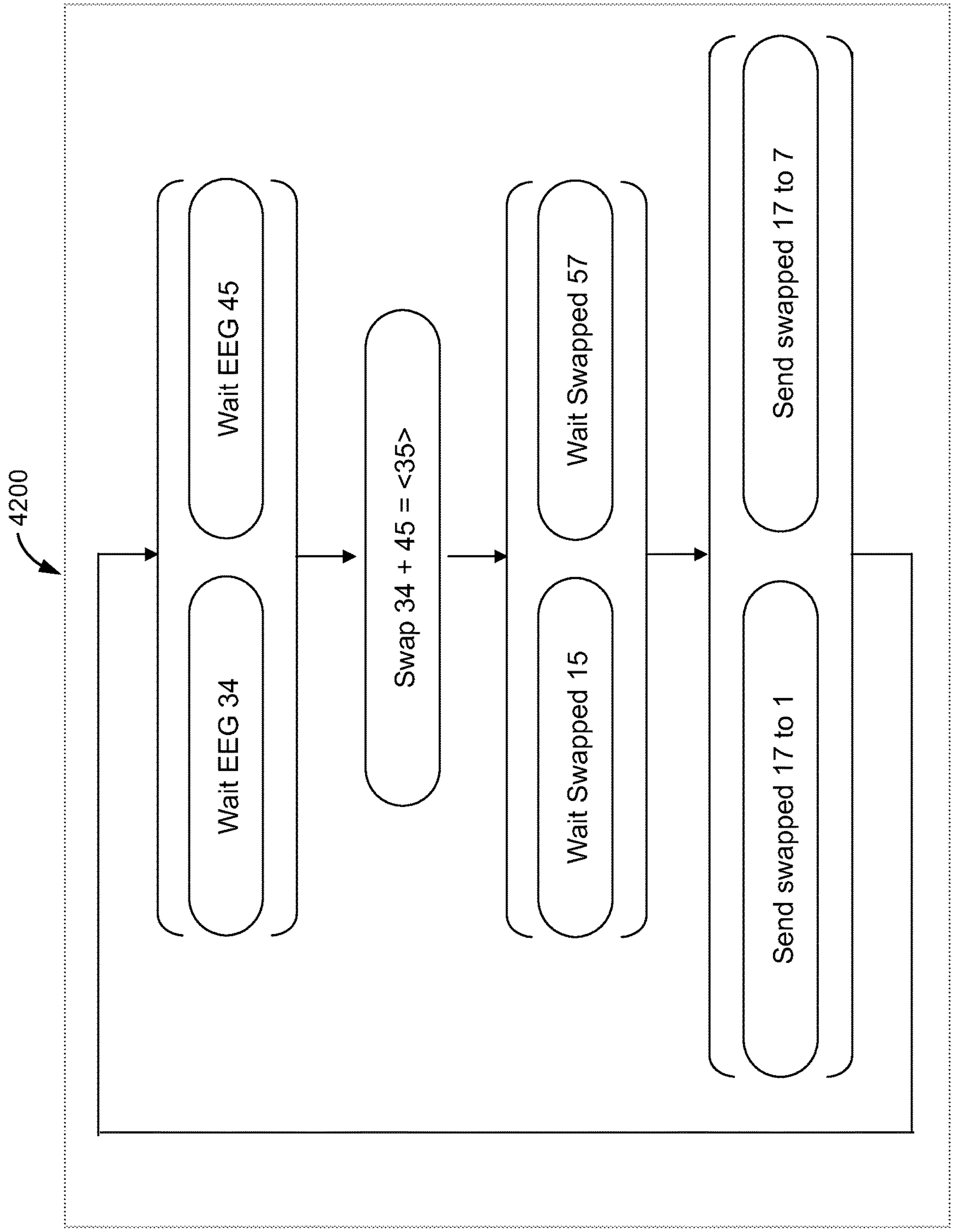
FIGS. 42-43 are FSM transition diagrams for example FSMs.

FIG. 42 shows an example subset of FSM states 4200 and transitions among the FSM states 4200 associated with execution of an FSM (finite-state machine) at a node, wherein the FSM is adapted to perform greedy swapping and comprises a state including both "Wait EEG 34" and "Wait EEG 45". After elementary entanglement generation generates entangled pairs 34 and 45, the FSM 4200 transitions to a state "Swap 34+45=<35>" wherein a swap operation results in an entangled pair <35>. Here, the swap operation results in <35> rather than 35 because greedy swapping is utilized, such that nodes further down the A-side of Node 3 and/or nodes further down the B-side of Node 5 may be entangled after the swap operation. The FSM 4200 then transitions to a state including both "Wait Swapped 15" and "Wait Swapped 57", and, upon receiving confirmation that the respective swaps have occurred, transitions to a state including both "Send swapped 17 to 1" and "Send swapped 17 to 7".

31. Tracking Fidelity 31.1 Estimating End-to-End Entanglement Fidelity

The swapping FSMs, in coordination with a Fidelity Estimation Unit, may also be responsible for providing an estimate of the fidelity of the delivered entanglement. In some implementations, the estimated fidelity may need to account for:

1. Noise introduced in elementary entanglement generation.

2. Spontaneous decoherence in qubit memories as a result of the passage of time (T1 and T2 decoherence times) while waiting to perform an entanglement swap.
3. Noise due to gates and storage during the entanglement swap.

Item (1) can be accounted for by the elementary entanglement generation protocol and the estimated fidelity provided in an Entanglement-Created event. As will be shown, in some examples the swapping protocol may be devised to handle items (2) and (3).

Each Entanglement-Created event may contain a timestamp at which the entanglement was created as well as an initial fidelity estimate of the entanglement at the time specified by the timestamp. When a network node performs an entanglement swap, it can use the timestamps, fidelity estimates, and knowledge of the two entanglements used for the entanglement swap to construct a new fidelity estimate for the entanglement produced by performing the swap.

To achieve this, the Fidelity Estimation Unit, which is configured to manage information associated with the noise characteristics of the quantum gates and measurements performed on local storage qubits, as well as the decoherence behavior of each storage qubit, may be utilized. For the swapping protocol, the decoherence behavior describes how an entanglement stored in the storage qubit decoheres as a function of time.

The Fidelity Estimation Unit may represent the decoherence behavior of each storage qubit in the form of a function F (t) (referred to as a fidelity curve) which computes the fidelity of an initially perfect (fidelity=1) entanglement that has been stored in the storage qubit for some time t. Each fidelity curve F (t) is associated with an inverse function $F^{\{-1\}}(F)$ (referred to as an inverse fidelity curve) which computes the amount of time an initially perfect entanglement has been stored for, given its current fidelity.

To compute the fidelity estimate of an entanglement produced by performing an entanglement swap, the network node first computes "pre-swap" estimates for the fidelity of each entanglement used in the entanglement swap. To compute a "pre-swap" fidelity estimate $F_{pre\text{-}swap}$, the network node determines the time delta $t_{\{store\}}$ between the creation timestamp $t_{\{create\}}$ of the entanglement and the time $t_{\{swap\}}$ at which the entanglement swap was performed. Using the initial fidelity estimate $F_{\{create\}}$ corresponding to the time $t_{\{create\}}$, the pre-swap fidelity estimate of the entanglement may be computed as:

$$F_{\{pre-swap\}} = F\left[t_{\{store\}} + F^{\{-1\}}(F_{\{create\}})\right],$$

By using the appropriate choice of F (t) and $F^{\{-1\}}(F)$ based on the storage qubit holding the entanglement, as specified in the Entanglement-Created event.

The fidelity curve F (t) may be represented as an exponential function $Ae^{Bt}+C$ where A, B, and C are chosen to lower-bound and closely approximate the fidelity of an initially perfect entanglement that is stored for some amount of time t. For example, the fidelity curve for a storage qubit that experiences purely depolarizing noise may be modeled as $$F_{depol}(t) = \frac{3}{4}e^{-\frac{t}{T}} + \frac{1}{4},$$

where T is the characteristic decay rate that describes the rate at which decoherence reduces the fidelity of the entanglement.

A fidelity curve F (t) of the form $Ae^{Bt}+C$ may be determined for a storage qubit by performing quantum state tomography on entanglement stored in the qubit for varying amounts of storage time and using software to determine A, B, and C that produce a curve which fits a plot of the empirically discovered fidelity as a function of time. In some implementations, the Fidelity Estimation Unit can be configured to perform repeated sets of quantum state tomography measurements performed at the node using the storage qubit to update the fidelity curve that characterizes the reduction in fidelity over time for that storage qubit. The parameters A, B, and C may then be modified based on these measurements to provide the corresponding lower-bounding behavior to be used until the next set of quantum state tomography measurements. Alternatively, a single set of quantum state tomography measurements can be taken and used for an arbitrary amount of time during operation of the network. Given a fidelity curve F (t)=$Ae^{Bt}+C$ the inverse fidelity curve is $$F^{-1}(F) = \frac{\log\left(\frac{(F-C)}{A}\right)}{B}.$$

Computing the "pre-swap" fidelity of each entanglement accounts for item (2), where reduction in fidelity occurs due to spontaneous decoherence in storage. We will refer to the "pre-swap" fidelity estimates of the A- and B-side entanglement as $F_{psA}$ and $F_{psB}$ respectively. The computed "pre-swap" estimates may then be updated to account for noise introduced due to quantum operations and measurements that realize the entanglement swap. Each (quantum gate, storage qubit) pair may be associated with a fidelity reduction function $F_R(F_e)$ which computes an estimate of the post-gate fidelity of an entanglement with initial fidelity $F_e$. Similarly, a measurement of a storage qubit is also associated with a fidelity reduction function $F_R(F_e)$ that computes an estimate of the fidelity of an entanglement that is measured which has had its fidelity reduced due to noise introduced during the measurement.

$F_{psA}$ and $F_{psB}$ can be updated. For example, suppose a gate-based entanglement swap is performed by performing a Bell state measurement that is implemented by a CNOT gate between the storage qubits holding the A- and B-side entanglements followed by a Hadamard gate on the A-side storage qubit and a measurement of both storage qubits.

Let the CNOT gate be associated with fidelity reduction curve $F_{R,CNOT}(F_e)$, the Hadamard gate associated with fidelity reduction curve $F_{R,H}(F_e)$, and the measurements associated with fidelity reduction curve $F_{R,MEAS}(F_e)$. $F_{psA}$ and $F_{psB}$ are updated in the following way:

$$F'_{psA} = F_{R,MEAS}(F_{R,H}(F_{R,CNOT}(F_1)))$$

$$F'_{psB} = F_{R,MEAS}(F_{R,CNOT}(F_2)))$$

In the case that the Bell state measurement is realized with optical components (e.g., beamsplitters and photon detectors), the operation performed may be viewed as a measurement which has a fidelity reduction function applied with no additional fidelity reduction functions corresponding to gates. The physical implementation of performing the entanglement swap may include periods of time where storage qubits decohere between the application of operations. In this case, one may apply the fidelity curves described above to account for decoherence between operations.

Fidelity reduction functions $F_R(F_e)$ may be determined empirically by performing quantum state tomography on an entanglement with varying fidelity that has had the quantum gate or measurement applied to it. Alternatively, the noise introduced by the quantum gate or measurement may be modeled by a fidelity curve F (t) and inverse fidelity curve $F^{-1}(F)$, in addition to a parameter $t_{op}$ that describes the fidelity reduction introduced in applying the fidelity curve F (t). The fidelity reduction function may then be computed as:

$$F_R(F_e) = F\left[t_{op} + F^{-1}(F_e)\right].$$

The Fidelity Estimation Unit may provide a final function, $$F_{\{SWAP\}}(F'_{psA}, F'_{psB}),$$

which estimates the post-swap fidelity of an entanglement produced by swapping entanglement with fidelities $$F'_{psA} \text{ and } F'_{psB}.\ F_{\{SWAP\}}(F'_{psA}, F'_{psB})$$

strictly accounts for the inherent loss in fidelity due to swapping imperfect entanglement and does not account for any noise introduced by quantum operations and measurements that are used on the storage qubits holding the entanglement.

$$F_{\{SWAP\}}(F'_{psA}, F'_{psB})$$

may be determined empirically using quantum state tomography as was the case for the fidelity curves and fidelity reduction curves described above or by using a function of the form $$AF'_{psA}F'_{psB} + B(1 - F'_{psA})(1 - F'_{psB})$$

where A and B may be chosen to lower-bound and closely approximate the true behavior of the entanglement swap. One example approximation uses a formula:

$$F_{\{SWAP\}}(F'_{psA}, F'_{psB}) = F'_{psA}F'_{psB} + \frac{1}{3}(1 - F'_{psA})(1 - F'_{psB})$$

which applies to the case that the entanglement used is of the Werner form corresponding to a worst-case noisy state.

When a network node performs an entanglement swap, it may include an estimate of the post-swap entanglement fidelity within the Swapped message that is sent to other nodes according to the schedule. Network nodes that originate a Swapped message (in some examples, such nodes do not wait for a Swapped message from any other node in the network before sending their own) may compute the post-swap fidelity estimates using the fidelity estimate of the elementary entanglement used in the swap. However, a network node that waits for a Swapped message on one (or both) of its sides before sending its own Swapped message may use the post-swap fidelity estimate in place of the fidelity estimate provided in the Entanglement-Created notification for the elementary entanglement on the side(s) the Swapped message(s) was received.

When the final Swapped message reaches the end nodes receiving the end-to-end entanglement, the post-swap fidelity estimate included in the Swapped message may be updated to account for the noise introduced due to storing the entanglement at the end node for the time duration until the final Swapped message is received, producing the final fidelity estimate for the end-to-end entanglement delivered to the end nodes. This may be performed using fidelity curves and inverse fidelity curves, as outlined previously for handling item (2) at the intermediate repeater nodes.

31.2 Discarding Decohered Entanglement

To provide end-to-end entanglement of sufficiently high fidelity, the entanglement swapping protocol may choose to discard elementary entanglement that has decohered for too long and its fidelity has fallen too low to satisfy the desired end-to-end entanglement fidelity. For example, in some implementations, the desired end-to-end entanglement fidelity may be determined based at least in part on a user application and may be used to determine fidelity threshold(s). This fidelity threshold information can be provided down the stack, and may originate from the controller (e.g., at the time of determining virtual channels). The fidelity curve above may also be used to determine how long an elementary entanglement may be stored for before it has fallen below an acceptable threshold $F_{Th}$.

To achieve this, a network node may compute a time delta $t_{\{timer\}}=F^{-1}(F_{Th})-F^{-1}(F_{create})$ and set a "decoherence timer" that notifies the swapping protocol at timestamp $(t_{\{discard\}}=t_{\{create\}}+t_{\{timer\}})$ to discard the elementary entanglement if it is still stored, $t_{\{timer\}}$ corresponds to the amount of time it takes for an entanglement with fidelity $F_{create}$ to decohere until it has a fidelity of $F_{Th}$. If the timer triggers at $t_{\{discard\}}$ and the entanglement is still held within the quantum memory, then it is discarded and the qubit memory is freed back to the elementary entanglement generation protocol. The timer may also trigger emission of real-time classical Entanglement-Lost messages to recover from failure scenarios, which are addressed in a later section.

While a decoherence timer can be set to trigger a discard of the entanglement once its estimated fidelity falls below an acceptable threshold $F_{Th}$, other fidelity thresholds and associated timers may be set to trigger other sets of actions (e.g., an error correction routine, a round of entanglement purification). More details on the establishment of and interaction between multiple fidelity thresholds and their associated timers are addressed in section 31.4.

31.3 Dynamic Recalculation of Estimated Fidelity

It may be the case that performing operations on one (or more) other storage qubits (which are not managed by the swapping protocol) introduces noise and decoheres storage qubits in the underlying hardware that hold entanglement used by the swapping protocol (i.e., crosstalk noise). When such an operation is performed, the fidelity estimates and timers for entanglement in effected storage qubits may also be updated according to fidelity reduction functions and fidelity curves.

To achieve this, the Fidelity Estimation Unit may contain additional information on crosstalk noise from quantum gates and measurements. Crosstalk noise is noise introduced on local qubits that are not the direct target of a quantum gate or measurement. For example, a device may execute a Hadamard gate on one storage qubit, which introduces noise on a different storage qubit and reduces the fidelity of an entanglement stored therein. The Fidelity Estimation Unit may contain additional fidelity reduction functions which update the fidelity estimate of an entanglement to account for crosstalk. When such crosstalk noise is introduced, the decoherence timer may be updated. Suppose that a stored entanglement with initial fidelity $F_{\{create\}}$ at timestamp $t_{\{create\}}$ has a timer delay of $t_{\{timer\}}$ which notifies the swapping protocol at timestamp $t_{\{discard\}}=t_{\{create\}}+t_{\{timer\}}$. Suppose further that a gate is applied to a storage qubit at some timestamp $t_{\{gate\}}$ which introduces crosstalk noise on the aforementioned stored entanglement while it was stored (that is, $t_{\{create\}}<t_{\{gate\}}<t_{\{create\}}+t_{\{timer\}}$). To update the decoherence timer, the node computes the "pre-crosstalk-noise" fidelity of the stored entanglement, applies the fidelity reduction function for the crosstalk noise, and then computes the remaining time on a new timer:

$$F_{\{pre-crosstalk-noise\}} = F\left[t_{\{gate\}} - t_{\{create\}} + F^{-1}(F_{\{create\}})\right]$$

$$F_{\{post-crosstalk-noise\}} = F_{R,crosstalk}(F_{\{pre-crosstalk-noise\}})$$

$$t_{new-timer} = F^{-1}(F_{Th}) - F^{-1}(F_{post-crosstalk-noise})$$

The new timer should then trigger at time $t_{\{new-discard\}}=(t_{\{gate\}}+t_{\{new-timer\}})$. This technique may be used to additionally account for other sources of noise that the network node may identify, such as noise introduced during the elementary entanglement generation process.

31.4 Setting Multiple Thresholds

In addition to setting timers which trigger the discarding of entanglement that has decohered too much to satisfy the desired end-to-end entanglement fidelity, timers may additionally be set to trigger the execution of purification to increase the fidelity. This may be done so that a stored entanglement may be kept in the quantum memory for a longer amount of time while waiting for the entanglement in the other quantum memory to become available for performing an entanglement swap.

For this, a network node may set a timer to trigger when the fidelity has reached a fidelity threshold $F_{Th,purify}$ and purification should be performed. Such fidelity thresholds for purification should be larger than the fidelity threshold for discarding an entanglement, as an entanglement cannot be purified if it is no longer located within the quantum memory. The timer may be calculated similarly to the previously described timer which triggers discarding of entanglement. This timer may also be updated to account for any crosstalk noise introduced.

If a timer triggers and there is an insufficient number of stored entanglements in order to perform purification, the network node may be configured to ignore purification or it may be configured to do so as soon as additional entanglements become available to enable purification. Upon performing purification, a new fidelity estimate for the now-purified entanglement may be calculated, and new timers that trigger purification or discarding of the entanglement may be computed based on the new fidelity estimate. In some implementations, it is the controller that configures the nodes to manage timers and perform associated actions (e.g., determining how timers trigger actions based on comparison of timers to thresholds, and determining what actions to perform based on predetermined rules).

In some implementations, the expiration of a timer may be mapped to trigger an action, or multiple actions, from a set of actions. The choice of triggered action(s) may depend on local state information, and/or a set of rules or instructions configured by the controller. The controller may install such rules or instructions based on user request information, network state, resource availability, network fairness or utility metrics, and/or observed telemetry from monitoring. For example, a timer can be set to expire when the estimated fidelity of an entanglement decoheres below a threshold of $F_{Th,QEM}$. Upon expiration, that timer may trigger one or more quantum error mitigation routines from a larger family of appropriate quantum error mitigation circuits. If the controller has been routinely monitoring the performance of the associated physical link(s) or node(s) and observes a common error syndrome, the controller may configure the local node to trigger a quantum error mitigation circuit that is tailored to mitigate the effects of most detrimental observed error when its local timer expires.

A timer expiration may also trigger the transmission of classical messages, the setting of new thresholds and timers, and/or the adjustment of existing thresholds and timers. Certain actions may be triggered with the intention of improving the fidelity of an existing entanglement (e.g., via a purification routine), but are stochastic in nature and may actually result in a decrease in estimated fidelity if unsuccessful. In such a case with unsuccessful purification, another fidelity threshold for triggering purification may be increased or established with the intention of triggering another attempted round of purification before reaching the discard threshold. In cases where the purification or error mitigation routine is successful in improving the estimated fidelity of the entanglement, another fidelity threshold may be decreased to avoid running another round of resource-intensive purification or error mitigation.

The involvement of the controller in the dynamic installation and configuration of multiple fidelity thresholds, timers, and their associated actions is valuable for efficient operation and management of a robust quantum network system. As different actions may take different amounts of time or resources to run, the nodes, in conjunction with the controller, may use these timers and configurations effectively to preserve and improve overall network reliability, fairness, and performance (e.g., end-to-end entanglement fidelity, end-to-end entanglement generation rate).

32. Handling Entanglement Decoherence 32.1 Motivation and Assumptions

During the process of creating end-to-end entanglement to meet the requests of the virtual circuit (VC) demand database, many elementary and non-elementary entanglements may be consumed by the swapping protocol in order to distribute long-range entanglement across the network. To create end-to-end entanglement between the hosts of an N-node path, the swapping protocol may need to consume $\Omega(N)$ entanglement pairs. In the era of non-deterministic photon sources, diverse quantum hardware platforms with differing noise models, and varying link distances, as the network develops more complexity, it becomes rapidly more probable that at least one entangled pair of qubits will decohere beyond recovery as it is waiting to be consumed by a swapping protocol FSM instance. There are factors which negatively impact the entanglement fidelity other than the idle passage of time, such as gate noise. An analysis of the impact of these factors on entanglement fidelity has been disclosed herein, which may allow for the following assumptions to be achieved:

(1) The estimated fidelity metric and its tracking is robust and accurate enough to determine with a high degree of confidence whether an entanglement pair has sufficient fidelity for consumption via entanglement swapping.

(2) A fidelity threshold $f_{min}$ is predetermined by some external entity (e.g., the SDN controller) such that, at any point in time, if the estimated entanglement fidelity of a pair of qubits falls below $f_{min}$, that entanglement is deemed unusable for the creation of end-to-end entanglement based on the Virtual Circuit Service Request and associated Quality of Service (QOS) parameters.

(A) Note that the singular notation of $f_{min}$ used herein is for explanation purposes. In reality, calculation of f min may be link-dependent (e.g., set a higher threshold for elementary links and a lower threshold for longer-distance links). Each node may have a pre-installed table for all the links it should expect to deal with based on the predetermined swapping schedule. This threshold table may also be (logically) installed by the SDN controller.

(3) Nodes running the swapping protocol have the ability to detect in real-time when an entangled pair associated with said node falls below the estimated fidelity threshold $f_{min}$. This may be done via a set of decoherence timers.

(4) If the estimated fidelity of an entangled pair falls below $f_{min}$, the protocol may determine the pair is beyond fidelity recovery (e.g., by purification) and the entanglement may be reestablished. In general, two thresholds per link, one triggering purification and another triggering restart, may be used. For explanation purposes, it is assumed that falling below the fidelity threshold triggers a complete reestablishment of the entanglement.

32.2 Entanglement-Lost Messages

To adapt our swapping protocol to handle decohered entanglements, a new type of classical message may be used: the Entanglement-Lost (EL) message. The EL message may contain an entanglement identifier, signifying the entanglement link that was lost, as well as the entanglement sequence number and virtual circuit associated with that lost link. The following table shows some of the fields within an example EL message, with an indication of which fields are "required" or "optional" in this particular example message format:

TABLE 3

Fields of an Entanglement-Lost message

| Field | Description |
|---|---|
| Entanglement Identifier (required) | Qubit identifiers and entanglement sequence number indicating which physically entangled qubit pair was lost |
| Virtual Circuit Identifier (required) | Identifier for the associated virtual circuit (used for determining which FSM instances to dispatch the EL event to) |
| Delay (optional) | Optional delay indicating when to start the entanglement regeneration process |
| Authentication (required) | Material for verifying the identity of the sending node |

Due to the probabilistic nature of quantum hardware, channel loss, and the quantum operations that underpin quantum network protocols, attempts at establishing end-to-end entanglement may often be unsuccessful. To recover from such system failures such as qubits being lost, entanglement swaps being unsuccessful, or qubits decohering below a useful fidelity threshold, the controller subsystem may configure the quantum network protocol stack to automatically reattempt elementary entanglement generation. As many subprocesses of quantum networking protocols rely on photon interference to establish and distribute entanglement, subsystems my require photons to be substantially indistinguishable and substantially synchronized. Thus, to generate high-fidelity end-to-end entanglement, it may be beneficial to synchronize the establishment (and re-establishment) of elementary entanglement on local links. Such synchronous establishment of entanglement may further improve photon interference, mitigate decoherence, enable higher-fidelity swapping operations, prevent throughput bottlenecks, and result in higher-fidelity end-to-end entangled pairs. One way to increase (or in some cases maximize) the probability of synchronous establishment of nearby elementary entanglements is to specify an entanglement regeneration delay value in the EL message, as described in Table 3. If appropriately configured and specified by the controller subsystem, a node receiving an EL message may intentionally delay the time to attempt generation of a new elementary entanglement with its respective neighboring node. It may be the responsibility of the controller subsystem to calculate, install, and update such delay values in the appropriate protocol subsystem(s). The controller subsystem may take into account network state, network information, topology, performance characteristics, hardware capabilities, and real-time telemetry/metrology to calculate and install delay values. The controller subsystem may use classical processing units, graphical processing units, and/or quantum processing units to calculate such values. The controller subsystem may run these calculations using mathematical, analytical, simulation, Bayesian, and/or machine learning algorithms to calculate entanglement regeneration delays. Such algorithms may use experimental telemetry/metrology data to iteratively adjust delays with the objective of maximizing aggregate network performance, utility, and/or fairness.

32.3 FSM Definition for Generalized Routers

This swapping protocol FSM may be defined from the perspective of a generalized router named Bob. Bob's initial state is to wait for an A-side (left-side) entanglement (LSE) and a B-side (right-side) entanglement (RSE) to be established with sufficient fidelity. The LSE (RSE) is an entanglement with some node to the left (right) of Bob, named Alice (Charlie), who can be at least one hop away from Bob. Along a preferred path, Bob conducts a swap in order to establish high-fidelity long-range entanglement between Alice and Charlie. For simplicity in definition, the arrival events, labeled 1-4 in FIG. 43, may be abstracted. In reality, these arrival events can be one of two things: 1) an arrival of an elementary Entanglement-Created event from the EEG layer, or 2) an arrival of a Swapped message from a remote node indicating the establishment of a non-local entanglement with a qubit on Bob. In this definition, we assume a special case of the router with only two ports (quantum repeater) and note that the generalization to two-dimensional routers and management of concurrent VCs is out of scope of this initial definition.

32.4 Transitions

Figure 43:
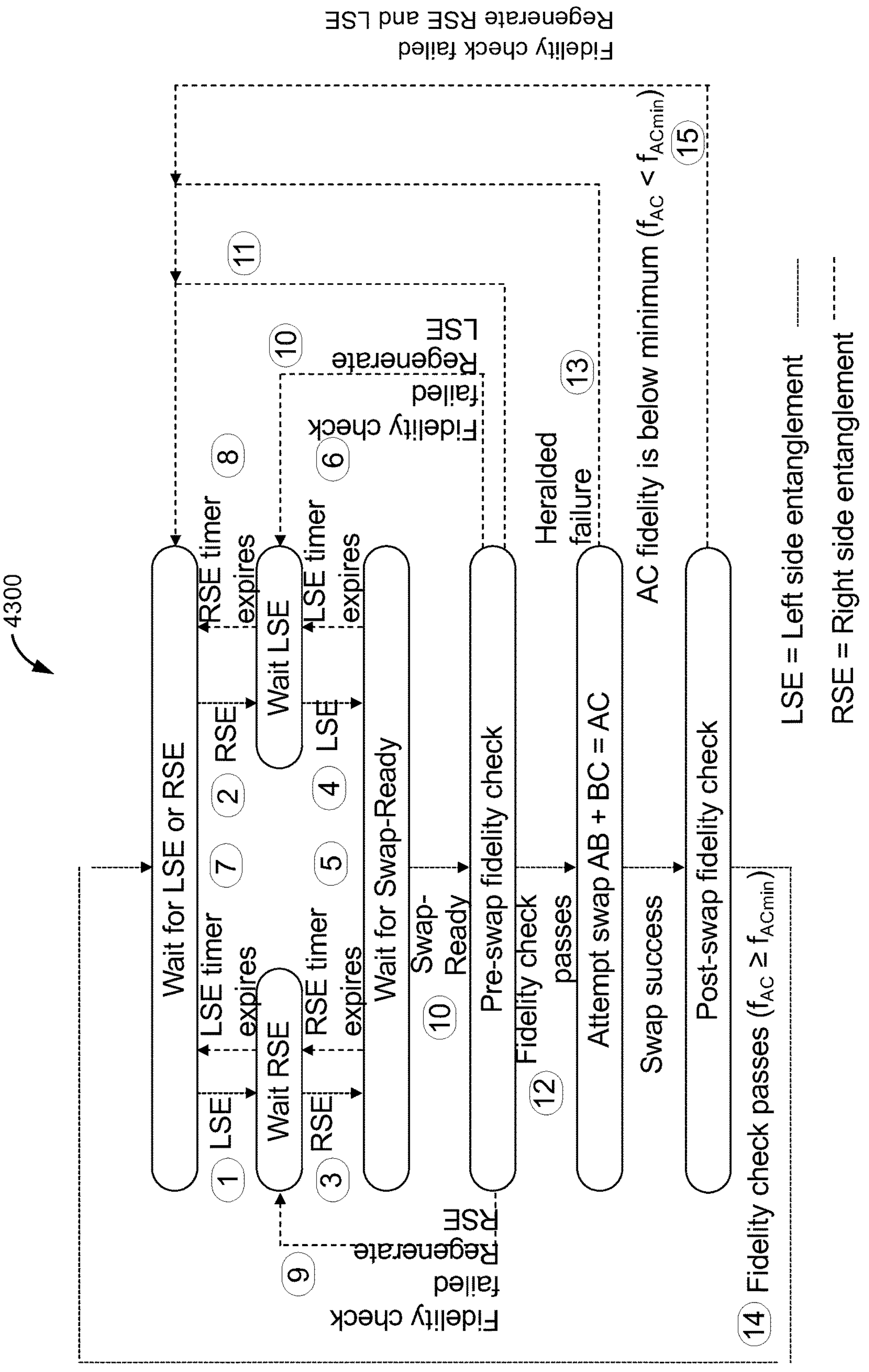

FIG. 43 shows an example generalized finite-state machine 4300 at a node, wherein the generalized finite-state machine 4300 includes a Swapping Protocol on a repeater. Transitions from received Entanglement-Lost (EL) messages are omitted. This example FSM 4300, including the following description of the numbered transitions in FIG. 43, is just one illustrative example. Other examples can include other states and/or transitions, or can omit states and/or transitions (e.g., the pre-swap fidelity check can be omitted in some examples).

1. LSE: based on the predefined swap schedule, this transition will be triggered by either the receipt of an elementary Entanglement-Created event with Alice or a Swapped message indicating non-local entanglement has been established between qubits on Alice and Bob.
   Actions: In the payload of the LSE event, Bob has enough information (timestamp of establishment of LSE, initial fidelity estimate, and $f_{min}^{LSE}$) to calculate the acceptable coherence time of LSE. As part of this transition, Bob will use the fidelity tracking mechanism to start a decoherence timer with the appropriate duration.
2. RSE: conversely analogous to transition 1.
3. RSE: same as 2, but with the additional action of scheduling a swap operation on the router via the Local Swap Scheduler. The Local Swap Scheduler will be responsible for managing the usage of the shared qubit pair amongst potentially several VCs. For example, access to a pair of non-entangled quantum elements serving as qubit memories at a node may be shared based at least in part one or more of quality of service requests associated with the virtual circuits, or hardware properties of links affecting a quality of the link (e.g., lower quality links may need more attempts before achieving success and thus may be allocated a larger fraction of time to access the quantum elements).
4. LSE: same as 1, but with the additional action of scheduling a swap operation on the router via the Local Swap Scheduler.
5. RSE timer exp.: This transition is triggered by the local RSE timer expiring while waiting for the Swap-Ready event from the Local Swap Scheduler (described later in the application), indicating that the RSE has decohered beyond its minimum estimated fidelity threshold. At this point, the LSE timer is still running.
   Actions: Bob emits an internal Delete-Swap-Request event to the Local Swap Scheduler. Bob releases ownership of the right-side qubit to the EEG layer. Bob sends an $EL_{RSE}$ message to Charlie in order to regenerate the RSE. In this example, it is a requirement that the $EL_{RSE}$ message must be relayed along the same routing sub-path that was used to establish RSE in the first place, so that each relay node can determine their next set of actions based on the $EL_{RSE}$ message and the predetermined swap schedule. Bob deletes the RSE timer. To enhance performance, the protocol may additionally request that a new LSE be regenerated via the left-side EEG layer, but it is not required for correctness.
6. LSE timer exp.: Conversely analogous to transition 5.
7. LSE timer exp.: This transition occurs when the LSE timer expires while waiting for RSE to be established, returning the FSM back to the initial state in which Bob is waiting for both sides.
   Actions: Bob releases ownership of the left-side qubit to the EEG layer. Bob sends an $EL_{LSE}$ message to Alice in order to regenerate the LSE. As with all EL messages, it can be relayed along the same routing sub-path that was used to establish the LSE in the first place. Bob deletes the LSE timer. To enhance performance, the protocol may additionally request that a new RSE be regenerated via the right-side EEG layer, but it is not required for correctness.
8. RSE timer exp.: Conversely analogous to transition 7.
9. FAIL and regen. RSE: this transition occurs when the pre-swap fidelity check determines that the RSE does not have sufficient fidelity to carry out the swap and decides it must be regenerated, while choosing to maintain the LSE in storage.
   Actions: Bob releases ownership of the right-side qubit to the EEG layer. Bob sends an $EL_{RSE}$ message to Charlie in order to regenerate the RSE. Bob deletes the RSE timer (if any).
10. FAIL and regen. LSE: Conversely analogous to transition 9.
11. FAIL and regen, both sides: this transition occurs when the pre-swap fidelity check determines that the estimated LSE and RSE fidelities are not sufficient to carry out the swap operation, and they both must be regenerated.
    Actions: Bob releases ownership of the left- and right-side qubits to the EEG layer. Bob sends out an $EL_{LSE}$ message to Alice and an $EL_{RSE}$ message to Charlie. Bob deletes any running timers. There may be a major performance benefit in synchronizing the regeneration of both LSE and RSE such that they are re-established within a short time window, as this increases the probability of the preferred path through the FSM, and thus the entanglement generation rate (EGR) and fidelity of the end-to-end entanglement. This synchronization may be complex, as it depends on the expected time to regenerate LSE and RSE, which itself depends on link distance, number of hops, and link fidelity. There are two options for managing the timing of the regeneration attempts: 1) add predetermined delays to the emission of one of the EL messages, or 2) simultaneously emit both EL messages, but include extra metadata informing the relay nodes when they should start regeneration. The calculation of these delays may be based on a combination of theoretical analysis, statistical models, and/or machine learning, for example.
12. PASS: this transition occurs when the pre-swap fidelity check determines that the estimated fidelities of the LSE and RSE are sufficient enough to proceed with the swap operation.
    Actions: Emit an internal event to the Local Swap Scheduler to proceed with the swap immediately.
13. Heralded failure: this transition occurs when the swap operation was heralded unsuccessful.
    Actions: Bob deletes any running LSE/RSE timers. Bob emits Swap-$Failed_{AC}$ messages to Alice and Charlie. Bob re-requests elementary entanglement. All Swap-Failed messages fall under the same routing constraint as the EL messages.
14. $f_{AC}>=f_{min}^{AC}$: this transition occurs when the post-swap fidelity check passes and the long-range entanglement between Alice and Charlie is of sufficient estimated fidelity.
    Actions: Bob releases both the left- and right-side qubits back to the EEG layer. Bob sends Swapped AB+BC=AC messages to the output node(s) determined by the swap schedule, including a timestamp of when the AC entanglement was established along with its estimated fidelity.

15. $f_{AC}<f_{min}^{AC}$: this transition occurs when the post-swap fidelity check fails and the long-range entanglement between Alice and Charlie is of insufficient estimated fidelity.

Actions: Bob releases both the left- and right-side qubits back to the EEG layer. Bob sends $EL_{AC}$ messages to Alice and Charlie. Alternatively, the protocol may trigger a round of purification on the AC entanglement link.

32.5 Local Swap Scheduler

The Local Swap Scheduler, in conjunction with the controller via the controller-to-node north-south interface, may be responsible for managing the usage of shared qubit pairs amongst several VCs. After the router acknowledges that both of its entanglements have arrived and are being stored simultaneously, the FSM instructs the router gateware to conduct a swap as soon as possible. If the qubit pair is fully dedicated to service only a single VC, then this swap operation can be conducted immediately (as soon as the pre-swap fidelity check passes). In the general case, this singular dedication cannot be assumed. Therefore, there may be a Local Swap Scheduler, which is a piece of software running on the router's CPU that listens for requests from various FSM instances which could be associated with distinct VCs. It is possible that the qubit pair is being shared between multiple VC requests, and thus a mechanism for determining which VC gets to conduct a swap at a certain point in time may be utilized.

The algorithm for processing a priority queue of Swap-Requests may be left as a separate task and is related to the differing swapping protocol variations. These methods may also differ based on router type (e.g., elementary, hybrid, or long-range). The Local Swap Scheduler may also be generalized to handle requests to run any block of sequential atomic operations beyond swaps.

32.6 Pre-Swap Fidelity Check

The Pre-swap estimated fidelity check may be an integral factor to the entanglement generation rate and fidelity of the end-to-end entanglement. More specifically, this check may be triggered upon receipt of a Swap-Ready event from the Local Swap Scheduler and may be responsible for determining whether the LSE and RSE are of sufficient fidelity to carry out the swap operation. In cases where the check determines they are not of sufficient fidelity, there are two options: (1) regenerate (i.e., re-establish) entanglement on one side while storing the other, or (2) regenerate entanglement on both sides. The logic of this step may follow a simple set of rules, but it can give rise to a set of network design questions. In some implementations, the set of rules is installed in the network nodes by the controller.

32.7 Post-Swap Fidelity Check

The post-swap fidelity check may calculate an updated estimated fidelity based on the pre-swap LSE and RSE estimated fidelities, the duration of the swap operation itself, and any other operational noise associated with the swap execution. Assuming the post-swap estimated fidelity value of the newly-established long-range entanglement is sufficient, the post-swap fidelity estimate and the timestamp of when the swap was completed may be included in the outgoing Swapped AB+BC=AC message(s).

32.8 Global FSM Transition: Receiving an Entanglement-Lost Message

A global FSM transition can be triggered at any time, regardless of the currently active state. For visual simplicity, the global transition is not captured in FIG. 43, but in this example may be implemented in every Swapping FSM instance. The global FSM transition may be used for handling the receipt of a classical EL message. Swapping FSM instances running on nodes may require a set of actions to execute (e.g., do nothing and wait, release qubit(s), trigger a start of a new entanglement generation protocol, etc.) when they receive an $EL_{XY}$ message at any given time. Based on the node identifiers X and Y, nodes may need to reattempt entanglement generation with the correct node to reestablish the (potentially non-local) XY link.

32.9 Generalization to Hosts

Translating this Swapping FSM definition from router to hosts is simple, as hosts only wait on one Swapped message and deliver the entanglement to the next-higher layer. At this point, once a host receives the Swapped message, it may perform one last fidelity check (accounting for the time it took between the establishment of the end-to-end entanglement and the time it received the Swapped message) and conditionally deliver the entanglement to the next-higher layer. If the final fidelity check does not pass, the hosts may take note in a local log file, but take no action and let the swapping protocol restart on its own (i.e., just wait for the next end-to-end entanglement to be established).

33. Variations of the Swapping Protocol

Both quantum routers and quantum repeaters may run the swapping protocol. In the context of swapping protocols, for the sake of brevity the term "router" will be used instead of "quantum router or quantum repeater". In the following paragraph, different variations of the entanglement swapping protocol are described. Their behavior differs in various dimensions, such as when to perform swap operations, when to send messages, to which other nodes those messages are sent, and what actions to take upon receiving messages. These variations have a common goal of generating end-to-end entanglement.

A first dimension of variation is: scheduled swapping protocols versus bi-directional swapping protocols. In a scheduled swapping protocol, the controller pre-determines the order in which the nodes perform the swap operations. This pre-determined order is called the schedule. This schedule applies to all end-to-end entanglements that are generated on a given virtual circuit. The controller pushes the schedule down to the nodes in the virtual circuit using the controller-to-node north-south protocol. The nodes follow the swapping schedule computed by the controller and send swapping messages to the next node(s) as instructed in the schedule. In a bi-directional swapping protocol, the order in which the swaps are performed is not computed by the controller. Instead, it is fixed and implicit. The swapping starts at one side of the virtual circuit and progresses hop-by-hop towards the other side of the virtual circuit. For each end-to-end entanglement, the swapping process starts at one side of the virtual circuit. Each node sends Swapped messages to its neighbor node. Thus, the swapping process happens hop-by-hop from one side of the virtual circuit to the other side. For each end-to-end entanglement, two flows of such Swapped messages are exchanged: one that flows from the A-side to the B-side of the virtual circuit, and one that flows in the reverse direction from the B-side to the A-side of the virtual circuit. Hence the name bi-directional.

A second dimension of variation is: as-soon-as-possible (ASAP) swapping protocols (also known as greedy swapping protocols) and as-late-as-possible (ALAP) swapping protocols. To understand this dimension, consider that the swapping process involves two related steps. (1) There is the step of actually performing the physical entanglement swap on two qubit memories. (2) There is the separate step of sending control-plane east-west classical messages between nodes to coordinate the end-to-end swapping processes. These classical control-plane messages are for several purposes, including: (a) reporting whether the swap succeeded or failed. (b) exchanging entanglement identifiers that to track which qubit state on one node is entangled with which other qubit state on another node, (c) exchanging information needed for fidelity estimation and Bell state tracking, (d) reporting that a previously established entanglement has expired due to decoherence, etc., and (e) coordinating when to start or stop generating entanglement.

The two steps associated with the swapping process are closely related, but there is a degree of freedom in what exactly the relation is. Specifically, it is often possible the perform the physical swapping operation, step (1), before the classical messages have been exchanged, step (2), that allow the node to receive information about which entanglement is physically being created by that physical swap operation.

This reveals one important difference between as-soon-as-possible and as-late-as-possible protocols. In an as-late-as-possible (ALAP) swapping protocol, the physical swapping operation is performed after all classical messages have been received that inform the node of the full properties of the entanglements that are being swapped and the new entanglement that is being created by the physical swap operation (though not necessarily the absolute latest possible time the operation could be performed). In an as-soon-as-possible (ASAP) swapping protocol, the physical swapping operation is performed earlier, potentially before those classical messages have been received (though not necessarily the absolute earliest possible time the operation could be performed). During the interval of time between performing the physical swap and receiving the classical messages, there is a duration where the node lacks information about which entanglements, exactly, were swapped and hence what the resulting entanglement is.

To some extent, these two dimensions are orthogonal and all four combinations can be implemented, as shown in Table 4.

TABLE 4

Swapping protocol variations

| | As-late-as-possible (ALAP) | As-soon-as-possible (ASAP) |
|---|---|---|
| Scheduled (SCHED) | SCHED-ALAP | SCHED-ASAP |
| Bi-directional (BIDIR) | BIDIR-ALAP | BIDIR-ASAP |

However, there are some subtle interactions between the two dimensions. For that reason, the following paragraphs describe three of the four possible combinations: SCHED-ALAP, SCHED-ASAP, and BIDIR-ALAP.

For explanation purposes, when describing these variations, it is assumed that the virtual circuit has been established, that the route has been chosen by the controller, and that the necessary quantum and classical resources have been allocated to the swapping layer of the network stack. The example variations of the swapping protocol may make use of so-called swap-records to keep track of stateful information about the progress of an individual end-to-end entanglement generation process. A variety of other variations are also possible. For example, another dimension of variation is described below in Section 34.2 entitled "Terminating the swapping protocol" that describes an explicit-restart vs. implicit-restart round-triggering mechanism.

33.1 Scheduled as-Late-As-Possible (SCHED-ALAP)

The scheduled as-late-as-possible (SCHED-ALAP) variation is an example of a scheduled approach to the entanglement swapping protocol. Being a scheduled variation, it specifies a predetermined role that each router follows in the process of generating end-to-end entanglements. More specifically, based on the chosen route and swap schedule determined by the controller, each router is responsible for performing a swap operation on two qubits, one of which is a qubit entangled with a remote qubit on the A-side and the other of which is entangled with a remote qubit on the B-side. The scheduled determinism of the SCHED-ALAP variation lies in the fact that the two remote qubits are located at predetermined nodes.

To illustrate the concept of the SCHED-ALAP variation more concretely, consider a five-node chain, with Node identifiers 1 through 5, where the goal of the SCHED-ALAP entanglement swapping protocol is to generate entanglements between node 1 and node 5. The SCHED-ALAP variation will follow the following predetermined rules governing the behavior of nodes 2, 3, and 4. (1) Node 2 is responsible for swapping entanglements generated between node 1 and node 2 with entanglements generated between node 2 and node 3, thus generating entanglements between node 1 and node 3. (2) Node 4 is responsible for swapping entanglements generated between node 3 and node 4 with entanglements generated between node 4 and node 5, thus generating entanglements between node 3 and node 5. (3) Node 3 is responsible for swapping entanglements generated between Node 1 and Node 3 with entanglements generated between Node 3 and Node 5, thus generating entanglements between Node 1 and Node 5.

In addition to predetermining the Node locations of each of the entanglements to be swapped, the SCHED-ALAP approach may also enforce a scheduled sequence by which the routers carry out their swap operations. In the above example, with the SCHED-ALAP variation, before Node 3 is allowed carry out its swap, entanglements need to be established between Node 1 and Node 3, and Node 3 and Node 5. Moreover, before Node 3 can conduct its swap, those entanglements (13 and 35) need to be confirmed as established by Node 3 via the receipt of Swap-Success messages coming from Node 2 and Node 4 (i.e., the routers responsible for generating the two corresponding entanglements 13 and 35). This schedule implies that both Nodes 2 and 4 must carry out their swaps successfully, and send a Swap-Success message to Node 3. However, as there is no entanglement dependency in the between Nodes 2 and 4, they are permitted by the swap schedule to conduct their respective operations in parallel. Some properties of the SCHED-ALAP variation are that:

- Each SCHED-ALAP router has deterministic knowledge of the remote nodes that are associated with the entanglements it is responsible for swapping.
- Each SCHED-ALAP router has a predetermined set of up to two other routers such that the node must wait to receive a successful Swapped message from all nodes in that set before it can conduct its swap operation.
- Each SCHED-ALAP router has a predetermined set of nodes to send successful Swapped messages to, upon conducting a successful swap operation.
- Each SCHED-ALAP router has a predetermined set of nodes to send Swap-Failed messages to, upon conducting a failed swap operation.

The as-late-as-possible aspect of the SCHED-ALAP variation comes into play determining when the router conducts the swap operation: only after it has received Swap-Success messages from all other routers it is dependent on.

33.1.1 Handling Heralded Swap Failures in the SCHED-ALAP Variation

The SCHED-ALAP variation makes careful use of a swap schedule predetermined by the controller for router R, $S_R$, that contains the information $$S_R = (W, X, F),$$

where W is a (possibly empty) set of node identifiers telling the protocol that router R cannot proceed to carry out its entanglement swap operation until Swap-Success messages have been received from all nodes in W. Once router R receives all Swap-Success messages, it attempts an entanglement swap operation. If the operation is heralded as successful, router R sends Swap-Success messages (containing the relevant entanglement identifiers and metadata as specified in Section 21) to each node identifier in set X. However, if the entanglement swap operation was heralded as unsuccessful, router R must send a Swap-Failed message (containing the relevant entanglement identifiers and metadata) to each node identifier in set F.

Once a SCHED-ALAP router successfully generates elementary entanglements with both the A-side and B-side neighboring nodes, the SCHED-ALAP swapping protocol FSM proceeds into a state of waiting, in which the router is waiting to receive Swap-Success messages from all of the nodes in W. Let us assume that W is non-empty (if W is empty, then the SCHED-ALAP protocol FSM continues directly to carrying out the entanglement swap operation).

While in this waiting state, consider the case where router R receives a Swap-Failed message. The message contains metadata such as the entanglement identifier that was destroyed in the process of conducting a failed entanglement swap operation at some remote router. If the metadata of the message includes a final destination that is not router R, router R will propagate the message (with the same metadata) in the appropriate direction via the corresponding classical port. The message may be propagated along a portion of the same path identified by the virtual circuit. Regardless of whether router R propagates the Swap-Failed message, Router R will still process the contents of the Swap-Failed message. If the entanglement identifier in the message metadata pertains to an elementary entanglement that is either outdated or unknown to router R, we simply ignore the message, as it does not affect the entanglements that router R is currently storing in memory. However, if the identifier does in fact pertain to the current entanglements, router R takes the following actions:

1) Reset the quantum memory for the affected qubit, as it was previously storing an entanglement that router R now knows was destroyed.
2) Clear the decoherence timer associated with the affected qubit storing the entanglement that was destroyed, if not cleared already. (See Section 33.1.2 for more detail on decoherence timers)
3) Emit an internal event signal to other layer(s) indicating that the affected quantum memory has been reset and is now available for re-attempting elementary entanglement generation, and issue a request for generating elementary entanglement with the nearest neighbor on the affected side.

After taking these actions, the SCHED-ALAP protocol FSM returns to the initial state of waiting for the union of both entanglements to be generated. Though, because only one side of the entanglements was destroyed, and router R has yet to attempt its entanglement swap operation, the other side does not necessarily need to be regenerated. In this case, router R will either keep the unaffected entanglement in memory, or request a regeneration of a fresh entanglement on the unaffected side as well. The controller decides whether or not the partial recovery procedure is used on a given virtual circuit (e.g., by sending corresponding recovery instructions to a particular node). Either way, once router R has valid entanglements on both sides again, the SCHED-ALAP protocol FSM will proceed to the described waiting state.

Having defined the rules for how SHED-ALAP routers handle the receipt of Swap-Failed messages from other nodes, the actions and SCHED-ALAP protocol FSM transitions that router R takes when it conducts a failed entanglement swap operation may be described. In this example, assume that the router has received the required Swap-Success messages from all routers in W. The FSM then takes the action of attempting an entanglement swap operation. If the swap was heralded as unsuccessful, thus destroying the participating entanglements, router R takes the following actions:

1) Reset the quantum memories and other affected components (if necessary) for all qubits involved in the entanglement swap operation, as those qubits were consumed by the mere process of attempting an entanglement swap operation.
2) Clear all decoherence timers associated with the entanglements consumed by the entanglement swap attempt if they haven't been cleared already.
3) Emit an internal event signal to other layer(s) indicating that the affected quantum memories have been reset and are now available for re-attempting elementary entanglement generation, and issue a request for generating elementary entanglement with the nearest neighbors on both sides of router R. There is a caveat in this action: if the swap operation failed, then this regeneration request is issued immediately. However, if the swap operation was successful, there is a version of the entanglement swapping protocol that does not issue this regeneration request immediately and waits for an explicit Start message before issuing said request.
4) For each node identifier in F, send a Swap-Failed message with the appropriate metadata, including the appropriate entanglement identifiers and a timestamp of the attempted operation. Notably, each of these Swap-Failed messages need to be emitted in the correct direction in accordance with each destination node identifier in F and in this example must be propagated and processed via all intermediate nodes on the path to the destination node identifier.

However, if the attempted entanglement swap operation was successful, router R takes actions (1), (2), and (3), but instead of sending Swap-Failed messages as in action (4), router R sends Swap-Success messages to all node identifiers in X. These Swap-Success messages need not be propagated via intermediate nodes on the path, as the Swap-Failed messages do. In either case (i.e., swap success or failure), once the appropriate actions have been taken, the SCHED-ALAP protocol FSM returns to its initial state.

31.1.1.1 Generalization to Hosts

The host behavior may be significantly less complicated than the router protocols. Once elementary entanglement is established between a host and its associated penultimate node, the entangled qubit sits in quantum memory until either a Swap-Success message is received, indicating that the end-to-end entanglement has been established with the other host, a Swap-Failed message is received, indicating that the end-to-end entanglement failed and the elementary entanglement was destroyed in the process, or an Entanglement-Lost message is received, indicating that the entanglement stored at the host has decohered beyond recovery and needs to be regenerated. If a host receives a Swap-Failed message or an Entanglement-Lost message, it simply clears the memory and decoherence timer, and requests a new elementary entanglement with its associated penultimate node.

31.1.2 Handling Decoherence in the SCHED-ALAP Variation

As soon as router R successfully generates an elementary entanglement with a neighboring node and stores the entangled qubit in memory, it starts a decoherence timer that is set to expire at some point in time t in the future such that at time t, the expected fidelity of the entanglement dips below a specified fidelity threshold. How the fidelity threshold is calculated is out of the scope of this section, though for the purposes of explaining how the SCHED-ALAP variation handles decoherence, it suffices to say that when the timer expires, the entanglement is deemed unusable by the network, and should be discarded and not considered for further use. When an entanglement decoheres beyond recovery, all east-west entanglement swapping protocols (regardless of variation) may use the Entanglement-Lost (EL) message to ensure that the network can recover from decohered entanglements and continue in an automated fashion towards generating end-to-end entanglement.

31.1.2.1 Local Decoherence Timers Expiring on SCHED-ALAP Routers

How the SCHED-ALAP entanglement swapping protocol handles decoherence with timers associated with the fidelity tracking mechanisms is described below. First, the behavior is described from the SCHED-ALAP protocol FSM perspective when local decoherence timers expire (i.e., router R is the one transmitting EL messages). Then, it is described how the SCHED-ALAP protocol FSM on router R handles the receipt of EL messages from other nodes in the network. As there are different stages in the procedure of the SCHED-ALAP variation, the descriptions will go through each of the possible cases and scenarios in which local timers expire, and different points in time in which EL messages can be received.

In one example, before router R can proceed to the second state in the SCHED-ALAP protocol FSM (i.e., the state in which the router is waiting for Swap-Success messages, also referred to as Waiting State 2), router R must successfully generate elementary entanglement with both of its A-side and B-side neighbors (also referred to as Waiting State 1). It may be extremely likely that one side of the entanglement will be generated and stored in local quantum memory before the other side successfully generates its elementary entanglement. Thus, there may be an indefinite waiting period in which the first-established entanglement is decohering in local (and remote) quantum memories while waiting for the other side to be established. If this waiting period is too long, the first-established entanglement may decohere beyond recovery. Without loss of generality, assume that the A-side entanglement is the first-established entanglement and decoheres below the estimated fidelity threshold before the B-side elementary entanglement is established. Once the timer associated with the A-side entanglement expires, router R takes the following actions:

1) Send an EL message to router R's A-side neighbor with the appropriate metadata and entanglement identifier.
2) Clear the timer associated with the A-side entanglement so it is ready for re-initialization.
3) Reset the A-side quantum memory and possibly other components that were used for storing the entangled qubit that decohered.
4) Emit an internal event signal to other layer(s) indicating that the affected quantum memory has been reset and is now available for re-attempting elementary entanglement generation and storage, and issue a request for generating elementary entanglement with the A-side neighbor of router R.

Upon executing these actions, the SCHED-ALAP protocol FSM returns to the initial Waiting State 1. The SCHED-ALAP protocol FSM will loop through this process until both entanglements are established with sufficient fidelity and stored in local quantum memories before proceeding to Waiting State 2.

Once the SCHED-ALAP router protocol FSM proceeds to Waiting State 2, at this point both local qubits are decohering in quantum memories while router R is waiting for Swap-Success message(s). This is another indefinite amount of time router R will be sitting idle, thus another opportunity for entanglements to decohere below the estimated fidelity threshold. It may be extremely unlikely (if not impossible) that both timers will expire at the exact same point in time, so, without loss of generality, assume that the timer associated with the A-side entanglement expires first. It is important to note that at this point in the procedure, router R has not conducted an entanglement swapping operation, so if one side of the entanglement has decohered beyond recovery, the protocols assume there is no implication on the decoherence of the other entanglement, as they are independent systems that have yet to interfere with each other. Thus, once the timer associated with the A-side entanglement expires during Waiting State 2, router R takes the same actions (1)-(4), as described above, then returns to the initial Waiting State 1.

If all the required Swap-Success message(s) are received by router R during Waiting State 2 before either of the timers expire, then the SCHED-ALAP protocol FSM may proceed to attempt an entanglement swap operation. Regardless of outcome (success or failure of the swap operation), both timers are cleared and the SCHED-ALAP router protocol FSM subsequently returns to the initial Waiting State 1.

33.1.2.2 Receiving an Entanglement-Lost Message on a SCHED-ALAP Router

Having covered the behavior of SCHED-ALAP routers when entanglements decohere locally (i.e., router R is the node transmitting EL messages), the behavior of how SCHED-ALAP routers handle the receipt of EL messages from other nodes in the network may now be described. The conditional logic described below will leverage swap-records and entanglement identifiers. More detail on entanglement identifiers and swap-records can be found in this application. The actions and relevant SCHED-ALAP FSM router protocol state transitions are described sequentially below:

1) Perform a look-up in local classical memory to find the corresponding swap-record associated with the entanglement identifier contained in the EL message. This look-up will return either the current swap-record, an outdated swap-record, or no swap-record at all.

a. If the look-up operation could not find a corresponding swap-record, no subsequent actions are taken by the router beyond logging the received-EL event.

b. If the EL message pertains to an outdated swap-record, and router R had attempted an entanglement swap operation on the entanglements associated with that swap-record, router R will propagate the EL message to its opposite-side neighboring node in the path. Before it propagates the received EL message to its opposite-side neighbor in the path, router R updates any necessary entanglement identifier field(s) of the received EL message so that the neighboring node will be able to identify its corresponding swap-record with the correct identifier information.

c. If the EL message pertains to an outdated swap-record, but router R did not attempt an entanglement swap operation on the associated entanglements, router R simply ignores the received EL message after logging the received-EL event.

d. If the EL message pertains to the current swap-record, router R takes the following actions based on the state of the decoherence timer associated with the entanglement on the side the EL message was received: If the timer has not yet expired, and router R has yet to conduct an entanglement swap operation, it will effectively emulate the local decoherence timer expiring, just at an earlier point in time.

e. If the EL message pertains to the current swap-record, the router has not yet conducted an entanglement swap attempt, but the timer associated with the entanglement in the received EL message has already expired, router R simply ignores the received EL message after logging the received-EL event.

f. If the EL message pertains to the current swap-record, but router R has already attempted the entanglement swap operation, router R will propagate the EL message to its opposite-side neighbor. Before propagating the message, router R updates any necessary entanglement identifier field(s) of the received EL message so that the neighboring node will be able to identify its corresponding swap-record with the correct identifier information.

33.1.2.3 Generalization to SCHED-ALAP Hosts

To cover some or all classes of quantum network nodes, how hosts behave with respect to handling entanglement decoherence in the SCHED-ALAP variation is now described.

Once elementary entanglement is established between a host and a penultimate node, the host may start a decoherence timer for that entanglement. If that decoherence timer expires before the host receives a Swap-Success message indicating that end-to-end entanglement was established, the host may emit an EL message to its corresponding penultimate node with the necessary identifier information, reset the quantum memory associated with that entanglement, and subsequently request a new elementary entanglement with the penultimate node.

If a host receives an EL message, and the entanglement identifier pertains to the current swap-record, the host may take the same actions as described above. Otherwise, if the EL message pertains to an outdated swap-record, the host simply ignores the message.

33.2 Scheduled As-Soon-As-Possible (SCHED-ASAP)

The scheduled as-soon-as-possible (SCHED-ASAP) variation is an example of a scheduled approach to the entanglement swapping protocol that uses the greedy swapping approach. The SCHED-ASAP variation uses the swap schedule determined by the controller, such that each SCHED-ASAP router is responsible for doing a swap operation on two qubits, one of which is a qubit entangled with a remote qubit on the A-side and the other of which is entangled with a remote qubit on the B-side. Whereas, the SCHED-ALAP variation guarantees the two remote qubits are located at predetermined nodes, the SCHED-ASAP variation does not have this guarantee, as the location of the remote entangled qubits depends on the sequence in which SCHED-ASAP routers conduct their respective swap operations.

As the SCHED-ASAP variation is still a scheduled approach, while the protocol does not enforce a sequence of swap operations across the routers, it does enforce a scheduled sequence by which Swap-Success messages are communicated in the east-west protocol. Some of the main properties of the SCHED-ASAP variation are that:

1) Each SCHED-ASAP router has a predetermined set of up to two other routers such that the node must wait to receive a successful Swapped message from all nodes in that set before it has permission to send out its Swap-Success message.

2) Each SCHED-ASAP router has a predetermined set of nodes to send successful Swapped messages to, upon conducting a successful swap operation.

The as-soon-as-possible aspect of the SCHED-ASAP variation comes into play by determining when the router conducts the swap operation: as soon as the router has received elementary entanglements on all sides, the router may proceed with the swap attempt. If the attempt was successful, SCHED-ASAP routers can only send their Swap-Success message after they have received Swap-Success messages from all other routers they are dependent on.

33.2.1 Handling Heralded Swap Failures in the SCHED-ASAP Variation

The SCHED-ASAP variation makes careful use of a swap schedule predetermined by the controller for router R, $S_R$, that contains the information $$S_R = (W, X),$$

where W is a (possibly empty) set of node identifiers informing the protocol that router R cannot proceed to send out its Swap-Success message until Swap-Success messages have been received from all nodes in W. If the swap operation was heralded as successful and all required messages were received, router R sends Swap-Success messages (containing the relevant entanglement identifiers and relevant metadata) to each node identifier in set X. However, if the entanglement swap operation was heralded as unsuccessful, router R will send a Swap-Failed message (containing the relevant entanglement identifiers and metadata) to each of its neighbors in the chosen path.

Once a SCHED-ASAP router successfully generates elementary entanglements with both the A-side and B-side neighboring nodes, the router proceeds to conduct an entanglement swap attempt. If the swap failed, the router sends Swap-Failed messages to its neighbors, and returns to the initial state, generating a new swap-record and requesting another set of elementary entanglements. If the swap was successful, the SCHED-ASAP protocol FSM proceeds into a state of waiting in which the router is waiting to receive Swap-Success messages from all of the nodes in W. In this example, assume that W is non-empty (if W is empty, then the SCHED-ASAP protocol FSM continues directly to sending out Swap-Success messages to all nodes in X).

Having described how SCHED-ASAP routers handle local heralded swap failures (i.e., the router is originating the Swap-Failed messages,) how SCHED-ASAP routers handle the receipt of Swap-Failed messages may now be described.

1) Router R parses the received Swap-Failed message, and uses the contained information to do a look-up for the corresponding swap-record. If no swap-record is found, this indicates a single-sided delivery error, and sends EL message(s) to other nodes, effectively emulating a lost entanglement.
2) If the located swap-record (current or outdated) indicates that a successful swap operation was conducted on router R on the entanglement identified in the received message, router R will propagate the Swap-Failed message to the opposite-side neighbor from the port it received the message. Before it propagates this message, router R will update fields of the received Swap-Failed message with updated entanglement identifier information and other metadata to ensure that the next-receiving node will be able to find the corresponding swap-record.
    a. If the located swap-record is the current swap-record, the SCHED-ASAP protocol FSM transitions back to the initial state, clears associated quantum memory, and requests a new set of elementary entanglements with its neighbors.
    b. If the located swap-record pertains to the second-newest swap-record (i.e., pertaining to the last end-to-end entanglement attempt), and router R is operating with explicit-start round-triggering mechanism (see Section 34.2 for more details on round-triggering mechanisms), the protocol FSM transitions out of the state of waiting for any Start messages, and proceeds to requesting a new pair of elementary entanglements with its neighbors.
3) If the located swap-record is the current swap-record, and router R has not yet attempted an entanglement swap operation, router R will trigger a regeneration of elementary entanglement only on the side on which it received the Swap-Fail message, as the other entanglement was not affected by the remote failed swap. This is called "partial recovery" and is described herein.
    a. Alternatively, if the controller configures the protocol to instead conduct a full recovery procedure, router R will propagate the Swap-Failed to its opposite-side neighbor in the path (with updated message fields), and trigger a regeneration of elementary entanglement on both sides.
    b. Router R will clear the decoherence timers for all entanglements that are to be regenerated before proceeding to request new elementary entanglement (s).

33.2.1.1 Generalization to Hosts

The SCHED-ASAP host protocol behaves the same way as the SCHED-ALAP host protocol with respect to handling heralded swap failures.

33.2.2 Handling Decoherence in the SCHED-ASAP Variation

The SCHED-ASAP variation handles and recovers from decoherence in a different way than the SCHED-ALAP variation. This is due to the fact that the entanglement swap attempt happens as soon as both elementary entanglements have been received, rather than waiting for messages to arrive before conducting the swap.

33.2.2.1 Local Decoherence Timers Expiring on SCHED-ASAP Routers

When a decoherence timer expires on a SCHED-ASAP router, the router conducts the following logic and actions:

1) Assert that the timer is associated with the current swap-record. If it doesn't, ignore the timer expiry and continue as scheduled.
2) If the current swap-record indicates that router R has not conducted its swap attempt yet, conduct the partial recovery protocol by regenerating the expired entanglement.
    a. If the timer wasn't intentionally expired early (this may happen when router R receives an associated EL message prior to its natural expiration time), send an EL message to the expired-side neighbor with the appropriate metadata.
    b. Clear any irrelevant data in associated with the expired entanglement in the current swap-record, reset the quantum memory, and request elementary entanglement with the expired-side neighbor.
    c. If the controller configures the protocol to do a full recovery procedure, send an EL message to the opposite-side neighbor as well (with the appropriate identifier and metadata), clear the opposite-side timer and quantum memory, and request elementary entanglement with the opposite-side neighbor as well.

33.2.2.2 Receiving an Entanglement Lost Message on a SCHED-ASAP Router

Having covered the behavior of SCHED-ASAP routers when entanglements decohere locally (i.e. router R is the node transmitting EL messages), the behavior of how SCHED-ASAP routers handle the receipt of EL messages from other nodes in the network may now be described. The actions and relevant SCHED-ALAP FSM router protocol state transitions are described sequentially below.

1) Do a look-up in local classical memory to find the corresponding swap-record associated with the entanglement identifier contained in the EL message. This look-up will return either the current swap-record, an outdated swap-record, or no swap-record at all.
    a. If the look-up operation could not find a corresponding swap-record, no subsequent actions are taken by the router beyond logging the received-EL event.
2) If the located swap-record is outdated and indicates that router R performed a swap attempt on the associated entanglements, propagate the EL message to the opposite-side neighbor with updated identifier information.
    a. If the swap-record pertains to the last end-to-end entanglement attempt, the swap operation was successful, router R is operating with the explicit-start round-triggering mechanism, and router R is currently waiting on Start message(s) to proceed, the protocol FSM will transition out of that waiting stage and proceed to request elementary entanglements with its neighbors.
3) If the located swap-record is the current swap-record, router R will take actions depending on the state of the timer associated with the received EL message, and whether the router has attempted a swap operation or not.
    a. If router R has yet to attempt an entanglement swap and the timer is still running, expire the timer early, and conduct the actions described in the above Section 33.2.2.1.
    b. If router R has already attempted its entanglement swap operation, and is currently waiting for Swap- Success messages, conduct a full recovery/reset procedure by propagating the EL message to the opposite-neighbor with updated identifier information and metadata, clearing both quantum memories, creating a new swap-record, and requesting new elementary entanglements with both neighbors. If the router is operating with the explicit-start round-triggering mechanism, the router skips the step of waiting for any Start messages.

33.2.2.3 Generalization to SCHED-ASAP Hosts

The SCHED-ASAP host protocol behaves the same way as the SCHED-ALAP host protocol with respect to handling decoherence.

33.3 Bidirectional Protocols

Bidirectional protocols, with a focus on the as-late-as-possible variation (BIDIR-ALAP), will now be described. The purpose of swapping protocols is to coordinate the actions of individual nodes on a virtual circuit to generate end-to-end entanglement. In some examples, the two hosts on each side of the virtual circuit must know when an end-to-end entanglement has been successfully created (or not) so that they can deliver their half to the next-higher layer (or not). The hosts may also need to know which Bell state was created and what its estimated fidelity is.

One method for achieving this would be to send control-plane messages hop-by-hop from the A-side of the virtual circuit to the B-side, controlling the actions at each hop, followed by a final confirmation message sent from the B-side host all the way back to the A-side host. However, this approach may incur a total delay which is two times the end-to-end classical message transmission latency. Reducing the total delay may be important because (a) it decreases the amount of decoherence affecting fidelity of the entanglements and (b) it increases the rate at which end-to-end entanglements are produced.

The bidirectional swapping protocol reduces the total delay from twice the end-to-end latency to just the end-to-end latency. It achieves this by sending two flows of control-plane messages hop-by-hop from the A-side to the B-side of the virtual circuit and simultaneously also from the B-side to the A-side. At some point, typically somewhere near the middle of the virtual circuit, the A-to-B and B-to-A message cross-over. Before the cross-over, the messages trigger the physical entanglement swapping to happen; after the cross-over, the messages continue to validate the consistency and deliver the final result to the hosts without the cost of an additional end-to-end latency.

33.3.1 Penultimate and Interior Nodes

The concepts of penultimate nodes and interior nodes may play important roles in bidirectional (BIDIR) protocols. A penultimate node is a quantum repeater or quantum router which is directly connected to a host. Assuming there is at least one router or repeater, there is one penultimate node for each end-point of the virtual circuit. Any router or repeater which is not a penultimate node is referred to as an interior node.

Figure 44:
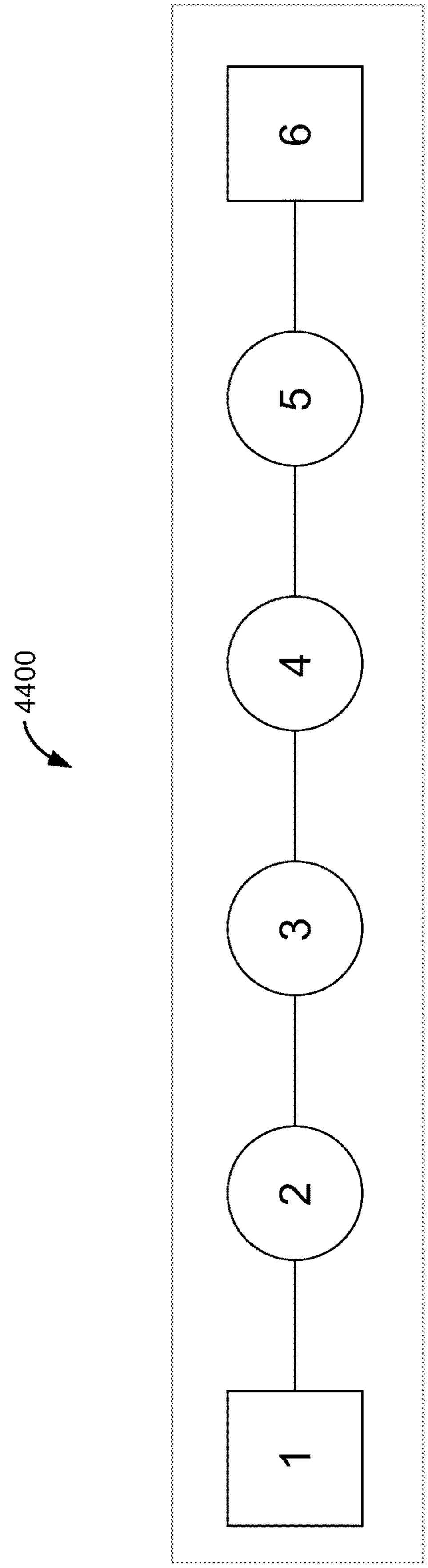
FIGS. 44-46 are schematic diagrams of example quantum network node arrangements.

FIG. 44 shows a portion of an example quantum network 4400 wherein node 2 is the penultimate node on the A-side of the virtual circuit (also referred to as the A-side penultimate node), node 5 is the B-side penultimate node, and nodes 3 and 4 are interior nodes.

Figure 45:
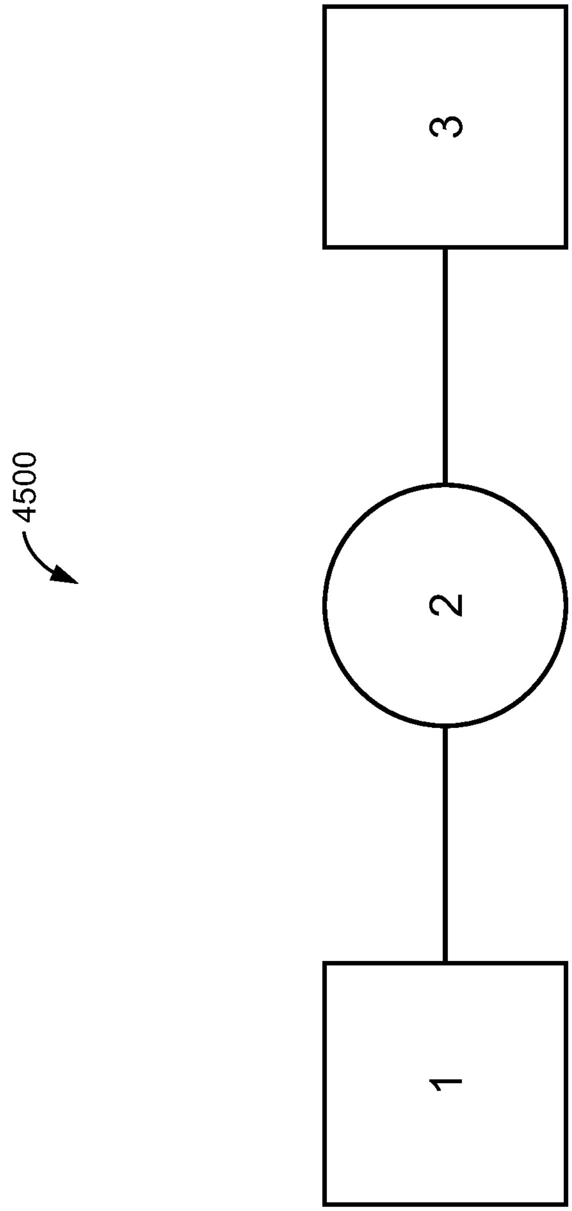

FIG. 45 shows a portion of an example quantum network 4500 wherein node 2 is both the A-side and B-side penultimate node, and there is no interior node.

Figure 46:
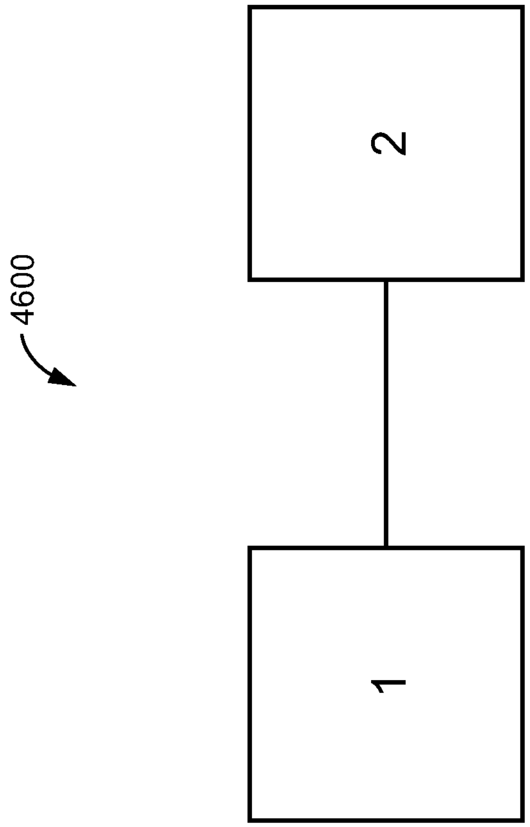

FIG. 46 shows a portion of an example quantum network 4600 comprising two hosts directly connected to each other, without any quantum routers or repeaters, which may be treated as a special case. In this case there are neither penultimate nodes nor interior nodes.

33.3.2 Concatenating Entanglement Identifiers

Another important concept in swapping protocols is the concept of concatenating entanglement identifiers. When a router or repeater performs a successful swap operation, two entanglements (one on the A-side and one on the B-side) are concatenated into one new longer-distance entanglement. The entanglement identified (ID) of the resulting longer-distance entanglement may be constructed out of portions of the two original entanglement IDs upon which the swap operation was performed. So, as used herein, the process of concatenating entanglement identifiers does not require inclusion of the entirety of each of the entanglement identifiers that are being concatenated, as shown in the following examples.

Figure 47:
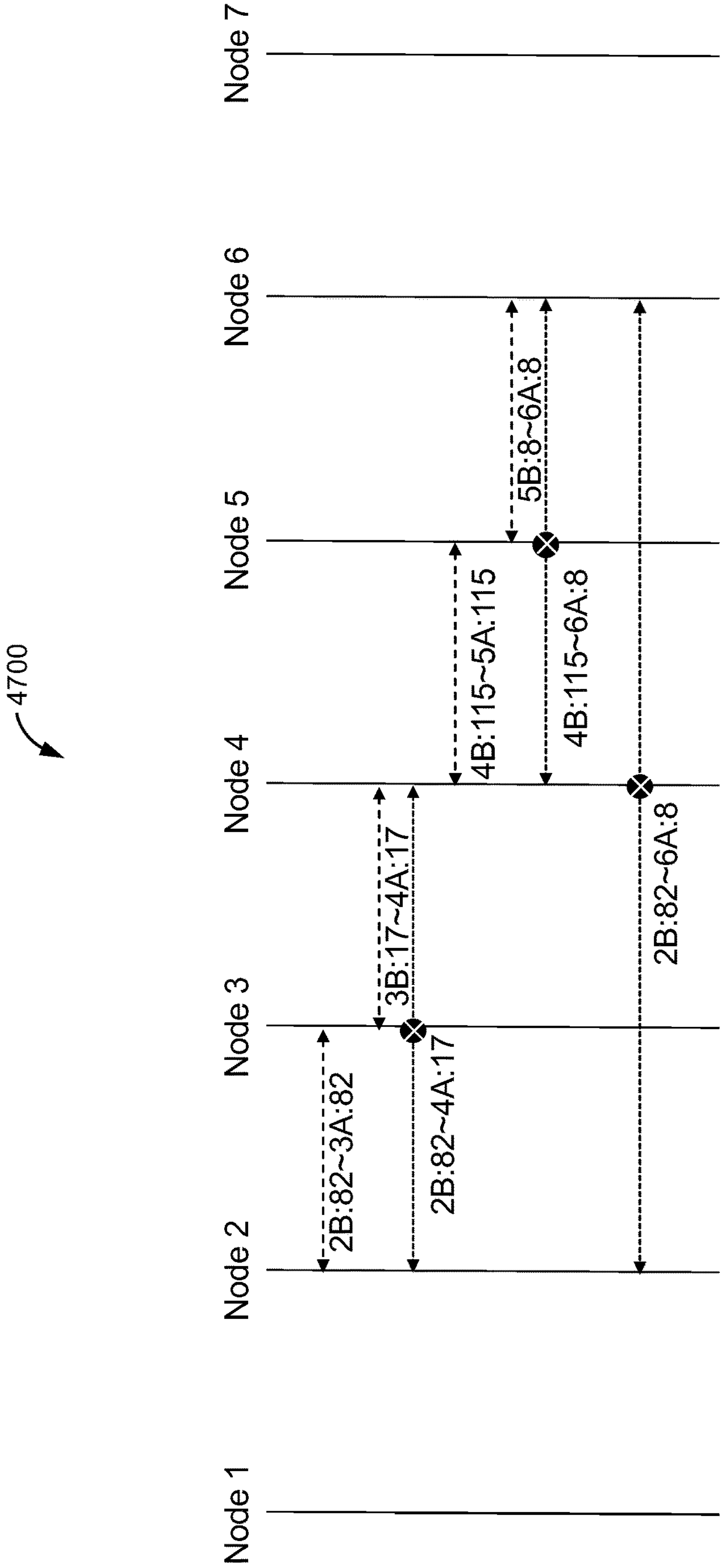
FIGS. 47-54 are schematic diagrams of example steps occurring in quantum network portions.

FIG. 47 shows a portion of an example quantum network 4700 comprising three examples of entanglement ID concatenation. Note that 82, 17, 115, and 8 are elementary entanglement sequence numbers which have been arbitrarily chosen for the purpose of this example. In these examples, the portions of the entanglement identifiers being concatenated that correspond to the node identifiers (i.e., the node hop number of the qubit memory hop number portion of the entanglement identifier) of the node at which the swap operation is being performed are discarded, and the remaining portions are combined.

1. The swap on node 3 concatenates entanglement IDs 2B:82~3A:82 and 3B:17~4A:17 producing entanglement ID 2B:82~4A:17 (after discarding the portions corresponding to node 3).
2. The swap on node 5 concatenates entanglement IDs 4B: 115~5A:115 and 5B:8~6A:8 producing entanglement ID 4B: 115~6A:8 (after discarding the portions corresponding to node 5).
3. The swap on node 4 concatenates entanglement IDs 2B:82~4A:17 and 4B: 115~6A:8 producing entanglement ID 2B:82~6A:8 (after discarding the portions corresponding to node 4).

33.3.3 Swap-Record

In all variations of the swapping protocols described in Table 4, each node on the virtual circuit may maintain a so-called swap-record that contains information that the node may use to keep track of the progress of one single end-to-end entanglement generation round. It can be viewed as a composite state record for the finite-state machine (FSM) that models one end-to-end entanglement generation.

At any given moment in time, a node may simultaneously be involved in multiple end-to-end entanglement generations. Hence, each node may maintain multiple swap-records, one for each end-to-end entanglement in progress.

The swap-record may contain the following fields. In this example, the entanglement information includes the entanglement ID, the entanglement Bell state, and the estimated entanglement fidelity.

TABLE 5

Fields in the swap-record for the swapping protocol

| Field name |
|---|
| A-side elementary entanglement information |
| B-side elementary entanglement information |
| A-side received entanglement information |
| B-side received entanglement information |
| Entanglement swap result |
| Swapped entanglement information |

33.3.4 End-to-End Entanglement Round Triggers

There are two possible triggers for a node to be ready for the next round of end-to-end entanglement generation.

1. Implicit start: the node automatically starts the next end-to-end entanglement as soon as the previous end-to-end entanglement has performed a successful physical swap operation, which frees up the qubit memories and makes them available for the next round of end-to-end entanglement.
2. Explicit start: the node only starts the next round of end-to-end entanglement after it has received explicit Start messages originating from both hosts on the A-side and the B-side of the virtual circuit. Each host on each side of the virtual circuit sends the Start message after it has allocated a qubit memory for the next end-to-end entanglement. This typically happens after both (a) the previous end-to-end entanglement has been delivered to the next-higher layer at the host and (b) the next-higher layer has consumed the end-to-end entanglement, for example by performing a teleportation or a measurement, thus freeing up the qubit memory.

Which of the two start triggers (implicit or explicit) is used is a configurable parameter for the virtual circuit, and may be set by the controller. These two trigger mechanisms are also applicable to the SCHED-ALAP, SCHED-ASAP, and BIDIR-ASAP swapping protocol variations.

33.3.5 Swap-Record Creation

When a node is ready to start with the next round of end-to-end entanglement generation, the node creates a new swap-record where all fields are initialized to the empty value. The entanglement swap result field of the swap-record being an empty value indicates that no entanglement swap has been attempted. This new swap-record may be appended at the head of the list of swap-records. This swap-record at the head of the list is referred to as the current swap-record.

33.3.6 Elementary Entanglement Generation Requests

After the swap record has been created, the node may request the next-lower layers corresponding to the A-side port and the B-side port to generate the next elementary entanglement. The next-lower layer is typically the elementary entanglement generation layer, but for this step (or other steps where requests are made to reset qubits and/or request regeneration of elementary entanglement) the next-lower layer could instead be the purification layer if initial purification before swapping is used. If the node is a repeater, the A-side port and the B-side port are the only two ports on the repeater. If the node is a router, it may have more than two ports. Each virtual circuit that transits a router has a corresponding A-side port and B-side port. These ports are chosen by the controller when it chooses the path for the virtual circuit through the network.

33.3.7 Receipt of Elementary Entanglements

After some finite amount of time, the next-lower layer on each side may either deliver the requested elementary entanglement (with a corresponding elementary entanglement identifier, an indication of which Bell state it is, and an estimated fidelity and timestamp) or it will report that elementary entanglement generation failed.

When the node successfully receives an elementary entanglement from the next-lower layer, it does the following:

1. It locates the current swap-record at the head of the list of existing swap-records.
2. It stores the elementary entanglement information (ID, Bell state, fidelity, timestamp) of the new elementary entanglement in the A-side or B-side elementary entanglement information of the swap record, according to whether the elementary entanglement was received on the A-side port or on the B-side port.

In the scenario where there are no routers or repeaters, but only two hosts directly connected to each other, as shown in FIG. 46, the elementary entanglement is immediately delivered to the next-higher layer because in this case the end-to-end entanglement is the elementary entanglement.

33.3.8 Initiate Physical Entanglement Swap

Once a router or repeater node has received elementary entanglements on both the A-side and the B-side, at some point in time the node will initiate an entanglement swap on those two elementary entanglements. The exact timing is determined as follows:

If as-soon-as-possible (ASAP) swapping is used, then the physical swap is requested immediately.

If as-late-as-possible (ALAP) swapping is used, then: If the node is a penultimate node, then the physical swap is also requested immediately. If the node is an interior node, then the physical swap is requested only after the first Swap-Success message is received (assuming the received Swap-Success message contains metadata including an entanglement identifier relevant to the current swap-record).

33.3.9 Process Entanglement Swap Success

Once the physical entanglement swap has been requested, it takes some finite amount of time for the Local Swap Scheduler to complete the swap request (success or failure) and send a notification back to the swapping layer. When the swapping layer receives a swap success notification that includes the Bell state, the estimated fidelity, and the timestamp it does the following:

1. It computes the entanglement ID of the swapped entanglement by concatenating the entanglement IDs of the two swapped entanglements.
2. It stores the swapped entanglement ID, Bell state, estimated fidelity, and timestamp in the swapped entanglement information in the current swap-record.
3. It stores "success" in the entanglement swap result in the current swap-record.
4. If the node is a penultimate node, it initiates a Swapped message as described in Section 33.3.10.
5. If the node is an interior node, it considers propagating Swapped messages as described in Section 33.3.13. This may be necessary because it is possible that the node has already received and stored a Swapped message before the local physical swap was complete; in that case the propagation is held off until the physical swap is complete.
6. The two qubit memories that were swapped are released; they are now available for the next round of end-to-end swapping, which can start implicitly start immediately or at the next explicit Start as described in Section 33.3.4.

33.3.10 Originate Swapped Message on Penultimate Node

Once the physical swap operation on the penultimate node is successful, then the node originates a Swapped message (s) as follows:

1. It creates a Swapped message which contains the entanglement ID, the Bell state, the estimated fidelity, and the timestamp of the newly-created swapped entanglement.
2. If the node is the A-side penultimate node, it sends the Swapped message to its B-side interior node neighbor, and vice versa. For example, in FIG. 44, penultimate node 2 originates a Swapped message to interior node 3, and penultimate node 5 originates a swapped message towards interior node 4.

3. The case that there is only one router or repeater node as shown in FIG. 45 above is handled differently: in this case the node originates a Swapped message to each host, both on the A-side and the B-side.

33.3.11 Terminate Swapped Message on Host

When a host node receives a Swapped message, it means that the end-to-end entanglement has successfully been completed. The received swap message may contain the entanglement ID of the generated end-to-end entanglement (which may include, amongst other things, the ID of the local quantum memory that contains the qubit on the local side of the entanglement) as well as the Bell state, timestamp, and the fidelity of the entanglement. The host delivers the generated end-to-end entanglement to the next-higher layer. The swap-record corresponding to the generated end-to-end entanglement is no longer needed and is removed.

33.3.12 Receive Swapped Message on Interior Node

When an interior node receives a Swapped message, it first stores the information in the Swapped message in the swap-record as follows:

1. It locates the swap-record using the entanglement ID in the received Swapped message (it may or may not be the current swap-record).
2. It stores the entanglement information (entanglement ID, Bell state, fidelity, timestamp) in the A/B-side received entanglement information of the swap-record.

It then considers propagating the Swapped message further downstream, as described below.

33.3.13 Propagate Swapped Message on Interior Node

Once a Swapped message is originated on one side of the virtual circuit by a penultimate node, it is propagated hop-by-hop across all interior nodes until it finally reaches the host on the remote side. This process of hop-by-hop propagation takes place both from the A-to-B-side and the B-to-A-side (hence the name bidirectional protocol). Example rules for propagating the Swapped message further downstream on the virtual circuit are as follows:

1. The node locates the swap-record corresponding to the received Swapped message.
2. If the physical entanglement swap operation has not yet been completed on the local node, the Swapped message is not yet propagated. The node will reconsider propagating the Swapped message later on, when the physical entanglement is complete.
3. The node turns the Swapped message into a Swap-Failed message and propagates it further downstream in the following two circumstances:
   a. The swap-record contains entanglement swap result "failed locally" (i.e., the local entanglement swap operation failed in a heralded manner).
   b. The swap-record contains entanglement swap result "failed remotely" (i.e., the node has already learned (e.g., from Swap-Failed messages traveling in the reverse direction) that the end-to-end entanglement attempt has failed because of a failed swap attempt further downstream.
4. Otherwise, the node updates the swapped entanglement information stored in the swap-record by extending it with the information in the received entanglement:
   a. If this is the first Swapped message that the node receives, the swap-record contains the result of swapping two elementary entanglements. This is extended towards the endpoint (i.e., the host) on one side of the virtual circuit (namely the side on which this first Swapped message was received). At this point in time, the swapped entanglement information contains "half" of the end-to-end entanglement, namely from the node to one of the hosts.
   b. If this is the second (and final) Swapped message that the node receives, the swap-record contains half of the end-to-end entanglement, as just mentioned. Now, the swapped entanglement information is extended towards the other endpoint (i.e., host). This produces the full end-to-end (i.e., host-to-host) entanglement information.
5. The new swapped entanglement information, computed in this manner, is placed in a Swapped message, which is propagated further downstream towards to opposite direction from which it was received.
6. Once both Swapped (or Swap-Failed, discussed later) messages have been received and propagated for swap-record, the swap-record can be removed from memory.

33.3.14 Example of a BIDIR-ALAP Round (Preferred Path)

Figure 48:
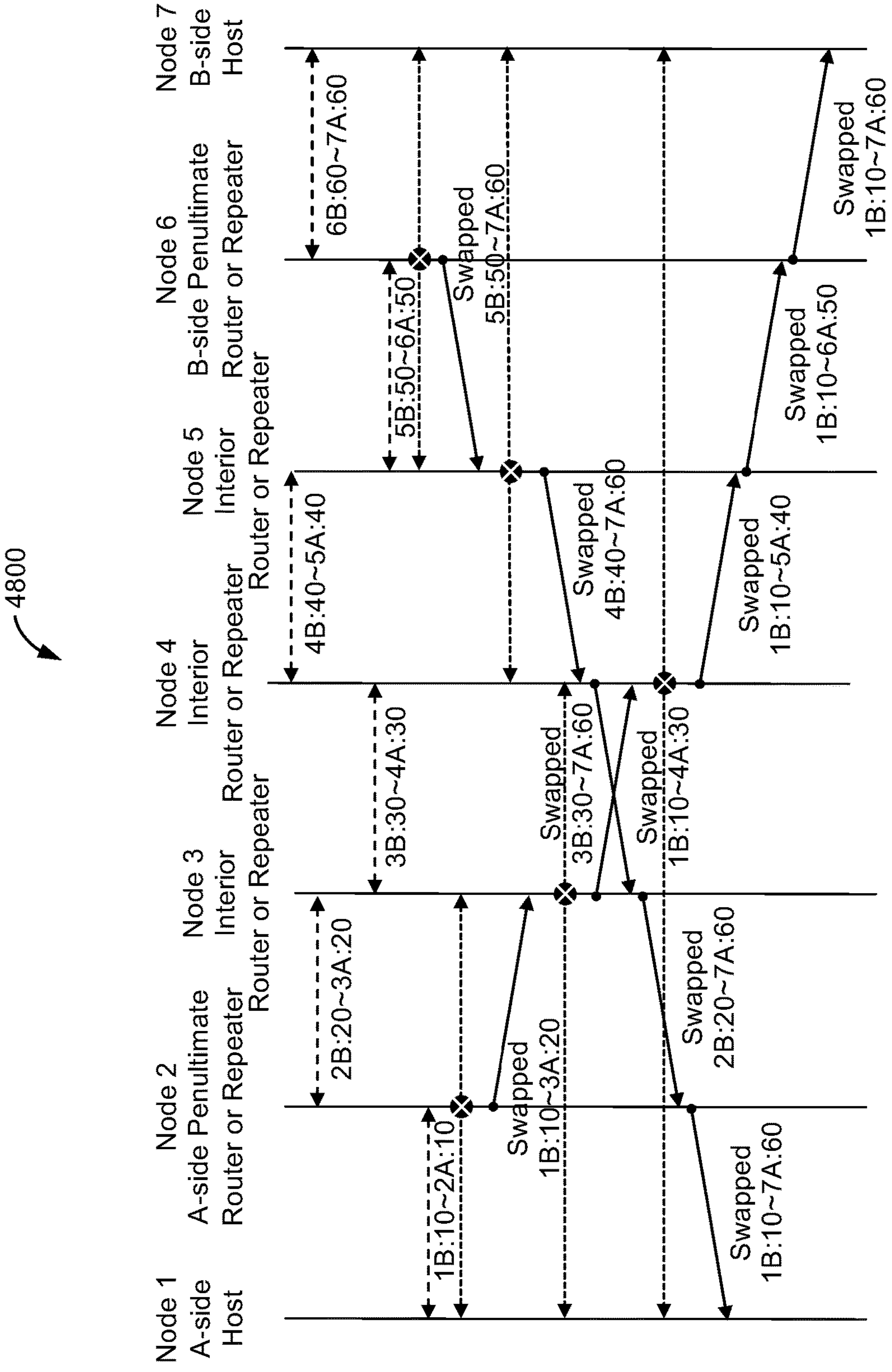

FIG. 48 shows a portion of an example quantum network 4800 comprising an example round of successful end-to-end entanglement generation for the BIDIR-ALAP swapping protocol. In this example, non-elementary entanglement is generated between Nodes 1 and 3 before non-elementary entanglement is generated between Nodes 1 and 4. Likewise, non-elementary entanglement is generated between Nodes 5 and 7 before non-elementary entanglement is generated between Nodes 4 and 7. Then, non-elementary entanglement is generated by a swap operation at Node 4, resulting in entanglement between Nodes 1 and 7. Several characteristics of the protocol can be observed from this example:

- There are two hop-by-hop flows of Swapped messages: one A-to-B-side flow and one B-to-A-side flow.
- Each flow starts at the penultimate node and ends at the host.
- The entanglement information (ID, Bell state, fidelity, timestamp) in the Swapped messages is updated at each hop, until it contains the final end-to-end entanglement information when it is delivered to the host.
- Swapped messages are propagated when the physical entanglement swap is complete.
- The physical entanglement swap takes place when (a) elementary entanglements are available on each side and (b) since this is an as-late-as-possible (ALAP) example, the protocol waits for the first Swapped message to be received on interior nodes (e.g., Nodes 3, 4, and 5).
  - In the BIDIR-ASAP variation, the physical entanglement swap takes place as soon as (a) elementary entanglements are available on each side. However, interior nodes will not send any Swapped or Swap-Failed messages until they receive their first Swapped or Swap-Fail message.

33.3.15 Process Heralded Entanglement Swap Failure

When a node receives a notification from the hardware abstraction layer that heralds an entanglement swap failure, it may take the following steps:

1. It computes the entanglement ID of the attempted swapped entanglement by concatenating the entanglement IDs of the two swapped entanglements.
2. It stores the swapped entanglement ID in the swapped entanglement information in the current swap-record.
3. It stores "failed locally" in the entanglement swap result in the current swap-record.
4. If the node is a penultimate node, it originated a Swap-Failed message as described in Section 33.3.16.

5. If the node is an interior node, it considers propagating a Swap-Failed message as described in Section 33.3.18 and Section 33.3.19.
6. The two qubit memories involved in the attempted swap are released; they are now available for the next round of end-to-end swapping, which can start implicitly start immediately or at the next explicit Start as previously described.

33.3.16 Originate Swap-Failed Message on Penultimate Node

If the physical swap operation fails in a heralded manner on the penultimate node, then it may originate Swap-Failed message(s) instead of Swapped message(s) as follows:

1. It creates a Swap-Failed message which contains the entanglement ID of the attempted swapped entanglement. Bell-state and fidelity are not relevant for failed swaps.
2. If the node is the A-side penultimate node, it sends the Swap-Failed message to its B-side interior node neighbor, and vice versa. If it is the only router or repeater node, it sends Swap-Failed messages to the hosts on both sides.

33.3.17 Terminate Swap-Failed Message on Host

When a host node receives a Swap-Failed message, it means that this round of end-to-end entanglement generation failed. The host does not deliver any entanglement to the next-higher layer, removes the swap-record, and implicitly or explicitly starts the next round of end-to-end entanglement generation, as governed by the controller.

33.3.18 Receive Swap-Failed Message on Interior Node

When an interior node receives a Swap-Failed message it may take the following steps:

1. It locates the swap-record using the entanglement ID in the received Swap-Failed message (it may or may not be the current swap-record).
2. It stores the entanglement ID in the A/B-side received entanglement information of the swap-record.
3. It stores "failed remote" in the entanglement swap result in the current swap-record.

It then considers propagating the Swap-Failed message further downstream, as described below.

It is possible that an interior node receives a Swap-Failed message before it has attempted its local entanglement swap. This happens when the node uses as-late-as-possible (ALAP) swapping and the node has not yet received a Swapped message for the swap-record. In this case, the node may optionally choose to use a partial recovery procedure, as governed by the controller. The controller may decide whether or not the partial recovery procedure is used on a given virtual circuit.

33.3.19 Propagate Swap-Failed Message on Interior Node

For an end-to-end entanglement round to fully succeed, it may necessary that all entanglement swaps on all nodes succeed. If the swap attempt on any node fails, the end-to-end entanglement attempt fails and another attempt may be needed.

The next attempt of end-to-end entanglement generation can start entirely from scratch, or sometimes it is possible to hang on to some existing elementary entanglements or partial end-to-end entanglements and reuse them in the next attempt. Here the restart from scratch approach is described, while the partial recovery procedure is described later.

In a successful end-to-end entanglement round, a Swapped message is originated on one side of the virtual circuit by a penultimate node, and it is propagated hop-by-hop across all interior nodes until it finally reaches the host on the remote side. In a failed end-to-end entanglement round, the Swapped message is propagated only to the first node where the entanglement swap attempt failed. At that point, the Swapped message is replaced by a Swap-Failed message, and this Swap-Failed message is propagated further downstream until it reaches the host at the end of the virtual circuit.

When an interior node receives a Swap-Failed message, it may consider propagating the Swap-Failed message according to the following.

1. The node locates the swap-record corresponding to the received Swap-Failed message.
2. The node releases the qubit memories involved in the end-to-end entanglement round. The exact manner in which this happens depends on how far the entanglement swapping for this round has progressed. (a) If the node has not yet received an elementary entanglement from the next-lower layer for this round, the elementary entanglement request is canceled, and the qubit memory is released. (b) If the node has received both elementary entanglements, but the entanglement swap has not yet been requested, then the qubit memories are released, and no entanglement will be requested. (c) If the node has requested the elementary entanglement swap, but the result has not yet been received from the hardware abstraction layer, the request is canceled, and the qubit memories are released. (d) If the entanglement swap was completed (it does not matter whether it was successful or a failure) nothing more needs to be done. The qubit memories have already been released.
3. The node extends the swapped entanglement ID in the swap-record in the same way it would have been done for a received Swapped message.
4. The node propagates the Swap-Failed message, which is propagated further downstream towards to opposite direction from which it was received.
5. Once both Swapped or Swap-Failed messages have been received and propagated for swap-record, the swap-record can be removed.

33.3.20 Example of a BIDIR-ALAP Round (Swap Failure Scenario, without Partial Recovery)

Figure 49:
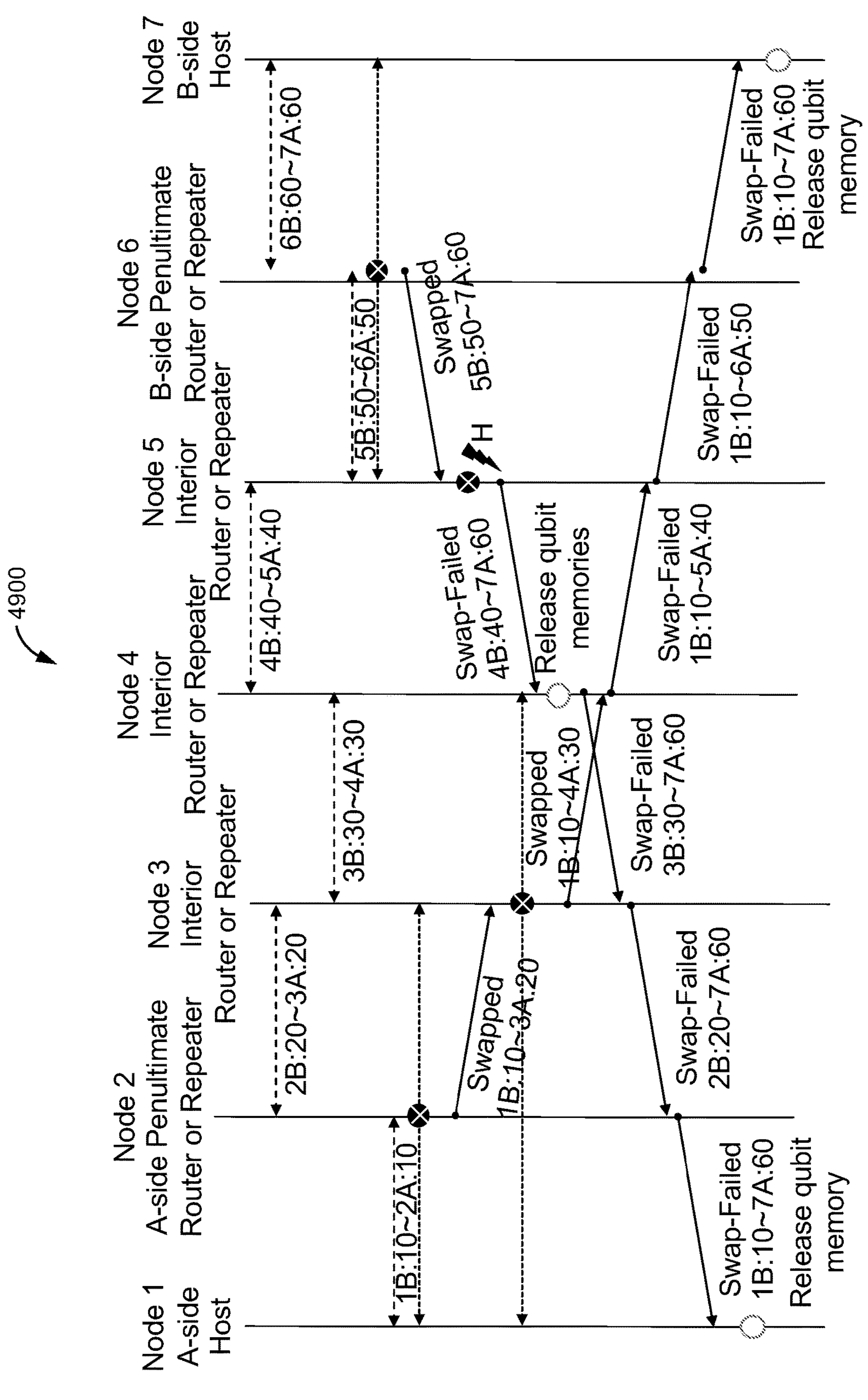

FIG. 49 shows a portion of an example quantum network 4900 comprising one example round of a failed end-to-end entanglement generation for the BIDIR-ALAP swapping protocol. In this example, the entanglement swap on node 5 results in a heralded failure (represented as a lightning bolt and "H") and partial recovery is not used. After the heralded failure, the qubit memories at Node 4 are released such that they may be used in the future, and Nodes 1 and 7 release their associated qubit memories upon receiving Swap-Failed messages. Nodes 2, 3, 5, and 6 do not release their associated qubit memories since previous swap operations have previously released them. Several characteristics of the protocol can be observed from this example. First, the flow of Swapped messages turns into a flow of Swap-Failed messages as soon as (a) there is a node where a swap attempt failed or (b) a swap failure is discovered further downstream. Second, any qubit memory resources that are still tied up to the end-to-end entanglement attempt are released.

33.3.21 Partial Recovery Procedure

The partial recovery can be used when an interior node receives a Swap-Failed message from an upstream node before it has initiated an entanglement swap locally. In this case, the node can choose to not give up on its downstream entanglement and only restart the entanglement generation for the upstream entanglement.

The controller may decide whether or not the partial recovery procedure is used for a given virtual circuit. One advantage of using it is that reusable entanglements are not unnecessarily thrown away. One disadvantage is that the re-used entanglements experience additional decoherence while waiting for the failed entanglement to be regenerated, which may decrease the fidelity of the final end-to-end entanglement or otherwise cause instabilities in the entanglement generation.

33.3.22 Example of a BIDIR-ALAP Round (Swap Failure Scenario, with Partial Recovery)

Figure 50:
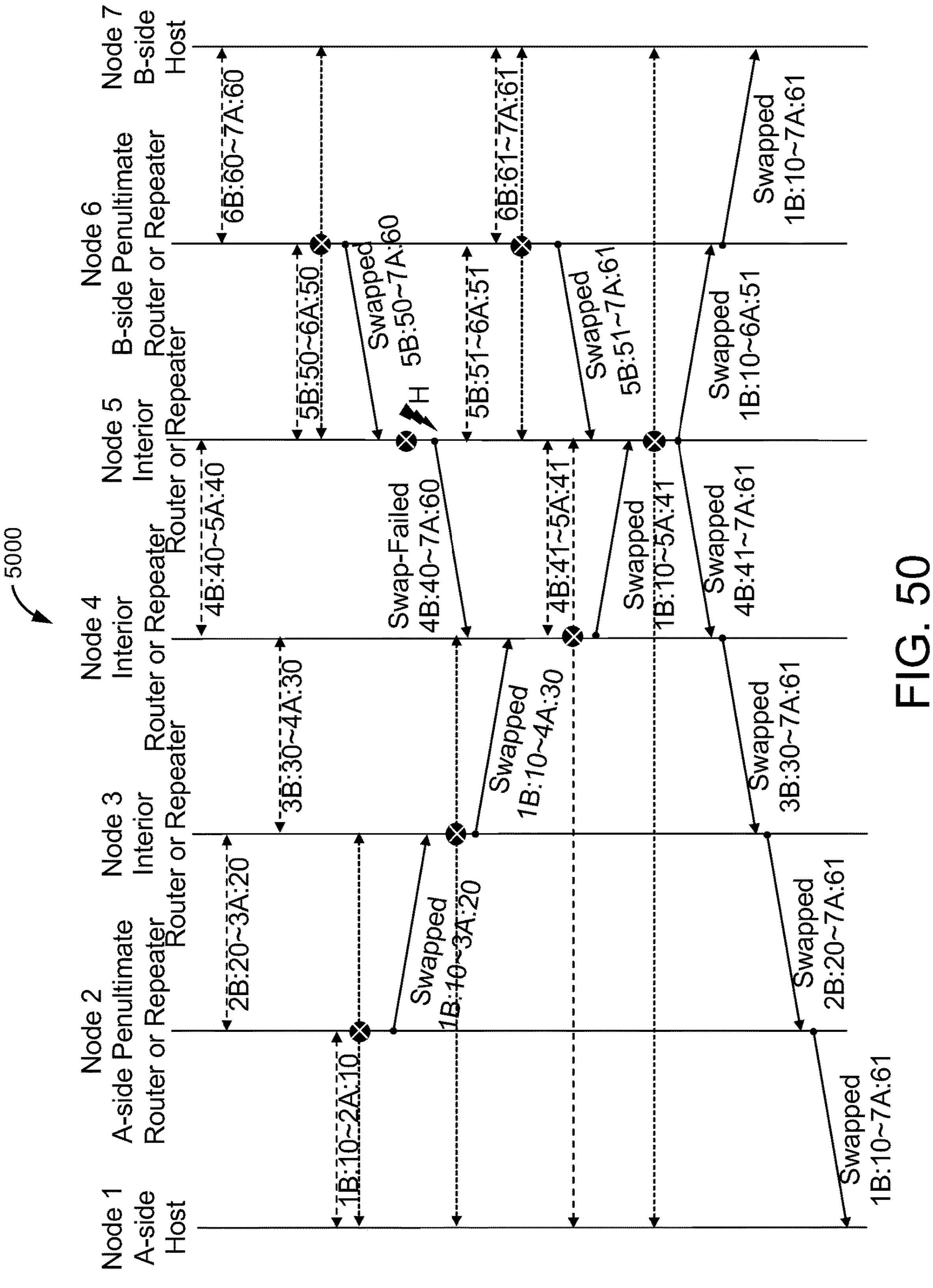

FIG. 50 shows a portion of an example quantum network 5000 comprising an example round of a failed end-to-end entanglement generation for the BIDIR-ALAP swapping protocol. In this example, the entanglement swap on node 5 failed and a partial recovery is used. In this example, after the heralded swap failure (represented as a lightning bold and the letter "H") on node 5, instead of giving up on the entire end-to-end entanglement, the protocol regenerates the entanglements that were directly affected by the failed swap, namely the 4-5 and 5-7 entanglements. The 1-4 entanglement was not affected and can be re-used.

34. Generating a Stream of End-to-End Entanglements 34.1 Virtual Circuit Requests For a virtual circuit connecting hosts to be established by the controller, the controller may validate and reserve the appropriate quantum and classical resources, decide on the path for the connection, decide which protocol variation(s) and layering framework to use for generating end-to-end entanglement, calculate necessary fidelity thresholds, install the corresponding protocols via the controller-to-node north-south interface (e.g., providing FSMs and other scheduling information, and various kinds of protocol information to one or more nodes on the path for a virtual circuit), and issue Virtual Circuit Service Requests for actually generating particular end-to-end entanglement(s).

Ultimately, the end-to-end entanglement(s) generated by the swapping layer can be passed up to the next-higher layer by the hosts. The end-to-end entanglement(s) may then be consumed by the next-higher layer, which can be a purification layer or an application layer.

End-to-end entanglement-consuming applications may require or prefer certain performance metrics for the application to be successful, practical, and/or advantageous. These key metric requirements or preferences may include an end-to-end entanglement fidelity bound, an end-to-end entanglement generation rate, and a specified number of end-to-end entanglements required.

These metric requirements or preferences give rise to so-called Quality-of-Service (QoS) parameters. The controller may make use of these metric requirements or preferences, informed by the network end-user- or stakeholder-defined applications, to inform decisions about network resource sharing amongst users and applications, path computation, and protocol variations and hyperparameters such as fidelity thresholds, partial recovery, and round-triggering mechanisms. These QoS parameters may ultimately be pushed down via the controller-to-node north-south interface as part of a Virtual Circuit Service Request.

34.2 Terminating the Swapping Protocol

The nodes in the network may be informed (either implicitly or explicitly) as to when they have completed servicing the Virtual Circuit Service Request. A Virtual Circuit Service Request may include metadata such as a required number of end-to-end entanglements to generate. In general, the round-triggering mechanism is a parameter chosen by the controller and is configurable across all swapping protocol variations (e.g., SCHED-ALAP, SCHED-ASAP, BIDIR-ALAP, and BIDIR-ASAP).

With the implicit-restart round-triggering mechanism, nodes will continue to issue requests for elementary entanglement until they are told to stop. As the hosts of the virtual circuit keep track of how many valid end-to-end entanglements have been successfully generated, both hosts will issue a Stop message to be propagated across the nodes in the path (propagating from A to B and from B to A) once they have met the Virtual Circuit Service Request parameters. Once a node running the implicit-restart mechanism receives a Stop message from both sides, it will terminate the protocol, reset and free any reserved resources, cancel any already-issued requests for elementary entanglements or entanglement swaps, clear any swap-records from memory, and ignore any incoming messages associated with the virtual circuit identifier.

With the explicit-restart round-triggering mechanism, every individual end-to-end entanglement generation process is initiated with Start messages originating from the hosts of the virtual circuit and subsequently propagated through the network. Thus, after every round of successful end-to-end entanglement generation, the explicit-restart mechanism guarantees that all resources are reset and freed, there are no already-issued requests that have yet to be met, and there are no other messages propagating through the network associated with the virtual circuit identifier. Thus, once the hosts have met the requirements of the Virtual Circuit Service Request for end-to-end entanglements, they issue a final Stop message to the nodes in the network indicating that the service requirements have been met and there will be no further Start messages to wait for. Nodes will subsequently terminate the protocol and clear any reserved quantum and classical resources associated with the virtual circuit identifier.

35. Handling Single-Sided Elementary Entanglement Delivery

Due to the design of the elementary entanglement generation protocol, it is possible (with low probability) that an elementary entanglement is delivered to the entanglement swapping protocol FSM instances at one network node but not the other. This can be due to message loss in the underlying protocols or a local error at a network node where an Entanglement-Created event is not received by the swapping protocol. When this occurs, a network node may later receive a Swapped message that specifies an elementary entanglement identifier that is not known locally. As a result, the network node is not able to proceed with building end-to-end entanglement as it does not hold any qubit locally that is storing the swapped entanglement.

Figure 51:
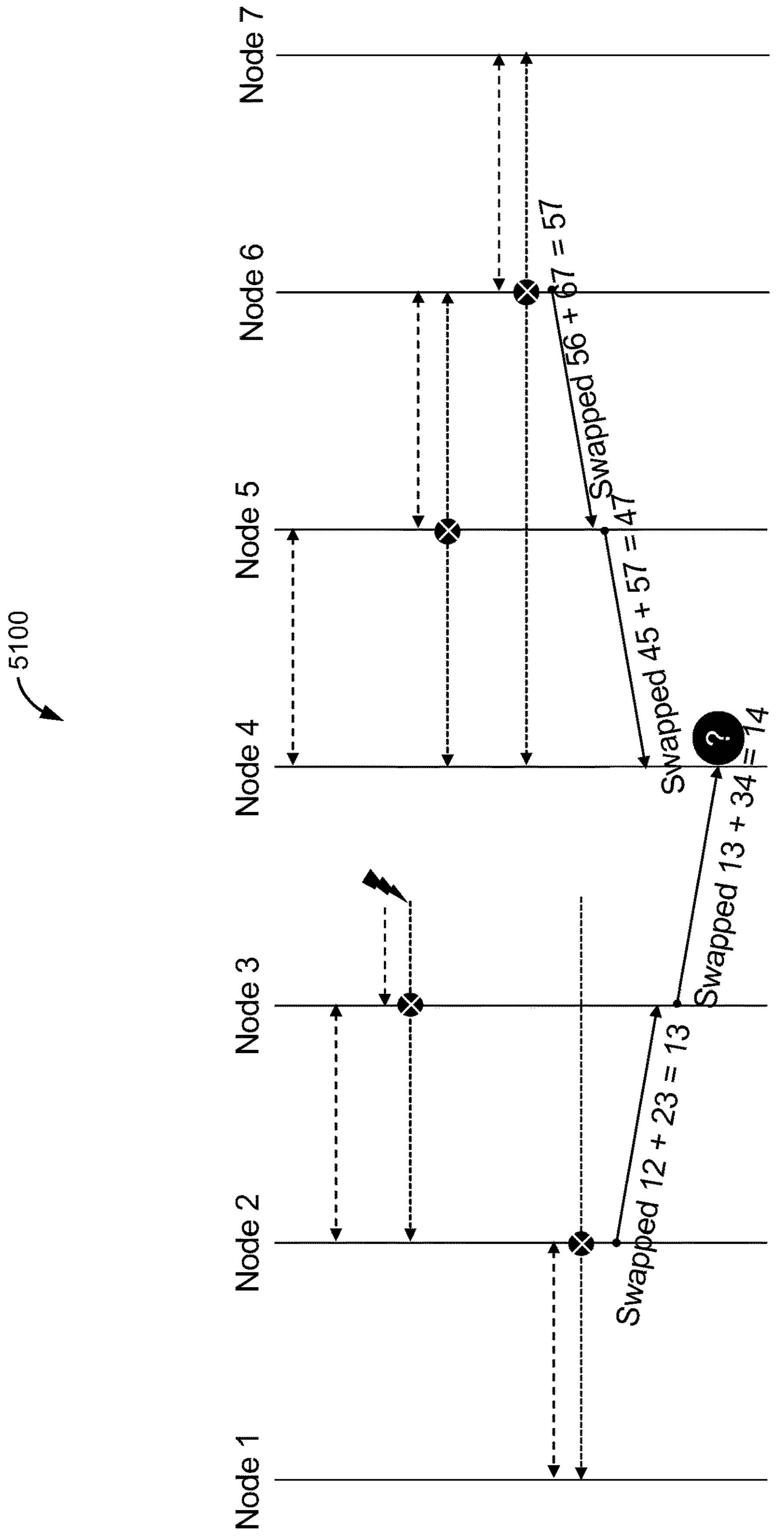
Figure 52:
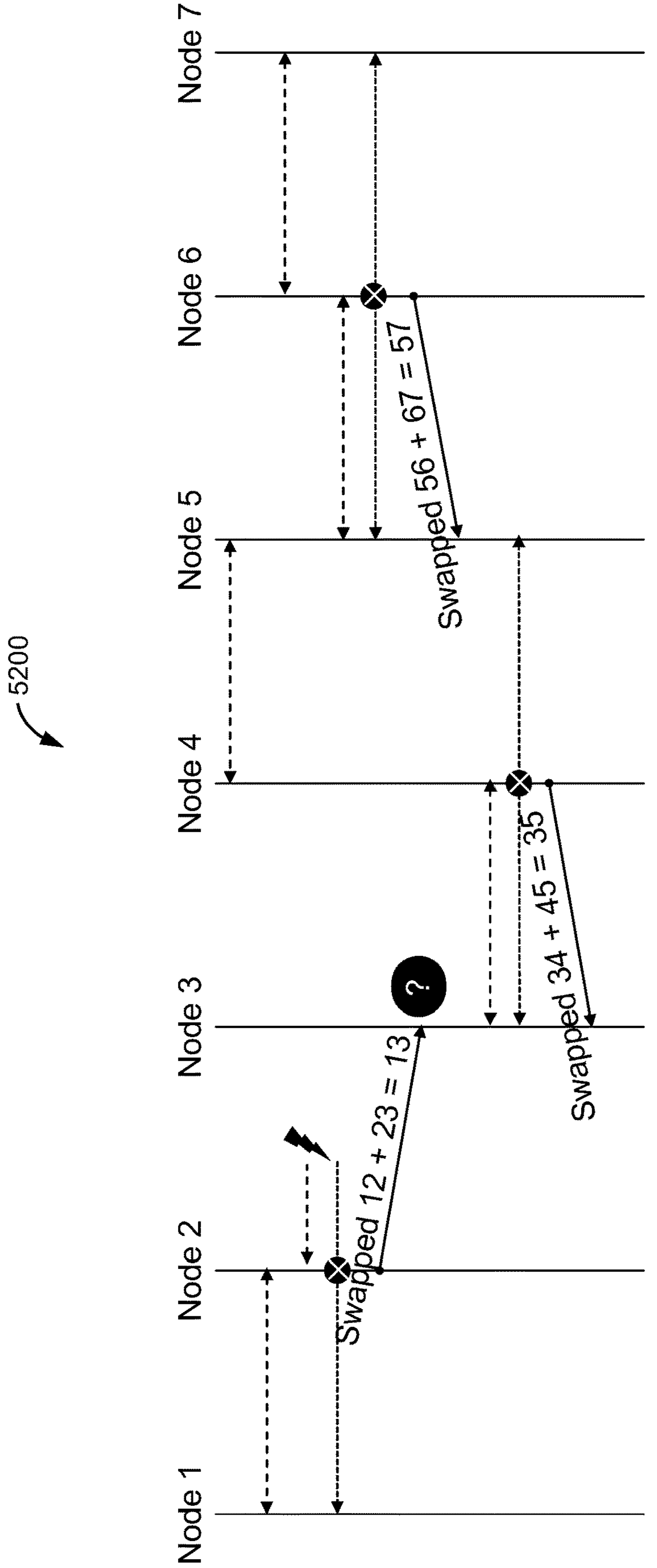

FIGS. 51 and 52 show portions of example quantum networks 5100 and 5200 comprising example erroneous situations in the bi-directional swapping protocol and the scheduled swapping protocol, respectively. Single-sided elementary entanglement delivery is depicted with a lightning bolt indicating that a lost message or local error caused the entanglement swapping protocol to never receive an Entanglement-Created event. Detection of the unknown elementary entanglement identifier is indicated with a circled question mark.

Referring to FIG. 51, during the bi-directional swapping protocol Node 4 receives a SWAP message from Node 3 that specifies an elementary entanglement between Nodes 3 and 4 which Node 4 never received.

Referring to FIG. 52, during the scheduled swapping protocol Node 3 receives a SWAP message from Node 2 that specifies an elementary entanglement between Nodes 2 and 3 which Node 3 never received.

Due to the fact that the network node which detects the unknown entanglement identifier likely does not have the corresponding entanglement in a local qubit, it may be impossible to establish end-to-end entanglement using said entanglement.

When a network node detects an unknown elementary entanglement identifier, it sends an Entanglement-Lost (EL) message to the network node that informed the detecting node of the unknown entanglement identifier. This is necessary in this example as the network nodes must be informed to regenerate elementary entanglements for the next end-to-end entanglement that will be built. Notably, it frees any qubits that could still be storing old entanglements that will never lend to establishing an end-to-end entanglement.

Figure 53:
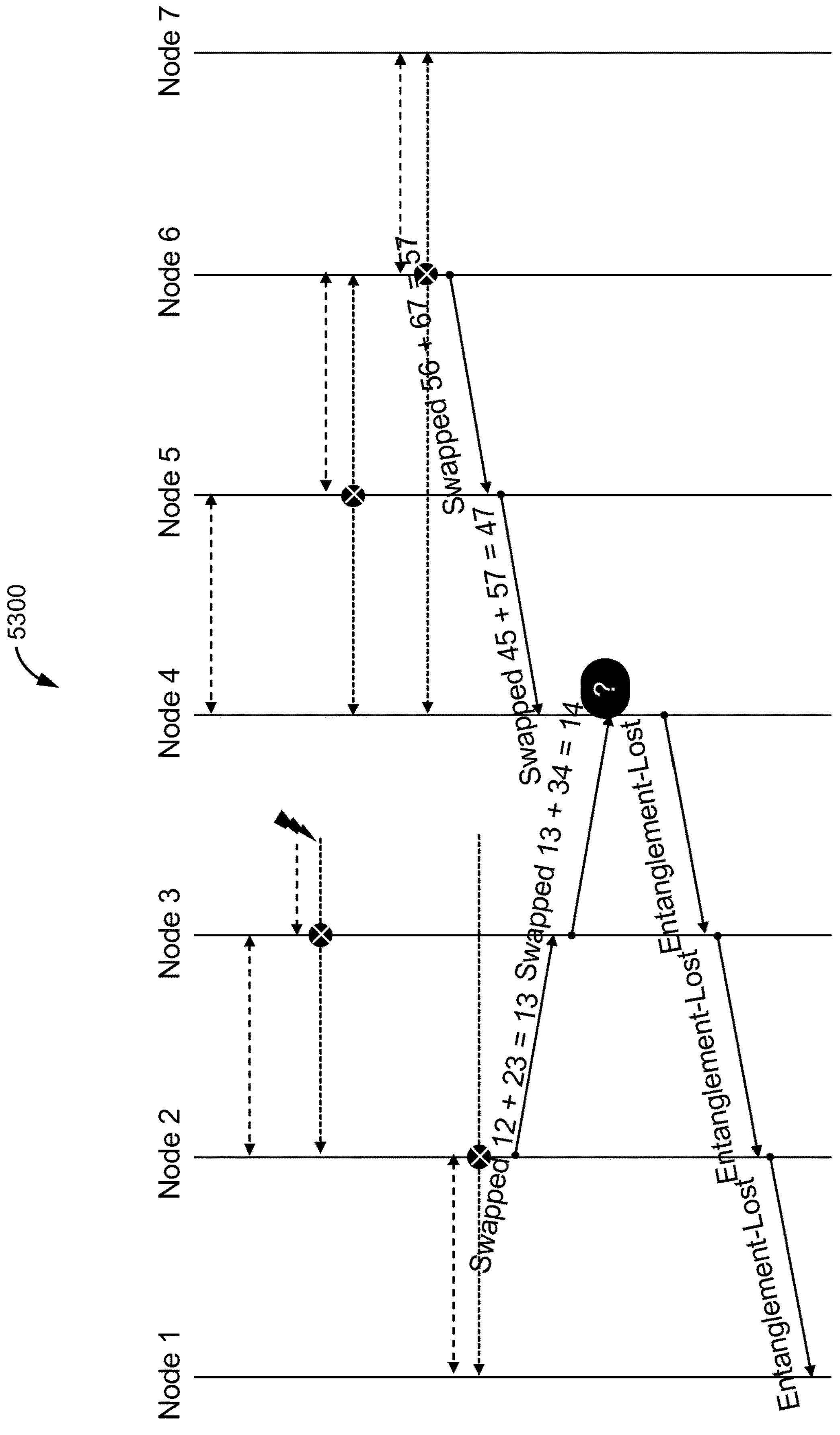
Figure 54:
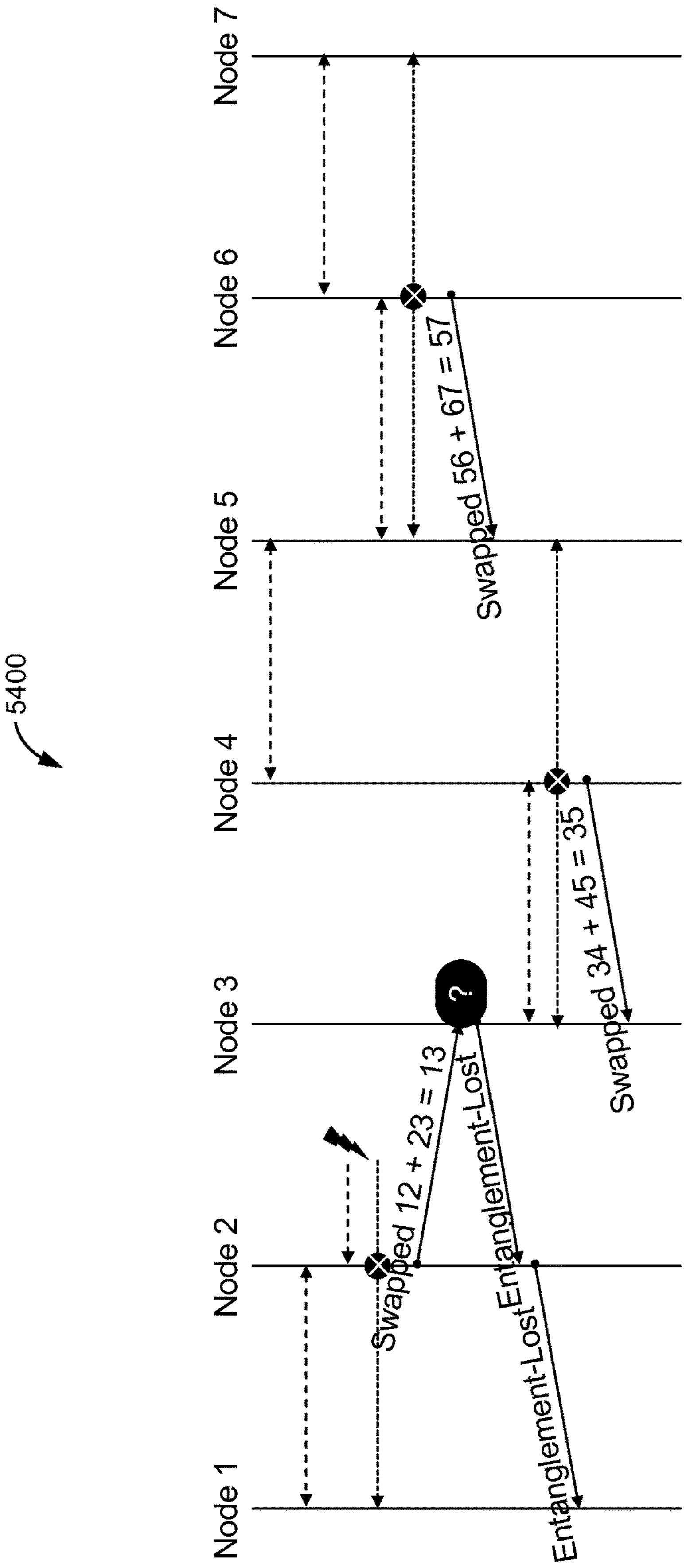

FIGS. 53 and 54 show portions of example quantum networks 5300 and 5400 comprising example erroneous situations in the bi-directional swapping protocol and the scheduled swapping protocol, respectively.

Referring to FIG. 53, during the bi-directional swapping protocol Node 4 sends an Entanglement-Lost message after detecting the unknown entanglement identifier (represented as a circled question mark) specified by the "Swapped 13+34=14" message sent from Node 3 to recover from the erroneous scenario of single-sided delivery.

Referring to FIG. 54, during the scheduled swapping protocol Node 3 sends an Entanglement-Lost message after detecting the unknown entanglement identifier (represented as a circled question mark) specified by the "Swapped 12+23=13" message sent from Node 2 to recover from the erroneous scenario of single-sided delivery.

A network node that receives this EL message interprets it in the same way as for decoherence timers: If the network node has performed a swap using the specified entanglement, the EL message is forwarded to the next node specifying the elementary entanglement that was used for the swap. If the network node still holds the specified entanglement, the corresponding qubit storing the entanglement should be freed and released back to the system.

The techniques described above can be implemented using one or more programs comprising instructions for execution on a device or module including one or more processors or other circuitry for executing the instructions. For example, the instructions can execute procedures of software or firmware that runs on one or more programmed or programmable computing devices or modules including at least one processor and at least one data storage system (e.g., including volatile and/or non-volatile memory or storage media). The programs may be provided on one or more non-transitory computer readable media, or delivered over a communication medium such as network to a device where is stored on one or more non-transitory computer readable media. The instructions of the program may be operable to cause one or more processors of computing devices or modules (e.g., within the nodes of a network) to perform various steps of the program individually or together. The term "non-transitory," as used herein, is intended to exclude electromagnetic signals as they are propagating over a communication medium, but is not intended to otherwise limit the type of computer-readable medium that may store any portion of the programs. For example, a non-transitory computer readable medium may include a dynamic random-access memory (DRAM) or other medium that does not necessarily store information in a permanent or non-volatile manner.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for managing entangled quantum states in a network of nodes, the method comprising:

for each of two or more pairs of nodes on a path over a set of N nodes in the network, establishing entanglement between pairs of quantum elements in the respective nodes of that pair of nodes based at least in part on one or more quantum signals transmitted over one or more quantum communication channels, where N>3;

performing a plurality of entanglement swap operations among different respective subsets of nodes in the set of N nodes using the pairs of entangled quantum elements, where each entanglement swap operation comprises:

performing a joint measurement on a non-entangled pair of quantum elements in a node that is a member of two different pairs of nodes of the two or more pairs of nodes, resulting in a measurement result; and managing the plurality of entanglement swap operations during establishment of end-to-end entanglement between respective quantum elements in the nodes at the respective ends of the path over the set of N nodes using a set of classical messages transmitted over one or more classical communication channels, where each of at least two classical messages in the set of classical messages comprises one or both of:

information indicating success or failure of a particular entanglement swap operation, and information indicating the measurement result of the joint measurement performed for the particular entanglement swap operation;

where one or more of the classical messages in the set of classical messages are sent in a first direction between nodes on the path, and one or more of the classical messages in the set of classical messages are sent a second direction opposite to the first direction between nodes on the path; and where none of the classical messages in the set of classical messages or messages acknowledging success or failure of one or more of the plurality of entanglement swap operations are transmitted from one of the nodes at the ends of the path with a destination of the other of the nodes at the ends of the path.

2. The method of claim 1, where the joint measurement comprises a Bell state measurement.

3. The method of claim 1, where the classical messages further comprise an estimate of a fidelity of an entanglement established using the particular entanglement swap operation.

4. The method of claim 1, where the classical messages further comprise a timestamp indicating a time at which the particular entanglement swap operation was performed.

5. The method of claim 1, where the non-entangled pair of quantum elements comprise members of two different pairs entangled quantum elements.

6. The method of claim 1, where the one or more quantum communication channels comprise at least a first transmission medium on links between nodes of the set of N nodes, and the one or more classical communication channels comprise at least a second transmission medium on the links different from the first transmission medium.

7. The method of claim 1, where the one or more quantum communication channels comprise a first wavelength band on at least one optical transmission medium on links between nodes of the set of N nodes, and the one or more classical communication channels comprise a second wavelength band on the optical transmission medium on the links.

8. The method of claim 1, where establishing entanglement between pairs of quantum elements and performing a plurality of entanglement swap operations comprise providing to nodes, in the set of N nodes, instructions formatted according to a hardware abstraction layer (HAL).

9. The method of claim 8, where the HAL is configured to map an operation associated with establishing entanglement or an entanglement swap operation to an instruction formatted according to at least one of a plurality of available driver interfaces associated with different devices used for interacting with a quantum element in one of the nodes in the set of N nodes.

10. The method of claim 1, where managing the plurality of entanglement swap operations comprises, at each of a plurality of nodes in the set of N nodes, executing a procedure that comprises sending at least one of the classical messages in the set of classical messages based on at least one condition.

11. The method of claim 10, where the condition is based at least in part on receiving at least one of the classical messages in the set of classical messages.

12. The method of claim 10, where the procedure further comprises performing a first entanglement swap operation.

13. The method of claim 12, where the classical message sent based on the condition includes information indicating that the first entanglement swap operation was performed without indicating success of the first entanglement swap operation and without indicating which nodes have quantum elements between which entanglement has been established as a result of success of the first entanglement swap operation.

14. The method of claim 12, where the classical message sent based on the condition includes information indicating that the first entanglement swap operation was performed, information indicating success of the first entanglement swap operation, and information indicating which nodes have quantum elements between which entanglement has been established as a result of success of the first entanglement swap operation.

15. The method of claim 12, where the first entanglement swap operation is performed at a first node in the set of N nodes after the first node receives at least one of the classical messages in the set of classical messages including information indicating success of at least one entanglement swap operation performed before the first entanglement swap operation.

16. The method of claim 10, where the procedure comprises, from a first node in the set of N nodes:

sending a first classical message in the set of classical messages to a first subset of nodes in the set of N nodes including information indicating failure of a first entanglement swap operation comprising a joint measurement performed at the first node, and sending a second classical message in the set of classical messages to a second subset of nodes in the set of N nodes including information indicating success of a second entanglement swap operation comprising a joint measurement performed at the first node, where the second subset of nodes is different from the first subset of nodes.

17. The method of claim 1, where a first classical message in the set of classical messages indicates that a first established entanglement between a first pair of quantum elements was lost based on an associated fidelity falling below a predetermined minimum fidelity.

18. The method of claim 17, where the first classical message comprises at least one of: an identifier that uniquely identifies an entanglement generation operation that established the first established entanglement between a pair of nodes over a first time period of a plurality of time periods, or an identifier associated with the path.

19. The method of claim 1, where a first classical message in the set of classical messages includes information indicating failure of at least one entanglement swap operation comprising a joint measurement performed at a first node in the set of N nodes, and the first classical message is sent to one or more nodes along a portion of the path over the set of N nodes.

20. The method of claim 1, where the one or more classical messages sent in the first direction are sent from a first node at a first end of the path, and the one or more classical messages sent in the second direction are sent from a second node at a second end of the path.

21. The method of claim 20, where the plurality of entanglement swap operations are performed before the one or more classical messages sent in the first direction cross the one or more classical messages sent in the second direction on the path.

22. The method of claim 1, where the classical messages include a first message that comprises information corresponding to a result of a Bell state measurement performed in an entanglement swap operation of the plurality of entanglement swap operations.

23. The method of claim 22, where, in response to receiving the first message, one of the nodes on the first path performs a Bell state correction operation that transforms one of four possible Bell states associated with a quantum element into a target Bell state if the quantum element is not already associated with the target Bell state.

24. The method of claim 23, where the node that performs the Bell state correction operation is one of the nodes at the ends of the first path.

25. The method of claim 1, where all of the plurality of entanglement swap operations performed during establishment of end-to-end entanglement between respective quantum elements in the nodes at the ends of the path are performed after transmission of all classical messages in the set of classical messages associated with results of the entanglement established between pairs of quantum elements in the respective nodes of the two or more pairs of nodes on the path.

26. The method of claim 1, where one or more of the plurality of entanglement swap operations performed during establishment of end-to-end entanglement between respective quantum elements in the nodes at the ends of the path are performed before transmission of any classical messages in the set of classical messages associated with results of the entanglement established between pairs of quantum elements in the respective nodes of the two or more pairs of nodes on the path.

27. One or more non-transitory computer readable media storing a program for managing entangled quantum states in a network of nodes, the program comprising instructions operable to cause one or more processors to perform steps comprising:

for each of two or more pairs of nodes on a path over a set of N nodes in the network, establishing entanglement between pairs of quantum elements in the respective nodes of that pair of nodes based at least in part on one or more quantum signals transmitted over one or more quantum communication channels, where N>3;

performing a plurality of entanglement swap operations among different respective subsets of nodes in the set of N nodes using the pairs of entangled quantum elements, where each entanglement swap operation comprises:

performing a joint measurement on a non-entangled pair of quantum elements in a node that is a member of two different pairs of nodes of the two or more pairs of nodes, resulting in a measurement result; and managing the plurality of entanglement swap operations during establishment of end-to-end entanglement between respective quantum elements in the nodes at the respective ends of the path over the set of N nodes using a set of classical messages transmitted over one or more classical communication channels, where each of at least two classical messages in the set of classical messages comprises one or both of:

information indicating success or failure of a particular entanglement swap operation, and information indicating the measurement result of the joint measurement performed for the particular entanglement swap operation;

where one or more of the classical messages in the set of classical messages are sent in a first direction between nodes on the path, and one or more of the classical messages in the set of classical messages are sent a second direction opposite to the first direction between nodes on the path; and where none of the classical messages in the set of classical messages or messages acknowledging success or failure of one or more of the plurality of entanglement swap operations are transmitted from one of the nodes at the ends of the path with a destination of the other of the nodes at the ends of the path.

28. A system comprising:

a network of nodes in which each of a plurality of nodes in the network of nodes includes at least one quantum element and is connected to at least one other node in the network of nodes by a quantum communication channel coupled to the quantum element;

where network of nodes is configured to:

for each of two or more pairs of nodes on a path over a set of N nodes in the network, establish entanglement between pairs of quantum elements in the respective nodes of that pair of nodes based at least in part on one or more quantum signals transmitted over one or more quantum communication channels, where N>3;

perform a plurality of entanglement swap operations among different respective subsets of nodes in the set of N nodes using the pairs of entangled quantum elements, where each entanglement swap operation comprises:

performing a joint measurement on a non-entangled pair of quantum elements in a node that is a member of two different pairs of nodes of the two or more pairs of nodes, resulting in a measurement result; and manage the plurality of entanglement swap operations during establishment of end-to-end entanglement between respective quantum elements in the nodes at respective ends of the path over the set of N nodes using a set of classical messages transmitted over one or more classical communication channels, where each of at least two classical messages in the set of classical messages comprises one or both of:

information indicating success or failure of a particular entanglement swap operation, and information indicating the measurement result of the joint measurement performed for the particular entanglement swap operation;

where one or more of the classical messages in the set of classical messages are sent in a first direction between nodes on the path, and one or more of the classical messages in the set of classical messages are sent a second direction opposite to the first direction between nodes on the path; and where none of the classical messages in the set of classical messages or messages acknowledging success or failure of one or more of the plurality of entanglement swap operations are transmitted from one of the nodes at the ends of the path with a destination of the other of the nodes at the ends of the path.

29. The system of claim 28, where the network of nodes comprises a network of quantum computers comprising respective quantum processors with at least a first quantum processor in a first quantum computer coupled to at least a second quantum processor in a second quantum computer over a quantum communication channel between at least the first quantum processor and the second quantum processor.

30. The system of claim 28, where the network of nodes comprises a network of quantum processors comprising respective sets of quantum elements with at least a first quantum element in a first quantum processor coupled to at least a second quantum element in a second quantum processor over a quantum communication channel between at least the first quantum element and the second quantum element.

* * * * *